US012712939B2

(12) United States Patent
Sabella et al.

(10) Patent No.: US 12,712,939 B2
(45) Date of Patent: Aug. 18, 2026

(54) INTEROPERABLE FRAMEWORK FOR SECURE DUAL MODE EDGE APPLICATION PROGRAMMING INTERFACE CONSUMPTION IN HYBRID EDGE COMPUTING PLATFORMS

(71) Applicant: Intel Corporation, Santa Clara, CA (US)

(72) Inventors: Dario Sabella, Gassino Torinese (IT); Danny Moses, Reut (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/484,719

(22) Filed: Sep. 24, 2021

(65) Prior Publication Data

US 2022/0086218 A1 Mar. 17, 2022

Related U.S. Application Data

(60) Provisional application No. 63/130,317, filed on Dec. 23, 2020.

(51) Int. Cl.
*H04L 67/10* (2022.01)
*G06F 9/54* (2006.01)
(Continued)

(52) U.S. Cl.
CPC .............. *H04L 67/10* (2013.01); *G06F 9/547* (2013.01); *H04L 63/0876* (2013.01); *H04L 67/141* (2013.01)

(58) Field of Classification Search
CPC ... H04L 67/10; H04L 63/0876; H04L 67/141; G06F 9/547

(Continued)

(56) References Cited

U.S. PATENT DOCUMENTS

2015/0295731 A1* 10/2015 Bagepalli ............ H04L 12/6418 370/401
2018/0123964 A1* 5/2018 Kore .................. H04L 41/5009
(Continued)

OTHER PUBLICATIONS

Sophia Antipolis (Functional architecture and information flows to support Common API Framework for 3GPP Northbound APIs; 3GPP TS 23.222 v17.3.0 Dec. 2020) (Year: 2020).*
(Continued)

*Primary Examiner* — Suraj M Joshi
*Assistant Examiner* — Ayele F Woldemariam
(74) *Attorney, Agent, or Firm* — Hanley, Flight & Zimmerman, LLC

(57) ABSTRACT

The present disclosure is related to edge computing frameworks and systems, and in particular, to interworking between different edge computing technologies (ECTs). The present disclosure provides a flexible framework including an edge API service (edgeXapis) gateway (GW) enabling interoperable and secure communication among the multiple different ECTs via attestation, and supporting the connection between the multiple different ECTs. The edgeXapis GW also provides exposure to edge Apps of the full list of application programming interfaces (APIs) from each of the multiple different ECTs. The edgeXapis GW also provides interoperable edge service consumption from the multiple different ECTs, including APIs exposed from each of the multiple different ECTs to make different alternative transport protocols available to each other ECT for edge service consumption. Other embodiments may be described and/or claimed.

16 Claims, 33 Drawing Sheets

(51) Int. Cl.
*H04L 9/40* (2022.01)
*H04L 67/141* (2022.01)

(58) Field of Classification Search
USPC .......................................................... 709/201
See application file for complete search history.

(56) References Cited

U.S. PATENT DOCUMENTS

| | | | | |
|---|---|---|---|---|
| 2018/0359312 | A1* | 12/2018 | Dabell | H04L 43/08 |
| 2019/0149576 | A1* | 5/2019 | Rajadurai | H04L 63/0869 |
| 2019/0334757 | A1* | 10/2019 | Hill | G06F 9/542 |
| 2022/0038554 | A1* | 2/2022 | Merwaday | H04L 45/64 |
| 2022/0353732 | A1* | 11/2022 | Filippou | H04W 28/0289 |

OTHER PUBLICATIONS

Multi-access Edge Computing (MEC) MEC 5G Integration ETSI GR MEC 031 V2.1.1 (Oct. 2020) (Year: 2020).*

Ed D. Hardt, “The OAuth 2.0 Authorization Framework”, Oct. 2012, 76 pages, Internet Engineering Task Force (IETF), RFC6749, ISSN: 2070-1721.

ETSI, “Harmonizing standards for edge computing—A synergized architecture leveraging ETSI ISG MEC and 3GPP specifications”, Jul. 2020, 14 pages, ISBN No. 979-10-92620-35-5, France.

ETSI, “5G; 5G System; Network Exposure Function Northbound APIs; Stage 3 (3GPP TS 29.522 version 16.4.0 Release 16)”, Aug. 2020, 163 pages, ETSI TS 129 522 V16.4.0, France.

ETSI, “LTE; 5G; Common API Framework for 3GPP Northbound APIs (3GPP TS 23.222 version 15.2.0 Release 15)”, Jul. 2018, 85 pages, ETSI TS 123 222 V15.2.0, France.

ETSI, “Multi-access Edge Computing (MEC); V2X Information Service API”, Apr. 2020, 59 pages, ETSI GS MEC 030 V2.1.1, France.

ETSI, “Multi-access Edge Computing (MEC); Device application interface”, Apr. 2020, 28 pages, ETSI GS MEC 016 V2.2.1, France.

ETSI, “Multi-access Edge Computing(MEC); Edge Platform Application Enablement”, Dec. 2020, 78 pages, ETSI GS MEC 011 V2.2.1, France.

ETSI, “Multi-access Edge Computing (MEC) MEC 5G Integration”, Oct. 2020, 47 pages, ETSI GR MEC 031 V2.1.1, France.

3GPP “3rd Generation Partnership Project; Technical Specification Group Services and System Aspects; System architecture for the 5G System (5GS); Stage 2 (Release 16)”, Sep. 2020, 447 pages, 3GPP TS 23.501 V16.6.0, Valbonne, France.

3GPP, “3rd Generation Partnership Project; Technical Specification Group Services and System Aspects; Architecture for enabling Edge Applications; (Release 17)”, Oct. 2020, 121 pages, 3GPP TS 23.558 V1.1.0, Valbonne, France.

3GPP, “3rd Generation Partnership Project; Technical Specification Group Services and System Aspects; Architecture for enabling Edge Applications; (Release 17)”, Nov. 2020, 131 pages, 3GPP TS 23.558 V1.2.0, Valbonne, France.

3GPP, “3rd Generation Partnership Project; Technical Specification Group Services and System Aspects; Architecture enhancements to facilitate communications with packet data networks and applications (Release 16)”, Sep. 2020, 135 pages, 3GPP TS 23.682 V16.8.0, Valbonne, France.

3GPP, “3rd Generation Partnership Project; Technical Specification Group Services and System Aspects; Telecommunication management; Study on management aspects of edge computing (Release 16)\”, Sep. 2019, 20 pages, 3GPP TR 28.803 V16.0.1, Valbonne, France.

3GPP, “3rd Generation Partnership Project; Technical Specification Group Core Network and Terminals; Common API Framework for 3GPP Northbound APIs; (Release 16)”, Dec. 2020, 150 pages, 3GPP TS 29.222 V16.5.0, Valbonne, France.

3GPP, “3rd Generation Partnership Project; Technical Specification Group Services and System Aspects; Security aspects of Common API Framework (CAPIF) for 3GPP northbound APIs (Release 16)”, Jul. 2020, 30 pages, 3GPP TS 33.122 V16.3.0, Valbonne, France.

3GPP, “3rd Generation Partnership Project; Technical Specification Group Services and System Aspects; Functional architecture and information flows to support Common API Framework for 3GPP Northbound APIs; Stage 2 (Release 17)”, Dec. 2020, 115 pages, 3GPP TS 23.222 V17.3.0, Valbonne, France.

3GPP, “3rd Generation Partnership Project; Technical Specification Group Services and System Aspects; General Packet Radio Service (GPRS) enhancements for Evolved Universal Terrestrial Radio Access Network (E-UTRAN) access (Release 16)”, Dec. 2020, 440 pages, 3GPP TS 23.401 V16.9.0, Valbonne, France.

* cited by examiner

700a

MEC App 2426
(API invoker 410)

1

Mp1

MEC service mgmnt API

2

Transport
Discovery 720

3

2b

MEC API(s) 630

MEC Platform 2432
(AEF 401)

3

CAPIF-7e

EAS 2150
(API invoker 410)

2a

3GPP Core Services 620

EES 2155
(AEF 401)

CAPIF-3e

0

CAPIF-3

1

CAPIF-1

CCF 405 edgeXapi GW
710

PLMN trust domain 420

700b

MEC App 2426 (API invoker 410)

1

Mp1

MEC service mgmnt API

2

Transport Discovery 720

MEC API(s) 630

MEC Platform 2432 (AEF 401)

3

2b

3

EAS 2150 (API invoker 410)

2a

3GPP Core Services 620

EES 2155 (AEF 401)

CAPIF-7e

CAPIF-3e

0

CAPIF-3

1

CAPIF-1

CCF 405 edgeXapi GW 710

PLMN trust domain 420

1900
Application Layer 1920
Edge Management Layer 1950
Edge Enabler Layer 1910
Edge Hosting Environment 1930
3GPP Transport Layer 1940
2000
OSS 2010
3GPPms 2015
ETSI NFV MANO 2025
ECMS 2027
Non-3GPPms 2020

INTEROPERABLE FRAMEWORK FOR SECURE DUAL MODE EDGE APPLICATION PROGRAMMING INTERFACE CONSUMPTION IN HYBRID EDGE COMPUTING PLATFORMS

RELATED APPLICATIONS

The present application claims priority to U.S. Provisional App. No. 63/130,317 filed Dec. 23, 2020 ("[AD4420-Z]"), the contents of which are hereby incorporated by reference in its entirety.

TECHNICAL FIELD

Embodiments described herein generally relate to edge computing, network communication, and communication system implementations, and in particular, to technologies for harmonizing edge computing standards and frameworks.

BACKGROUND

The Information and Communications Technology (ICT) industry has been debating edge computing for many years. With a growing market demand stemming from applications requiring low latency and recent developments in standards and products, the opportunity to deploy edge computing at scale is here to stay, fueling substantial market growth. Mobile network infrastructures offer a fast-track deployment path for edge cloud infrastructures. There are two factors contributing to this trend.

On the demand side, with Industrial Internet of Things (IIoT) going mainstream, there are several commercially viable use cases which call for processing data at the edge to address stringent latency requirements and avoid overloading networks. Other applications calling for edge computing capabilities include Augmented Reality (AR) and/or Virtual Reality (VR), gaming and Vehicle-to-everything (V2X) communication (such as Vehicle-to-Vehicle, Vehicle-to-Infrastructure, Vehicle-to-Network, or Vehicle-to-Pedestrian)—all are currently gaining momentum in the marketplace On the supply side, building a distributed cloud computing infrastructure is proven to be a viable business opportunity, thanks to geographically dense Points-of-Presence (PoP) of Mobile Network Operators (MNOs). Cloud providers are also looking for opportunities and partnerships to build edge cloud infrastructures. MNO points of presence are unique in addressing the proximity requirements of most demanding use cases with deployment options ranging from deep and far edge (up to 5 km and 10 km from end user resp.) to aggregated edge (up to 30 km). With 5G being extensively deployed in several geographies, new features such as Ultra-Reliable Low Latency Communications (URLLC) and massive Machine Type Communication (mMTC) call for complementary edge computing capabilities to realize the full market potential of 5G. Today, deploying cloud computing at the edge is a market and a business imperative.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
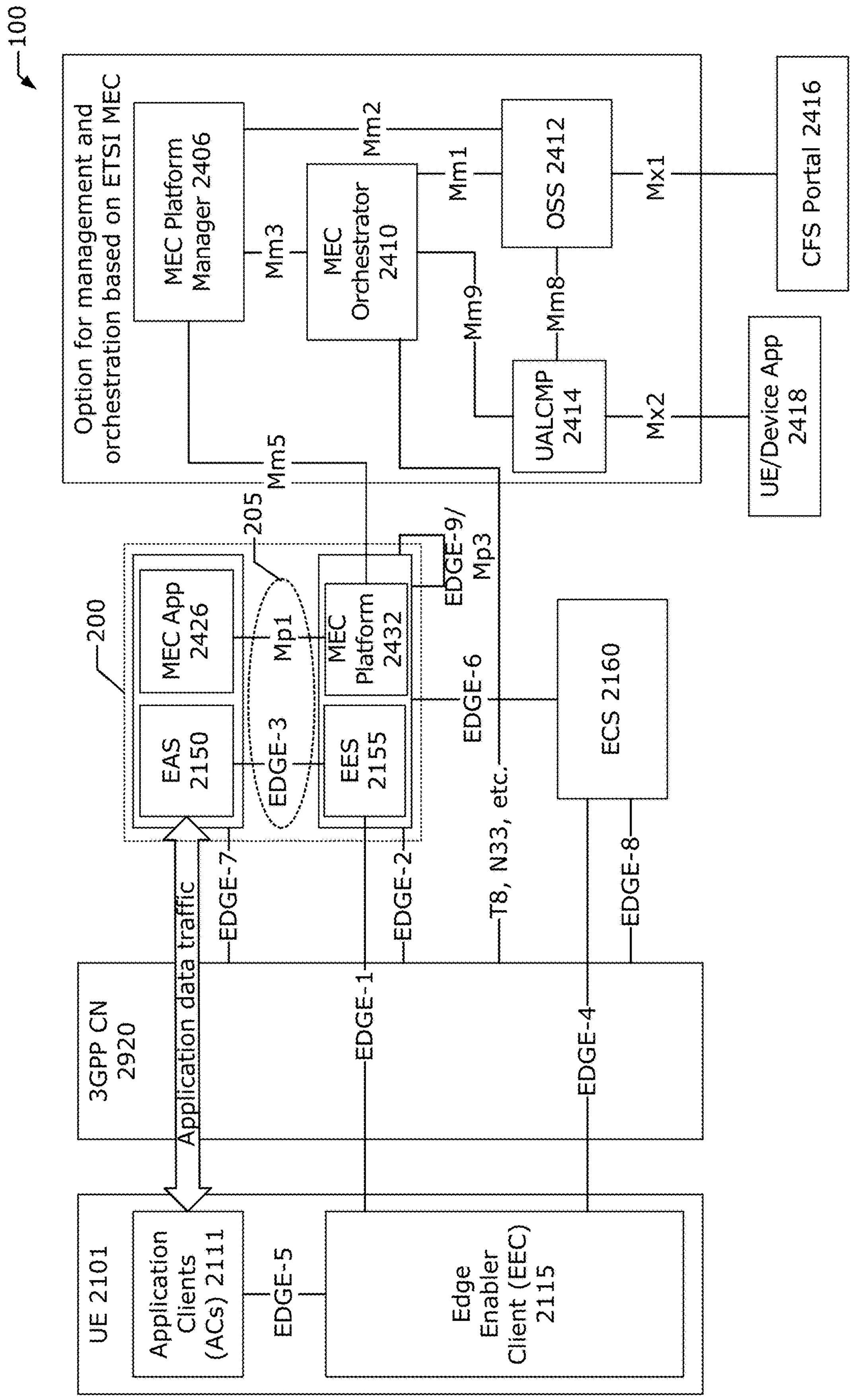
FIG. 1 illustrates a Synergized Mobile Edge Cloud architecture supporting different modes of operations according to various embodiments.

The following embodiments generally relate to data processing, service management, resource allocation, compute management, network communication, application partitioning, and communication system implementations, and in particular, to techniques and configurations for adapting various edge computing devices and entities to dynamically support multiple entities (e.g., multiple tenants, users, stakeholders, service instances, applications, etc.) in a distributed edge computing environment.

Internet of Things (IoT) devices are physical or virtualized objects that may communicate on a network, and may include sensors, actuators, and other input/output components, such as to collect data or perform actions from a real-world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated. The deployment of IoT devices and Multi-access Edge Computing (MEC) services have introduced a number of advanced use cases and scenarios occurring at or otherwise involving the edge of the network.

Industrial IoT (IIoT) refers to interconnected sensors, instruments, and other devices networked together with computers' industrial applications, including manufacturing and energy management. This connectivity allows for data collection, exchange, and analysis, potentially facilitating improvements in productivity and efficiency as well as other economic benefits. The IIoT is an evolution of a distributed control system (DCS) that allows for a higher degree of automation by using cloud computing to refine and optimize the process controls. IIoT Industry 4.0 is/are wide in scope and in the number of use cases it encompasses. Because of the low latency requirements introduced by these use cases and their need for trusted computing, using central clouds is oftentimes not an option anymore, leaving edge cloud as the only viable option. With 5G being deployed in public and private networks, combining 5G (and 4G) with edge cloud is a natural architecture option to support Industrial IoT.

Edge computing, at a general level, refers to the implementation, coordination, and use of computing and resources at locations closer to the "edge" or collection of "edges" of the network. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in a high performance compute data center or cloud installation; a designated edge node server, an enterprise server, a roadside server, a telecom central office; or a local or peer at-the-edge device being served consuming edge services).

Applications that have been adapted for edge computing include but are not limited to virtualization of traditional network functions (e.g., to operate telecommunications or Internet services) and the introduction of next-generation features and services (e.g., to support 5G network services). Use-cases which are projected to extensively utilize edge computing include connected self-driving cars, surveillance, Internet of Things (IoT) device data analytics, video encoding and analytics, location aware services, device sensing in Smart Cities, among many other network and compute intensive services.

Edge computing may, in some scenarios, offer or host a cloud-like distributed service, to offer orchestration and management for applications and coordinated service instances among many types of storage and compute resources. Edge computing is also expected to be closely integrated with existing use cases and technology developed for IoT and Fog/distributed networking configurations, as endpoint devices, clients, and gateways attempt to access network resources and applications at locations closer to the edge of the network.

Standards are often required when there is a need to build solutions involving multiple stakeholders. They are also beneficial to realize economies of scale, avoid lock-in and enable multi-vendor solutions leveraging best of breed components from each provider to be built. Examples of where standards are specifically required when deploying edge computing in conjunction with MNO infrastructures include:

- Common infrastructure capabilities to help developers/customers access and deploy their software (e.g., applications, platforms, etc.) over the edge infrastructure of the MNOs.
- Smart application placement to allow the optimized deployment of applications at the edge infrastructure based on criteria such as available resources, geographical areas, cost and latency requirements.
- Discovery of, and optimal (re)-routing to an edge cloud capable of serving application clients (running on devices). When an application client wants to reach a server application, there's a need to discover the optimal edge cloud, one which runs instances of the server application, has the necessary resources (CPU, GPU, etc.) and provides the lowest network latency.
- Service continuity: when mobility occurs, it will be beneficial to seamlessly transfer the context from a stateful application instance in an edge cloud to an instance of the same application in a target edge cloud, e.g., one that provides a lower latency.
- Cloud applications would enhance the user experience if they could leverage services offered by the network: accessing information and services provided by the edge services such as the device location or QoS are key to enhance the user experience.
- Edge federation across multiple MNOs: allowing MNOs to offer to the developers/customers the possibility to deploy their software across multiple domains and ensure service continuity when roaming on alternative networks.

In order to offer these capabilities interactions between the edge cloud middleware (enabling applications running on the edge), the applications (whether running on devices or on the edge cloud) and the networks are required. Related to these interactions, this document highlights the relevant standards initiatives, their value propositions and their complementary natures.

Open source also plays an important role in shaping and accelerating deployments of edge clouds. A variety of open source projects pertaining to the cloud in general will equally apply to edge clouds. These include ones that offer high throughput, low latency, high availability, horizontal scalability, etc. Additionally, other open source initiatives are emerging to specifically support ongoing standards for edge cloud deployments in conjunction with mobile networks. Their value propositions will be about supporting developers and expediting the time to deployment. Vertical specific open source components can also enhance edge cloud deployments through offering specific microservices that can be used by application developers through application programming interfaces (APIs).

The various embodiments discussed herein are applicable to any kind of wireless equipment, including processors/CPUs with connectivity features, mobile devices (e.g., smartphones, feature phones, tablets, wearables (e.g., smart watches or the like), IoT product and/or IoT devices, laptops, wireless equipment in vehicles, industrial automation equipment, etc.), network or infrastructure equipment (e.g., Macro/Micro/Femto/Pico Base Stations, repeaters, relay stations, WiFI access points, RSUs, RAN nodes, backbone equipment, routing equipment, any type of Information and Communications Technology (ICT) equipment, any type of Information Technology (IT) equipment, etc.), and systems/applications that are not classically part of a communications network (e.g., medical systems/applications (e.g., remote surgery, robotics, etc.), tactile internet systems/applications, satellite systems/applications, aviation systems/applications, vehicular communications systems/applications, autonomous driving systems/applications, industrial automation systems/applications, robotics systems/applications, etc.). The embodiments introduce hierarchy levels for various types of equipment, for example, network equipment may have a higher hierarchy level as compared to UEs, or vice versa. Depending on the hierarchy level, some equipment may be treated preferably (less delay) or may have access to more information/data than other equipment.

1. EXAMPLE EMBODIMENTS

FIG. 1 illustrates a Synergized Mobile Edge Cloud architecture 100 supporting different modes of operations and leveraging Third Generation Partnership Project (3GPP) and European Telecommunications Standards Institute (ETSI) Industry Specification Group (ISG) Multi-access Computing (MEC). FIG. 1 also shows a relationship between 3GPP EDGEAPP and ETSI MEC architectures.

In FIG. 1, devices (e.g., UE 2101) run application clients (ACs) 2111, which either use a Domain Name System (DNS) to discover application servers such as the Edge Application Server (EAS) 2150 in 3GPP Service and System Aspects (SA) Working Group 6 (SA6) or an MEC Application (MEC app) 2426 in ETSI MEC, and/or use the Edge Enabler Client (EEC) 2115 to perform the discovery according to the 3GPP SA6 EDGEAPP architecture (see e.g., FIGS. 19-23). 3GPP SA6 defines an the 3GPP architecture for enabling Edge Applications (EDGEAPP), specifically through the specification of an enabling layer to facilitate communication between application clients and applications deployed at the edge. While offering indirect support to edge unaware application clients, EDGEAPP offers additional benefits for edge aware applications through direct interaction with the device hosted Edge Enabler Client. The EDGEAPP architecture also enables the Common API Framework (CAPIF) to be leveraged as a standardized means of providing and accessing APIs in the Edge Cloud. The UE 2101 may be the same or similar as UEs 1221, 1211 of FIG. 12, UE/Device 2420 of FIG. 24, UE 2902 of FIG. 29, and/or other UEs, mobile devices, and/or clients discussed herein.

In some implementations, the EAS 2150 and the MEC app 2426 are application servers and can provide similar application specific functionalities. EAS 2150 utilizes services of the EES 2155 whereas the MEC app 2426 utilizes the services provided by MEC platform 2432 as specified in [MEC003]. The EAS 2150 and MEC app 2426 can be collocated in some implementations.

An edge platform (e.g., Edge Enabler Server (EES) 2155 in 3GPP SA6 and/or MEC platform 2432 in ETSI MEC) provides functionality pertaining to mediating access to network services, application authorization, application service registration, application service discovery, context transfer, and/or other like functionality and/or services. Both the EES 2155 and the MEC platform 2432 provide application support capabilities towards the application servers (e.g., EAS 2150 and MEC app 2426, respectfully). How the EES 2155 and the MEC platform 2432 are implemented or aligned can be implementation specific. The EES 2155 and the MEC platform 2432 can be collocated in an implementation. For example, the APIs provided by the EES 2155 in support of the EASs 2150 could be offered and/or exposed by an implementation offering both EES 2155 and MEC platform 2432 capabilities in support of EASs 2150 and MEC apps 2426. Similarly, an EAS 2150 and MEC app 2426 can be collocated in an implementation (as also stated in the informative Annex C of [TS23558]), to utilize the services offered by both the EES and MEC platform. In summary, implementations, in particular those in which an EES 2155 and MEP 2432 are collocated, may be compliant with the 3GPP EDGEAPP specification [TS23558], the ETSI MEC specifications, or both sets of specifications. Implementations compliant with both sets of specifications enables capabilities of both edge computing technologies (ECTs) to be offered and can avoid potential duplication of separately deploying EESs 2155 and MEPs 2432.

A given implementation can combine functions/services specified by ETSI MEC and functions/services specified by 3GPP SA6 Edge Computing. The edge platform exposes APIs towards edge cloud applications (e.g., MEC app 2426 or EAS 2150). The EDGE-3 and Mp1 reference points offer complementary and/or similar API functions, and therefore, the EDGE-3 and Mp1 reference points can be considered to be part of a single reference point 205 from an application developer perspective.

Functionalities specified by ETSI MEC include management and orchestration of the MEC platforms 2406 and OSS 2412 functions supporting access to portals offered to application service providers (see e.g., [MEC003]). In ETSI MEC, MEC apps 2426 and the MEC platform 2432 can expose services, which can include network services, subject to their availability at the core or access network level. The orchestration and management aspects of the architecture for enabling edge applications are specified in 3GPP SA5 specifications. The MEC platform 2432 offers supports to MEC apps 2426 (similar to EASs 2150, where both can be considered as application servers in 3GPP nomenclature) via the Mp1 reference point; it is also involved in the MEC app management through connectivity to the MEC platform manager 2406 via the Mm5 reference point. While the MEC platform 2432 does not directly interact with the UEs, a device application (hosted in a device, for which a UE 2101 is provided as an example) can issue a request (via Mx2 reference point to the UALCMP 2414) to instantiate an application in the MEC system 2400, or to move an instantiated application in or out of the MEC system 2400. Details about MEC entities (e.g., MEC platform 2432, MEC app 2426, MEC platform manager 2406, MEC Orchestrator 2410, OSS 2412, and Customer Facing Service (CFS) portal 2416) are discussed infra with respect to FIGS. 24-28 and can be found in [MEC003].

The EDGE-3 and Mp1 provide service registration and service discovery features which allow an edge cloud application to register services exposed by this application and their subsequent discovery and use by other applications. The exposed services can be about network services, subject to their availability at the core or access network level. The common capabilities may be harmonized through adoption of the Common API Framework (CAPIF) as specified in [TS23222].

EDGE-9 and Mp3 are both at early stage of development. Both are intended to assist in context migration. The following interfaces are about simple endorsement of SA2 interfaces (e.g., Network Exposure Function/Service Capability Exposure Function, NEF/SCEF): EDGE-2, EDGE-7, EDGE-8, M3GPP-1.

According to 3GPP SA6 standards, edge services are exposed to the application clients by the Edge Configuration Server (ECS) 2160 and the EES 2155 via the EEC 2115 in the UE 2101. Each EEC 2115 is configured with the address of the ECS 2160, which is provided by either the MNO or by the Edge Computing Service Provider (ECSP) (see e.g., ECSP 2310 of FIG. 23). Deployment options may implement all or a subset of the features of the synergized architecture as shown in subsequent sections.

The present disclosure considers the edge computing reference scenario, as described in ETSI White Paper #36, "Harmonizing standards for edge computing—A synergized architecture leveraging ETSI ISG MEC and 3GPP specifications" (July 2020) ("[ETSIWP36]") published by both ETSI MEC and 3GPP SA6 officials and members. The paper introduced a synergized architecture leveraging ETSI MEC standards (see e.g., [MEC003]) and 3GPP specifications (see e.g., 3GPP TS 23.558 v1.2.0 (2020 Dec. 7) ("[TS23558]"), by highlighting the value proposition of different standards streams and how those standards may be combined when it comes to deployments.

Regarding the alignment between ETSI MEC and 3GPP SA6 EDGEAPP standards, starting from the initial analysis done in the recent ETSI white paper, the focus was to compare the definition of MEC platform 2432 in ETSI and the EES 2155 in SA6, to possibly identify similarities and gaps. One goal is in fact to ensure that both SDOs allow the implementation of a single platform as product compliant with both standards. Three main "deployment variants" should be possible, for a product implementation. Depending on the various deployment options and customer needs, a single product should be able to be compliant with 3GPP, ETSI MEC, or both.

As a preliminary analysis focused on the edge platform, at high level the two standards groups (ETSI MEC and 3GPP SA6) are defining the same basic platform features. Mainly, the two sets of APIs related to edge services exposed to the Apps are complementary. This can be a great added value, especially for products compliant with both standards.

Figure 2:
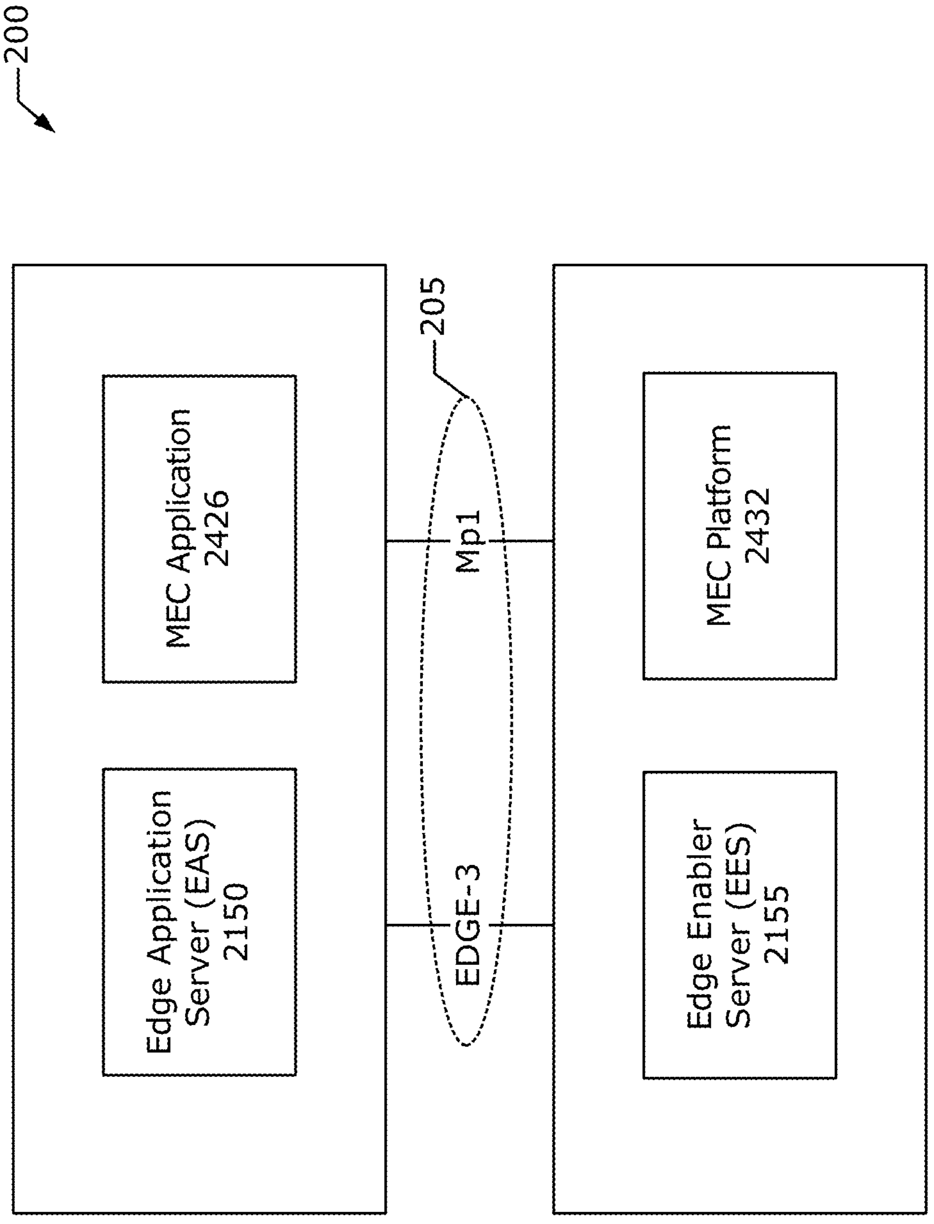
FIG. 2 illustrates a reference platform and edge service application programming interface (API) exposure.

Based on this context, the present disclosure provides a flexible framework for Edge APIs consumption, in presence of hybrid MEC implementations of edge platforms (e.g., compliant with both standards), such as the architecture of FIG. 1 and the reference platform and edge service API exposure framework 200 shown by FIG. 2. The embodiments herein enable edge applications to consume edge APIs from both set of standards (e.g., ETSI MEC and 3GPP EDGEAPP standards).

The present disclosure considers edge platforms compliant with both ETSI MEC and 3GPP SA6 standards, where the edge platform implements functionalities and APIs compliant to the two standards. The embodiments herein enable edge applications in dual mode edge APIs consumption, from both standards. The embodiments herein provide an interoperable mechanism that may enable the same application (e.g., on-boarded either as a MEC Apps 2426 or EAS 2150) to consume edge service APIs in such a hybrid scenario, in order to benefit from the whole portfolio of functionalities offered at the edge.

The flexible framework discussed herein provide the following technology components: a definition of an edge API service (edgeXapis) gateway (GW) as a function enabling interoperable and secure communication via attestation, and supporting the connection between MEC and 3GPP CAPIF; exposure to edge apps of the full list of APIs from both MEC and 3GPP systems, by means of proper signaling (supported by the edgeXapis GW function) CAPIF Core Function (e.g., CCF 405 of FIG. 4) and the MEC platform 2432; interoperable edge service consumption from MEC and 3GPP, including APIs exposed from both systems; and mechanisms to make available to EASs 2150 also alternative transport protocols, for the MEC APIs service consumption. The present disclosure includes MEC platform 2432 and EES 2155 implementations that enable this dual mode API consumption, including from the edge platform implementations.

In some aspects, the starting point is to have an App already on-boarded, and up and running, either as ETSI or as 3GPP. In both cases, as an initial working assumption, the onboarding mechanisms are not changed. The embodiments herein make this cross-exposure available from an App.

The ETSI MEC contribution [MEC(20)000390r1] provides a visual comparison of the two standards related to edge platforms (e.g., between ETSI MEC and 3GPP), which is also shown by Table 1. This showed a good alignment of the two standards, and also a good complementarity of APIs offered by the two SDOs, but still not showing in detail how is possible for edge applications to consume both sets of APIs.

TABLE 1

| Feature/ capability | EES (3GPP SA6) | MEC Platform (ETSI MEC) | Comments |
|---|---|---|---|
| General purpose | Provide information for EAS 2150 Discovery to the EEC 2115.<br>Provides Edge services through APIs to co-located EASs 2150.<br>Supports application Context | Provide App look-up procedure through UALCMP.<br>Provides MEC services through APIs to co-located or remote MEC Apps.<br>Supports application Context | Generally, the two standard groups are defining the same basic platform features. |

TABLE 1-continued

| Feature/ capability | EES (3GPP SA6) | MEC Platform (ETSI MEC) | Comments |
|---|---|---|---|
| | Transfer Supports general service discovery | Transfer Supports MEC service discovery (via Service Registry) | |
| Edge app discovery | EEC 2115/EES 2155 interaction Also DNS-based is possible ([ETSIWP36], section 3.3.1) | DNS based | While the App discovery in ETSI MEC is only based on DNS, the SA6 standard foresees also other device-based method. |
| Service APIs | APIs for EAS 2150 registration APIs for EAS 2150 profile sharing APIs for providing 3GPP Core services to EASs 2150 APIs for UE identification and UE-related events | MEC Application support API (see e.g., [MEC011]) MEC Service Management API (see e.g., [MEC011]) RNI API (see e.g., [MEC012]) Location API (see e.g., [MEC013]) UE Identity API (see e.g., [MEC014]) UE App Interface API (see e.g., [MEC016]) Fixed Access Info API (see e.g., [MEC029]) Traffic Mgmt APIs (see e.g., [MEC015]) WLAN Info API (see e.g., [MEC028]) V2X Info Service API (see e.g., [MEC030]) | Mainly, the 2 sets of APIs (related to edge services exposed to the Apps) are complementary. This can be a great added value, especially for products compliant with both standards. |
| Application Context Transfer | APIs for subscription for UE-mobility events APIs assisting the discovery of target EASs 2150 (interaction with other EESs 2155). APIs for influencing 3GPP core User Plain path settings | App Mobility Service API (see e.g., [MEC021]) Application lifecycle, rules and requirements management (see e.g., [MEC010-2]) | |
| General Discovery | Enables EASs to advertise services via CAPIF | ETSI MEC aligned with CAPIF (see e.g., [MEC031]) | Good alignment |

[MEC011] defines both a MEC application support API (e.g., MEC application assistance, application specific traffic routing (e.g., updates, activation, deactivation), DNS rules (e.g., activation, deactivation) and timing (e.g., providing access to date, time zone, and/or time of day information), as well as graceful termination/stop) and a MEC service management API (e.g., MEC service assistance and associated service transport information). The MEC application assistance functionality may include, for example, MEC application start-up procedure(s) and/or MEC application graceful termination/stop. The MEC service assistance functionality may include, for example, authentication and authorization of producing and consuming MEC services 2436; a means for service producing MEC apps 2426 to register/deregister towards the MEC platform 2432, the MEC services 2436 they provide, and to update the MEC platform 2432 about changes of the MEC service availability; a means to notify the changes of the MEC service availability to the relevant MEC app 2426; and discovery of available MEC services 2436.

The service transport information may include information about available transports, information regarding a particular transport used by a service, a transport ID (an identifier of the transport to be used by the service), a transport name, a human-readable description of this transport, the type of transport, a transport protocol name and version, information about the endpoint to access the transport, information about the security used by the transport (e.g., OAuth 2.0, TLS, etc.), additional implementation specific details of the transport, and/or other like information. Providing a MEC service 2436 implies the use of a transport to deliver the MEC service 2436 to the MEC apps 2426 that consume the MEC service 2436. Each MEC service 2436 is bound to a transport that is either provided by the MEC platform 2432, or by the MEC app 2426 itself. Transports that may be used for purposes of the present disclosure include any protocol that supports communication between MEC app 2426 instances and the MEC platform 2432, or between MEC app 2426 instances. Examples of transports that may be used and/or indicated using the mechanisms described herein include REST-HTTP (RESTful API using HTTP (as defined in IETF RFC 7230 and related specifications), possibly also with the usage of TLS; topic-based message buses (protocols that route messages to receivers based on subscriptions, if a pattern passed on subscription matches the topic of the message; e.g., Message Queue Telemetry Transport (MQTT), Apache™ Kafka, etc.); routing-based message bus (protocols that route messages to receivers based on subscriptions, if a key passed on subscription is equal to the key of the message); publish-subscribe (pub/sub) message buses (protocols that distribute messages to all subscribers); remote procedure call (RPC) frameworks (e.g., gRPC™, Apache™ Thrift, etc.); RPC streaming frameworks (RPC frameworks supporting streams of requests and responses such as gRPC™ and the like); websocket (websockets as defined in IETF RFC 6455); Zenoh transport protocol provided by the Eclipse Foundation™; and/or any other like protocol such as those discussed herein. The transport information query described in [MEC011] provides a standardized means for MEC apps 2426 to discover available transports from a MEC platform 2432.

1.1. Edge Service APIs Exposure Aspects

Figure 3:
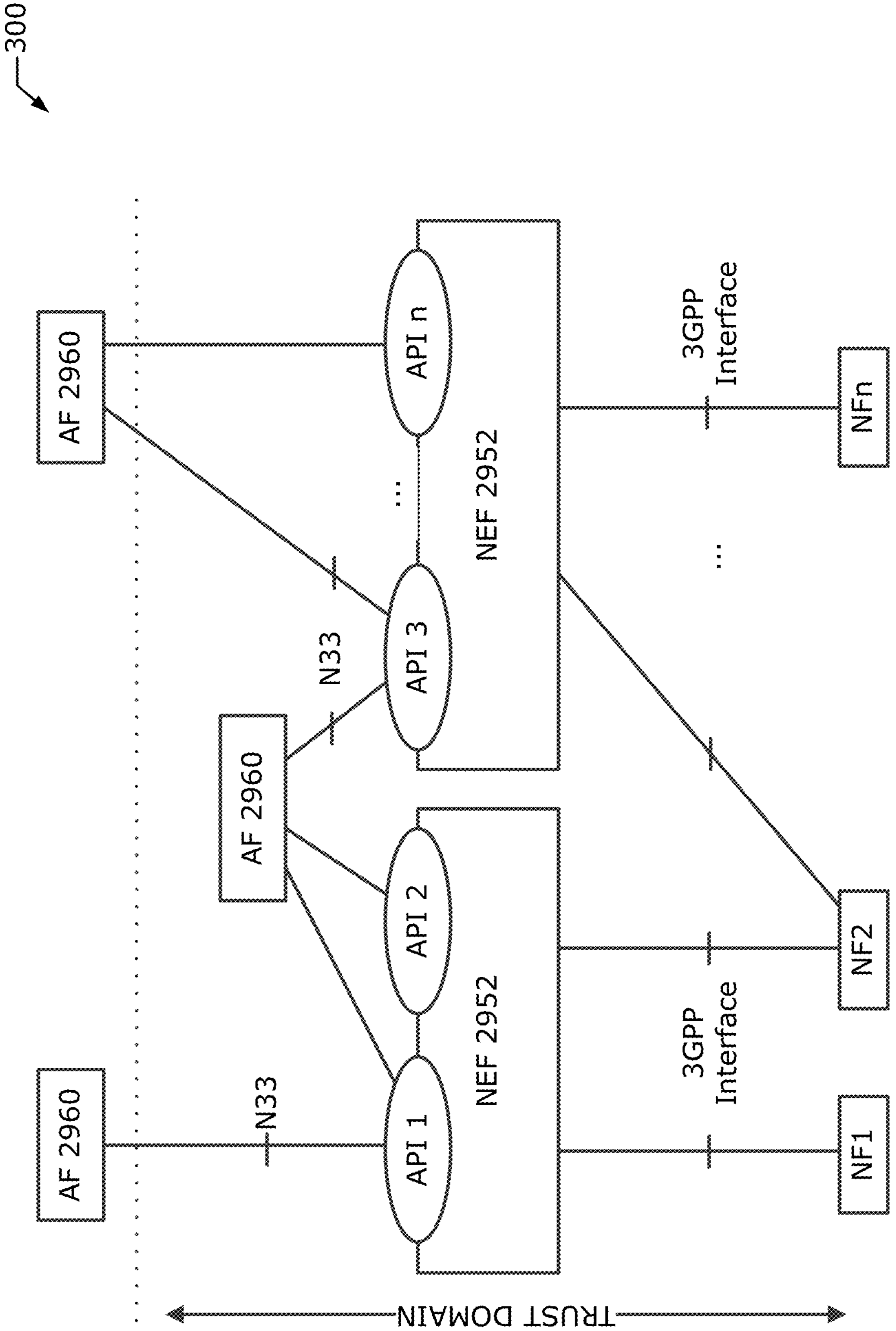
FIG. 3 illustrates an example architecture for Network Exposure Function in reference point representation.

FIG. 3 illustrates an example architecture 300 for Network Exposure Function (NEF) 2952 in reference point representation. In FIG. 3, the trust domain for the NEF 2952 is same as Trust domain for the Service Capability Exposure Function (SCEF) as discussed in 3GPP TS 23.682 v16.8.0 (2020 Sep. 24) ("[TS23682]"). The 3GPP Interface between the NEFs 2952 and the 5GC 2940 Network Functions (NFs) 1-n represents one or more southbound interfaces (e.g., N29 interface between NEF 2952 and SMF 2946, N30 interface between NEF 2952 and PCF 2956, etc.). The southbound interfaces from the NEF 2952 are not shown for the sake of simplicity.

According to [TS23501], the NEF 2952 is responsible for service exposure, both for AFs 2960 inside and outside the 3GPP trusted domain. For exposure of capabilities and events, NF capabilities and events may be securely exposed by the NEF 2952, for example, 3rd party, AFs 2960, and Edge Computing as described in clause 5.13 of [TS23501]. The NEF 2952 also provides a means for the AFs 2960 to securely provide information to 3GPP network (e.g., Expected UE Behavior, 5G-VN group information, time synchronization service information and service specific information). In that case the NEF 2952 may authenticate and authorize and assist in throttling the AFs 2960. The NEF 2952 also translates between information exchanged with an AF 2960 and information exchanged with the internal NFs. For example, the NEF 2952 translates between an AF-Service-Identifier and internal 5G Core information such as DNN, S-NSSAI, as described in clause 5.6.7 of [TS23501]. In particular, the NEF 2952 handles masking of network and user sensitive information to external AF's 2960 according to the network policy. Other aspects of the NEF 2952 are discussed in [TS23501]. Additional aspects regarding the NEF 2952 and its relationship with the MEC system 2400 can be found in ETSI GR MEC 031 V2.1.1 (2020 October) ("[MEC031]").

The NEF 2952 is the 5G NF in charge of securely exposing the network capabilities and events to AFs and other consumers as defined in [TS23501], clause 6.2.5. Two types of AFs 2960 are possible: trusted AFs 2960 and non-trusted AFs 2960. AFs 2960 that are not allowed by the operator to access directly the target NFs use the NEF 2952 for their interactions. While the NEF 2952 is used for untrusted AFs 2960, a trusted AF 2960 may interface with the 5GS via NEF 2952 or interface directly with 5GS functions, such as SMF 2946, etc. The details of the external exposure of the capabilities are defined in [TS23501]. The Restful APIs for capability exposure are defined in ETSI TS 129 522 V16.4.0 (2020 August) and/or [TS29522].

An AF 2960 can get services from multiple NEFs 2952 and an NEF 2952 can provide service to multiple AFs 2960. Any instance of an NEF 2952 may support only a subset or all of the available NEF functionality. An NEF 2952 may support CAPIF functionality, and more specifically the CAPIF API provider domain functions, for external exposure ETSI TS 123 222 V15.2.0 (2018 July) and/or [TS23222]. Moreover, additional aspects regarding the 3GPP CAPIF are discussed in [MEC031].

Figure 4:
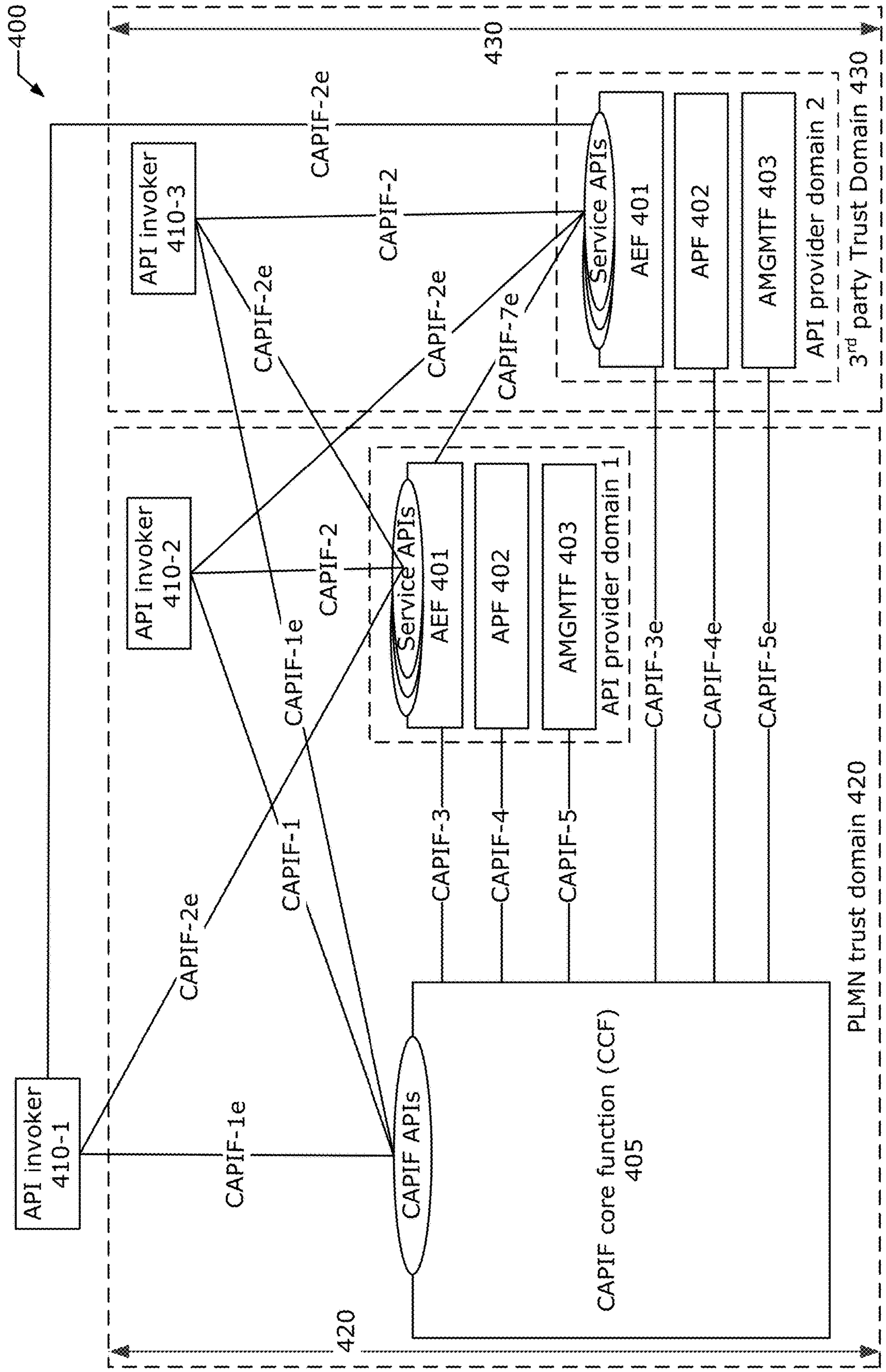
FIG. 4 illustrates an example CAPIF functional architecture connecting different systems.

FIG. 4 depicts an example CAPIF functional architecture 400 showing the connection between different systems, where API exposing functions (AEFs) 401 belonging to different domains can interwork through the presence of a CAPIF Core Function (CCF) 405. The CAPIF is a framework comprising common API aspects that are required to support service APIs. 3GPP has considered the development of a common API framework (CAPIF) for 3GPP northbound APIs that includes common aspects applicable to any northbound service APIs. In the context of CAPIF, a northbound API is a service API exposed to higher-layer API invokers 410. The CAPIF functional model 400 is organized into functional entities to describe a functional architecture which enables an API invoker 410 to access and invoke service APIs and supports AEFs 401 in publishing the API towards the API invokers 410. The terms "functional architecture" and "functional model" mean the same and have been used interchangeably in this specification.

The CAPIF functional architecture 400 is service-based, and interactions between the CAPIF functions are represented in two ways: as a service-based representation, where CAPIF functions enable other authorized CAPIF functions to access their services; and as a reference point representation, where interactions between any two CAPIF functions (e.g., CCF 405, AEF 401, etc.) is shown by an appropriate point-to-point reference point (e.g., CAPIF-3 and the like). The CAPIF functional architecture 400 can be adopted by any 3GPP functionality providing service APIs and/or 3GPP northbound service APIs. Services offered by the CAPIF are discussed in [TS29222].

The AEFs 401 are entities that provide the service communication entry point for service APIs. AEFs 401 are providers of the service APIs and is also the service communication entry point of the service API to the API invokers 410. The AEFs 401 include the following capabilities: authenticating the API invoker 410 based on the identity and other information required for authentication of the API invoker 410 provided by the CCF 405; validating the authorization provided by the CCF 405; and logging the service API invocations at the CCF 405. Each AEF 401 is associated with an AEF location, which comprises the location information (e.g., civic (physical) address, GPS coordinates, data center ID, and/or some other network identifier) where the AEF 401 providing the service API is located.

The API publishing function (APF) 402 enables the API provider to publish the service APIs information in order to enable the discovery of service APIs by the API invoker 410. The APF 402 includes the following capabilities: publishing the service API information of the API provider to the CCF 405.

The API management function (AMGF) 403 enables the API provider to perform administration of the service APIs. The AMGF 403 includes the following capabilities: auditing the service API invocation logs received from the CCF 405; monitoring the events reported by the CCF 405; configuring the API provider policies to the CCF 405; monitoring the status of the service APIs; onboarding the new API invokers 410 and offboarding API invokers 410; and registering and maintaining registration information of the API provider domain functions on the CCF 405. The term "onboarding" at least in some embodiments refers to a one time registration process that enables the API invoker 410 to subsequently access the CAPIF and the service APIs.

Figure 29:
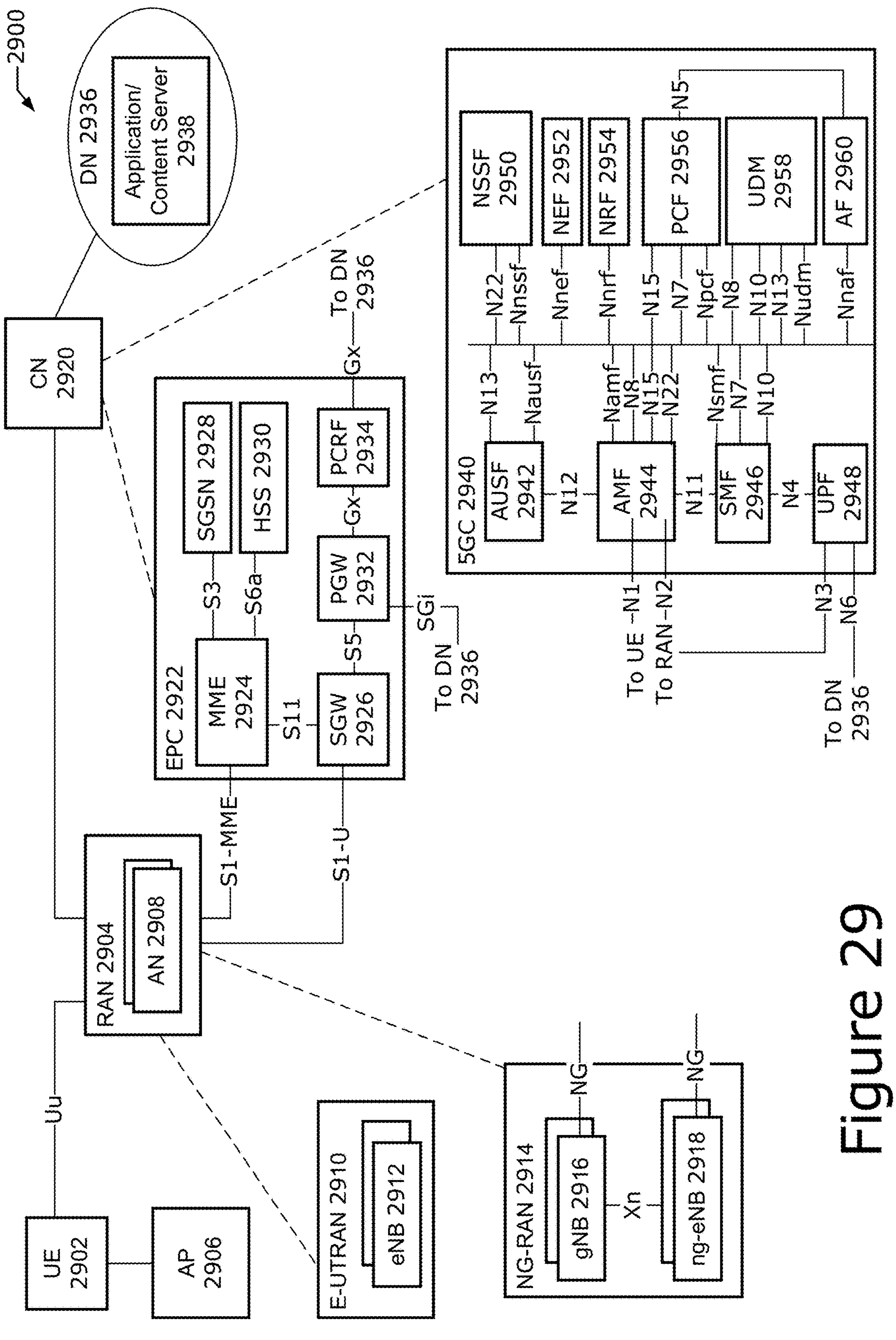
FIG. 29 illustrates an example network architecture.

The AEF 401, APF 402, and AMGF 403 are part the API provider domain, which can be implemented by a Service Capability Exposure Function (SCEF) in 3GPP LTE systems and/or a Network Exposure Function (NEF) 2952 in a 5GC (see e.g., FIGS. 3 and 29).

The CCF 405 includes the following capabilities: authenticating the API invoker 410 based on the identity and other information required for authentication of the API invoker 410; supporting mutual authentication with the API invoker 410; providing authorization for the API invoker 410 prior to accessing the service API; publishing, storing and supporting the discovery of service APIs information; controlling the service API access based on PLMN operator 2315 configured policies; storing the logs for the service API invocations and providing the service API invocation logs to authorized entities; charging based on the logs of the service API invocations; monitoring the service API invocations; onboarding a new API invoker 410 and offboarding an API invoker 410; storing policy configurations related to CAPIF and service APIs; support accessing the logs for auditing (e.g., detecting abuse); and supports publishing, discovery of service APIs information with another CCF 405 in CAPIF interconnection.

The API provider (e.g., API provider domain 1 and/or API provider domain 2 in FIG. 4) hosts one or more service APIs and has a service API arrangement with a CAPIF provider to offer the service APIs to one or more API invokers 410. A service API is an interface through which a component of the system exposes its services to API invokers 410 by abstracting the services from the underlying mechanisms.

An API invoker 410 is an entity which invokes the CAPIF or service APIs. The API invoker 410 is typically provided by a 3$^{rd}$ party application provider who has service agreement with PLMN operator 2315. The API invoker 410 supports the following capabilities: supporting the authentication by providing the API invoker identity (ID) and other information required for authentication of the API invoker 410; supporting mutual authentication with CAPIF; obtaining the authorization prior to accessing the service API; discovering service APIs information; and invoking the service APIs. API invokers 410 may include an API invoker profile, which is a set of information associated to an API invoker 410 that allows that API invoker 410 to utilize CAPIF APIs and service APIs.

The CAPIF is hosted within a Public Land Mobile Network (PLMN) operator network 420. The API invoker 410 is typically provided by a 3$^{rd}$ party application provider who has service agreement with PLMN operator 2315 and/or a CAPIF provider. The API invoker 410 may reside within the same trust domain as the PLMN operator network 2315 (e.g., the PLMN trust domain 420). The PLMN trust domain 420 refers to entities protected by adequate security and controlled by the PLMN operator or a trusted 3$^{rd}$ party of the PLMN. The 3$^{rd}$ party trust domain 430 refers to entities protected by adequate security and controlled by a corresponding 3$^{rd}$ party. The CAPIF provider and the API provider can be part of the same organization (e.g., PLMN operator 2315), in which case the business relationship between the two is internal to a single organization. The CAPIF provider and the API provider can be part of different organizations, in which case the business relationship between the two must exist.

In a reference point based model, the API invoker 410 within the PLMN trust domain 420 (e.g., API invoker 410-2 in FIG. 4) interacts with the CAPIF via the CAPIF-1 and CAPIF-2 reference points. The API invoker 410 from outside the PLMN trust domain (e.g., API invoker 410-1 and/or 410-3 in FIG. 4) interacts with the CAPIF via CAPIF-1e and CAPIF-2e. The AEF 401, the APF 402, and the AMGF 403 of the API provider domain (together known as the "API provider domain functions") within the PLMN trust domain 420 interacts with the CCF 405 via the CAPIF-3, CAPIF-4, and CAPIF-5 reference points, respectively.

The CAPIF-1 reference point connects an API invoker 410-2 inside the PLMN trust domain 420 with the CCF 405 via CAPIF APIs. The CAPIF-2 reference point connects an API invoker 410-2 inside the PLMN trust domain 420 with the AEF 401 inside the PLMN trust domain 420. The CAPIF-3 reference point connects the AEF 401 inside the PLMN trust domain 420 with the CCF 405. The CAPIF-4 reference point connects the APF 402 inside the PLMN trust domain 420 with the CCF 405. The CAPIF-5 reference point connects the AMGF 403 inside the PLMN trust domain 420 with the CCF 405.

The CCF 405 in the PLMN trust domain 420 supports service APIs from both the PLMN trust domain 420 and the 3rd party trust domain 430 having business relationship with PLMN trust domain 420. The API invokers 410 may exist within the PLMN trust domain 420 (e.g., API invoker 410-2), within the 3rd party trust domain 430 (e.g., API invoker 410-3), or outside of both the PLMN trust domain 420 and the 3rd party trust domain 430 (e.g., API invoker 410-1).

The CAPIF-1e reference point connects API invokers 410-1, 410-3 outside the PLMN trust domain 420 with the CCF 405. The CAPIF-2e reference point connects an API invoker 410-2 inside the PLMN trust domain 420 with the AEF 401 outside the PLMN trust domain 420, connects an API invoker 410-3 outside the PLMN trust domain 420 with the AEF 401 inside the PLMN trust domain 420, and connects API invokers 410-1, 410-3 outside the 3$^{rd}$ party trust domain 430 with the AEF 401 inside the 3$^{rd}$ party trust domain 430. The CAPIF-3e reference point connects the AEF 401 outside the PLMN trust domain 420 with the CCF 405. The CAPIF-4e reference point connects the APF 402 outside the PLMN trust domain 420 with the CCF 405. The CAPIF-5e reference point connects the AMGF 403 outside the PLMN trust domain 420 with the CCF 405.

The CAPIF-7 (not shown by FIG. 4) and CAPIF-7e reference points connect the AEF 401 within PLMN trust domain 420 and the AEF 401 outside PLMN trust domain 420. [TS23222] specifies a functional model for interactions between the AEFs 401. Additionally, although not shown by FIG. 4, CAPIF 4 may also include CAPIF-6 and CAPIF-6e reference points. The CAPIF-6 and CAPIF-6e reference points connect two CCFs 405 located in the same or different PLMN trust domains 420, respectively. The CAPIF-6/6e reference points allows API invokers 410 of a CAPIF 400 provider to utilize the service APIs from the 3rd party CAPIF provider or another CAPIF provider within trust domain(s).

Various additional aspects of the CAPIF 400 are discussed in more detail in [TS29222] and [TS23222]. Cross-consumption of APIs is theoretically possible, but not specified. Moreover, when it comes to specific mapping between CAPIF and MEC functionalities, a proper mechanism is not defined.

1.2. 3GPP SA6 Mechanisms for Service API Exposure

Service APIs can be exposed by the Edge Enabler Server (EES) 2155 using the CAPIF framework 400. The CAPIF framework 400 introduces the following functions: AEF 401 (the entity that provides services via API); API invoker 410 (the entity that uses these API); APF 402 (the entity that publishes APIs to all potential API invokers 410); AMGF 403 (performs administration of the service APIs (e.g., auditing, monitoring, etc.)); and the CCF 405 (the function that manages the CAPIF framework 400).

For Edge Data Networks (EDNs), the EES 2155 can host the CCF 405. The EES 2155 also serves as the AEF 401 and AMGF 403, and also serve as an NEF 2952 exposing APIs to EASs 2150. The SA6 Edge Environment also supports special EASs 2150 that provide services to other EASs 2150. In that respect, these services are provided by publishing APIs to the CCF 405 in the EES 2155, and the CCF 405 avails these APIs to all EASs 2150.

According to Annex A.4.3 of [TS23558], provides non-normative information about exposing services of various verticals (e.g., V2X servers, V2X application enabler servers, etc.) to other EASs 2150, including: the EES 2155 can act as the CCF 405, and the vertical application enabler server acting the AEF 401 and publish the vertical application enabler server APIs to the EES 2155. Further, the vertical application enabler server APIs is discovered by the EASs 2150 acting as the API invoker 410 during the service API discover procedure as specified in [TS23222].

Nevertheless, current specifications do not specify how this exposure is made possible. Moreover, the present disclosure does not consider the specific case of EES 2155 acting as the CCF 405, but provides a more general case where the two entities are separated (and connected via the CAPIF-3 reference point). The embodiments herein are applicable to the cases where of EES 2155 acts as the CCF 405.

1.3. MEC Platform in CAPIF

The current/existing solutions (e.g., mainly 3GPP SA6 and ETSI MEC) do not define any specific mechanisms for the purpose of the targeted cross-API consumption for edge systems. In fact, from one hand the current SA6 specification does not address support for non-3GPP service exposure. This problem is solved by our invention (e.g., by having ETSI MEC services provided by a "pseudo EAS" publishing its services via APIs to the CCF 405 in the EES 2155).

Current ETSI MEC specifications do not describe how it is possible for a MEC app 2426 to consume directly 3GPP services. In fact, MEC apps 2426 are usually residing on a non-trusted environment. Thus, this consumption mechanism should be ideally managed by proper 3GPP functionality, or by a sort of bridging entity that can ensure authorization to consume these services from MEC apps 2426 to 3GPP functions. There are high-level scenarios described in [MEC031] that describe how to couple CAPIF and MEC (see e.g., FIG. 5). Nevertheless, no technical details are provided on how this can be practically done.

Figure 5:
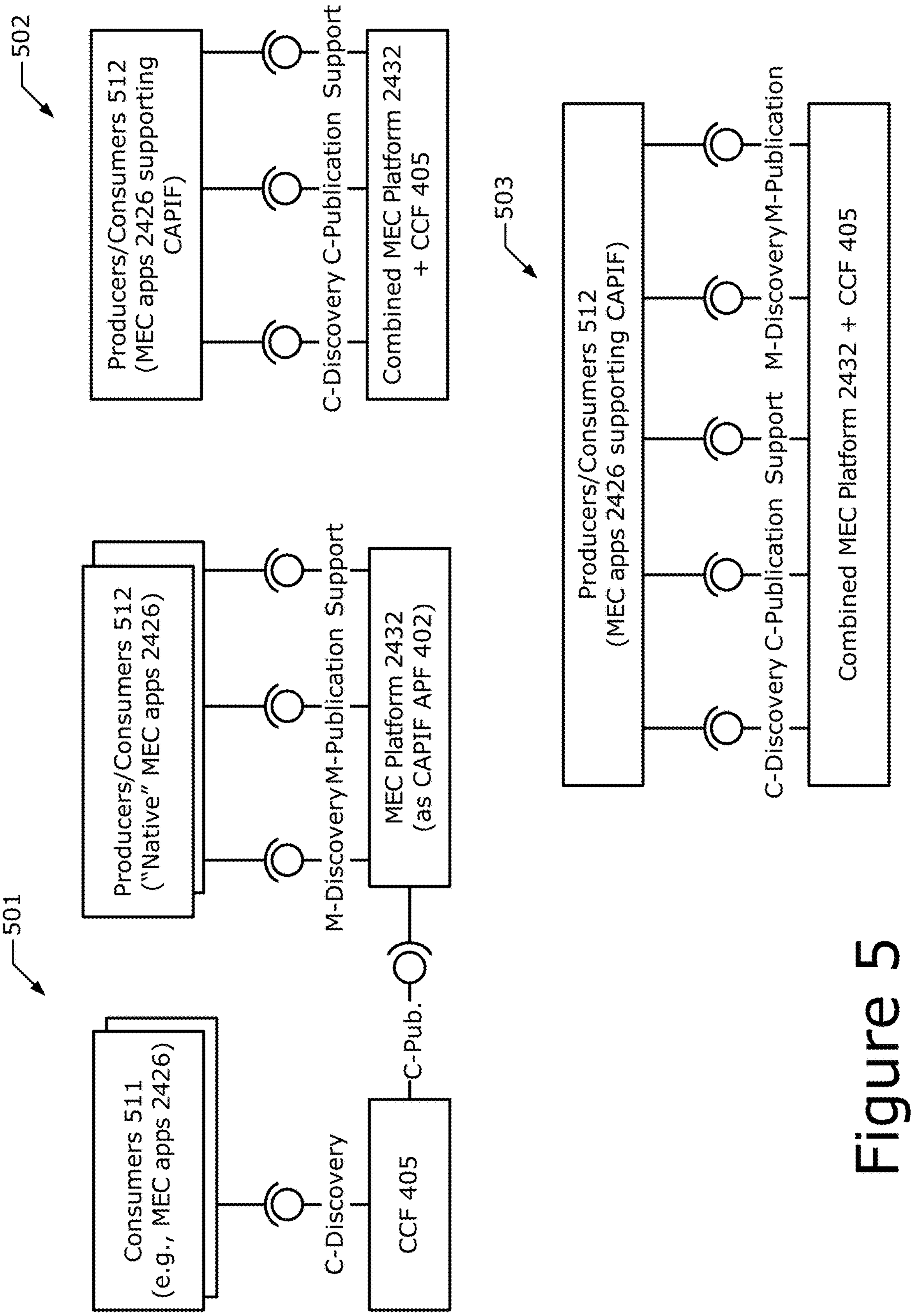
FIG. 5 illustrates options for deployment of MEC and Common API Framework (CAPIF).

FIG. 5 shows various deployment options 501, 502, and 503 for integration of the MEC and CAPIF. In 3GPP, there are multiple northbound API-related specifications (e.g., APIs for SCEF, API for the interface between MBMS service provider and BM-SC, APIs for NEF). To avoid duplication and inconsistency of approach between different API specifications, 3GPP has considered the development of the CAPIF for 3GPP northbound APIs that includes common aspects applicable to any northbound service APIs.

Figure 24:
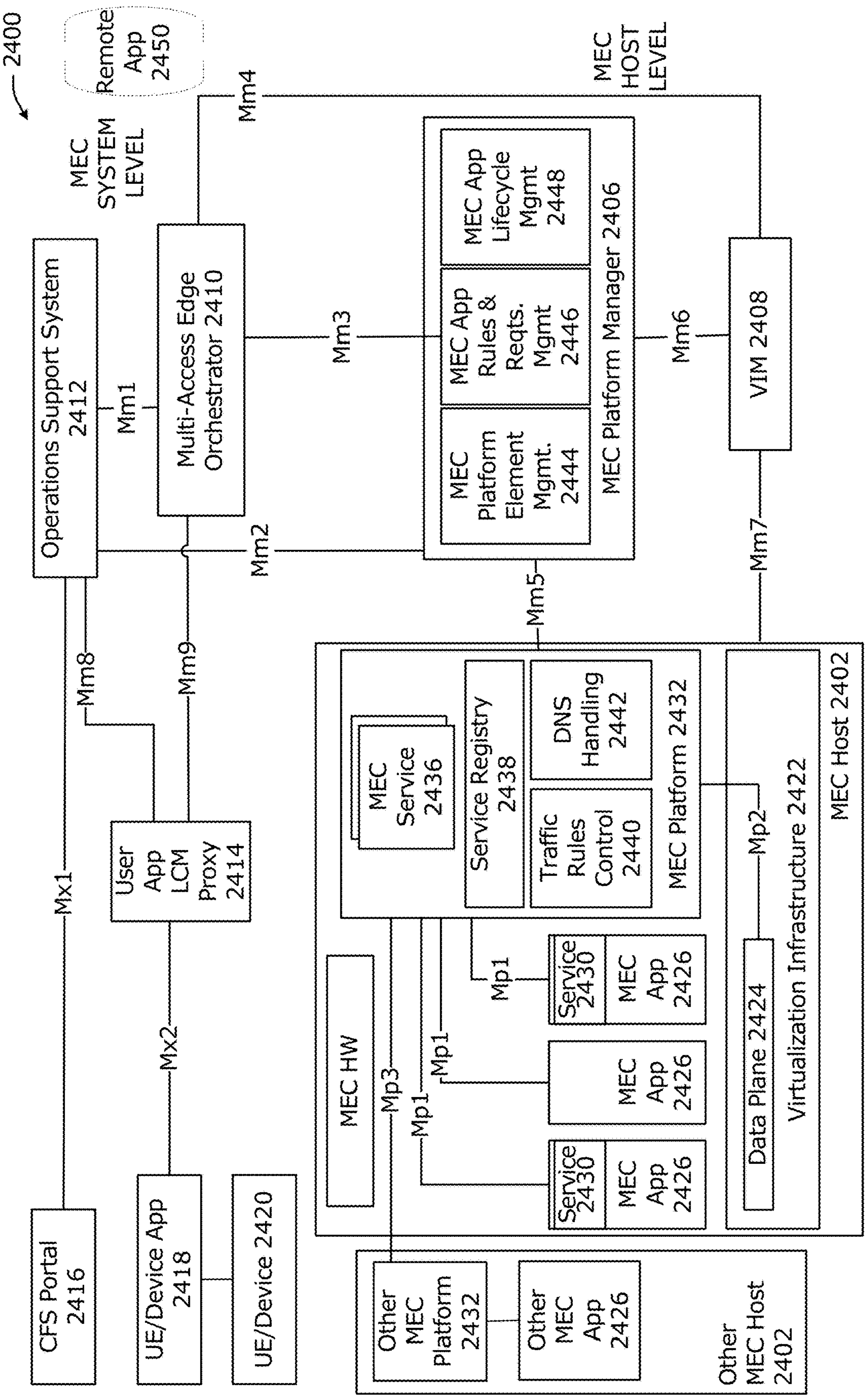
FIG. 24 illustrates an example MEC system reference architecture.

The relationship between the MEC API framework and the CAPIF may involve the MEC platform 2432 including API-related platform functionality such as service registry (e.g., service registry 2438 in FIG. 24). In addition the MEC platform 2432 can also expose MEC service APIs for consumption by MEC apps 2426. The API provider domain in CAPIF collectively represents the service APIs available for consumption in any 5G NF and any trusted 3rd party AF 2960. A MEC service 2436 produced by a MEC app 2426 or the MEC platform 2432 can be mapped into the API provider domain in CAPIF. A MEC app 2426 or MEC platform 2432 consuming a service is an API invoker 410 in CAPIF 400. The existing MEC platform 2432 functionality related to API enablement can be mapped into the CCF 405.

The MEC platform 2432 also supports traffic rules control 2440 and DNS handling 2442 (see e.g., FIG. 24). In 5GS, the traffic rules control by an AF 2960 has been defined as a procedure between the AF 2960 and the SMF 2946, possibly involving the NEF, as defined in clause 4.3.6 of ETSI TS 123 502 v16.7.0 (2021 January) and/or [TS23502].

In particular,

Deployment option 501 is a loosely-coupled deployment of CAPIF and MEC that provides access to MEC APIs via an external CAPIF instance. In this option, it is assumed that a MEC platform and a CAPIF deployment co-exist in the network, and that CAPIF API invokers 410 want to access MEC services 2436 provided by the MEC platform 2432 or by MEC apps 2426 via the RESTful MEC service APIs. In that case, the following applies: it should be possible to announce MEC APIs in the CAPIF registry; and it should be possible to use the CAPIF flavor of authorization when accessing MEC APIs. This might be realized via a gateway, or by updating the MEC API exposing functions to understand the CAPIF flavor of authorization. This use case can be fulfilled by announcing the same service API redundantly in both the registry of the CCF 405 in the network, and in the registries in the MEC platform(s) 2432. In MEC, location of the API producer matters. It has not been elaborated how to signal multiple instances of the same service available at different locations (e.g., different MEC platforms 2432) when using CAPIF.

In deployment option 501, the MEC reference point Mp1 supports publication of MEC services ("M-Publication"), discovery/announcement of MEC services ("M-Discovery") and further MEC application support ("Support") such as activation of traffic rules 2440 and the like. The CCF 405 supports publication ("C-Publication") and discovery ("C-Discovery") of CAPIF APIs. The simplest integration possibility is to re-publish the MEC service APIs via CAPIF.

Deployment option 502 is a fully-integrated hybrid deployment of CAPIF and MEC. In deployment option 502, it is assumed that a deployment exists that unifies MEC and CAPIF. In such realization, CAPIF replaces those Mp1 parts that are overlapping with CAPIF (such as the MEC service registry 2438 of RESTful MEC services). The registry 2438 for the MEC services 2436 will be based on CAPIF; the same applies to authorization. The MEC platform 2432 can benefit from further CCF 405 support such as logging. All invocations of RESTful APIs will be facilitated using CAPIF. This means that MEC apps 2426 would need to consume MEC APIs using CAPIF support and would need to support CAPIF's authorization. In addition, further MEC app 2426 support ("Support") is still provided. The entity that exposes the interfaces is a deployment that combines capabilities defined for the MEC platform 2432 and capabilities defined for the CCF 405.

However, the fully-integrated deployment 502 would not support the MEC concept of alternative transports; it would only apply to RESTful APIs. For additional support of alternative transports, a MEC service registry 2438 would still need to be supported. There is no need for redundancy, however, unlike in deployment option 501, all RESTful service APIs are published and discovered via CAPIF; those services that are accessed via alternative transports are part of the MEC service registry 2438. Deployment option 503 is a hybrid deployment of CAPIF and MEC with support for MEC alternative transports. An alternative is the evolution of CAPIF by adding an extension mechanism, which would enable MEC to specify alternative transports as a MEC-specific CAPIF extension. Interaction with 3GPP would be required for this purpose.

According to existing solutions, none of the scenarios provide details on how to enable cross-consumption of edge service APIs in hybrid MEC implementations of edge platforms (e.g., compliant with both standards). In fact, according to [MEC031], consumption/invocation of APIs is out of scope in these figures, and would need to be addressed separately.

Finally, a mapping of CAPIF APIs and MEC service management APIs, as shown by Table 2, shows that not all functionalities in the two standards have always a correspondence. In particular, the possibility to discover transport protocols (see e.g., [MEC011]) is not available when considering CAPIF APIs service consumption (see e.g., the resource URI "mec_service_mgmt/v1/transports" and containing a list of MEC transports).

bring their own protocol to the MEC platform 2432. Furthermore, in certain cases (e.g., to enhance security) some extensions for alternative transport mechanisms can be foreseen in MEC (see e.g., [MEC011]), and these extensions would depend on the actual transport used. For instance, such extensions may be used to signal the necessary parameters for the client to use TLS-based authorization defined for alternative transports (see e.g., [MEC009]). Thus, it may be advantageous to allow such cross-API consumption for edge applications. Finally, as explained in the previous section, the EES 2155 can include CAPIF functionality and then act as the CCF 405 (see e.g., Annex A.4.3, [TS23558],);

TABLE 2

| MEC resource name | MEC resource URI | CAPIF resource name | CAPIF resource URI |
|---|---|---|---|
| Retrieve information about a list of mecService resources | | | |
| A list of mecService | mec_service_mgmt/v1/service | CAPIF_Discover_Service_API: All published service APIs | /service-apis/v1/allServiceApis |
| A list of meService | mec_service_mgmt/v1/service | All published service APIs | /service-apis/v1/allServiceApis |
| Retrieve information about a mecService resource | | | |
| Individual mecService | mec_service_mgmt/v1/services/{serviceId} | — (see note) | — (see note) |
| Individual meService | mec_service_mgmt/v1/services/{serviceId} | — | — |
| Retrieve information about the available transports | | | |
| A list of mecTransport | mec_service_mgmt/v1/transports | — (subset is part of service API information) | — |
| A list of meTransport | mec_service_mgmt/v1/transports | — (subset is part of service API information) | — |
| Retrieve information about a list of mecService resources of an application instance | | | |
| A list of mecService of an application instance | mec_service_mgmt/v1/applications/{appInstanceId}/services | CAPIF_Publish_Service_API: APF published APIs | /published-apis/v1/{apfId}/service-apis |
| A list of meService of an application instance | mec_service_mgmt/v1/applications/{appInstanceId}/services | APF published APIs | /published-apis/v1/{apfId}/service-apis |
| Retrieve information about a mecService resource of an application instance | | | |
| Individual mecService of an application instance | mec_service_mgmt/v1/applications/{appInstanceId}/services/{serviceId} | CAPIF_Publish_Service_API: Individual APF published API | /published-apis/v1/{apfId}/service-apis/{serviceApiId} |
| Individual meService of an application instance | mec_service_mgmt/v1/applications/{appInstanceId}/services/{serviceId} | Individual APF published API | /published-apis/v1/{apfId}/service-apis/{serviceApiId} |
| Retrieve information about a list of mecSrvMgmtSubscription resources for this subscriber | | | |
| Parent resource of all mecSrvMgmtSubscription of a subscriber | mec_service_mgmt/v1/applications/{appInstanceId}/subscriptions | CAPIF_Events_API: CAPIF Events Subscriptions | /capif-events/v1/{subscriberId}/subscriptions/ |
| Parent resource of all meMp1 Subscription of a subscriber | mec_service_mgmt/v1/applications/{appInstanceId}/subscriptions | CAPIF Events Subscriptions | /capifevents/v1/{subscriberId}/subscriptions/ |
| Retrieve information about a mecSrvMgmtSubscription resource for this subscriber | | | |
| Individual mecSrvMgmtSubscription | mec_service_mgmt/v1/applications/{appInstanceId}/subscriptions/{subscriptionId} | CAPIF_Events_API: Individual CAPIF Events Subscription | /capif-events/v1/{subscriberId}/subscriptions/{subscriptionId} |
| Individual meMp1Subscription | mec_service_mgmt/v1/applications/{appInstanceId}/subscriptions/{subscriptionId} | Individual CAPIF Events Subscription | /capifevents/v1/{subscriberId}/subscriptions/{subscriptionId} |

NOTE:
Although there is no resource defined in CAPIF for individual services, the query of a specific service is possible by using suitable filtering parameters with the CAPIF APIs.

The present disclosure provides an interoperable mechanism to cross-expose APIs for application consumption. This mechanism also allows the usage of different transport protocols, and the possibility for MEC services 2436 to or when deployed, the EES 2155 exposes its APIs to the CCF 405 via the CAPIF-3 reference point.

The present disclosure considers the case where EES 2155 and CCF 405 are separated entities, as in the first case they would instead collapse into a single entity. The present disclosure considers a MEC scenario, based on edge platforms compliant to both ETSI MEC and 3GPP SA6 standards, where the platform is implementing functionalities and APIs compliant to the 2 respective standards. How enable from edge applications a dual mode Edge APIs consumption, from both standards? How to provide an interoperable mechanism that may enable the same application (on-boarded either as a MEC App or EAS 2150) to consume edge service APIs in such a hybrid scenario, in order to benefit from the whole portfolio of functionalities offered at the edge by the multipe edge compting technologies.

The flexible framework introduced herein provides the following technology components: the definition of a edgeXapis GW, as a function enabling interoperable and secure communication via attestation, and supporting the connection between MEC and 3GPP CAPIF; exposure to Edge Apps of the full list of APIs from both MEC and 3GPP systems, by means of proper signaling (supported by the edgeXapis GW function) CAPIF Core Function and the MEC platform; interoperable edge service consumption from MEC and 3GPP, including APIs exposed from both systems; and mechanisms to make available to EASs 2150 also alternative transport protocols, for the MEC APIs service consumption.

As a general assumption, the embodiments herein abstract from the particular application programming language, as well as from the e.g., kind of virtualization technology (e.g., virtual machines (VMs), containers, etc.). In general, the application can be either a monolithic or comprising one ore more microservices. Additionally, edge application instantiation mechanisms in ETSI MEC are defined in the [MEC010-2] deliverable and in [MEC(20)000390r1].

The present disclosure provides a "facility layer" for cross-API exposure between 3GPP trusted domain and external MEC systems, and can be seen as a CCF 405 extension/enhancement, supported by a gateway between the two platforms (and the related sets of APIs), in order to allow an edge service exposure between the platform, and the consequent consumption from authorized applications.

The embodiments herein can be implemented as part of CCF 405 in 3GPP systems, but it can be also a software functionality, as enhancement (SW update) of present CCF 405 implementations. The embodiments include means of signaling the need to establish a relationship between the MEC system and the 3GPP CAPIF (e.g., via the CAPIF-3e reference point). The additional information transferred is contained in the transport protocols information provided by MEC to CAPIF. Embodiments also include message sequences and data structures relevant to the communication described in the last section of the present embodiments.

Figure 6:
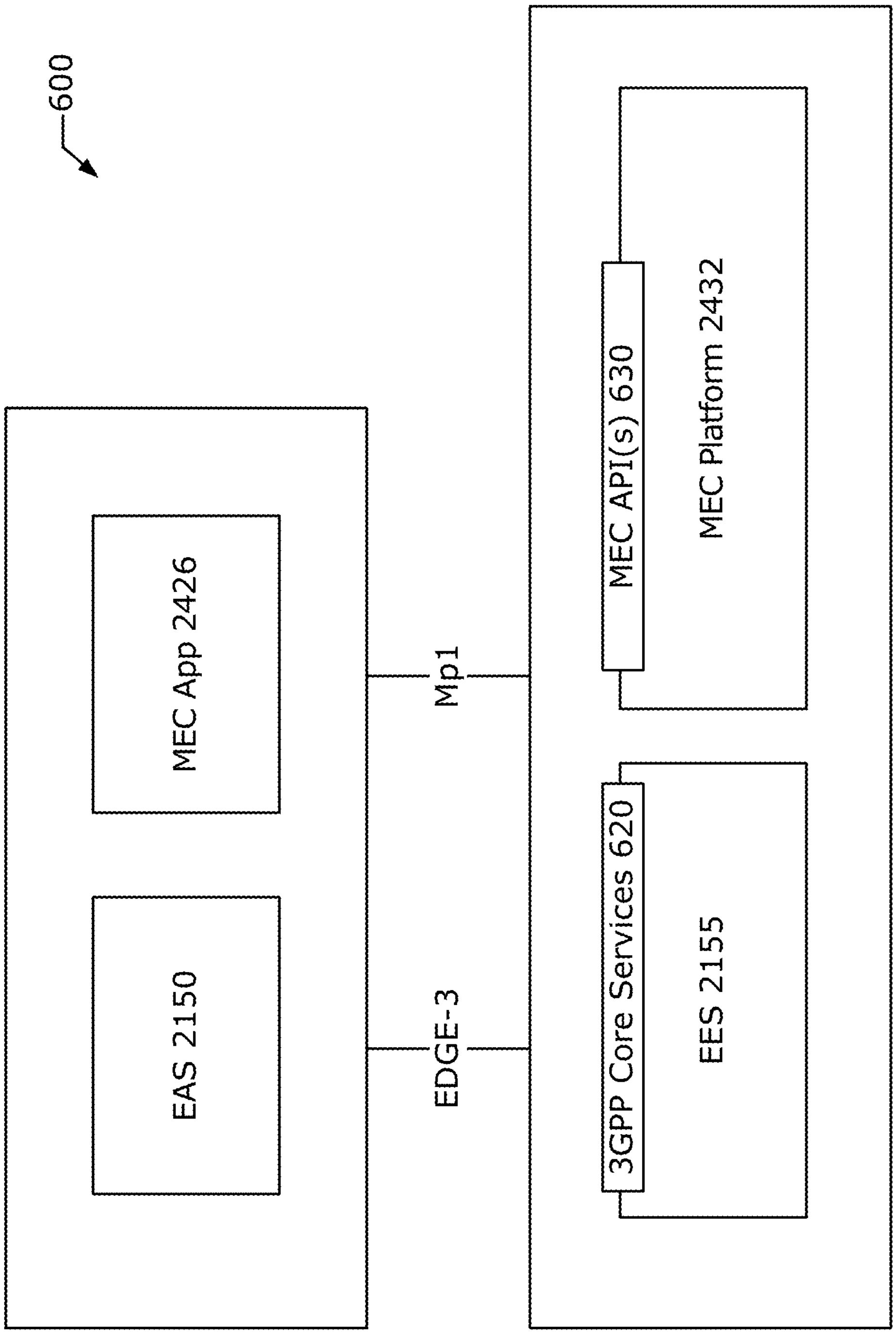
FIG. 6 illustrates scenarios for cross-consumption of edge service APIs in hybrid MEC implementations of edge platforms.

Referring to FIG. 6, the embodiments herein involve two scenarios, and aim at enabling the cross-consumption of edge service APIs in hybrid implementations of edge platforms (e.g., compliant with multiple standards), for example, (1) edge apps registered in ETSI MEC system 2400, and consuming APIs from both ETSI MEC platform 2432 (e.g., MEC API(s) 630) and 3GPP APIs (e.g., APIs 620 for providing 3GPP core services to EASs 2150); and (2) edge apps registered in EDGEAPP system, and consuming APIs from both ETSI MEC platform 2432 (e.g., MEC API(s) 630) and 3GPP APIs (e.g., APIs 620 for providing 3GPP core services to EAS 2150*s*). A baseline assumption considers MEC apps 2426 and EAS 2150 as similar entities, and in the remainder of the present document each of these elements are referred to as "edge apps" or the like. As already explained, in both cases the actual implementation of the application can be the same. The only difference is that the same application instance is registered either as 3GPP application or ETSI application. In some implementations, these applications will use Mp1 to consume ETSI MEC APIs and EDGE-3 to consume 3GPP APIs.

1.4. Embodiment 1

A first embodiment is applicable to MEC systems 2400 connected to 3GPP systems 2900, or in general cases where an edge computing system is outside of the PLMN trust domain 420. This scenario can be particularly useful also in MEC Federations, as discussed infra and described in [ETSIWP36], where different stakeholders (e.g., MNOs, hyperscalers, and third parties) may need to federate and expose their edge services to each other.

Figure 7A:
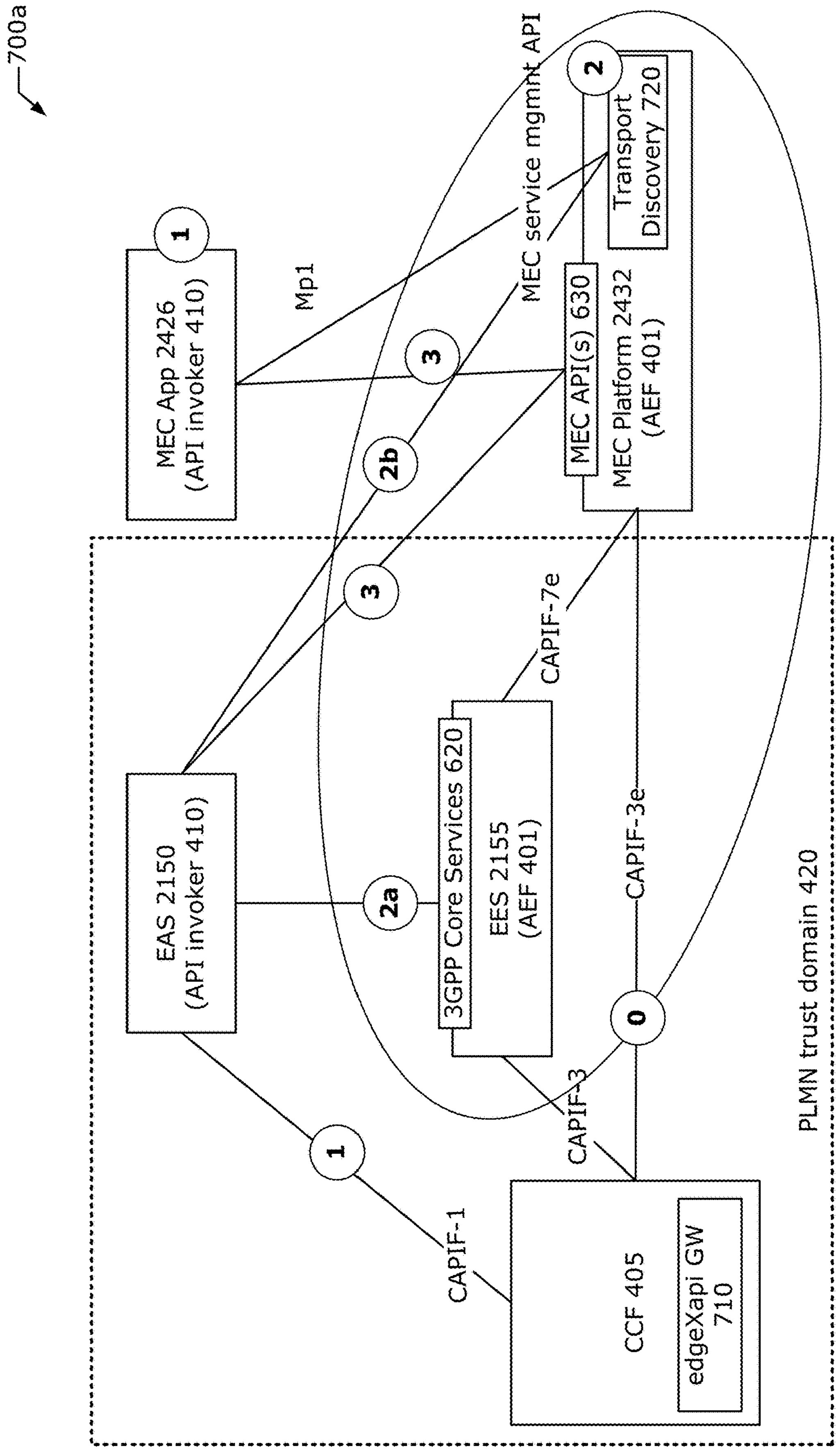
FIGS. 7*a*, 7*b*, and 7*c* illustrate architectures for practicing the various embodiments discussed herein.
Figure 7B:
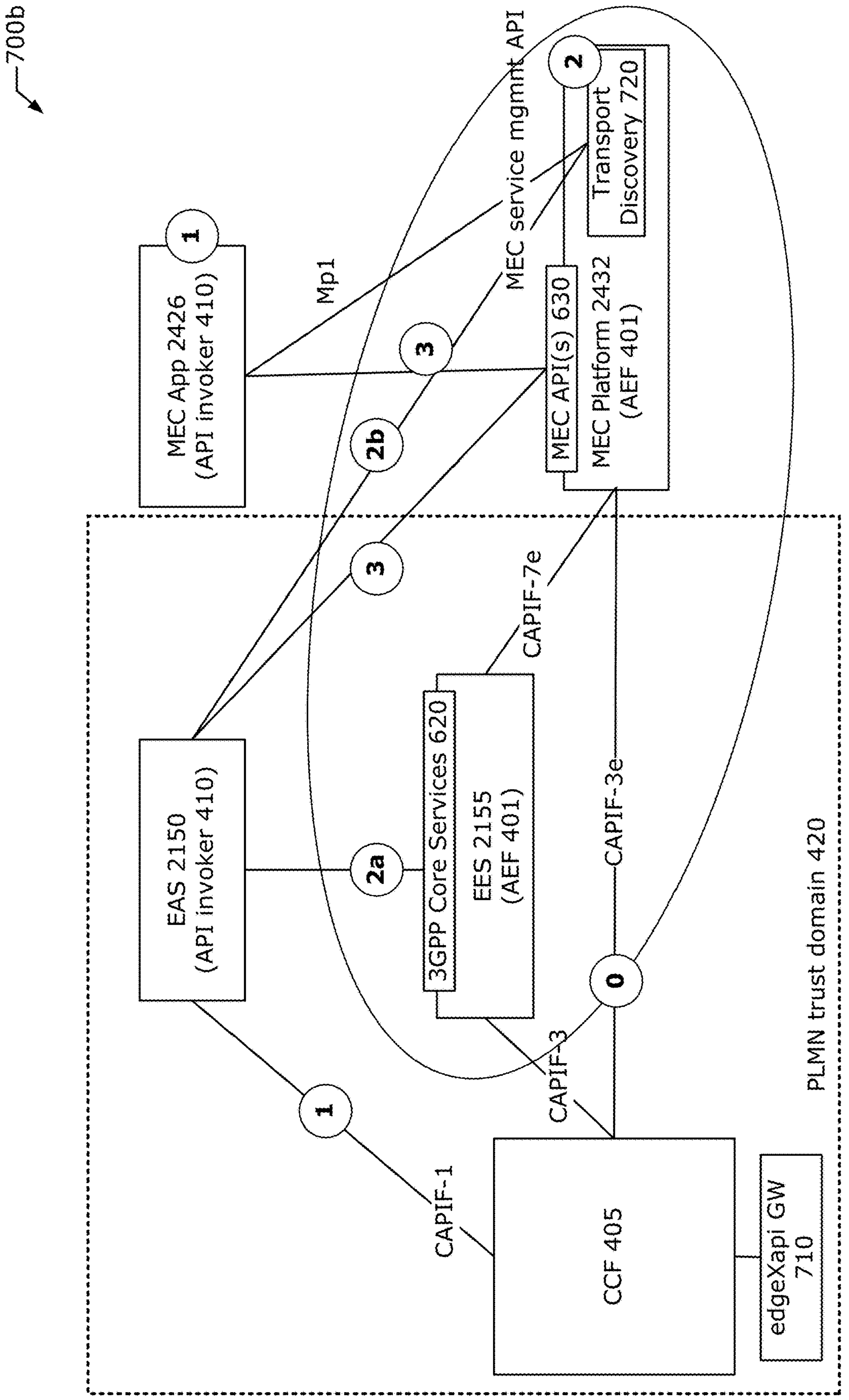

FIG. 7*a* shows an architecture 700*a* according to the first embodiment, and FIG. 7*b* shows an architecture 700*b* according to the first embodiment. Architecture 700*a*-700*b* include several enablers and operational steps. In architecture 700*a* the edgeXapis GW function 710 resides in the CCF 405, while in architecture 700*b* the edgeXapis GW function 710 is separated from the CCF 405. The specific deployment may be implementation specific. In either architecture 700*a* and 700*b*, the edgeXapis 710 is a functional block in charge of managing the interoperability with the ETSI MEC system, as an edge computing system outside of the PLMN trust domain 420.

At step 0, a connection between MEC and CAPIF takes place, which is supported by the edgeXapis GW 710 as a support function enabling interoperable and secure communication via attestation. When connecting the MEC platform 2432 with the CCF 405, the MEC platform 2432 should be aware of the CCF 405 and include in its configuration the CCF's 405 root URL. Similarly, the CCF 405 can be connected with the MEC platform 2432 via CAPIF-3e and receive via HTPP the requests coming from the MEC platform 2432. In some implementations, the CCF 405 is an HTTP server, and thus, any HTTP client providing security authentication, authorization can connect to the CCF 405.

In step 0, a connection between MEC platform 2432 and CCF is performed and established, including authorization and authentication via the CAPIF-3e reference point. The edgeXapis GW function 710 provides the needed attestation means to ensure security for authorization and authentication and usage of MEC platform 2432 capabilities in 3GPP domain (and vice versa). This step preliminarily involves the MEC platform 2432 and CCF 405 communication via CAPIF-3e, and also the edgeXapis GW function 710 for security attestation (see e.g., FIG. 8). In this step, the MEC platform 2432 sends, to CCF 405, a list of APIs exposed by MEC to CAPIF. In 3GPP terminology, the MEC platform 2432 acts as a CAPIF AEF 401.

Figure 7C:
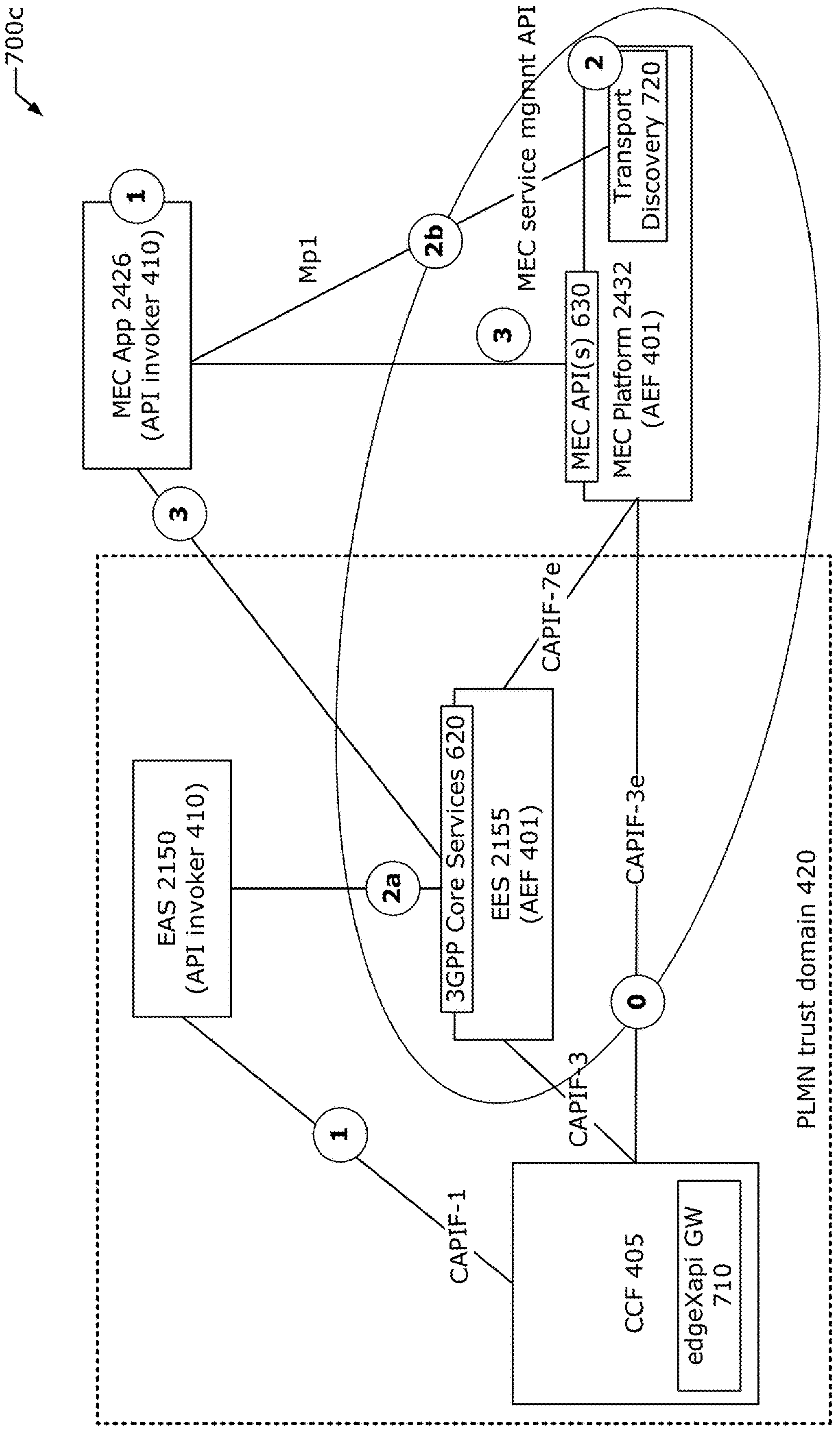
Figure 8:
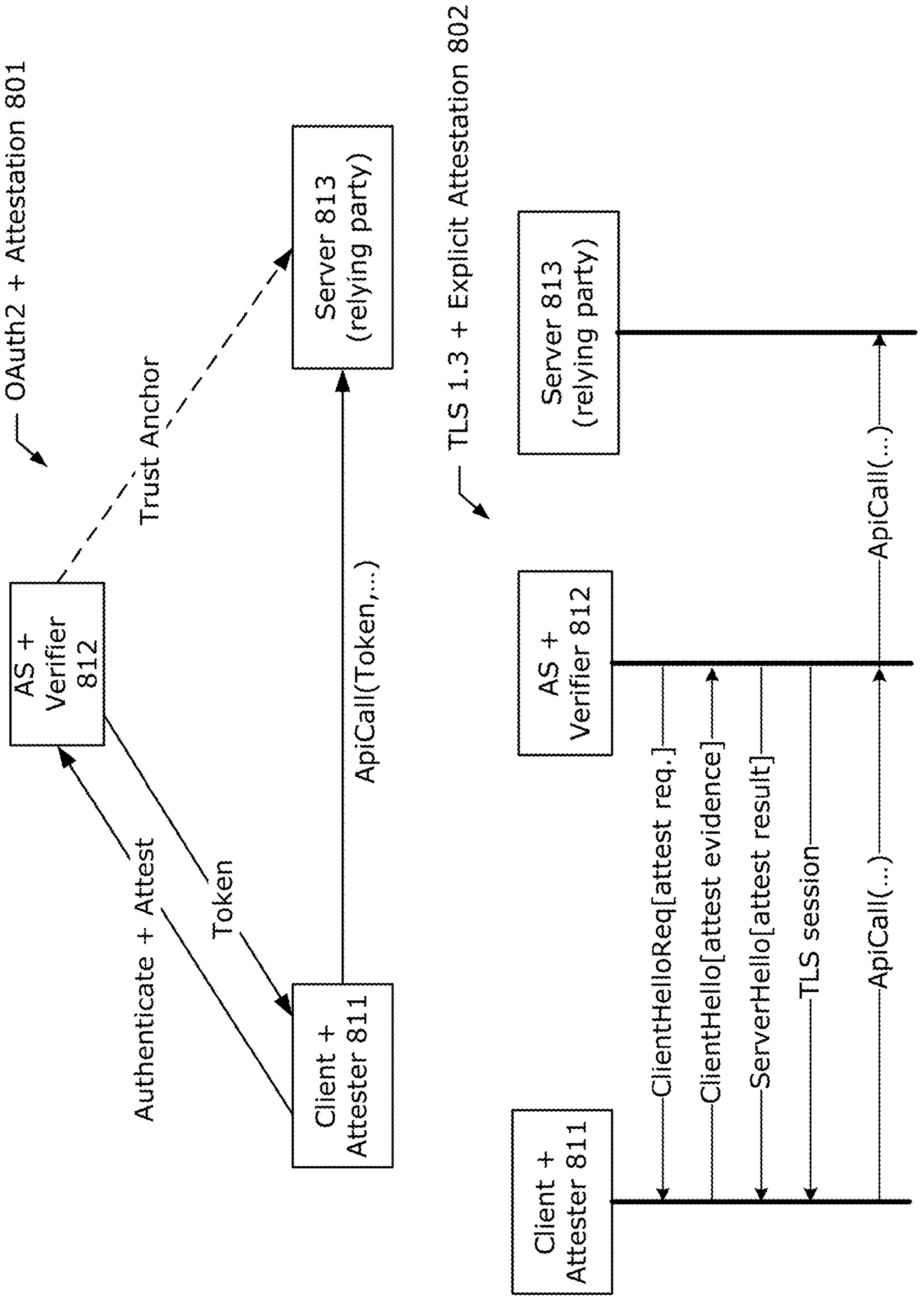
FIG. 8 illustrates attestation aspects.

FIG. 8 shows example authentication with attestation procedures that can be used for the MEC platform 2432, with two options including OAuth2+Attestation 801 and/or Transport Layer Security (TLS)+Explicit Attestation 802. In both options, the edgeXapis GW 710 (see e.g., FIG. 7) acts as a verifier (e.g., the verifier part of the AS+Verifier 812 of FIG. 8), in support of CCF 405 (e.g., the AS part of the AS+Verifier 812 of FIG. 8).

In OAuth2+Attestation 801, the client+attester 811 provides authentication+attestation information to the AS+Verifier 812, and the AS+Verifier 812 provides a token to the client+attester 811. The client+attester 811 provides the token to the server (relying party) 813. A trust anchor is also established between the AS+Verifier 812 and the server (relying party) 813. Additional aspects of the OAuth2+ Attestation 801 process is discussed in Hardt, "The Oauth 2.0 Authorization Framework", IETF RFC 6749 (October 2012).

In TLS+Explicit Attestation 802, the AS+Verifier 812 sends a client hello request message with an attestation request to the client+attester 811, and the client+attester 811 provides a client hello message with attestation evidence to the AS+Verifier 812. The AS+Verifier 812 sends a server hello message with attestation results to the client+attester 811 and establishes a TLS session with the client+attester 811. The client+attester 811 then invokes an API call, which is passed to the AS+Verifier 812 and to the server (relying party) 813.

In FIG. 8, the MEC platform 2432 (acting as AEF 401 and communicating via CAPIF-3e) corresponds to the client+attester 811 and the edgeXapis GW 710 provides attestation in support of the legacy CCF 405 authentication and authorization functionalities (as required by [TS33122], clause 4.6). Currently, 3GPP only specifies how to secure messages or use certificates for the CAPIF-3e reference point. For example, according to [TS33122], to ensure security of the interfaces between CAPIF entities between different trusted domains (e.g., CCF 405 domain and API Provider Domain), namely CAPIF-3e, CAPIF-4e, and CAPIF-5e, 3GPP TS 33.210 v16.4.0 (2020 Jul. 10) ("[TS33210]") may be applied to secure messages on the reference points specified otherwise; and 3GPP TS 33.310 v16.6.0 (2020 Dec. 16) may be applied regarding the use of certificates with the security mechanisms of [TS33210]. However, there is no specification on how to manage authentication and authorization functionalities with attestation, and the edgeXapis GW function 710 is playing the role here.

After authentication and authorization (enhanced by attestation), the CCF 405 now has an additional list of APIs that can be advertised, coming from the MEC platform 2432. The full list in the CCF 405 includes both EES 2155 APIs and MEC platform 2432 APIs. Security attestation of the MEC API can be also ensured by means of proper communication with the edgeXapis GW function 710.

Referring back to FIGS. 7*a*-7*b*, step 1 includes exposure of ETSI MEC service APIs 630 to EASs 2150 in 3GPP via the CCF 405. When an EAS 2150 is launched, it queries the CCF 405 as an API invoker 410 to obtain the exposed API. Thanks to the previous step 0, the EAS 2150 will receive a list of APIs known to the CCF 405 including both EES 2155 and MEC platform 2432 APIs. Also, in this step, the edgeXapis GW function 710 updates a list of EASs 2150 accessing some or all of the API list. These EASs 2150 will be authorized to consume MEC service API, and then a list of these EASs 2150 is sent to the MEC platform 2432 via CAPIF-3e.

Steps 2*a* and 2*b* include interoperable edge service consumption from MEC and 3GPP. The EAS 2150 can now invoke any advertised API, either as an EES 2155 API (e.g., step 2*a* in FIGS. 7*a*-7*b*) or any advertised MEC platform 2432 API (e.g., step 2*b* in FIGS. 7*a*-7*b*).

In case of step 2*a*, it is assumed that EAS 2150 has been authorized by the EES 2155 to use EES 2155 services. In case of 2*b*, it is assumed that EAS 2150 has been authorized in step 1 by the MEC platform 2432 to use MEC services. The EAS 2150 is an API invoker 410, but should be also seen from the MEC platform 2432 as an authorized consumer of the MEC service API. The list of authorized EASs 2150 is contained in the edgeXapis GW function 710 and communicated via CAPIF-3e to the MEC platform 2432. Separated edge app onboarding (to EES 2155 or to MEC platform 2432) may be used. Additionally or alternatively, dual onboarding to EES 2155 and MEC platform 2432 is possible. Furthermore, the communication in step 2*b* may use RESTFUL messages to dialogue with the MEC platform 2432 (transport discovery function 720).

Step 3 includes a mechanism to make available to EASs 2150 also alternative transport protocols, for the MEC APIs service consumption. CAPIF currently supports the exposure of API using either HTTP V1.1 or HTTP V2.0, but it does not support other transports. The MEC platform 2432, however, supports a larger set of transports, but there is no way to expose them via CAPIF. In order to be aware of APIs using other protocols, the EAS 2150 (or MEC App 2426) need to use the MEC platform 2432's Transport Discovery service. In order to do so, the MEC platform 2432 exposes the Transport Discovery API as a RESTful API (step 2*b*). By doing so, the Transport Discovery API is exposed by the MEC platform 2432 as part of the API exposure described previously (step 0), and is discovered by the EAS 2150 (or MEC Application) (step 1).

In order to obtain APIs using different transports (step 3), the EAS 2150 (or MEC App 2426) obtains the APIs supporting different transports from the Transport Discovery service (step 3). From now on, the communication, done via Mp1, can use different transport protocols, as defined by the selected API. In this step, the EAS 2150, as an API invoker 410, and also as an authorized MEC API service consumer, reach out the MEC platform 2432 by using Mp1 interface (e.g., MEC service management API) to discover available transport protocols (this step is done by following [MEC011] standard, which may eventually include some ETSI MEC enhancements in the MEC platform 2432 since the edge app might not be a "pure" MEC app 2426, but is rather registered as EAS 2150).

After steps 0-3, the edge app can consume the MEC services 2436 using the Mp1 interface (e.g., MEC application support API), and also using the specific transport made available by that specific service (this step is done by following [MEC011] standard, which may eventually include some ETSI MEC enhancements in the MEC platform 2432 since the edge app might not be a "pure" MEC app 2426, but is rather registered as EAS 2150).

1.5. Embodiment 2

A second embodiment involves enhancing the CAPIF, and enhancing the first embodiment, in order to provide additional transport information. In this embodiment, all steps are performed as in embodiment 1, with the difference that step 0 is enhanced as follows: In step 0, pre-align the EES 2155 and MEC platforms 2432 through the edgeXapis GW 710, as a function enabling interoperability between CAPIF and MEC, and supporting additional transports in the CCF 405.

The edgeXapis GW 710 has an additional role in a pre-alignment phase between EES 2155 and MEC platform 2432, where the list of available transports is exposed and transferred to the edgeXapis GW 710 in a centralized way, in order to better manage transports from all available API exposing functions to all possible API invokers 410.

In this embodiment, which is not mutually exclusive with the other embodiments discussed herein, the CAPIF is enhanced to support the transport information as part of the API advertisement. Here, the CAPIF includes the ability to receive transport information from the MEC platform 2432 when the MEC platform 2432 (acting as an AEF 401)

exposes the APIs to the CCF 405 in step 0. Additionally or alternatively, the CCF 405 has the ability to provide the transport from the MEC platform 2432 info to the API invoker 410 when the API invoker 410 is discovering APIs in step 1.

In order to support this new functionality, some implementations include an additional information element (IE) to support this new information. Subclause 8.2.4.1 of [TS29222] specifies the application data model supported by the CAPIF_Publish_Service_API (data types listed in subclause 7.2 of [TS29222] also apply to this API). Table 8.2.4.1-1 in subclause 8.2.4.1 of [TS29222] specifies the data types defined specifically for the CAPIF_Publish_Service_API service and defines the data elements that are provided by the AEF 401. In this embodiment, a new data element, "TransportName", is added to support the exposure of APIs using different transports, as shown by Table 3.

TABLE 3

CAPIF_Publish_Service_API specific Data Types

| Data type | [TS29222] section defined | Description | Applicability |
|---|---|---|---|
| AefProfile | Subclause 8.2.4.2.4 | AEF profile | |
| CommunicationType | Subclause 8.2.4.3.5 | Communication type of the resource | |
| CustomOperation | Subclause 8.2.4.2.7 | Custom operation | |
| DataFormat | Subclause 8.2.4.3.4 | Data format | |
| InterfaceDescription | Subclause 8.2.4.2.3 | Description of the API interface | |
| Operation | Subclause 8.2.4.3.7 | HTTP method (e.g., PUT) | |
| Protocol | Subclause 8.2.4.3.3 | Protocol used by the API | |
| PublishedApiPath | Subclause 8.2.4.2.9 | The published API path within the same CAPIF provider domain. | |
| Resource | Subclause 8.2.4.2.6 | API resource | |
| SecurityMethod | Subclause 8.2.4.3.6 | Security method (e.g., PKI) | |
| ServiceAPIDescription | Subclause 8.2.4.2.2 | Description of a service API as published by the APF. | |
| ShareableInformation | Subclause 8.2.4.2.8 | Information on whether a service API and/or a service API category can be published to other CCFs. | |
| Version | Subclause 8.2.4.2.5 | API version information | |
| TransportName | New element | The name of the Transport associated with this API | |

The CAPIF publish service APIs, as defined in [TS23222], allow the APF 402 to publish and manage published service APIs at the CCF 405 via the CAPIF-4 and CAPIF-4e reference points, and allow the CCF 405 to publish and manage published service APIs at other CCFs 405 via the CAPIF-6 and CAPIF-6e reference points. Consumers and/or initiators of the CAPIF_Publish_Service_API include the APF 402 and the CCF 405. The service operations defined for the CAPIF_Publish_Service_API are shown in Table 4.

TABLE 4

Operations of the CAPIF_Publish_Service_API

| Service operation name | Description | [TS29222] section defined |
|---|---|---|
| Publish_Service_API | This service operation is used by an API publishing function to publish service APIs on the CAPIF core function. This service operation is also used by CAPIF core function to publish service APIs on other CAPIF core function. | 5.3.2.2 |
| Unpublish_Service_API | This service operation is used by an API publishing function to un-publish service APIs from the CAPIF core function. This service operation is also used by CAPIF core function to un-publish service APIs on other CAPIF core function. | 5.3.2.3 |
| Get_Service_API | This service operation is used by an API publishing function to retrieve service APIs from the CAPIF core function. This service operation is also used by CAPIF core function to retrieve service APIs on other CAPIF core function. | 5.3.2.4 |
| Update_Service_API | This service operation is used by an API publishing function to update published service APIs on the CAPIF core function. This service operation is also used by CAPIF core function to update published service APIs on other CAPIF core function. | 5.3.2.5 |

The request URIs used in HTTP requests from the APF 402 towards the CCF 405 has the following Resource URI structure: {apiRoot}/published-apis/v1/<apiSpecificSuffixes> where the <apiSpecificSuffixes> are set as described in subclause 8.2.2 of [TS29222]). Table 5 provides an overview of the resources and applicable HTTP methods. The "apiRoot" is configured by means outside the scope of the present disclosure, and it includes the scheme ("https"), host and optional port, and an optional prefix string. A different root structure can be used when the resource URI is preconfigured in the API invoking entity 410.

TABLE 5

Resources and methods overview

| Resource name | Resource URI | HTTP method or custom operation | Description |
|---|---|---|---|
| APF published APIs | /{apfId}/service-apis | POST | Publish a new API |
| | | GET | Retrieve all published service APIs |
| Individual APF published API | /{apfId}/service-apis/{serviceApiId} | GET | Retrieve a published service API |
| | | PUT | Update a published service API |
| | | DELETE | Unpublish a published service API |

The APF published APIs resource represents all published service APIs of a API publishing function. The resource URI: {apiRoot}/published-apis/<apiVersion>/{apfId}/service-apis. The apfId identifies the APF 402. For CAPIF interconnection cases, this string also identifies the CCF 405 which is publishing the service API.

Additionally, subclause 8.1.4 of [TS29222] specifies the application data model supported by the CAPIF_Discover_Service_API (data types listed in subclause 7.2 of [TS29222] also apply to this API), and subclause 8.1.4.2.2 of [TS29222] specifies the definition of the service API "DiscoveredAPIs". The DiscoveredAPIs type includes the attribute serviceAPIDescriptions, which includes the data type: "array(ServiceAPIDescription)" that provides a description of the service API as published by the service. For the CAPIF_Discover_Service_API, the supportedFeatures attribute of the ServiceAPIDescription data type are provided in the HTTP GET response of a successful query. In addition, the supportedFeatures attribute may include one or more supported feature(s) as defined in subclause 8.1.6 of [TS29222]. The supportedFeatures attribute may include the feature "ApiSupportedFeatureQuery", which indicates the support of the query filter indicating the supported feature(s) of a service API. Furthermore, table 8.1.2.2.3.1-1 in subclause 8.1.2.2.3.1 of [TS29222] defines the data elements that are provided by the CCF 405 to API invokers 410 as part of API discovery (CAPIF_Discover_Service_API). In this embodiment, a new data element, "transport-name", is added to support the discovery of APIs using different transports as shown by Table 6.

TABLE 6

URI query parameters supported by the GET method on this resource

| Name | Data type | P | Cardinality | Description | Applicability |
|---|---|---|---|---|---|
| api-invoker-id | string | M | 1 | String identifying the API invoker 410 assigned by the CAPIF core function. It also represents the CCF identifier in the CAPIF-6/6e reference point. | |
| api-name | string | O | 0 . . . 1 | Contains the API name as {apiName} part of the URI structure as defined in subclause 4.4 of 3GPP TS 29.501. | |
| api-version | string | O | 0 . . . 1 | Contains the API major version conveyed in the URI (e.g., v1). | |
| comm-type | CommunicationType | O | 0 . . . 1 | Communication type used by the API (e.g. REQUEST_RESPONSE). | |
| protocol | Protocol | O | 0 . . . 1 | Protocol used by the API. | |
| aef-id | string | O | 0 . . . 1 | AEF identifier. | |
| data-format | DataFormat | O | 0 . . . 1 | Data format used by the API (e.g., serialization protocol JSON). | |
| api-cat | string | O | 0 . . . 1 | The service API category to which the service API belongs. | |
| supported-features | SupportedFeatures | O | 0 . . . 1 | To filter irrelevant responses related to unsupported features. | |
| api-supported-features | SupportedFeatures | C | 0 . . . 1 | Features supported by the discovered service API indicated by api-name parameter. This may only be present if the api-name query parameter is present. | ApiSupported FeatureQuery |

TABLE 6-continued

| URI query parameters supported by the GET method on this resource | | | | | |
|---|---|---|---|---|---|
| Name | Data type | P | Cardinality | Description | Applicability |
| transport-name | string | O | 0 . . . 1 | The name of the Transport associated with this API | |

The CAPIF discover service APIs, as defined in [TS23222], allow API invokers 410 to discover service API(s) available at the CCF 405 via the CAPIF-1/1e reference points, and allow the CCF 405 to discover service API(s) available at other CCFs 405 via the CAPIF-6 and CAPIF-6e reference points. Consumers of the CAPIF_Discover_Service_API service include the API invoker 410 and the CCF 405. To discover service APIs available at the CCF 405, the consumer (e.g., API invoker 410) sends an HTTP GET message with the API invoker ID or CCF ID and query parameters to the CCF 405 as specified in subclause 8.1.2.2.3.1 of [TS29222].

Upon receiving the aforementioned HTTP GET message, the CCF 405 verifies the identity of the consumer (e.g., API invoker 410) and checks if the consumer is authorized to discover the service APIs. If the consumer is authorized to discover the service APIs, the CCF 405 searches the CCF 405 (API registry) for APIs matching the query criteria; applies the discovery policy, if any, on the search results and filter the search results to obtain the list of service API description or the information of the CCF 405 which is required to be contacted further for discovering the service APIs; and returns the filtered search results or the information of the CCF 405 in the response message. In some implementations, the shareableInformation for each of serviceAPIDescription is not provided in the filtered search results.

1.6. Embodiment 3

FIG. 7*c* depicts architecture 700*c* according to a third embodiment, which enhances the first and second embodiments. In the third embodiment, the MEC apps 2426 can consume 3GPP services by benefitting from the mechanisms described previously, and the supporting role of the edgeXapis GW function 710 in securing the communication between MEC platform 2432 and 3GPP EES 2155.

This service consumption is made possible by foreseeing a preliminary exchange of information at step 0 in FIG. 7*c* between CCF 405 and MEC platform 2432, so that the MEC platform 2432 is exposing in the service registry a full list of services available at step 2*b* in FIG. 7*c*. This step is also assuming that in the previous alignment steps, the EES 2155 is already considering the MEC app 2426 as an authorized API invoker 410. Then, the MEC app 2426 can consume the APIs exposed by the EES 2155 as depicted in step 3 in FIG. 7*c*.

1.7. Attestation and Security Aspects

Figure 9:
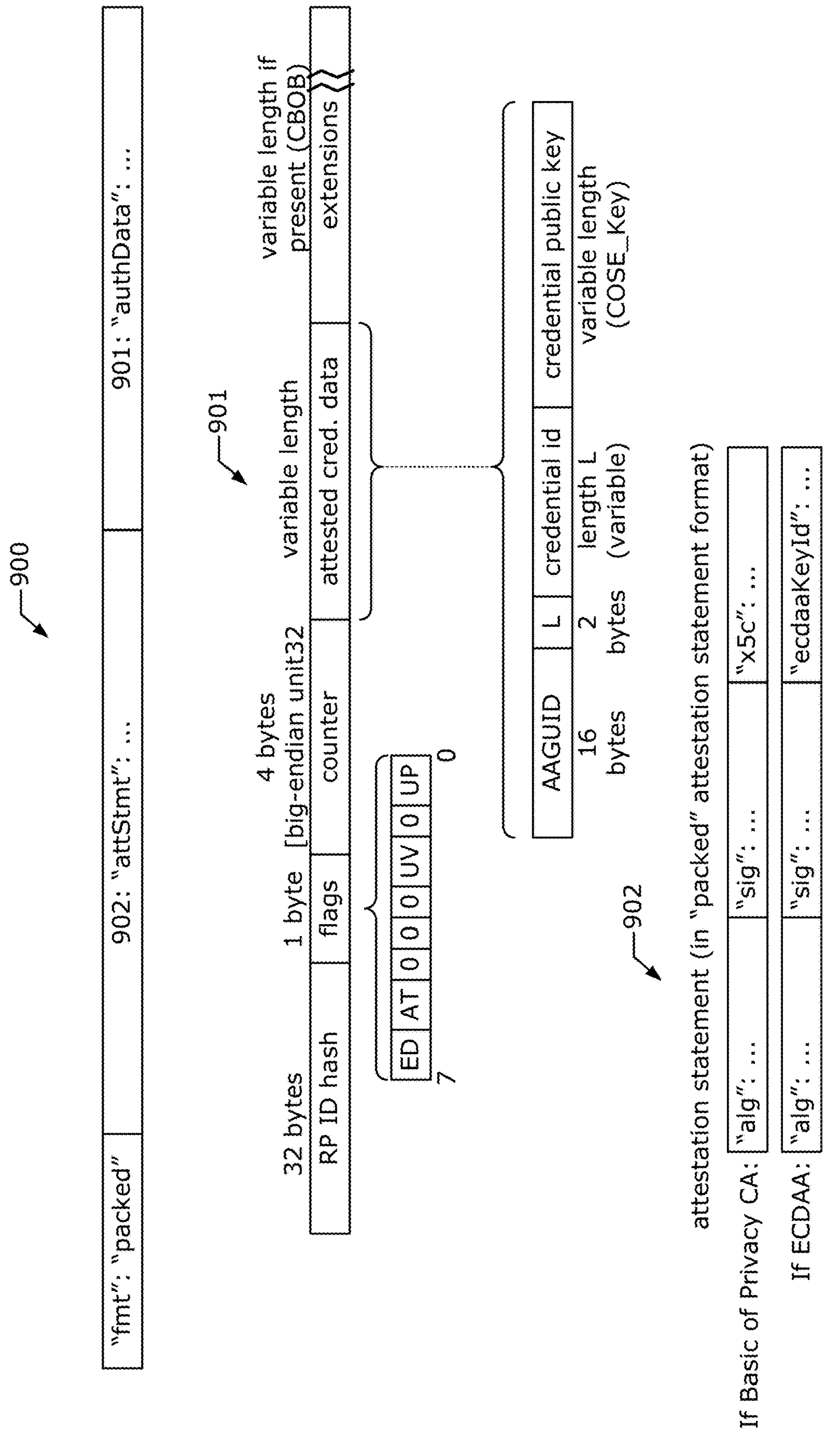
FIG. 9 illustrates an attestation object layout illustrating the included authenticator data (containing attested credential data) and attestation statement.

FIG. 9 shows a layout of an attestation object 900 illustrating the included authenticator data 901 (containing attested credential data) and an attestation statement 902. Generally, attestation is a statement serving to bear witness, confirm, or authenticate. In the web authentication (WebAuthn) context, attestation is employed to attest to the provenance of an authenticator and the data it emits; including, for example, credential IDs, credential key pairs, signature counters, etc. A credential is data one entity presents to another in order to authenticate the former to the latter. A credential ID is a probabilistically-unique byte sequence identifying a public key credential source and its authentication assertions, and a credential key pair is a pair of asymmetric cryptographic keys generated by an authenticator and scoped to a specific WebAuthn relying party. A credential key pair is a part of a public key credential (or "credential public key"). The term public key credential refers to one of a public key credential source, the possibly-attested credential public key corresponding to a public key credential source, or an authentication assertion. A credential private key is the private key portion of a credential key pair; a credential private key is bound to a particular authenticator (its managing authenticator) and is expected to never be exposed to any other party, not even to the owner/operator of the authenticator. An attestation statement 902 is conveyed in an attestation object 900 during registration (see e.g., § 6.5 Attestation in "Web Authentication: An API for accessing Public Key Credentials Level 2", Web Authentication Working Group W3C Recommendation, (8 Apr. 2021), available at: https://www.w3.org/TR/webauthn-2/(" [W3CWebAuthn]")).

An authenticator is a cryptographic entity, existing in hardware and/or software, that can register a user with a given relying party and later assert possession of the registered public key credential, and optionally verify the user, when requested by the relying party. Authenticators can report information regarding their type and security characteristics via attestation during registration. The relying party is an entity whose application (e.g., a web app and/or the like) utilizes an authentication mechanism (e.g., the Web Authentication API discussed in [W3CWebAuthn] and/or the Oauth and/or TLS mechanisms discussed herein) to register and authenticate users. Each authenticator has an AAGUID, which is a 128-bit identifier indicating the type (e.g. make and model) of the authenticator. Whether or how the client (e.g., authenticator) conveys the attestation statement 902 and the AAGUID portions of the attestation object 900 to the relying party is described by attestation conveyance.

Authenticators should provide some form of attestation, if possible. If an authenticator does, the basic requirement is that the authenticator can produce, for each credential public key, an attestation statement 902 verifiable by the WebAuthn relying party. Typically, this attestation statement 902 contains a signature by an attestation private key over the attested credential public key and a challenge, as well as a certificate (e.g., X.509 Certificate) or similar data providing provenance information for the attestation public key, enabling the relying party to make a trust decision. However, if an attestation key pair is not available, then the authenticator may either perform self-attestation of the credential public key with the corresponding credential private key, or otherwise perform no attestation. All this information is returned by authenticators any time a new public key credential is generated, in the overall form of an attestation object. The relationship of the attestation object 900 with authenticator data 901 (containing attested credential data) and the attestation statement 902 is illustrated by FIG. 9. If an authenticator employs self-attestation or no attestation, then no provenance information is provided for the relying party to base a trust decision on. In these cases, the authenticator provides no guarantees about its operation to the relying part.

The authenticator data structure 901 encodes contextual bindings made by the authenticator. These bindings are controlled by the authenticator itself, and derive their trust from the WebAuthn relying party's assessment of the security properties of the authenticator. In some cases, the authenticator may be embedded in the client, and its bindings may be no more trustworthy than the client data. Additionally or alternatively, the authenticator may be a discrete entity with high-security hardware and software, connected to the client over a secure channel. In both cases, the relying party receives the authenticator data in the same format, and uses its knowledge of the authenticator to make trust decisions. The authenticator data structure 901 includes, inter alia, attested credential data is a variable-length byte array added to the authenticator data when generating an attestation object 900 for a given credential; its format is shown in table 3 in [W3CWebAuthn] § 6.5.1.

The attestation statement 902 is a specific type of signed data object, containing statements about a public key credential itself and the authenticator that created it. It contains an attestation signature created using the key of the attesting authority (except for the case of self-attestation, when it is created using the credential private key). In order to correctly interpret an attestation statement 902, a relying party needs to understand the following two aspects of attestation: the attestation statement format and the attestation type.

The attestation statement format is the manner in which the signature is represented and the various contextual bindings are incorporated into the attestation statement 902 by the authenticator. In other words, this defines the syntax of the statement. Various existing components and OS platforms (such as TPMs and the Android OS) have previously defined attestation statement formats. This specification supports a variety of such formats in an extensible way, as defined in [W3CWebAuthn] § 6.5.2 Attestation Statement Formats. The formats themselves are identified by strings, as described in [W3CWebAuthn] § 8.1 Attestation Statement Format Identifiers.

The attestation type defines the semantics of attestation statements 902 and their underlying trust models. Specifically, the attestation type defines how a relying party establishes trust in a particular attestation statement 902, after verifying that it is cryptographically valid. Various supported attestation types are described in [W3CWebAuthn] § 6.5.3 Attestation Types.

The attestation certificate may be an X.509 certificate for the attestation key pair used by an authenticator to attest to its manufacture and capabilities. At registration time, the authenticator uses the attestation private key to sign the relying party-specific credential public key (and additional data) that it generates and returns via the authenticatorMakeCredential operation. Relying parties use the attestation public key conveyed in the attestation certificate to verify the attestation signature. Note that in the case of self-attestation, the authenticator has no distinct attestation key pair nor attestation certificate. In the case of self-attestation, also known as surrogate basic attestation (see e.g., Lindemann et al., "FIDO UAF Protocol Specification v1.0", FIDO Alliance Proposed Standard (8 Dec. 2014), available at: https://fidoalliance.org/specs/fido-uaf-v1.0-ps-20141208/fido-uaf-protocol-v1.0-ps-20141208.html ("[UAFProtocol]"), the Authenticator does not have any specific attestation key pair Instead it uses the credential private key to create the attestation signature. Authenticators without meaningful protection measures for an attestation private key typically use this attestation type.

Figure 10:
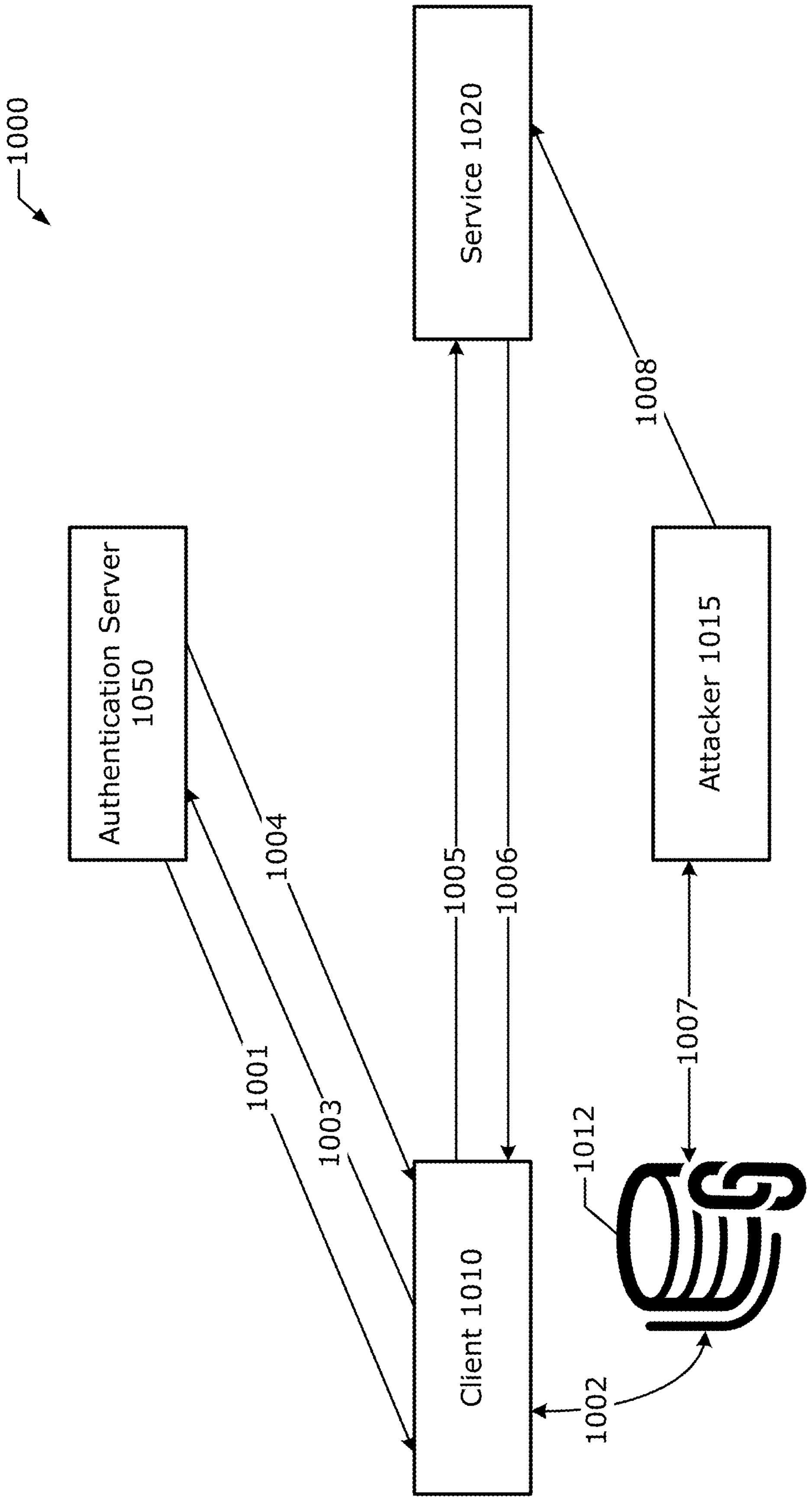
FIG. 10 illustrates an example of authentication an attack in the lack of an attestation mechanism.

FIG. 10 shows an example authentication attack in the lack of an attestation mechanism. This example begins at step 1001 where an authentication server 1050 sends an authentication challenge message to the client 1010 (which may be the same or similar to UE 2101, UEs 1221, 1211 of FIG. 12, UE/Device 2420 of FIG. 24, UE 2902 of FIG. 29, and/or other UEs, mobile devices, and/or clients discussed herein). At step 1002, the client 1010 obtains authentication credentials (e.g., keys, biometrics, secrets, certificates, etc.) from the secure storage 1012, and at step 1003, the client 1010 provides the authentication credentials to the authentication server 1050 in an authentication response message. At step 1004, the authentication server 1050 provides an authentication token to the client 1010. At step 1005, the client 1010 provides a service request with the authentication token to the service 1020, and in response, the service 1020 provides a service response to the client 1010 at step 1006. Meanwhile, at some point during steps 1001 to 1006, an attacker 1015 obtains the authentication credentials from the client 1010 and/or the secure storage 1012 at step 1007, and at 1008, the attacker 1015 provides an illicit service request using a token (which is obtained in a same or similar manner as described with respect to steps 1001 to 1006) to obtain personal and/or confidential data related to the client 1010.

Figure 11:
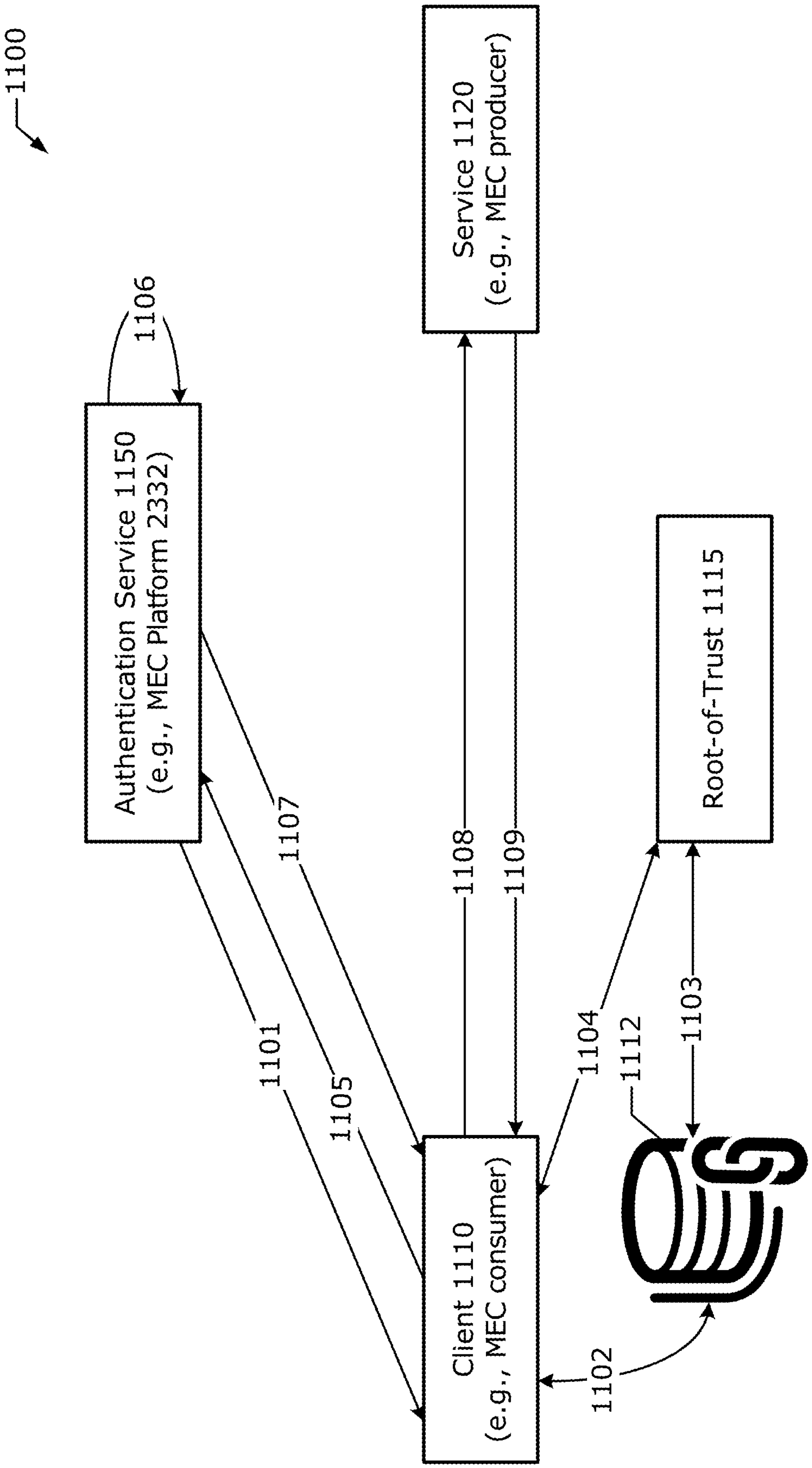
FIG. 11 illustrates an example of an authentication attack protected with an attestation mechanism.

FIG. 11 shows an example authentication attack augmented with attestation. This example begins at step 1101 where an authentication server 1150 (which may be a MEC platform 2432) sends an authentication challenge message to the client 1010 (which may be a MEC consumer such as the UE 2101, UEs 1221, 1211 of FIG. 12, UE/Device 2420 of FIG. 24, UE 2902 of FIG. 29, and/or other UEs, mobile devices, and/or clients discussed herein). \

At step 1102, the client 1110 obtains authentication credentials (e.g., keys, biometrics, secrets, certificates, etc.) from the secure storage 1112, and at step 1103, the client 1010 performs an assessment protection mechanism (e.g., attestation) with the root-of-trust 1115 (which may be a hardware and/or software element). At step 1104, the root-of-trust 1115 provides an attestation report to the client 1110. At step 1104, the client 1110 provides the attestation report to the authentication server 1150 in an authentication response message. At step 1106, the authentication server 1150 evaluates the attestation report, and at step 1107, the authentication server 1150 provides an authentication token to the client 1010 (e.g., upon successful validation/verification of the attestation report). At step 1105, the client 1010 provides a service request with the authentication token to the service 1120 (which may be a MEC producer element), and in response, the service 1120 provides a service response to the client 1010 at step 1109.

2. EDGE COMPUTING SYSTEM CONFIGURATIONS AND ARRANGEMENTS

Edge computing, at a general level, refers to the implementation, coordination, and use of computing and resources at locations closer to the "edge" or collection of "edges" of the network. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in an high performance compute data center or cloud installation; a designated edge node server, an enterprise server, a roadside server, a telecom central office; or a local or peer at-the-edge device being served consuming edge services).

Individual compute platforms or other components that can perform edge computing operations (referred to as "edge compute nodes," "edge nodes," or the like) can reside in whatever location needed by the system architecture or ad hoc service. In many edge computing architectures, edge nodes are deployed at NANs, gateways, network routers, and/or other devices that are closer to endpoint devices (e.g., UEs, IoT devices, etc.) producing and consuming data. As examples, edge nodes may be implemented in a high performance compute data center or cloud installation; a designated edge node server, an enterprise server, a roadside server, a telecom central office; or a local or peer at-the-edge device being served consuming edge services.

Edge compute nodes may partition resources (e.g., memory, CPU, GPU, interrupt controller, I/O controller, memory controller, bus controller, network connections or sessions, etc.) where respective partitionings may contain security and/or integrity protection capabilities. Edge nodes may also provide orchestration of multiple applications through isolated user-space instances such as containers, partitions, virtual environments (VEs), virtual machines (VMs), Function-as-a-Service (FaaS) engines, Servlets, servers, and/or other like computation abstractions. Containers are contained, deployable units of software that provide code and needed dependencies. Various edge system arrangements/architecture treats VMs, containers, and functions equally in terms of application composition. The edge nodes are coordinated based on edge provisioning functions, while the operation of the various applications are coordinated with orchestration functions (e.g., VM or container engine, etc.). The orchestration functions may be used to deploy the isolated user-space instances, identifying and scheduling use of specific hardware, security related functions (e.g., key management, trust anchor management, etc.), and other tasks related to the provisioning and lifecycle of isolated user spaces Applications that have been adapted for edge computing include but are not limited to virtualization of traditional network functions (e.g., to operate telecommunications or Internet services) and the introduction of next-generation features and services (e.g., to support 5G network services). Use-cases which are projected to extensively utilize edge computing include connected self-driving cars, surveillance, Internet of Things (IoT) device data analytics, video encoding and analytics, location aware services, device sensing in Smart Cities, among many other network and compute intensive services.

Edge computing may, in some scenarios, offer or host a cloud-like distributed service, to offer orchestration and management for applications and coordinated service instances among many types of storage and compute resources. Edge computing is also expected to be closely integrated with existing use cases and technology developed for IoT and Fog/distributed networking configurations, as endpoint devices, clients, and gateways attempt to access network resources and applications at locations closer to the edge of the network.

The present disclosure provides specific examples relevant to edge computing configurations provided within Multi-Access Edge Computing (MEC) and 5G network implementations. However, many other standards and network implementations are applicable to the edge and service management concepts discussed herein. For example, many other edge computing/networking technologies may be applicable to the present disclosure in various combinations and layouts of devices located at the edge of a network. Examples of such other edge computing/networking technologies include Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used for purposes of the present disclosure.

Figure 12:
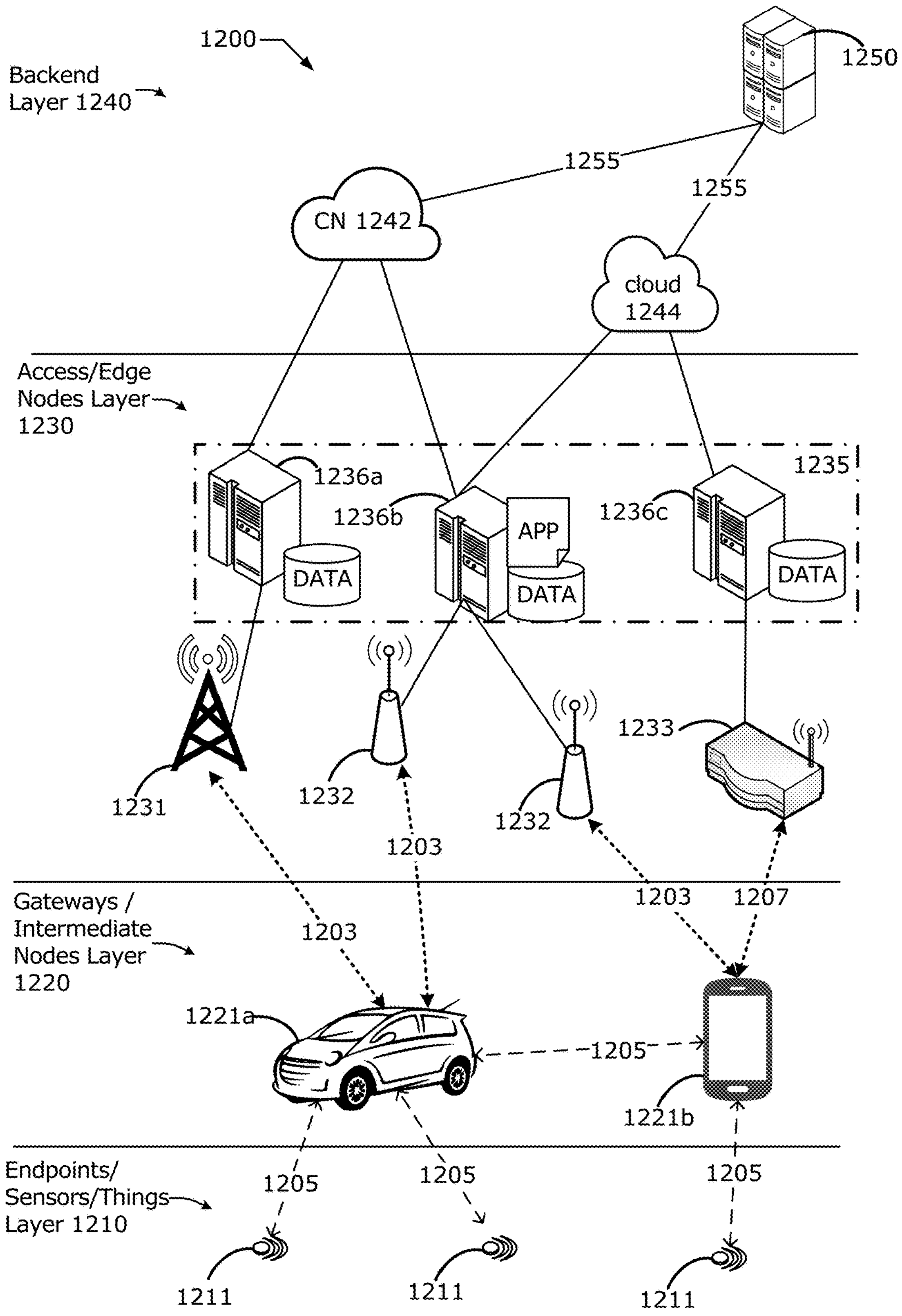
FIG. 12 illustrates an example edge computing environment.

FIG. 12 illustrates an example edge computing environment 1200. FIG. 12 specifically illustrates the different layers of communication occurring within the environment 1200, starting from endpoint sensors or things layer 1210 (e.g., operating in an Internet of Things (IoT) network topology) comprising one or more IoT devices 1211 (also referred to as edge endpoints 1210 or the like); increasing in sophistication to gateways or intermediate node layer 1220 comprising one or more user equipment (UEs) **1221*a* and 1221*b* (also referred to as intermediate nodes 1220 or the like), which facilitate the collection and processing of data from endpoints 1210; increasing in processing and connectivity sophistication to access node layer 1230 (or "edge node layer 1230") comprising a plurality of network access nodes (NANs) 1231, 1232, and 1233 (collectively referred to as "NANs 1231-1233" or the like) and a plurality of edge compute nodes 1236*a-c* (collectively referred to as "edge compute nodes 1236" or the like) within an edge computing system 1235; and increasing in connectivity and processing sophistication to a backend layer 1210 comprising core network (CN) 1242 and cloud 1244. The processing at the backend layer 1210 may be enhanced by network services as performed by one or more remote application (app) servers 1250** and/or other cloud services. Some or all of these elements may be equipped with or otherwise implement some or all features and/or functionality discussed herein.

The environment 1200 is shown to include end-user devices, such as intermediate nodes 1220 and endpoints 1210, which are configured to connect to (or communicatively couple with) one or more multiple communication networks (also referred to as "access networks," "radio access networks," or the like) based on different access technologies (or "radio access technologies") for accessing application services. These access networks may include one or more of NANs 1231, 1232, and/or 1233. The NANs 1231-1233 are arranged to provide network connectivity to the end-user devices via respective links 1203, 1207 between the individual NANs and the one or more UEs 1211, 1221.

As examples, the communication networks and/or access technologies may include cellular technology such as LTE, MuLTEfire, and/or NR/5G (e.g., as provided by Radio Access Network (RAN) node 1231 and/or RAN nodes 1232), WiFi or wireless local area network (WLAN) technologies (e.g., as provided by access point (AP) 1233 and/or RAN nodes 1232), and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.).

The intermediate nodes 1220 include UE 1221*a* and UE 1221*b* (collectively referred to as "UE 1221" or "UEs 1221"). In this example, the UE 1221*a* is illustrated as a vehicle UE, and UE 1221*b* is illustrated as a smartphone (e.g., handheld touchscreen mobile computing device connectable to one or more cellular networks). However, these UEs 1221 may comprise any mobile or non-mobile computing device, such as tablet computers, wearable devices, PDAs, pagers, desktop computers, laptop computers, wireless handsets, unmanned vehicles or drones, and/or any type of computing device including a wireless communication interface.

The endpoints 1210 include UEs 1211, which may be IoT devices (also referred to as "IoT devices 1211"), which are uniquely identifiable embedded computing devices (e.g., within the Internet infrastructure) that comprise a network access layer designed for low-power IoT applications utilizing short-lived UE connections. The IoT devices 1211 are any physical or virtualized, devices, sensors, or "things" that are embedded with hardware and/or software components that enable the objects, devices, sensors, or "things" capable of capturing and/or recording data associated with an event, and capable of communicating such data with one or more other devices over a network with little or no user intervention. As examples, IoT devices 1211 may be abiotic devices such as autonomous sensors, gauges, meters, image capture devices, microphones, light emitting devices, audio emitting devices, audio and/or video playback devices, electro-mechanical devices (e.g., switch, actuator, etc.), EEMS, ECUs, ECMs, embedded systems, microcontrollers, control modules, networked or "smart" appliances, MTC devices, M2M devices, and/or the like. The IoT devices 1211 can utilize technologies such as M2M or MTC for exchanging data with an MTC server (e.g., a server 1250), an edge server 1236 and/or edge computing system 1235, or device via a PLMN, ProSe or D2D communication, sensor networks, or IoT networks. The M2M or MTC exchange of data may be a machine-initiated exchange of data.

The IoT devices 1211 may execute background applications (e.g., keep-alive messages, status updates, etc.) to facilitate the connections of the IoT network. Where the IoT devices 1211 are, or are embedded in, sensor devices, the IoT network may be a WSN. An IoT network describes an interconnecting IoT UEs, such as the IoT devices 1211 being connected to one another over respective direct links 1205. The IoT devices may include any number of different types of devices, grouped in various combinations (referred to as an "IoT group") that may include IoT devices that provide one or more services for a particular user, customer, organizations, etc. A service provider (e.g., an owner/operator of server 1250, CN 1242, and/or cloud 1244) may deploy the IoT devices in the IoT group to a particular area (e.g., a geolocation, building, etc.) in order to provide the one or more services. In some implementations, the IoT network may be a mesh network of IoT devices 1211, which may be termed a fog device, fog system, or fog, operating at the edge of the cloud 1244. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 1244 to Things (e.g., IoT devices 1211). The fog may be established in accordance with specifications released by the OFC, the OCF, among others. Additionally or alternatively, the fog may be a tangle as defined by the IOTA foundation.

The fog may be used to perform low-latency computation/aggregation on the data while routing it to an edge cloud computing service (e.g., edge nodes 1230) and/or a central cloud computing service (e.g., cloud 1244) for performing heavy computations or computationally burdensome tasks. On the other hand, edge cloud computing consolidates human-operated, voluntary resources, as a cloud. These voluntary resource may include, inter-alia, intermediate nodes 1220 and/or endpoints 1210, desktop PCs, tablets, smartphones, nano data centers, and the like. In various implementations, resources in the edge cloud may be in one to two-hop proximity to the IoT devices 1211, which may result in reducing overhead related to processing data and may reduce network delay.

Additionally or alternatively, the fog may be a consolidation of IoT devices 1211 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks or workloads offloaded by edge resources.

Additionally or alternatively, the fog may operate at the edge of the cloud 1244. The fog operating at the edge of the cloud 1244 may overlap or be subsumed into an edge network 1230 of the cloud 1244. The edge network of the cloud 1244 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes 1236 or edge devices). The Fog layer resides on top of the edge layer and is a consolidation of networking devices such as the intermediate nodes 1220 and/or endpoints 1210 of FIG. 12.

Data may be captured, stored/recorded, and communicated among the IoT devices 1211 or, for example, among the intermediate nodes 1220 and/or endpoints 1210 that have direct links 1205 with one another as shown by FIG. 12. Analysis of the traffic flow and control schemes may be implemented by aggregators that are in communication with the IoT devices 1211 and each other through a mesh network. The aggregators may be a type of IoT device 1211 and/or network appliance. In the example of FIG. 12, the aggregators may be edge nodes 1230, or one or more designated intermediate nodes 1220 and/or endpoints 1210. Data may be uploaded to the cloud 1244 via the aggregator, and commands can be received from the cloud 1244 through gateway devices that are in communication with the IoT devices 1211 and the aggregators through the mesh network. Unlike the traditional cloud computing model, in some implementations, the cloud 1244 may have little or no computational capabilities and only serves as a repository for archiving data recorded and processed by the fog. In these implementations, the cloud 1244 centralized data storage system and provides reliability and access to data by the computing resources in the fog and/or edge devices. Being at the core of the architecture, the Data Store of the cloud 1244 is accessible by both Edge and Fog layers of the aforementioned edge-fog network.

As mentioned previously, the access networks provide network connectivity to the end-user devices 1220, 1210 via respective NANs 1231-1233. The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. Additionally or alternatively, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. Additionally or alternatively, the CRAN, CR, or vBBUP may implement a RAN function split, wherein one or more communication protocol layers are operated by the CRAN/CR/vBBUP and other communication protocol entities are operated by individual RAN nodes 1231, 1232. This virtualized framework allows the freed-up processor cores of the NANs 1231, 1232 to perform other virtualized applications, such as virtualized applications for various elements discussed herein.

The UEs 1221, 1211 may utilize respective connections (or channels) 1203, each of which comprises a physical communications interface or layer. The connections 1203 are illustrated as an air interface to enable communicative coupling consistent with cellular communications protocols, such as 3GPP LTE, 5G/NR, Push-to-Talk (PTT) and/or PTT over cellular (POC), UMTS, GSM, CDMA, and/or any of the other communications protocols discussed herein. Additionally or alternatively, the UEs 1211, 1221 and the NANs 1231-1233 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). To operate in the unlicensed spectrum, the UEs 1211, 1221 and NANs 1231-1233 may operate using LAA, enhanced LAA (eLAA), and/or further eLAA (feLAA) mechanisms. The UEs 1221, 1211 may further directly exchange communication data via respective direct links 1205, which may be LTE/NR Proximity Services (ProSe) link or PC5 interfaces/links, or WiFi based links or a personal area network (PAN) based links (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/Bluetooth Low Energy (BLE) protocols).

Additionally or alternatively, individual UEs 1221, 1211 provide radio information to one or more NANs 1231-1233 and/or one or more edge compute nodes 1236 (e.g., edge servers/hosts, etc.). The radio information may be in the form of one or more measurement reports, and/or may include, for example, signal strength measurements, signal quality measurements, and/or the like. Each measurement report is tagged with a timestamp and the location of the measurement (e.g., the UEs 1221, 1211 current location). As examples, the measurements collected by the UEs 1221, 1211 and/or included in the measurement reports may include one or more of the following: bandwidth (BW), network or cell load, latency, jitter, round trip time (RTT), number of interrupts, out-of-order delivery of data packets, transmission power, bit error rate, bit error ratio (BER), Block Error Rate (BLER), packet loss rate, packet reception rate (PRR), e2e delay, signal-to-noise ratio (SNR), signal-to-noise and interference ratio (SINR), signal-plus-noise-plus-distortion to noise-plus-distortion (SINAD) ratio, carrier-to-interference plus noise ratio (CINR), Additive White Gaussian Noise (AWGN), energy per bit to noise power density ratio (Eb/NO), energy per bit to interference power density ratio (Ec/I0), peak-to-average power ratio (PAPR), Reference Signal Received Power (RSRP), Received Signal Strength Indicator (RSSI), Reference Signal Received Quality (RSRQ), GNSS timing of cell frames for UE positioning for E-UTRAN or 5G/NR (e.g., a timing between an AP or RAN node reference time and a GNSS-specific reference time for a given GNSS), GNSS code measurements (e.g., The GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, Fast Initial Link Setup (FILS) discovery frames, or probe response frames for IEEE 802.11 WLAN/WiFi networks. Other measurements may be additionally or alternatively used, such as those discussed in 3GPP TS 36.214 v16.2.0 (2021 Mar. 31) ("[TS36214]"), 3GPP TS 38.215 v16.4.0 (2020 December) ("[TS38215]"), IEEE 802.11-2020, "IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications" (2021 Feb. 26) ("[IEEE80211]"), and/or the like. Additionally or alternatively, any of the aforementioned measurements (or combination of measurements) may be collected by one or more NANs 1231-1233 and provided to the edge compute node(s) 1236.

The radio information may be reported in response to a trigger event and/or on a periodic basis. Additionally or alternatively, individual UEs 1221, 1211 report radio information either at a low periodicity or a high periodicity depending on a data transfer that is to take place, and/or other information about the data transfer.

Additionally or alternatively, the edge compute node(s) 1236 may request the measurements from the NANs 1231-1233 at low or high periodicity, or the NANs 1231-1233 may provide the measurements to the edge compute node(s) 1236 at low or high periodicity. Additionally or alternatively, the edge compute node(s) 1236 may obtain other relevant data from other edge compute node(s) 1236, core network functions (NFs), application functions (AFs), and/or other UEs 1211, 1221 such as Key Performance Indicators (KPIs), with the measurement reports or separately from the measurement reports.

The UE 1221*b* is shown to be configured to access an access point (AP) 1233 via a connection 1207. In this example, the AP 1233 is shown to be connected to the Internet without connecting to the CN 1242 of the wireless system. The connection 1207 can comprise a local wireless connection, such as a connection consistent with any IEEE 802.11 protocol, wherein the AP 1233 would comprise a wireless fidelity (WiFi®) router. Additionally or alternatively, the UEs 1221 and IoT devices 1211 can be configured to communicate using suitable communication signals with each other or with any of the AP 1233 over a single or multicarrier communication channel in accordance with various communication techniques, such as, but not limited to, an orthogonal frequency division multiplexing (OFDM) communication technique, a single-carrier frequency division multiple access (SC-FDMA) communication technique, and/or the like, although the scope of the present disclosure is not limited in this respect. The communication technique may include a suitable modulation scheme such as Complementary Code Keying (CCK); Phase-Shift Keying (PSK) such as Binary PSK (BPSK), Quadrature PSK (QPSK), Differential PSK (DPSK), etc.; or Quadrature Amplitude Modulation (QAM) such as M-QAM; and/or the like.

The one or more NANs 1231 and 1232 that enable the connections 1203 may be referred to as "RAN nodes" or the like. The RAN nodes 1231, 1232 may comprise ground stations (e.g., terrestrial access points) or satellite stations providing coverage within a geographic area (e.g., a cell). The RAN nodes 1231, 1232 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 1231 is embodied as a NodeB, evolved NodeB (eNB), or a next generation NodeB (gNB), and the RAN nodes 1232 are embodied as relay nodes, distributed units, or Road Side Unites (RSUs). Any other type of NANs can be used.

Any of the RAN nodes 1231, 1232 can terminate the air interface protocol and can be the first point of contact for the UEs 1221 and IoT devices XE111. Additionally or alternatively, any of the RAN nodes 1231, 1232 can fulfill various logical functions for the RAN including, but not limited to, RAN function(s) (e.g., radio network controller (RNC) functions and/or NG-RAN functions) for radio resource management, admission control, uplink and downlink dynamic resource allocation, radio bearer management, data packet scheduling, etc. Additionally or alternatively, the UEs 1211, 1221 can be configured to communicate using OFDM communication signals with each other or with any of the NANs 1231, 1232 over a multicarrier communication channel in accordance with various communication techniques, such as, but not limited to, an OFDMA communication technique (e.g., for downlink communications) and/or an SC-FDMA communication technique (e.g., for uplink and ProSe or sidelink communications), although the scope of the present disclosure is not limited in this respect.

For most cellular communication systems, the RAN function(s) operated by the RAN or individual NANs 1231-1232 organize downlink transmissions (e.g., from any of the RAN nodes 1231, 1232 to the UEs 1211, 1221) and uplink transmissions (e.g., from the UEs 1211, 1221 to RAN nodes 1231, 1232) into radio frames (or simply "frames") with 10 millisecond (ms) durations, where each frame includes ten 1 ms subframes. Each transmission direction has its own resource grid that indicate physical resource in each slot, where each column and each row of a resource grid corresponds to one symbol and one subcarrier, respectively. The duration of the resource grid in the time domain corresponds to one slot in a radio frame. The resource grids comprises a number of resource blocks (RBs), which describe the mapping of certain physical channels to resource elements (REs). Each RB may be a physical RB (PRB) or a virtual RB (VRB) and comprises a collection of REs. An RE is the smallest time-frequency unit in a resource grid. The RNC function(s) dynamically allocate resources (e.g., PRBs and modulation and coding schemes (MCS)) to each UE 1211, 1221 at each transmission time interval (TTI). A TTI is the duration of a transmission on a radio link 1203, 1205, and is related to the size of the data blocks passed to the radio link layer from higher network layers.

The NANs 1231/1232 may be configured to communicate with one another via respective interfaces or links (not shown), such as an X2 interface for LTE implementations (e.g., when CN 1242 is an Evolved Packet Core (EPC)), an Xn interface for 5G or NR implementations (e.g., when CN 1242 is an Fifth Generation Core (5GC)), or the like. The NANs 1231 and 1232 are also communicatively coupled to CN 1242. Additionally or alternatively, the CN 1242 may be an evolved packet core (EPC) network, a NextGen Packet Core (NPC) network, a 5G core (5GC), or some other type of CN. The CN 1242 may comprise a plurality of network elements, which are configured to offer various data and telecommunications services to customers/subscribers (e.g., users of UEs 1221 and IoT devices 1211) who are connected to the CN 1242 via a RAN. The components of the CN 1242 may be implemented in one physical node or separate physical nodes including components to read and execute instructions from a machine-readable or computer-readable medium (e.g., a non-transitory machine-readable storage medium). Additionally or alternatively, Network Functions Virtualization (NFV) may be utilized to virtualize any or all of the above-described network node functions via executable instructions stored in one or more computer-readable storage mediums (described in further detail infra). A logical instantiation of the CN 1242 may be referred to as a network slice, and a logical instantiation of a portion of the CN 1242 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN 1242 components/functions.

The CN 1242 is shown to be communicatively coupled to an application server 1250 and a network 1250 via an IP communications interface 1255. the one or more server(s) 1250 comprise one or more physical and/or virtualized systems for providing functionality (or services) to one or more clients (e.g., UEs 1221 and IoT devices 1211) over a network. The server(s) 1250 may include various computer devices with rack computing architecture component(s), tower computing architecture component(s), blade computing architecture component(s), and/or the like. The server(s) 1250 may represent a cluster of servers, a server farm, a cloud computing service, or other grouping or pool of servers, which may be located in one or more datacenters. The server(s) 1250 may also be connected to, or otherwise associated with one or more data storage devices (not shown). Moreover, the server(s) 1250 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 1250 offer applications or services that use IP/network resources. As examples, the server(s) 1250 may provide traffic management services, cloud analytics, content streaming services, immersive gaming experiences, social networking and/or microblogging services, and/or other like services. In addition, the various services provided by the server(s) 1250 may include initiating and controlling software and/or firmware updates for applications or individual components implemented by the UEs 1221 and IoT devices 1211. The server(s) 1250 can also be configured to support one or more communication services (e.g., Voice-over-Internet Protocol (VoIP) sessions, PTT sessions, group communication sessions, social networking services, etc.) for the UEs 1221 and IoT devices 1211 via the CN 1242.

The Radio Access Technologies (RATs) employed by the NANs 1231-1233, the UEs 1221, 1211, and the other elements in FIG. 12 may include one or more V2X RATs, which allow these elements to communicate directly with one another, with infrastructure equipment (e.g., NANs 1231-1233), and other devices. Any number of V2X RATs may be used for V2X communication. In some implementations, at least two distinct V2X RATs may be used including WLAN V2X (W-V2X) RAT based on IEEE V2X technologies (e.g., DSRC for the U.S. and ITS-G5 for Europe) and 3GPP C-V2X RAT (e.g., LTE, 5G/NR, and beyond).

The W-V2X RATs include, for example, IEEE 1609.0-2019, "IEEE Guide for Wireless Access in Vehicular Environments (WAVE) Architecture" (2019 Apr. 10) ("[IEEE16090]"), SAE Intl "V2X Communications Message Set Dictionary" (formerly "Dedicated Short Range Communication (DSRC) Message Set Dictionary") (2020 Jul. 23) ("[J2735_202007]"), Intelligent Transport Systems in the 5 GHz frequency band (ITS-G5), the IEEE 802.11p protocol (which is the layer 1 (L1) and layer 2 (L2) part of WAVE, DSRC, and ITS-G5), and sometimes IEEE 802.16-2017, "IEEE Standard for Air Interface for Broadband Wireless Access Systems" (sometimes referred to as "Worldwide Interoperability for Microwave Access" or "WiMAX") (2018 Mar. 2) ("[WiMAX]"). The term "DSRC" refers to vehicular communications in the 5.9 GHz frequency band that is generally used in the United States, while "ITS-G5" refers to vehicular communications in the 5.9 GHz frequency band in Europe. Since any number of different RATs are applicable (including IEEE 802.11p-based RATs) that may be used in any geographic or political region, the terms "DSRC" (used, among other regions, in the U.S.) and "ITS-G5" (used, among other regions, in Europe) may be used interchangeably throughout this disclosure. The access layer for the ITS-G5 interface is outlined in ETSI EN 302 663 V1.3.1 (2020 January) (hereinafter "[EN302663]") and describes the access layer of the ITS-S reference architecture. The ITS-G5 access layer comprises (which now incorporates IEEE 802.11p) and IEEE 802.2 Logical Link Control (LLC) ("[IEEE8022]") and/or IEEE/ISO/IEC 8802-2-1998 protocols, as well as features for Decentralized Congestion Control (DCC) methods discussed in ETSI TS 102 687 V1.2.1 (2018 April) ("[TS102687]"). The access layer for 3GPP LTE-V2X based interface(s) is outlined in, inter alia, ETSI EN 303 613 V1.1.1 (2020 January), 3GPP TS 23.285 v16.2.0 (2019 December); and 3GPP 5G/NR-V2X is outlined in, inter alia, 3GPP TR 23.786 v16.1.0 (2019 June) and 3GPP TS 23.287 v16.2.0 (2020 March).

The cloud 1244 may represent a cloud computing architecture/platform that provides one or more cloud computing services. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Some capabilities of cloud 1244 include application capabilities type, infrastructure capabilities type, and platform capabilities type. A cloud capabilities type is a classification of the functionality provided by a cloud service to a cloud service customer (e.g., a user of cloud 1244), based on the resources used. The application capabilities type is a cloud capabilities type in which the cloud service customer can use the cloud service provider's applications; the infrastructure capabilities type is a cloud capabilities type in which the cloud service customer can provision and use processing, storage or networking resources; and platform capabilities type is a cloud capabilities type in which the cloud service customer can deploy, manage and run customer-created or customer-acquired applications using one or more programming languages and one or more execution environments supported by the cloud service provider. Cloud services may be grouped into categories that possess some common set of qualities. Some cloud service categories that the cloud 1244 may provide include, for example, Communications as a Service (CaaS), which is a cloud service category involving real time interaction and collaboration services; Compute as a Service (CompaaS), which is a cloud service category involving the provision and use of processing resources needed to deploy and run software; Database as a Service (DaaS), which is a cloud service category involving the provision and use of database system management services; Data Storage as a Service (DSaaS), which is a cloud service category involving the provision and use of data storage and related capabilities; Firewall as a Service (FaaS), which is a cloud service category involving providing firewall and network traffic management services; Infrastructure as a Service (IaaS), which is a cloud service category involving infrastructure capabilities type; Network as a Service (NaaS), which is a cloud service category involving transport connectivity and related network capabilities; Platform as a Service (PaaS), which is a cloud service category involving the platform capabilities type; Software as a Service (SaaS), which is a cloud service category involving the application capabilities type; Security as a Service, which is a cloud service category involving providing network and information security (infosec) services; and/or other like cloud services.

Additionally or alternatively, the cloud 1244 may represent a network such as the Internet, a local area network (LAN), a wide area network (WAN), a wireless local area network (WLAN), or a wireless wide area network (WWAN) including proprietary and/or enterprise networks for a company or organization, or combinations thereof.

Here, the cloud 1244 includes one or more networks that comprise computers, network connections among the computers, and software routines to enable communication between the computers over network connections. In this regard, the cloud 1244 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud 1244 may be via a wired or a wireless connection using the various communication protocols discussed infra. More than one network may be involved in a communication session between the illustrated devices. Connection to the cloud 1244 may require that the computers execute software routines which enable, for example, the seven layers of the OSI model of computer networking or equivalent in a wireless (cellular) phone network. Cloud 1244 may be used to enable relatively long-range communication such as, for example, between the one or more server(s) 1250 and one or more UEs 1221 and IoT devices 1211. Additionally or alternatively, the cloud 1244 may represent the Internet, one or more cellular networks, local area networks, or wide area networks including proprietary and/or enterprise networks, TCP/Internet Protocol (IP)-based network, or combinations thereof. In these implementations, the cloud 1244 may be associated with network operator who owns or controls equipment and other elements necessary to provide network-related services, such as one or more base stations or access points, one or more servers for routing digital data or telephone calls (e.g., a core network or backbone network), etc. The backbone links 1255 may include any number of wired or wireless technologies, and may be part of a LAN, a WAN, or the Internet. In one example, the backbone links 1255 are fiber backbone links that couple lower levels of service providers to the Internet, such as the CN 1212 and cloud 1244.

Additionally or alternatively, the various access technologies may include cellular technology such as LTE, MuLTEfire, and/or NR/5G (e.g., as provided by Radio Access Network (RAN) nodes 1231-1232, WLAN (e.g., WiFi®) technologies (e.g., as provided by an access point (AP) 1233), and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.).

The edge compute nodes 1236 may include or be part of an edge system 1235 (or edge network 1235). The edge compute nodes 1236 may also be referred to as “edge hosts 1236” or “edge servers 1236.” The edge system 1235 includes a collection of edge servers 1236 (e.g., MEC hosts/servers 2402 of FIG. 24) and edge management systems (not shown by FIG. 12) necessary to run edge computing applications (e.g., MEC Apps 2426 of FIG. 24) within an operator network or a subset of an operator network. The edge servers 1236 are physical computer systems that may include an edge platform (e.g., MEC platform 2432 of FIG. 24) and/or virtualization infrastructure (e.g., VI 2422 of FIG. 24), and provide compute, storage, and network resources to edge computing applications. Each of the edge servers 1236 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to intermediate nodes 1220 and/or endpoints 1210. The VI of the edge servers 1236 provide virtualized environments and virtualized resources for the edge hosts, and the edge computing applications may run as VMs and/or application containers on top of the VI. One example implementation of the edge system 1235 is a MEC system 1235, which is discussed in more detail infra with respect to FIGS. 24-28. It should be understood that the disclosed MEC systems and services deployment examples are only one illustrative example of edge computing systems/networks 1235, and that the present disclosure may be applicable to many other edge computing/networking technologies in various combinations and layouts of devices located at the edge of a network including the various edge computing networks/systems described herein. Further, the techniques disclosed herein may relate to other IoT edge network systems and configurations, and other intermediate processing entities and architectures may also be applicable to the present disclosure.

As shown by FIG. 12, each of the NANs 1231, 1232, and 1233 are co-located with edge compute nodes (or “edge servers”) 1236*a*, 1236*b*, and 1236*c*, respectively. These implementations may be small-cell clouds (SCCs) where an edge compute node 1236 is co-located with a small cell (e.g., pico-cell, femto-cell, etc.), or may be mobile micro clouds (MCCs) where an edge compute node 1236 is co-located with a macro-cell (e.g., an eNB, gNB, etc.). The edge compute node 1236 may be deployed in a multitude of arrangements other than as shown by FIG. 12. In a first example, multiple NANs 1231-1233 are co-located or otherwise communicatively coupled with one edge compute node 1236. In a second example, the edge servers 1236 may be co-located or operated by RNCs, which may be the case for legacy network deployments, such as 3G networks. In a third example, the edge servers 1236 may be deployed at cell aggregation sites or at multi-RAT aggregation points that can be located either within an enterprise or used in public coverage areas. In a fourth example, the edge servers 1236 may be deployed at the edge of CN 1242. These implementations may be used in follow-me clouds (FMC), where cloud services running at distributed data centers follow the UEs 1221 as they roam throughout the network.

In any of the implementations discussed herein, the edge servers 1236 provide a distributed computing environment for application and service hosting, and also provide storage and processing resources so that data and/or content can be processed in close proximity to subscribers (e.g., users of UEs 1221, 1211) for faster response times The edge servers 1236 also support multitenancy run-time and hosting environment(s) for applications, including virtual appliance applications that may be delivered as packaged virtual machine (VM) images, middleware application and infrastructure services, content delivery services including content caching, mobile big data analytics, and computational offloading, among others. Computational offloading involves offloading computational tasks, workloads, applications, and/or services to the edge servers 1236 from the UEs 1211/1221, CN 1242, cloud 1244, and/or server(s) 1250, or vice versa. For example, a device application or client application operating in a UE 1221/1211 may offload application tasks or workloads to one or more edge servers 1236. In another example, an edge server 1236 may offload application tasks or workloads to one or more UE 1221/1211 (e.g., for distributed ML computation or the like).

Figure 13:
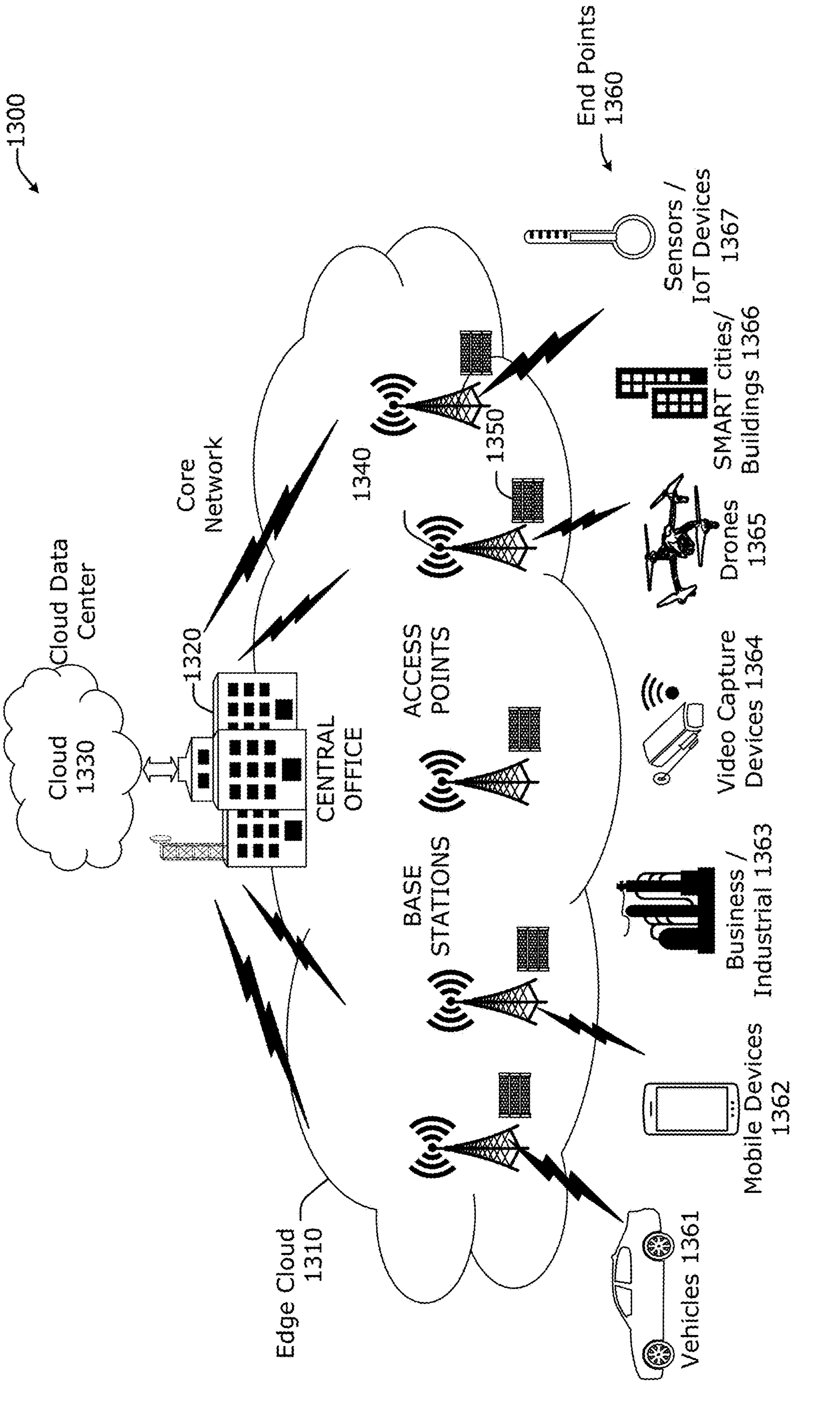
FIG. 13 illustrates an overview of an edge cloud configuration for edge computing.

FIG. 13 is a block diagram 1300 showing an overview of a configuration for edge computing, which includes a layer of processing referred to in many of the following examples as an "edge cloud". As shown, the edge cloud 1310 is co-located at an edge location, such as a network access node (NAN) 1340 (e.g., access point or base station), a local processing hub 1350, or a central office 1320, and thus may include multiple entities, devices, and equipment instances. The edge cloud 1310 is located much closer to the endpoint (consumer and producer) data sources 1360 (e.g., autonomous vehicles 1361, user equipment 1362, business and industrial equipment 1363, video capture devices 1364, drones 1365, smart cities and building devices 1366, sensors and IoT devices 1367, etc.) than the cloud data center 1330. Compute, memory, and storage resources which are offered at the edges in the edge cloud 1310 are critical to providing ultra-low latency response times for services and functions used by the endpoint data sources 1360 as well as reduce network backhaul traffic from the edge cloud 1310 toward cloud data center 1330 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of an appropriately arranged compute platform (e.g., x86, ARM, Nvidia or other CPU/GPU based compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Alternatively, an arrangement with hardware combined with virtualized functions, commonly referred to as a hybrid arrangement may also be successfully implemented. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 14:
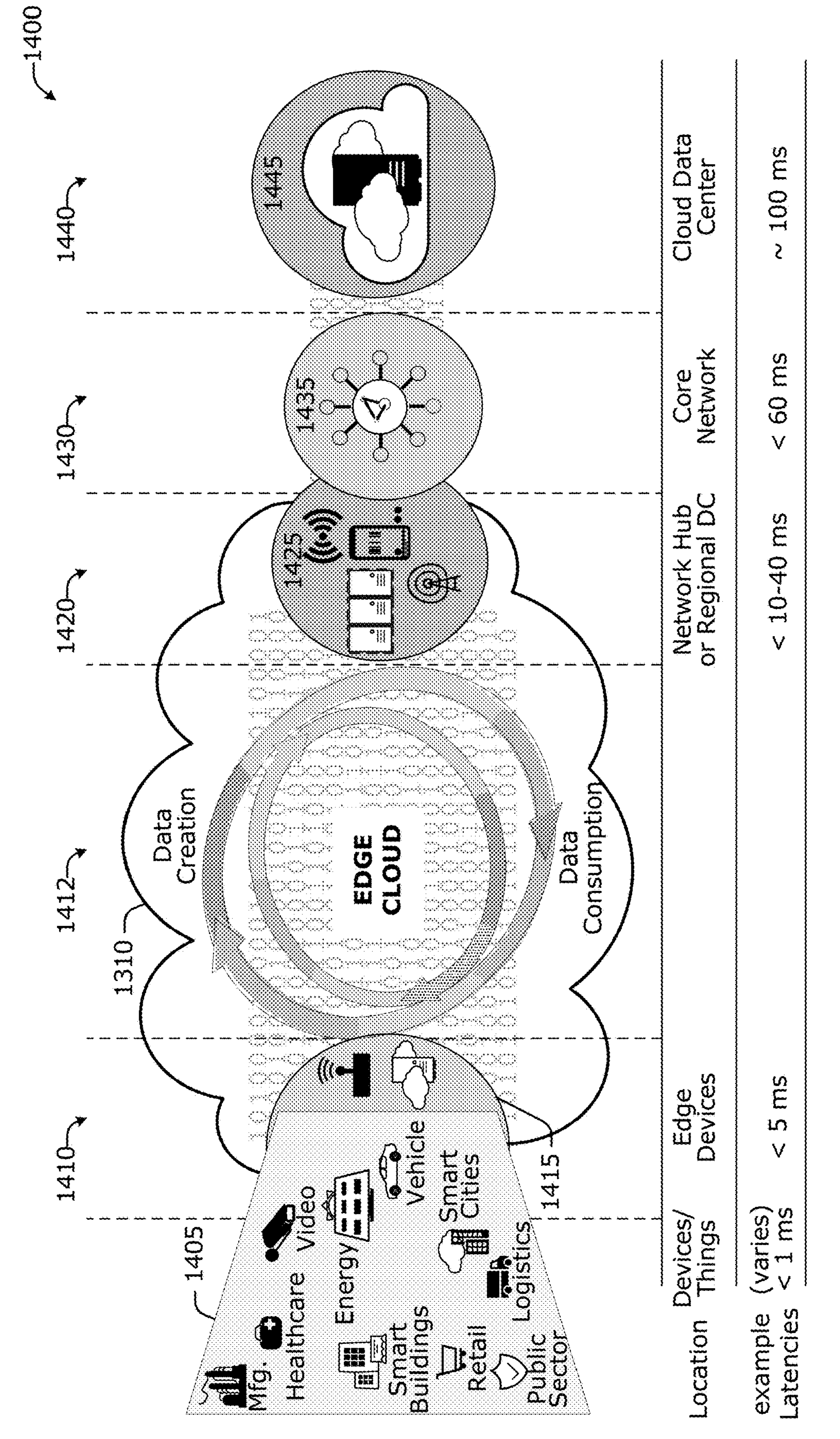
FIG. 14 illustrates operational layers among endpoints, an edge cloud, and cloud computing environments.

FIG. 14 illustrates operational layers among endpoints, an edge cloud, and cloud computing environments. Specifically, FIG. 14 depicts examples of computational use cases 1405, utilizing the edge cloud 1310 among multiple illustrative layers of network computing. The layers begin at an endpoint (devices and things) layer 1400, which accesses the edge cloud 1310 to conduct data creation, analysis, and data consumption activities. The edge cloud 1310 may span multiple network layers, such as an edge devices layer 1410 having gateways, on-premise servers, or network equipment (nodes 1415) located in physically proximate edge systems; a network access layer 1420, encompassing base stations, radio processing units, network hubs, regional data centers (DC), or local network equipment (equipment 1425); and any equipment, devices, or nodes located therebetween (in layer 1412, not illustrated in detail). The network communications within the edge cloud 1310 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 1400, under 5 ms at the edge devices layer 1410, to even between 10 to 40 ms when communicating with nodes at the network access layer 1420. Beyond the edge cloud 1310 are core network 1430 and cloud data center 1440 layers, each with increasing latency (e.g., between 50-60 ms at the core network layer 1430, to 100 or more ms at the cloud data center layer). As a result, operations at a core network data center 1435 or a cloud data center 1445, with latencies of at least 50 to 100 ms or more, will not be able to accomplish many time-critical functions of the use cases 1405. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 1435 or a cloud data center 1445, a central office or content data network may be considered as being located within a "near edge" layer ("near" to the cloud, having high latency values when communicating with the devices and endpoints of the use cases 1405), whereas an access point, base station, on-premise server, or network gateway may be considered as located within a "far edge" layer ("far" from the cloud, having low latency values when communicating with the devices and endpoints of the use cases 1405). It will be understood that other categorizations of a particular network layer as constituting a "close", "local", "near", "middle", or "far" edge may be based on latency, distance, number of network hops, or other measurable characteristics, as measured from a source in any of the network layers 1400-1440.

The various use cases 1405 may access resources under usage pressure from incoming streams, due to multiple services utilizing the edge cloud. To achieve results with low latency, the services executed within the edge cloud 1310 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 1310 may provide the ability to serve and respond to multiple applications of the use cases 1405 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 1310 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 1310 (network layers 1400-1440), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Here, a "producer" refers to an entity or element that provides a service to other entities or elements on the same edge node or on different edge nodes, and a "consumer" refers to an entity or element that can consumer end user traffic and/or user services from a producer on the same or different edge nodes. For example, a producer app may provide location services, mapping services, transcoding services, AI/ML services, and/or other like services. Additionally or alternatively, a consumer app may be a content delivery network (CDN) node, AR or VR apps, gaming apps, and/or some other type of app. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 1310.

As such, the edge cloud 1310 is formed from network components and functional features operated by and within edge gateway nodes, edge aggregation nodes, or other edge compute nodes among network layers 1410-1430. The edge cloud 1310 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 1310 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 1310 may be servers, multi-tenant servers, appliance computing devices, and/or any other type of computing devices. For example, the edge cloud 1310 may include an appliance computing device that is a self-contained electronic device including a housing, a chassis, a case or a shell. In some circumstances, the housing may be dimensioned for portability such that it can be carried by a human and/or shipped. Alternatively, it may be a smaller module suitable for installation in a vehicle for example. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Smaller, modular implementations may also include an extendible or embedded antenna arrangement for wireless communications. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 32. The edge cloud 1310 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 15:
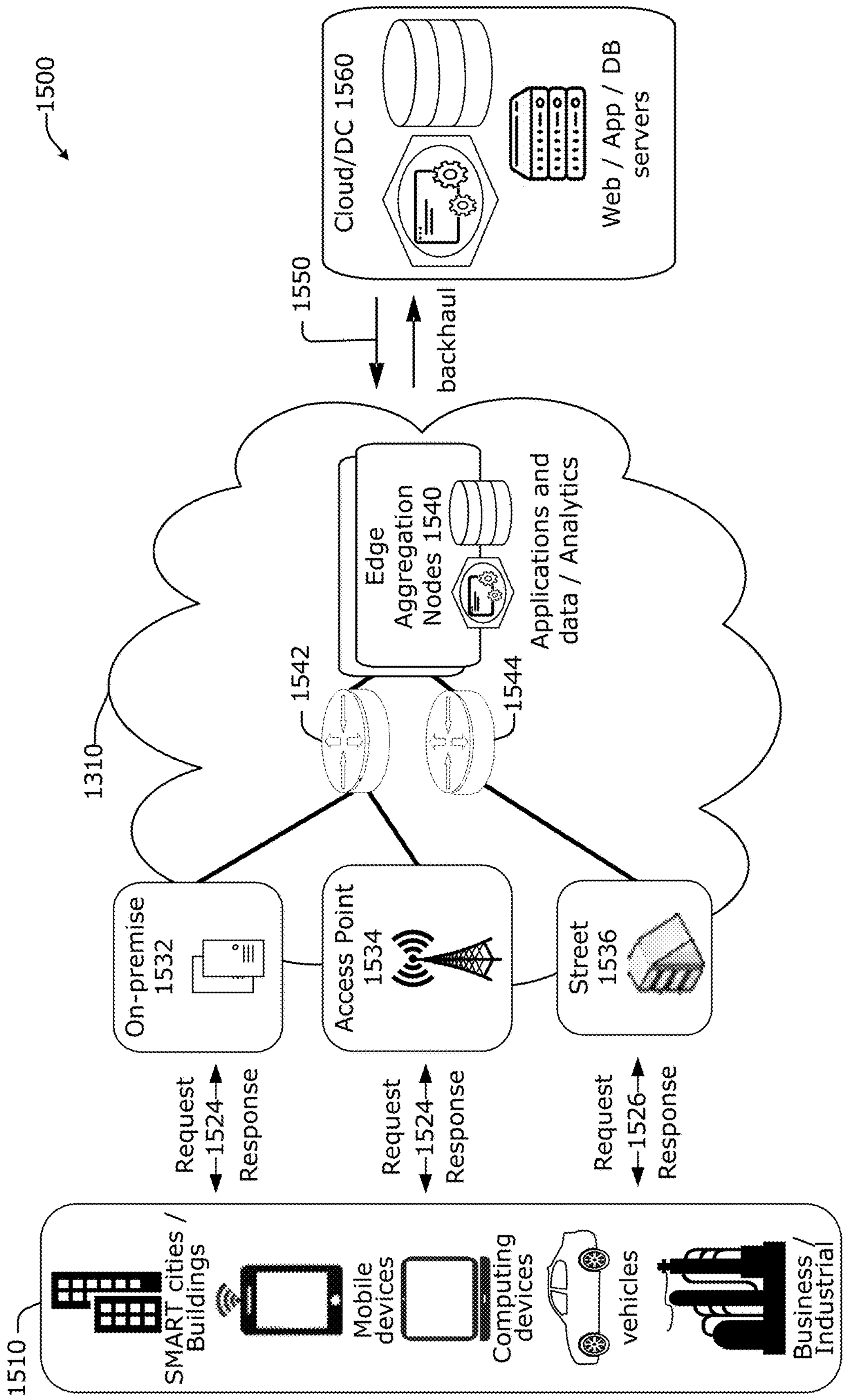
FIG. 15 illustrates an example approach for networking and services in an edge computing system.

In FIG. 15, various client endpoints 1510 (in the form of mobile devices, computers, autonomous vehicles, business computing equipment, industrial processing equipment) exchange requests and responses that are specific to the type of endpoint network aggregation. For instance, client endpoints 1510 may obtain network access via a wired broadband network, by exchanging requests and responses 1522 through an on-premise network system 1532. Some client endpoints 1510, such as mobile computing devices, may obtain network access via a wireless broadband network, by exchanging requests and responses 1524 through an access point (e.g., cellular network tower) 1534. Some client endpoints 1510, such as autonomous vehicles may obtain network access for requests and responses 1526 via a wireless vehicular network through a street-located network system 1536. However, regardless of the type of network access, the TSP may deploy aggregation points 1542, 1544 within the edge cloud 1310 to aggregate traffic and requests. Thus, within the edge cloud 1310, the TSP may deploy various compute and storage resources, such as at edge aggregation nodes 1540, to provide requested content. The edge aggregation nodes 1540 and other systems of the edge cloud 1310 are connected to a cloud or data center 1560, which uses a backhaul network 1550 to fulfill higher-latency requests from a cloud/data center for websites, applications, database servers, etc. Additional or consolidated instances of the edge aggregation nodes 1540 and the aggregation points 1542, 1544, including those deployed on a single server framework, may also be present within the edge cloud 1310 or other areas of the TSP infrastructure.

Figure 16:
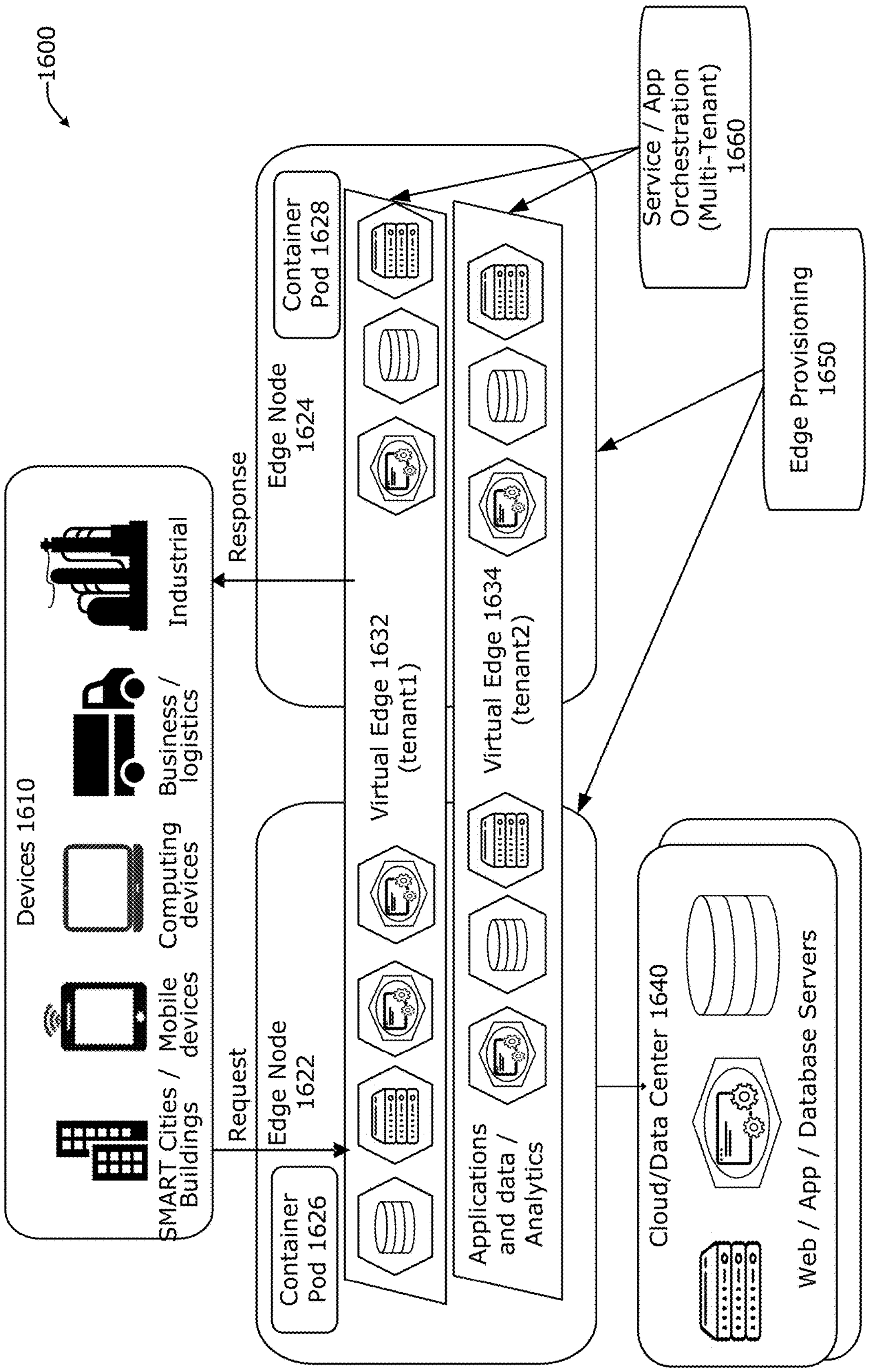
FIG. 16 illustrates deployment of a virtual edge configuration in an edge computing system operated among multiple edge nodes and multiple tenants.

FIG. 16 illustrates deployment and orchestration for virtualized and container-based edge configurations across an edge computing system operated among multiple edge nodes and multiple tenants (e.g., users, providers) which use such edge nodes. Specifically, FIG. 16 depicts coordination of a first edge node 1622 and a second edge node 1624 in an edge computing system 1600, to fulfill requests and responses for various client endpoints 1610 (e.g., smart cities/building systems, mobile devices, computing devices, business/logistics systems, industrial systems, etc.), which access various virtual edge instances. Here, the virtual edge instances 1632, 1634 provide edge compute capabilities and processing in an edge cloud, with access to a cloud/data center 1640 for higher-latency requests for websites, applications, database servers, etc. However, the edge cloud enables coordination of processing among multiple edge nodes for multiple tenants or entities.

In FIG. 16, these virtual edge instances include: a first virtual edge 1632, offered to a first tenant (Tenant 1), which offers a first combination of edge storage, computing, and services; and a second virtual edge 1634, offering a second combination of edge storage, computing, and services. The virtual edge instances 1632, 1634 are distributed among the edge nodes 1622, 1624, and may include scenarios in which a request and response are fulfilled from the same or different edge nodes. The configuration of the edge nodes 1622, 1624 to operate in a distributed yet coordinated fashion occurs based on edge provisioning functions 1650. The functionality of the edge nodes 1622, 1624 to provide coordinated operation for applications and services, among multiple tenants, occurs based on orchestration functions 1660.

Some of the devices 1610 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 1622, 1624 may operate as security feature enforcement points for local resources allocated to multiple tenants per node. Additionally, tenant runtime and application execution (e.g., in instances 1632, 1634) may serve as an enforcement point for a security feature that creates a virtual edge abstraction of resources spanning potentially multiple physical hosting platforms. Finally, the orchestration functions 1660 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes often use containers, FaaS engines, Servlets, servers, or other computation abstraction that may be partitioned according to a DICE layering and fan-out structure to support a RoT context for each. Accordingly, the respective RoTs spanning devices 1610, 1622, and 1640 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 16. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 1622, 1624 may implement the use of containers, such as with the use of a container "pod" 1626, 1628 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 1632, 1634 are partitioned according to the needs of each container.

With the use of container pods, a pod controller oversees the partitioning and allocation of containers and resources. The pod controller receives instructions from an orchestrator (e.g., orchestrator 1660) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 1660 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 17:
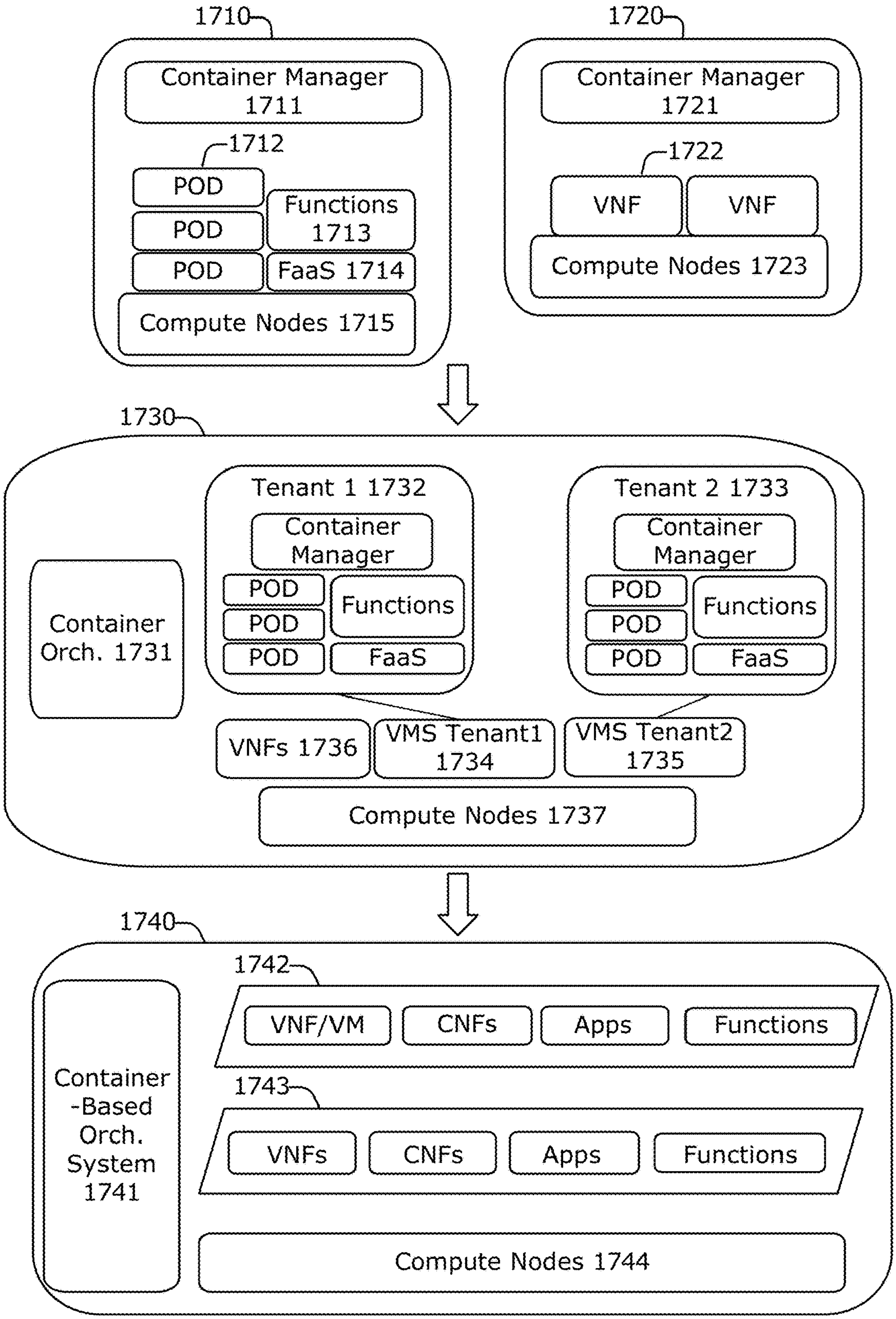
FIG. 17 illustrates various compute arrangements deploying containers in an edge computing system.

FIG. 17 illustrates additional compute arrangements deploying containers in an edge computing system. As a simplified example, system arrangements 1710, 1720 depict settings in which a pod controller (e.g., container managers 1711, 1721, and container orchestrator 1731) is adapted to launch containerized pods, functions, and functions-as-a-service instances through execution via compute nodes 1715 in arrangement 1710, or to separately execute containerized virtualized network functions through execution via compute nodes 1723 in arrangement 1720. This arrangement is adapted for use of multiple tenants in system arrangement 1730 (using compute nodes 1737), where containerized pods (e.g., pods 1712), functions (e.g., functions 1713, VNFs 1722, 1736), and functions-as-a-service instances (e.g., FaaS instance 1714) are launched within virtual machines (e.g., VMs 1734, 1735 for tenants 1732, 1733) specific to respective tenants (aside the execution of virtualized network functions). This arrangement is further adapted for use in system arrangement 1740, which provides containers 1742, 1743, or execution of the various functions, applications, and functions on compute nodes 1744, as coordinated by an container-based orchestration system 1741.

The system arrangements of depicted in FIG. 17 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 17, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon (SDSi) may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 18:
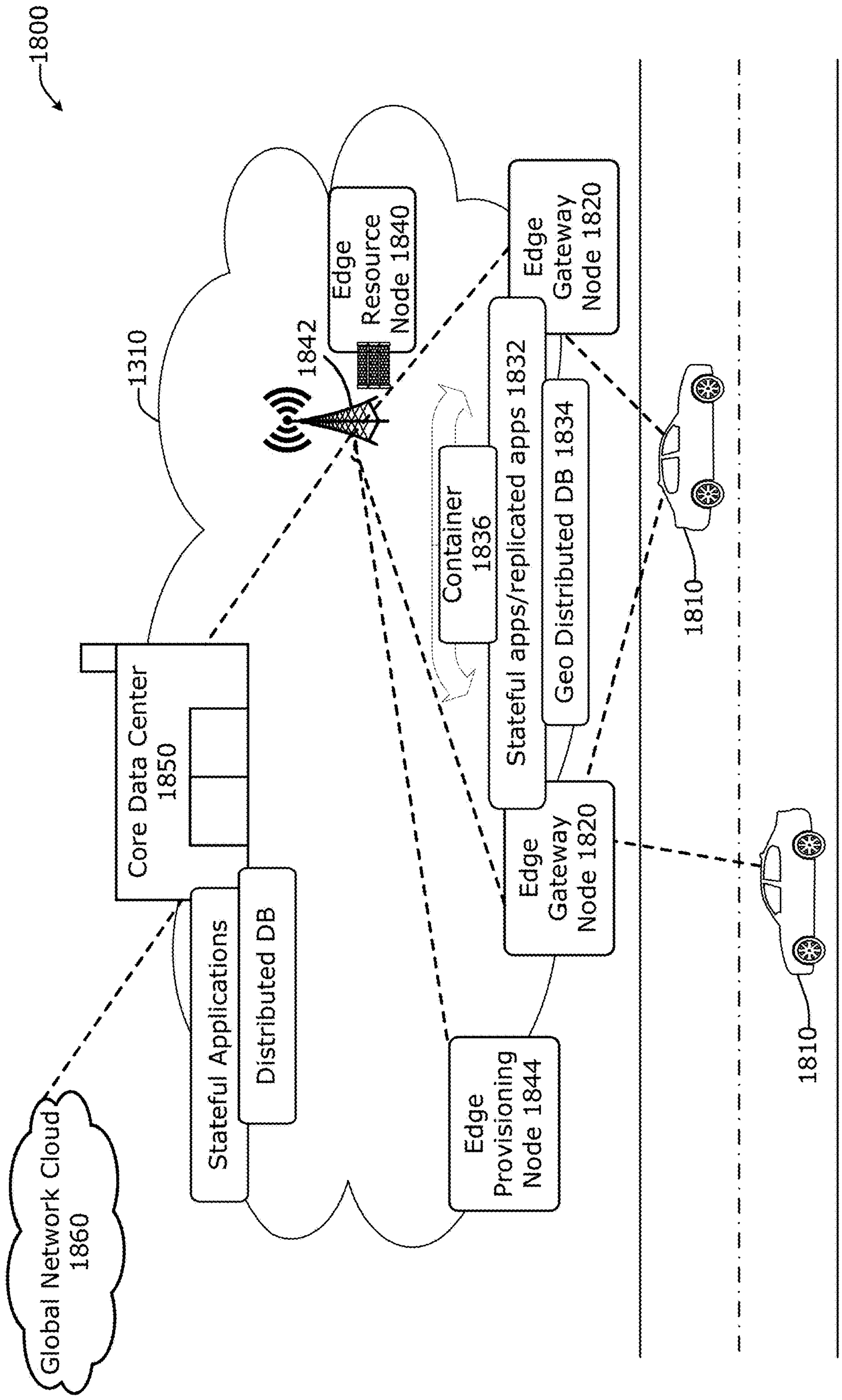
FIG. 18 illustrates a compute and communication use case involving mobile access to applications in an edge computing system.

FIG. 18 shows an example arrangement in which the edge computing systems and arrangements discussed herein may be applicable in various solutions, services, and/or use cases involving mobility. FIG. 18 shows vehicle compute and communication use case involving mobile access to applications in an edge computing system 1800 that implements an edge cloud 1310. In this use case, respective client compute nodes 1810 may be embodied as in-vehicle compute systems (e.g., in-vehicle navigation and/or infotainment systems) located in corresponding vehicles which communicate with the edge gateway nodes 1820 during traversal of a roadway. For instance, the edge gateway nodes 1820 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 1810 and a particular edge gateway device 1820 may propagate so as to maintain a consistent connection and context for the client compute node 1810. Likewise, mobile edge nodes may aggregate at the high priority services or according to the throughput or latency resolution requirements for the underlying service(s) (e.g., in the case of drones). The respective edge gateway devices 1820 include an amount of processing and storage capabilities and, as such, some processing and/or storage of data for the client compute nodes 1810 may be performed on one or more of the edge gateway devices 1820.

The edge gateway devices 1820 may communicate with one or more edge resource nodes 1840, which are illustratively embodied as compute servers, appliances or components located at or in a network access node (NAN) 1842 (e.g., a base station of a cellular network). As discussed above, the respective edge resource nodes 1840 include an amount of processing and storage capabilities and, as such, some processing and/or storage of data for the client compute nodes 1810 may be performed on the edge resource node 1840. For example, the processing of data that is less urgent or important may be performed by the edge resource node 1840, while the processing of data that is of a higher urgency or importance may be performed by the edge gateway devices 1820 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 1840 also communicate with the core data center 1850, which may include compute servers, appliances, and/or other components located in a central location (e.g., a central office of a cellular communication network). The core data center 1850 may provide a gateway to the global network cloud 1860 (e.g., the Internet) for the edge cloud 1310 operations formed by the edge resource node(s) 1840 and the edge gateway devices 1820. Additionally, in some examples, the core data center 1850 may include an amount of processing and storage capabilities and, as such, some processing and/or storage of data for the client compute devices may be performed on the core data center 1850 (e.g., processing of low urgency or importance, or high complexity).

The edge gateway nodes 1820 or the edge resource nodes 1840 may offer the use of stateful applications 1832 and a geographic distributed database 1834. Although the applications 1832 and database 1834 are illustrated as being horizontally distributed at a layer of the edge cloud 1310, it will be understood that resources, services, or other components of the application may be vertically distributed throughout the edge cloud (including, part of the application executed at the client compute node 1810, other parts at the edge gateway nodes 1820 or the edge resource nodes 1840, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 1836 (or pod of containers) may be flexibly migrated from an edge node 1820 to other edge nodes (e.g., 1820, 1840, etc.) such that the container with an application and workload does not need to be reconstituted, re-compiled, re-interpreted in order for migration to work. However, in such settings, there may be some remedial or "swizzling" translation operations applied. For example, the physical hardware at node 1840 may differ from edge gateway node 1820 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 18 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 1820, some others at the edge resource node 1840, and others in the core data center 1850 or global network cloud 1860.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 1800 can include or be in communication with an edge provisioning node 1844. The edge provisioning node 1844 can distribute software such as the example computer readable instructions 3282 of FIG. 32, to various receiving parties for implementing any of the methods described herein. The example edge provisioning node 1844 may be implemented by any computer server, home server, content delivery network, virtual server, software distribution system, central facility, storage device, storage disk, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 1844. For example, the entity that owns and/or operates the edge provisioning node 1844 may be a developer, a seller, and/or a licensor (or a customer and/or consumer thereof) of software instructions such as the example computer readable instructions 3282 of FIG. 32. The receiving parties may be consumers, service providers, users, retailers, OEMs, etc., who purchase and/or license the software instructions for use and/or re-sale and/or sub-licensing.

In an example, edge provisioning node 1844 includes one or more servers and one or more storage devices/disks. The storage devices and/or storage disks host computer readable instructions such as the example computer readable instructions 3282 of FIG. 32, as described below. Similarly to edge gateway devices 1820 described above, the one or more servers of the edge provisioning node 1844 are in communication with a NAN 1842 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third-party payment entity. The servers enable purchasers and/or licensors to download the computer readable instructions 3282 from the edge provisioning node 1844. For example, the software instructions, which may correspond to the example computer readable instructions 3282 of FIG. 32, may be downloaded to the example processor platform/s, which is to execute the computer readable instructions 3282 to implement the methods described herein.

In some examples, the processor platform(s) that execute the computer readable instructions 3282 can be physically located in different geographic locations, legal jurisdictions, etc. In some examples, one or more servers of the edge provisioning node 1844 periodically offer, transmit, and/or force updates to the software instructions (e.g., the example computer readable instructions 3282 of FIG. 32) to ensure improvements, patches, updates, etc. are distributed and applied to the software instructions implemented at the end user devices. In some examples, different components of the computer readable instructions 3282 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

2.1. 3GPP Edge Computing Aspects 5G networks extend beyond the traditional mobile broadband services to provide various new services such as IoT, industrial control, autonomous driving, mission critical communications, etc. that may have ultra-low latency, ultra-high reliability, and high data capacity requirements due to safety and performance concerns. The edge computing feature has been added in the 5GC system architecture in 3GPP TS 23.501 v16.7.0 (2020 Dec. 17) ("[TS23501]") to support such services by hosting some applications closer in the local data network in order to reduce the end-to-end latency and the load on the transport network.

Figure 19:
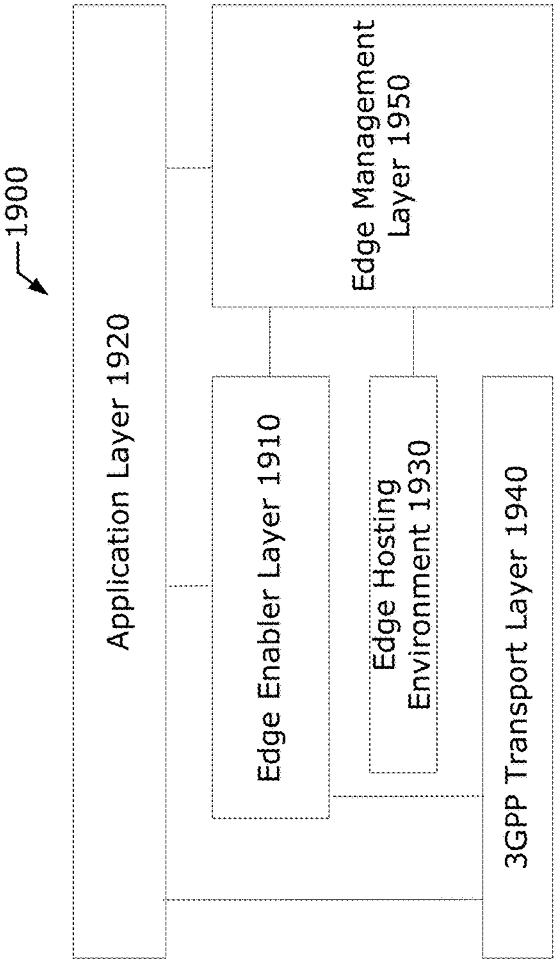
FIG. 19 depicts an overview of 3GPP edge computing.

FIG. 19 depicts an overview of 3GPP edge computing 1900 including the edge computing capabilities supported by 3GPP. For edge computing, the Application Clients (ACs) are able to locate and connect with a most suitable application server available in the Edge Data Network (EDN), depending on the needs of the application. The edge enabler layer 1910 exposes APIs to support the edge computing capabilities. The application layer 1920 is a consumer of 3GPP specified edge computing capabilities. The 3GPP edge computing capabilities may be organized as follows: edge enabler layer 1910 (see e.g., [TS23558]); edge hosting environment 1930; 3GPP transport layer 1940 (see e.g., 3GPP TS 23.401 v16.9.0 (2020 Dec. 17) and [TS23501]); and edge management layer 1950. The features of edge enabler layer 1910 include service provisioning, registration, EAS discovery, capability exposure to EAS, security, and dynamic EAS 2150 installation.

Service provisioning procedures supply the information required by a UE 111 to access the edge services. The procedure takes UE's 111 location, service requirements, service preferences and connectivity information into account to provide the required configuration. Service provisioning procedures are specified in clause 8.3 of [TS23558]. Registration procedures specified in clause 8.4 of [TS23558], allow entities (e.g., UE 111 and Application Server) in the edge enabler layer 1910 to provide information about itself to other entities of the edge enabler layer 1910. The EAS 2150 discovery procedures enable the UE 111 to obtain information about suitable EASs 2150 of interest (e.g., specified as discovery filters) in the EDN; EAS 2150 discovery procedures are specified in clause 8.5 of [TS23558].

Capability exposure to EAS 2150 involves the edge enabler layer 1910 exposing services towards the EASs 2150. The exposed capabilities include the services of the edge enabler layer 1910 and the re-exposed and enhanced services of the 3GPP core network 2920. The capabilities exposed by the edge enabler layer 1910 are specified in clause 8.6 of [TS23558] and the 3GPP network capability exposure is specified in clause 8.7 of [TS23558]. Other application layer 1920 capabilities like application enabler services and Service Enabler Architecture Layer (SEAL) services may be exposed via the edge enabler layer 1910 as per a Common API Framework (CAPIF) as discussed in Annex A.4 of [TS23558]. The CAPIF enables a unified Northbound API framework across 3GPP network functions, and ensures that there is a single and harmonized approach for their development (see e.g., 3GPP TS 23.222 v17.5.0 (2021 Jun. 24) ("[TS23222]"), TS 33.122 v16.3.0 (2020 Jul. 10) ("[TS33122]"), and 3GPP TS 29.222 v17.1.0 (2021 Jun. 25) ("[TS29222]", each of which are hereby incorporated by reference in their entireties).

When a UE 111 moves to a new location, different EASs 2150 can be more suitable for serving the UE 111. Such transitions can result from a non-mobility event also, requiring support from the edge enabler layer 1910 to maintain the continuity of the service. Support for service continuity provides several features for minimizing the application layer service interruption by replacing the S-EAS connected to the AC in the UE 111, with a T-EAS. Support for service continuity is further specified in clause 8.8 of [TS23558].

For security, the edge enabler layer 1910 supports secure communication amongst the enabler layer entities. Clause 8.11 of [TS23558] provides details on EEC 2115 authentication and authorization. For dynamic EAS 2150 installation, the edge enabler layer 1910 can interact with the EAS 2150 management system to trigger instantiation of a suitable EAS 2150 as per application needs; details of the EAS 2150 instantiation triggering are specified in clause 8.12 of [TS23558].

The deployment of edge computing in 3GPP networks may require cooperation with other SDOs, as AFs and AS are not 3GPP defined nodes. [MEC003], ETSI GS MEC 010-1 v1.1.1 (2017 October) ("[MEC010-1]"), and ETSI GS MEC 010-2 v2.1.1 (2019 November) ("[MEC010-2]") provide some information about non-3GPP edge computing management systems. The deployment of network functions in 3GPP networks and non-3GPP networks to support edge computing requires communication between 3GPP management system and non-3GPP management systems, such as ETSI GS NFV-MAN 001 v1.1.1 (2014 December) ("[NFVMAN]") and [MEC003].

Figure 20:
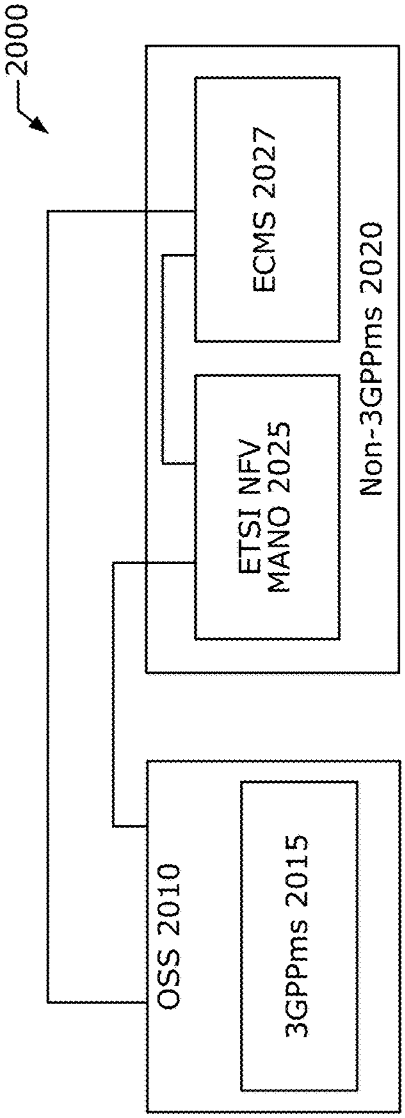
FIG. 20 shows an example peer-to-peer (P2P) edge computing management deployment scenario according to various embodiments.

FIG. 20 shows an example peer-to-peer (P2P) edge computing management deployment scenario 2000 where the deployment of edge computing in 3GPP networks includes communication among 3GPP management system (3GPPms) 2015 in an Operations Support System (OSS) 2010, non-3GPPms 2020, including an edge computing management system (ECMS) 2027 and ETSI NFV MANO 2025. The 3GPP management system 2015 can initiate the edge computing deployment by requesting the ECMS 2027 to deploy the local DN 2936, and NFVO to connect the UPF 2948 and local data network with the QoS for N6 requirements for the connection (e.g., virtual link) between UPF 2948 and local data network. The ECMS 2027 can initiate the edge computing deployment by requesting the 3GPP management system to deploy the UPF 2948, and NFVO to connect the UPF 2948 and local data network with the QoS requirements for the connection between UPF 2948 and local data network.

Figure 21:
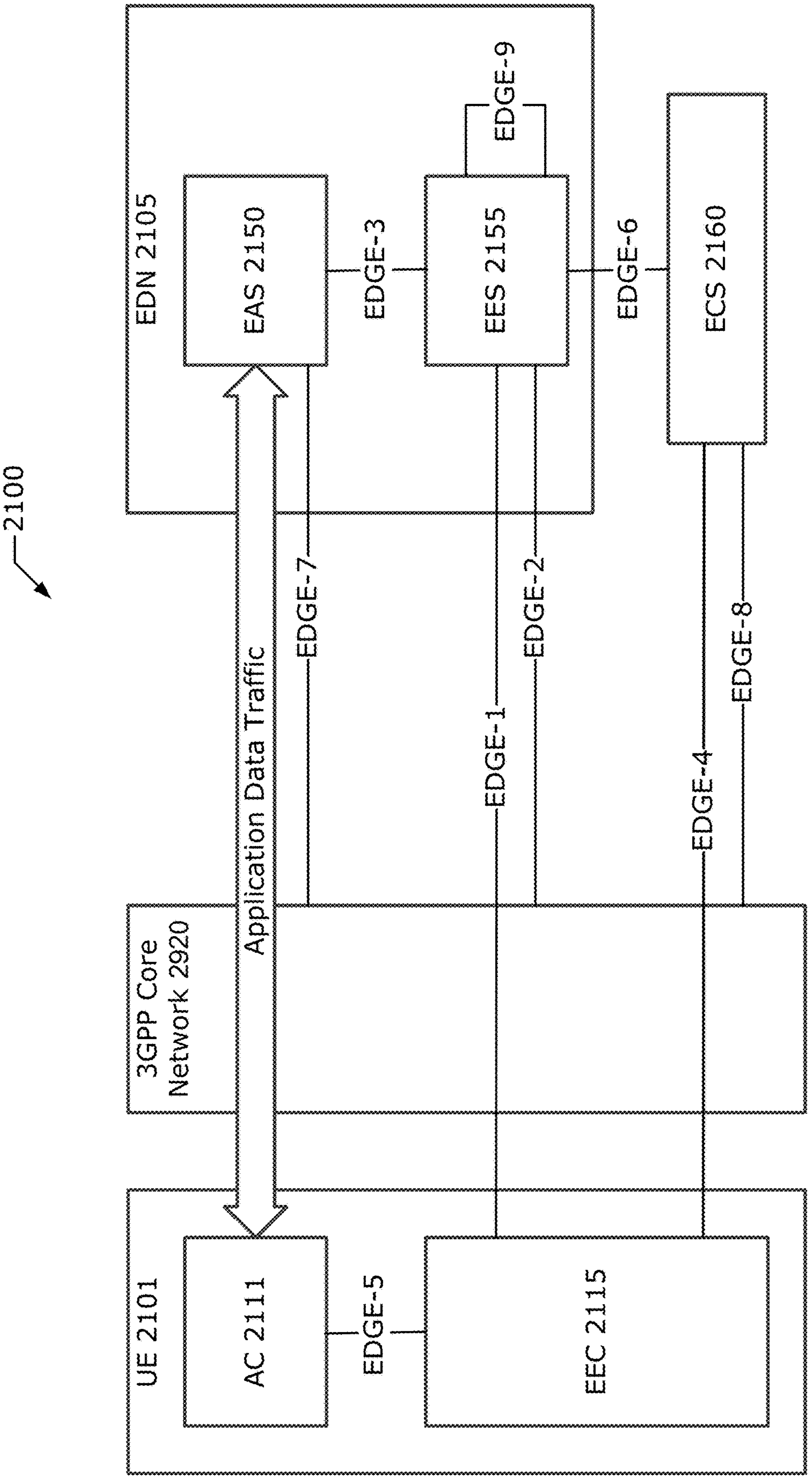
FIG. 21 shows an application architecture for enabling Edge Applications according to various embodiments.

FIG. 21 shows a reference point representation of an architecture 2100 for enabling Edge Applications. The Edge Data Network (EDN) 2105 is a local Data Network (e.g., DN 2936 of FIG. 29 infra). Edge Application Server(s) (EAS) 2150 and the Edge Enabler Server(s) (EES) 2155 are contained within the EDN. The Edge Configuration Server (ECS) 2160 provides configurations related to the EES 2155, including details of the Edge Data Network hosting the EES 2155. The UE 2101 contains Application Client(s) (AC(s)) 2111 and the Edge Enabler Client (EEC) 2115. The EAS(s) 2150, the EES(s) 2155, and the ECS 2160 may interact with the 3GPP CN 2920.

The interactions related to enabling Edge Computing, between the EES(s) 2155 and the EEC 2115 are supported by the EDGE-1 reference point. The EDGE-1 reference point supports registration and de-registration of the EEC 2115 to the EES 2155; retrieval and provisioning of configuration information for the UE 2101; and Discovery of EAS(s) 2150 available in the EDN 2105.

The interactions related to edge enabler layer 1910, between the EES 2155 and the 3GPP Network are supported by the EDGE-2 reference point. EDGE-2 reference point supports: Access to 3GPP Network functions and APIs for retrieval of network capability information, e.g., via SCEF and NEF APIs as defined in [TS23501], 3GPP TS 23.502 v16.7.0 (2020-12-17) ("[TS23502]"), 3GPP TS 29.522 v17.6.0 (2021 Jun. 25) ("[TS29522]"), 3GPP TS 29.122 v17.2.0 (2021 Jun. 25) ("[TS29122]"), and with the EES 2155 acting as a trusted AF in 5GC (see the clause 5.13 of [TS23501]). EDGE-2 reference point reuses SA2 defined 3GPP reference points, N33, or interfaces of EPS or 5GS considering different deployment models.

The interactions related to edge enabler layer 1910, between the EES 2155 and the EASs 2150 are supported by the EDGE-3 reference point. EDGE-3 reference point supports: Registration of EASs 2150 with availability information (e.g., time constraints, location constraints); De-registration of EASs 2150 from the EES 2155; and providing access to network capability information (e.g., location information). The following cardinality rules apply for EDGE-3 (between EAS 2150 and EES 2155): a) one EAS 2150 may communicate with only one EES 2155; and b) one EES 2155 may communicate with one or more EAS(s) 2150 concurrently.

The interactions related to edge enabler layer 1910, between the EDN 2105 Configuration Server and the EEC 2115 are supported by the EDGE-4 reference point. EDGE-4 reference point supports: Provisioning of EDN 2105 configuration information to the EEC 2115 in the UE 2101.

The interactions between AC(s) 2111 and the EEC 2115 in the UE 2101 are supported by the EDGE-5 reference point. EDGE-5 reference point supports: Obtaining information about EASs 2150 that Application Client require to connect; Notifications about events related to the connection between Application Clients and their corresponding EASs 2150, such as: when an Application Client needs to reconnect to a different Edge Application Server; Providing Application Client information (such as its profile) to be used for various tasks such as, identifying the appropriate Edge Application Server instance to connect to; and Provide the identity of the desired Edge Application Server to the EEC 2115 to enable it to use that identity as a filter when requesting information about EASs 2150.

The interactions related to edge enabler layer 1910, between the Edge Data Network Configuration Server and the EES 2155 are supported by the EDGE-6 reference point. EDGE-6 reference point supports: Registration of EES 2155 information to the Edge Enabler Network Configuration Server.

The interactions related to edge enabler layer 1910, between the EES 2155 and the 3GPP Network are supported by the EDGE-2 (or EDGE-7) reference point. EDGE-7 reference point supports: Access to 3GPP Network functions and APIs for retrieval of network capability information, e.g., via SCEF and NEF APIs as defined in [TS23501], [TS23502], [TS29522], [TS29122], and with the EAS 2150 acting as a trusted AF in 5GC (see e.g., clause 5.13 of [TS23501]). EDGE-7 reference point reuses SA2 defined 3GPP reference points, N6, or interfaces of EPS or 5GS considering different deployment models.

The interactions between the Edge Data Network Configuration Server and the 3GPP Network are supported by the EDGE-8 reference point. EDGE-8 reference point supports: Edge Data Network configurations provisioning to the 3GPP network utilizing network exposure services.

EDGE-9 reference point enables interactions between two EES(s) 2155. EDGE-9 reference point may be provided between EES 2155 within different EDN and within the same EDN.

The EES 2155 provides supporting functions needed for EASs 2150 and EEC 2115. Functionalities of EES 2155 are: a) provisioning of configuration information to EEC 2115, enabling exchange of application data traffic with the Edge Application Server; b) supporting the functionalities of API invoker 410 and API exposing function as specified in [TS23222]; c) interacting with 3GPP Core Network for accessing the capabilities of network functions either directly (e.g., via PCF) or indirectly (e.g., via SCEF/NEF/SCEF+NEF); and d) support the functionalities of application context transfer.

Figure 23:
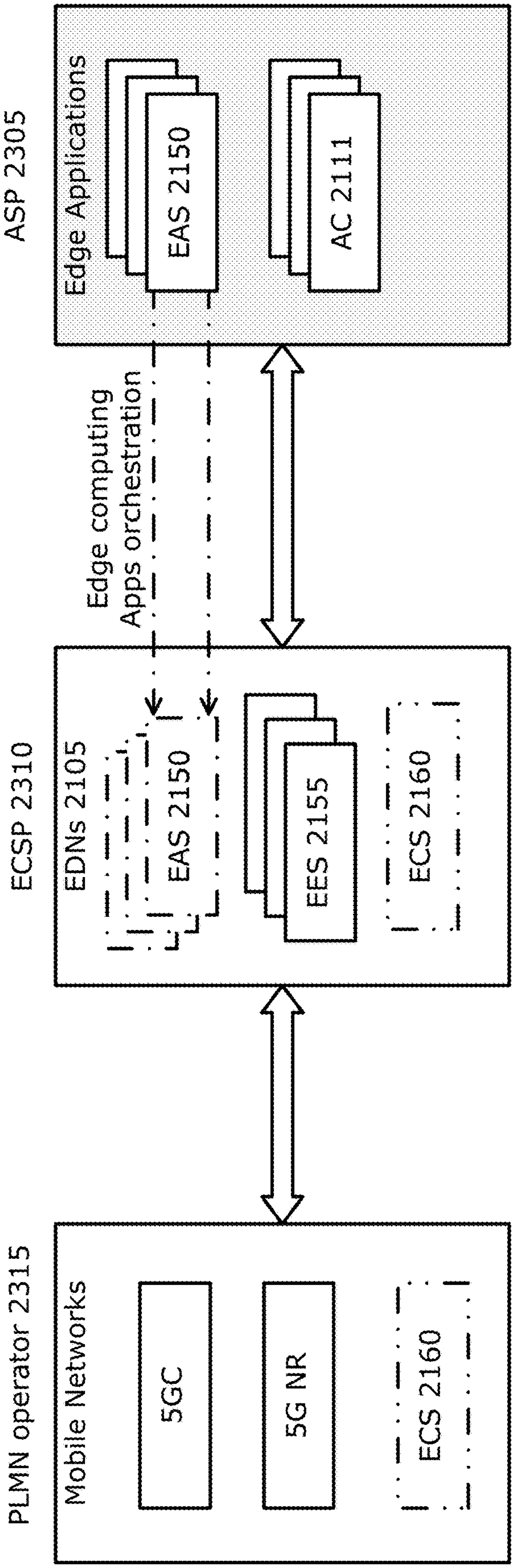
FIG. 23 shows the roles and relationship of service providers involved in the deployment of edge computing services.

The following cardinality rules apply for EES 2155: a) One or more EES(s) 2155 may be located in an EDN; b) One or more EES(s) 2155 may be located in an EDN 2105 per ECSP (see e.g., ECSP 2310 of FIG. 23).

The EAS 2150 is the application server resident in the EDN 2105, performing the server functions. The Application Client connects to the Edge Application Server in order to avail the services of the application with the benefits of Edge Computing. It is possible that the server functions of an application are available only as EAS 2150. However, if the server functions of the application are available as both, EAS 2150 and an Application Server resident in cloud, it is possible that the functions of the EAS 2150 and the Application Server are not the same. In addition, if the functions of the EAS 2150 and the Application Server are different, the Application Data Traffic may also be different.

The EAS 2150 may consume the 3GPP Core Network capabilities in different ways, such as: a) it may invoke 3GPP Core Network function APIs directly, if it is an entity trusted by the 3GPP Core Network; b) it may invoke 3GPP Core Network capabilities through the EES 2155; and c) it may invoke the 3GPP Core Network capability through the capability exposure functions (e.g., SCEF or NEF).

The following cardinality rules apply for EASs 2150: a) One or more EAS(s) may be located in an EDN. The EAS(s) belonging to the same EAS ID can be provided by multiple ECSP(s) 2310 in an EDN.

The EES 2155 ID (EESID) is the FQDN of that EES 2155 and each EES 2155 ID is unique within PLMN domain.

The EAS identity (EASID) identifies a particular application for e.g., SA6Video, SA6Game etc. For example, all Edge SA6 Video Servers will share the same EASID. Table 7 shows EAS 2150 Profile IEs.

TABLE 7

| Edge Application Server Profile | | |
|---|---|---|
| Information element | Status | Description |
| EAS ID | M | The identifier of the EAS 2150 |
| EAS Endpoint | M | Endpoint information (e.g., URI, FQDN, network address (e.g., IP address)) used to communicate with the EAS. This information maybe discovered by EEC 2115 and exposed to Application Clients so that application clients can establish contact with the EAS. |
| Application Client ID(s) | O | Identifies the Application Client(s) that can be served by the EAS 2150 |
| EAS Provider Identifier | O | The identifier of the EAS Provider |
| EAS Type | O | The category or type of EAS 2150 (e.g., V2X) |
| EAS description | O | Human-readable description of the EAS 2150 |
| EAS Schedule | O | The availability schedule of the EAS 2150 (e.g., time windows) |
| EAS Service Area | O | The geographical service area that the EAS 2150 serves |
| EAS Service KPIs | O | Service characteristics provided by EAS, detailed in Table 8.2.5-1 |
| Service continuity support | O | Indicates if the EAS 2150 supports service continuity or not. |
| EAS Availability Reporting Period | O | The availability reporting period (e.g., heart beat period) that indicates to the EES how often it needs to check the EAS's availability after a successful registration. |
| EAS Required Service APIs | O | A list of the Service APIs that are required by the EAS |
| EAS Status | O | The status of the EAS 2150 (e.g., enabled, disabled, etc.) |

Table 8 shows EAS 2150 Service KPIs, which provide information about service characteristics provided by the EAS 2150.

TABLE 8

| Edge Application Server Service KPIs | | |
|---|---|---|
| Information element | Status | Description |
| Maximum Request rate | O | Maximum request rate from the Application Client supported by the server. |
| Maximum Response time | O | The maximum response time advertised for the Application Client's service requests. |
| Availability | O | Advertised percentage of time the server is available for the Application Client's use. |
| Available Compute | O | The maximum compute resource available for the Application Client. |
| Available Graphical Compute | O | The maximum graphical compute resource available for the Application Client. |
| Available Memory | O | The maximum memory resource available for the Application Client. |
| Available Storage | O | The maximum storage resource available for the Application Client. |
| Connection Bandwidth | O | The connection bandwidth in Kbit/s advertised for the Application Client's use. |

NOTE:
The maximum response time includes the round-trip time of the request and response packet, the processing time at the server and the time required by the server to consume 3GPP Core Network capabilities, if any.

Table 9 shows EES 2155 profile IEs, which includes information about the EES 2155 and the services it provides.

TABLE 9

| Edge Enabler Server Profile | | |
|---|---|---|
| Information element | Status | Description |
| EES ID | M | The identifier of the EES 2155 |
| EES Endpoint | M | Endpoint information (e.g., URI, FQDN, IP address) used to communicate with the EES. This information is provided to the EEC 2115 to connect to the EES 2155. |
| Edge Application Server Profiles | M | List of EASs 2150 registered with the EES 2155. |
| EES Provider Identifier | O | The identifier of the EES Provider (such as ECSP) |

The network capability exposure to EAS(s) 2150 depends on the deployment scenarios and the business relationship of the ASP 2305 and/or ECSP 2310 with the PLMN operator 2315. The following mechanisms are supported: Direct network capability exposure and/or Network capability exposure via EES 2155.

In some implementations, the network capability exposure to EAS(s) depends on the deployment scenarios and the business relationship of the ASP 2305 and/or ECSP 2310 with the PLMN operator 2315. The following mechanisms are supported: Direct network capability exposure and/or Network capability exposure via EES 2155. In some implementations, the charging functionalities with different deployment options depending on business relationships among Edge ASP (see e.g., ASP 2305 of FIG. 23), ECSP (see e.g., ECSP 2310 of FIG. 23), and SFC service provider are out of scope of the present disclosure (SA5 study).

Figure 22A:
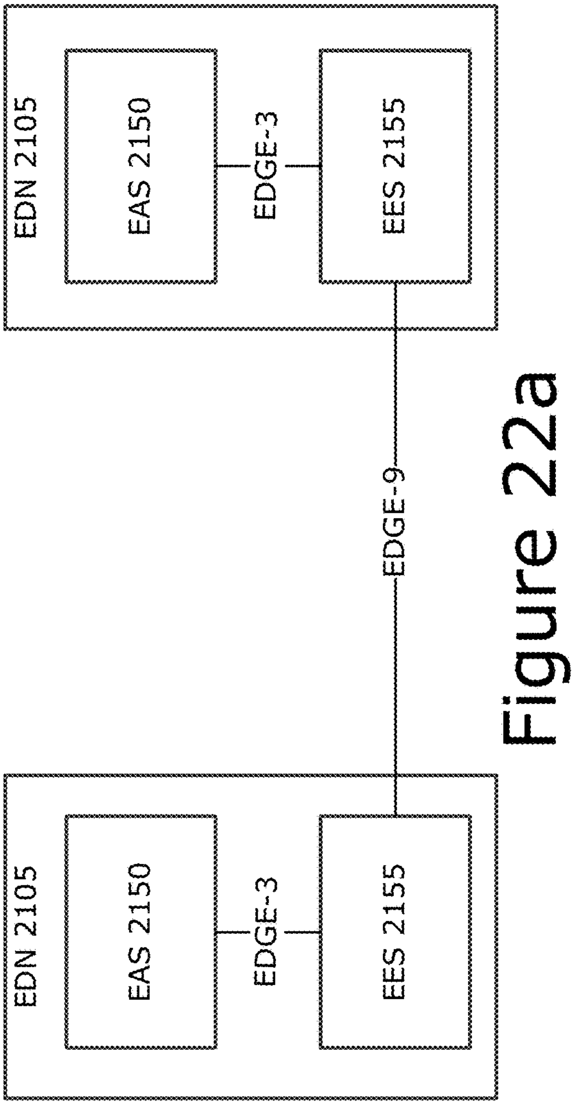
FIGS. 22*a* and 22*b* show aspects of an EDGE-9 reference point.
Figure 22B:
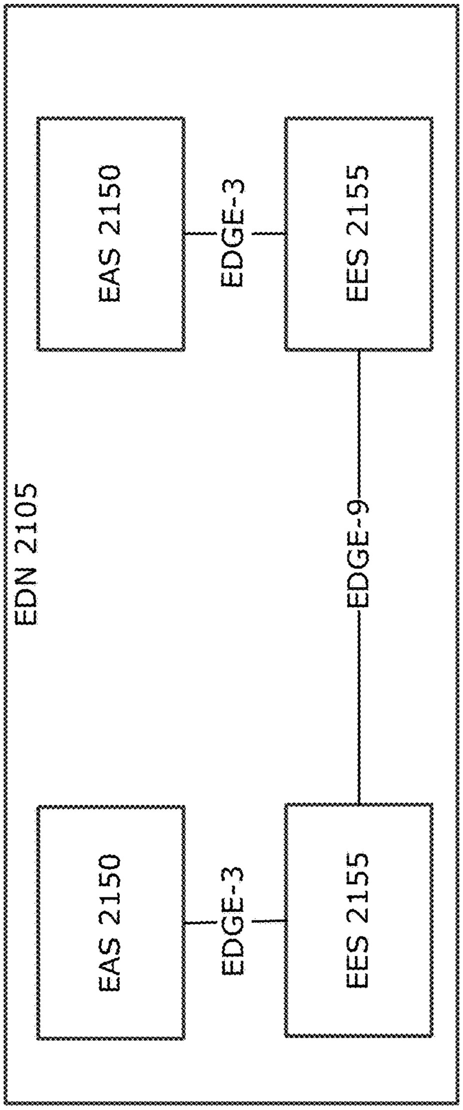

The EDGE-9 reference point enables interactions between two EES(s) 2155. The EDGE-9 reference point may be provided between EESs 2155 within different EDNs 2105 as shown by FIG. 22*a* and within the same EDN 2105 as shown by FIG. 22*b*.

FIG. 23 shows the roles and relationship of service providers involved in the deployment of edge computing services (see e.g., annex B in [TS23558]). The application service provider (ASP) 2305 is responsible for the creation of EAS(s) 2150 and ACs 2111. The ECSP 2310 is responsible for the deployment of EDNs 2105 that contain EAS 2150 and EES 2155 that provides the configuration information to EEC 2115, enabling AC to exchange application data traffic with the EAS. PLMN operator 2315 is responsible for the deployment of 5G network functions, such as 5GC and 5G NR.

The end user is the consumer of the applications/services provided by the ASP and can have ASP service agreement with a single or multiple application service providers. The end user has a PLMN subscription arrangement with the PLMN operator 2315. The UE used by the end user is allowed to be registered on the PLMN operator network 2315. The ASP consumes the edge services (e.g., infrastructure, platform, etc.) provided by the edge computing service provider (ECSP) 2310 and can have ECSP service agreement(s) with a single or multiple ECSPs 2310. The ECSP 2310 may be a mobile network operator or a 3rd party service provider offering Edge Computing services. A single PLMN operator 2315 can have the PLMN operator 2315 service agreement with a single or multiple ECSP 2310. A single ECSP 2310 can have PLMN operator 2315 service agreement with a single or multiple PLMN operators 2315 which provide edge computing support. The ECSP 2310 and the PLMN operator 2315 can be part of the same organization or different organizations.

The following discussion provides specific examples relevant to edge computing configurations provided within Multi-Access Edge Computing (MEC) and 5G network implementations. However, many other standards and network implementations are applicable to the edge and service management concepts discussed herein. For example, the embodiments discussed herein may be applicable to many other edge computing/networking technologies in various combinations and layouts of devices located at the edge of a network. Examples of such other edge computing/networking technologies that may implement the embodiments herein include Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used to practice the embodiments herein.

2.2. Multi-Access Edge Computing (Mec) Aspects

FIG. 24 illustrates a MEC system reference architecture (or MEC architecture) 2400 providing functionalities in accordance with ETSI GS MEC 003 v2.1.1 (2019 January) ("[MEC003]"); ETSI GS MEC 009 V2.1.1 (2019 January) ("[MEC009]"); ETSI GS MEC 011 V1.1.1 (2017 July) ("[MEC011]"); ETSI GS MEC 012 V2.1.1 (2019 December) ("[MEC012]"); ETSI GS MEC 013 v2.1.1 (2019 September) ("[MEC013]"); ETSI GS MEC 014 V1.1.1 (2018 February) ("[MEC014]"); ETSI GS MEC 015 v2.1.1 (2020 July) ("[MEC015]"); ETSI GS MEC 016 V2.2.1 (2020 April) ("[MEC016]"); ETSI GS MEC 021 V2.1.1 (2020 January) ("[MEC021]"); ETSI GS MEC 028 v2.1.1 (2020 July) ("[MEC028]"); ETSI GS MEC 029 v2.1.1 (2019 July) ("[MEC029]"); ETSI MEC GS 030 v2.1.1 (2020 April) ("[MEC030]"); among many other ETSI MEC standards. MEC offers application developers and content providers cloud-computing capabilities and an IT service environment at the Edge of the network. This environment is characterized by ultra-low latency and high bandwidth as well as real-time access to radio network information that can be leveraged by applications. MEC technology permits to flexible and rapid deployment of innovative applications and services towards mobile subscribers, enterprises and vertical segments. In particular, regarding the automotive sector, applications such as V2X (e.g., IEEE 802.11p based protocols such as DSRC/ITS-G5, or 3GPP C-V2X based protocols) need to exchange data, provide data to aggregation points and access to data in databases which provide an overview of the local situation derived from a multitude of sensors (by various cars, roadside units, etc.).

The MEC architecture 2400 includes MEC hosts 2402, a virtualization infrastructure manager (VIM) 2408, an MEC platform manager 2406, an MEC orchestrator 2410, an operations support system (OSS) 2412, a User Application Life Cycle Management Proxy (UALCMP) 2414, a UE app 2418 running on UE 2420, and CFS portal 2416. The MEC host 2402 can include a MEC platform 2432 with filtering rules control component 2440, a DNS handling component 2442, a service registry 2438, and MEC services 2436. The MEC services 2436 can include at least one scheduler, which can be used to select resources for instantiating MEC apps (or NFVs) 2426 upon virtualization infrastructure (VI) 2422. The MEC apps 2426 can be configured to provide services 2430, which can include processing network communications traffic of different types associated with one or more wireless connections (e.g., connections to one or more RANs or core network functions) and/or some other services such as those discussed herein. The other MEC host 2402 may have a same or similar configuration/implementation as the MEC host 2402, and the other MEC app 2426 instantiated within other MEC host 2402 can be similar to the MEC apps 2426 instantiated within MEC host 2402. The VI 2422 includes a data plane 2424 coupled to the MEC platform 2422 via an MP2 interface. Additional interfaces between various network entities of the MEC architecture 2400 are illustrated in FIG. 24.

The MEC system 2400 includes three groups of reference points, including "Mp" reference points regarding the MEC platform functionality; "Mm" reference points, which are management reference points; and "Mx" reference points, which connect MEC entities to external entities. The interfaces/reference points in the MEC system 2400 may include IP-based connections, and may be used to provide Representational State Transfer (REST or RESTful) services, and the messages conveyed using the reference points/interfaces may be in XML, HTML, JSON, or some other desired format, such as those discussed herein. A suitable Authentication, Authorization, and Accounting (AAA) protocol, such as the radius or diameter protocols, may also be used for communicating over the reference points/interfaces.

The logical connections between various entities of the MEC architecture 2400 may be access-agnostic and not dependent on a particular deployment. MEC enables implementation of MEC apps 2426 as software-only entities that run on top of a VI 2422, which is located in or close to the network Edge. A MEC app 2426 is an application that can be instantiated on a MEC host 2402 within the MEC system 2400 and can potentially provide or consume MEC services 2436.

The MEC entities depicted by FIG. 24 can be grouped into a MEC system level, MEC host level, and network level entities (not shown). The network level (not shown) includes various external network level entities, such as a 3GPP network, a local area network (e.g., a LAN, WLAN, PAN, DN, LADN, etc.), and external network(s). The MEC system level includes MEC system level management entities and UE 2420, and is discussed in more detail infra. The MEC host level includes one or more MEC hosts 2402, 2404 and MEC management entities, which provide functionality to run MEC Apps 2426 within an operator network or a subset of an operator network. The MEC management entities include various components that handle the management of the MEC-specific functionality of a particular MEC platform 2432, MEC host 2402, and the MEC Apps 2426 to be run.

The MEC platform manager 2406 is a MEC management entity including MEC platform element management component 2444, MEC app rules and requirements management component 2446, and MEC app lifecycle management component 2448. The various entities within the MEC architecture 2400 can perform functionalities as discussed in [MEC003]. The remote app 2450 is configured to communicate with the MEC host 2402 (e.g., with the MEC apps 2426) via the MEC orchestrator 2410 and the MEC platform manager 2406.

The MEC host 2402 is an entity that contains an MEC platform 2432 and VI 2422 which provides compute, storage, and network resources for the purpose of running MEC Apps 2426. The VI 2422 includes a data plane (DP) 2424 that executes traffic rules 2440 received by the MEC platform 2432, and routes the traffic among MEC Apps 2426, MEC services 2436, DNS server/proxy (see e.g., via DNS handling entity 2442), 3GPP network, local networks, and external networks. The MEC DP 2424 may be connected with the (R)AN nodes and the 3GPP core network, and/or may be connected with an access point via a wider network, such as the internet, an enterprise network, or the like.

The MEC platform 2432 is a collection of essential functionality required to run MEC Apps 2426 on a particular VI 2422 and enable them to provide and consume MEC services 2436, and that can provide itself a number of MEC services 937*a*. The MEC platform 2432 can also provide various services and/or functions, such as offering an environment where the MEC Apps 2426 can discover, advertise, consume and offer MEC services 2436 (discussed infra), including MEC services 2436 available via other platforms when supported. The MEC platform 2432 may be able to allow authorized MEC Apps 2426 to communicate with third party servers located in external networks. The MEC platform 2432 receives traffic rules from the MEC platform manager 2406, applications, or services, and instruct the data plane accordingly (see e.g., traffic rules control 2440). The MEC platform 2432 may send instructions to the DP 2424 within the VI 2422 via the Mp2 reference point. The Mp2 reference point between the MEC platform 2432 and the DP 2424 of the VI 2422 may be used to instruct the DP 2434 on how to route traffic among applications, networks, services, etc. The MEC platform 2432 may translate tokens representing UEs 2420, UE apps, individual sessions, and/or individual flows within a session in the traffic rules into specific network addresses (e.g., IP addresses or the like). The MEC platform 2432 also receives DNS records from the MEC platform manager 2406 and configures a DNS proxy/server accordingly. The MEC platform 2432 hosts MEC services 2436 including the multi-access Edge services discussed infra, and provide access to persistent storage and time of day information. Furthermore, the MEC platform 2432 may communicate with other MEC platforms 2432 of other MEC servers 2402 via the Mp3 reference point. Upon receipt of update, activation or deactivation of traffic rules from the MEC platform manager 2406, apps, or services, the MEC platform 2432 instructs the data plane 2424 accordingly. The MEC platform 2432 also receives DNS records from the MEC platform manager 2406 and uses them to configure a DNS proxy/server 2442. The traffic rules control 2440 allows the MEC platform 2432 to perform traffic routing including traffic rules update, activation, and deactivation. Additionally or alternatively, the traffic rules control 2440 allows the MEC platform 2432 to perform traffic steering, for example, by directing data packets over one or more access network connections in a multi-access environment comprising multiple access networks, each of which may have multiple access network connections and/or may implement different access technologies.

Additionally or alternatively, the MEC platform 2432 offers an environment where MEC apps 2426 can discover, advertise, consume and offer MEC services 2436. Upon receipt of update, activation or deactivation of traffic rules from the MEC platform manager 2406, applications 2426, or services 2436, the MEC platform 2432 instructs the data plane 2424 accordingly. The MEC platform 2432 also receives DNS records from the MEC platform manager 2406 and uses them to configure a DNS proxy/server (e.g., DNS handling 2442).

Additionally or alternatively, the MEC platform 2432 may be accompanied by API gateway functionality supports receipt of service API request from MEC apps 2426 via a stable service connection endpoint. The network address (e.g., IP address) change of MEC service instances will not lead to the update of the service connection endpoint information. The API gateway functionality also supports load balancing for multiple backend MEC service instances, throttling API requests for better throughput based on the configuration, and monitoring API requests. The API gateway functionality can be used for statistics and charging.

The VI 2422 represents the totality of all hardware and software components which build up the environment in which MEC Apps 2426 and/or MEC platform 2432 are deployed, managed and executed. The VI 2422 may span across several locations, and the network providing connectivity between these locations is regarded to be part of the VI 2422. The physical hardware resources of the VI 2422 includes computing, storage and network resources that provide processing, storage and connectivity to MEC Apps 2426 and/or MEC platform 2432 through a virtualization layer (e.g., a hypervisor, VM monitor (VMM), or the like). The virtualization layer may abstract and/or logically partition the physical hardware resources of the MEC server 2402 as a hardware abstraction layer. The virtualization layer may also enable the software that implements the MEC Apps 2426 and/or MEC platform 2432 to use the underlying VI 2422, and may provide virtualized resources to the MEC Apps 2426 and/or MEC platform 2432, so that the MEC Apps 2426 and/or MEC platform 2432 can be executed.

The MEC Apps 2426 are applications that can be instantiated on a MEC host/server 2402 within the MEC system 2400 and can potentially provide or consume MEC services 2436. The term "MEC service" refers to a service provided via a MEC platform 2432 either by the MEC platform 2432 itself or by a MEC App 2426. MEC Apps 2426 may run as VM on top of the VI 2422 provided by the MEC server 2402, and can interact with the MEC platform 2432 to consume and provide the MEC services 2436. The Mp1 reference point between the MEC platform 2432 and the MEC Apps 2426 is used for consuming and providing service specific functionality. Mp1 provides service registration 2438, service discovery, and communication support for various services, such as the MEC services 2436 provided by MEC host 2402. Mp1 may also provide application availability, session state relocation support procedures, traffic rules and DNS rules activation, access to persistent storage and time of day information, and/or the like. Additionally or alternatively, the MEC Apps 2426 may communicate with the MEC platform 2432 using the MEC APIs discussed in ETSI GS MEC 011 V2.1.1 (2019 November).

The MEC Apps 2426 are instantiated on the VI 2422 of the MEC server 2402 based on configuration or requests validated by the MEC management (e.g., MEC platform manager 2406). The MEC Apps 2426 can also interact with the MEC platform 2432 to perform certain support procedures related to the lifecycle of the MEC Apps2426, such as indicating availability, preparing relocation of user state, etc. The MEC Apps 2426 may have a certain number of rules and requirements associated to them, such as required resources, maximum latency, required or useful services, etc. These requirements may be validated by the MEC management, and can be assigned to default values if missing. MEC services 2436 are services provided and/or consumed either by the MEC platform 2432 and/or MEC Apps 2426. The service consumers (e.g., MEC Apps 2426 and/or MEC platform 2432) may communicate with particular MEC services 2430/2436 over individual APIs (including the various MEC API(s) 630 discussed herein). When provided by an application, a MEC service 2436 can be registered in a list of services in the service registries 2438 to the MEC platform 2432 over the Mp1 reference point. Additionally, a MEC App 2426 can subscribe to one or more services 2430/2436 for which it is authorized over the Mp1 reference point. Examples of MEC services 2430/2436 include MEC application support [MEC011], MEC service management [MEC011], RNIS (see e.g., [MEC012], location services [MEC013], UE identity services [MEC014], traffic management services (TMS) and BWMS [MEC015], device application interface [MEC016], WLAN access information (WAI) services [MEC028], fixed access information (FAI) services [MEC029], V2X information services (VIS) [MEC030], and/or other MEC services 2430/2436. Each of these MEC services 2430/2436 is made available using a corresponding MEC API 630.

The RNIS, when available, provides authorized MEC Apps 2426 with radio network related information, and expose appropriate up-to-date radio network information to the MEC Apps 2426. The RNI may include, inter alia, radio network conditions, measurement and statistics information related to the UP, information related to UEs 2420 served by the radio node(s) associated with the MEC host 2402 (e.g., UE context and radio access bearers), changes on information related to UEs 2420 served by the radio node(s) associated with the MEC host XE136, and/or the like. The RNI may be provided at the relevant granularity (e.g., per UE 2420, per cell, per period of time).

The service consumers (e.g., MEC Apps 2426, MEC platform 2432, etc.) may communicate with the RNIS over an RNI API to obtain contextual information from a corresponding RAN. RNI may be provided to the service consumers via a NAN (e.g., (R)AN node, RRH, AP, etc.). The RNI API may support both query and subscription (e.g., a pub/sub) based mechanisms that are used over a Representational State Transfer (RESTful) API or over a message broker of the MEC platform 2432 (not shown). A MEC App 2426 may query information on a message broker via a transport information query procedure, wherein the transport information may be pre-provisioned to the MEC App 2426 via a suitable configuration mechanism. The various messages communicated via the RNI API may be in XML, JSON, Protobuf, or some other suitable format.

The VIS provides supports various V2X applications including the journey-aware QoS predictions among many others. The RNI may be used by MEC Apps 2426 and MEC platform 2432 to optimize the existing services and to provide new types of services that are based on up to date information on radio conditions. As an example, a MEC App 2426 may use RNI to optimize current services such as video throughput guidance. In throughput guidance, a radio analytics MEC App 2426 may use MEC services to provide a backend video server with a near real-time indication on the throughput estimated to be available at the radio DL interface in a next time instant. The throughput guidance radio analytics application computes throughput guidance based on the required radio network information it obtains from a multi-access Edge service running on the MEC server 2402. RNI may be also used by the MEC platform 2432 to optimize the mobility procedures required to support service continuity, such as when a certain MEC App 2426 requests a single piece of information using a simple request-response model (e.g., using RESTful mechanisms) while other MEC Apps 2426 subscribe to multiple different notifications regarding information changes (e.g., using a pub/sub mechanism and/or message broker mechanisms).

The LS, when available, may provide authorized MEC Apps 2426 with location-related information, and expose such information to the MEC Apps 2426. With location related information, the MEC platform 2432 or one or more MEC Apps 2426 perform active device location tracking, location-based service recommendations, and/or other like services. The LS supports the location retrieval mechanism, e.g., the location is reported only once for each location information request. The LS supports a location subscribe mechanism, for example, the location is able to be reported multiple times for each location request, periodically or based on specific events, such as location change. The location information may include, inter alia, the location of specific UEs 2420 currently served by the radio node(s) associated with the MEC server 2402, information about the location of all UEs 2420 currently served by the radio node(s) associated with the MEC server XE136, information about the location of a certain category of UEs 2420 currently served by the radio node(s) associated with the MEC server XE136, a list of UEs 2420 in a particular location, information about the location of all radio nodes currently associated with the MEC host 2402, and/or the like. The location information may be in the form of a geolocation, a Global Navigation Satellite Service (GNSS) coordinate, a Cell identity (ID), and/or the like. The LS is accessible through the API defined in the Open Mobile Alliance (OMA) specification "RESTful Network API for Zonal Presence" OMA-TS-REST-NetAPI-ZonalPresence-V1-0-20160308-C. The Zonal Presence service utilizes the concept of "zone", where a zone lends itself to be used to group all radio nodes that are associated to a MEC host 2402, or a subset thereof, according to a desired deployment. In this regard, the OMA Zonal Presence API provides means for MEC Apps 2426 to retrieve information about a zone, the access points associated to the zones and the users that are connected to the access points. In addition, the OMA Zonal Presence API, allows authorized application to subscribe to a notification mechanism, reporting about user activities within a zone. A MEC server 2402 may access location information or zonal presence information of individual UEs 2420 using the OMA Zonal Presence API to identify the relative location or positions of the UEs 2420.

The TMS allows edge apps to get informed of various traffic management capabilities and multi-access network connection information, and allows Edge applications to provide requirements, e.g., delay, throughput, loss, for influencing traffic management operations. In some implementations, the TMS includes Multi-Access Traffic Steering (MTS), which seamlessly performs steering, splitting, and duplication of application data traffic across multiple access network connections. The BWMS provides for the allocation of bandwidth to certain traffic routed to and from MEC Apps 2426, and specify static/dynamic up/down bandwidth resources, including bandwidth size and bandwidth priority. MEC Apps 2426 may use the BWMS to update/receive bandwidth information to/from the MEC platform 2432. Different MEC Apps 2426 running in parallel on the same MEC server 2402 may be allocated specific static, dynamic up/down bandwidth resources, including bandwidth size and bandwidth priority. The BWMS includes a bandwidth management (BWM) API to allowed registered applications to statically and/or dynamically register for specific bandwidth allocations per session/application. The BWM API includes HTTP protocol bindings for BWM functionality using RESTful services or some other suitable API mechanism. The BWM service is for allocating/adjusting BW resources for MEC apps, and allows MEC apps to provide their BW requirements.

Different MEC Apps 2426 running in parallel on the same MEC host may require specific static/dynamic up/down bandwidth (BW) resources, including BW size and BW priority. In some cases different sessions running in parallel on the same app may each have specific BW requirements. In addition, sessions driven by Apps running from closer to end users (e.g., shorter RTT) may receive unfair advantage over session driven by apps running from distant locations (e.g., outside the RAN). To resolve potential resource conflicts between such competing applications, BWM and/or Multi-access Traffic Steering (MTS) services may be used. The MTS services may be provided as part of the BWMS or separately from the BWMS. The MTS service is for seamlessly steering/splitting/duplicating app data traffic across multiple access network connections. The MTS service allows apps/MEC apps to get informed of various MTS capabilities and MX network connection info. The MTS also allows MEC apps to provide requirements (e.g., delay, throughput, loss, etc.) for influencing traffic management operations. The specific session or app/MEC app may be identified using a set of filters and/or identifiers (IDs) within the resource request.

The purpose of the UE Identity feature is to allow UE specific traffic rules in the MEC system 2400. When the MEC system 2400 supports the UE Identity feature, the MEC platform 2432 provides the functionality (e.g., UE Identity API) for a MEC App 2426 to register a tag representing a UE 2420 or a list of tags representing respective UEs 2420. Each tag is mapped into a specific UE 2420 in the MNO's system, and the MEC platform 2432 is provided with the mapping information. The UE Identity tag registration triggers the MEC platform 2432 to activate the corresponding traffic rule(s) 2440 linked to the tag. The MEC platform 2432 also provides the functionality (e.g., UE Identity API) for a MEC App 2426 to invoke a de-registration procedure to disable or otherwise stop using the traffic rule for that user.

The WAIS is a service that provides WLAN access related information to service consumers within the MEC System 2400. The WAIS is available for authorized MEC Apps 2426 and is discovered over the Mp1 reference point. The granularity of the WLAN Access Information may be adjusted based on parameters such as information per station, per NAN/AP, or per multiple APs (Multi-AP). The WLAN Access Information may be used by the service consumers to optimize the existing services and to provide new types of services that are based on up-to-date information from WLAN APs, possibly combined with the information such as RNI or Fixed Access Network Information. The WAIS defines protocols, data models, and interfaces in the form of RESTful APIs. Information about the APs and client stations can be requested either by querying or by subscribing to notifications, each of which include attribute-based filtering and attribute selectors.

The FAIS is a service that provides Fixed Access Network Information (or FAI) to service consumers within the MEC System 2400. The FAIS is available for the authorized MEC Apps 2426 and is discovered over the Mp1 reference point. The FAI may be used by MEC Apps 2426 and the MEC platform 2432 to optimize the existing services and to provide new types of services that are based on up-to-date information from the fixed access (e.g., NANs), possibly combined with other information such as RNI or WLAN Information from other access technologies. Service consumers interact with the FAIS over the FAI API to obtain contextual information from the fixed access network. Both the MEC Apps 2426 and the MEC platform 2432 may consume the FAIS; and both the MEC platform 2432 and the MEC Apps 2426 may be the providers of the FAI. The FAI API supports both queries and subscriptions (pub/sub mechanism) that are used over the RESTful API or over alternative transports such as a message bus. Alternative transports may also be used.

The MEC management comprises MEC system level management and MEC host level management. The MEC management comprises the MEC platform manager 2406 and the VI manager (VIM) 2408, and handles the management of MEC-specific functionality of a particular MEC server 2402 and the applications running on it. In some implementations, some or all of the multi-access Edge management components may be implemented by one or more servers located in one or more data centers, and may use virtualization infrastructure that is connected with NFV infrastructure used to virtualize NFs, or using the same hardware as the NFV infrastructure.

The MEC platform manager 2406 is responsible for managing the life cycle of applications including informing the MEC orchestrator (MEC-O) 2410 of relevant application related events. The MEC platform manager 2406 may also provide MEC Platform Element management functions 2444 to the MEC platform 2432, manage MEC App rules and requirements 2446 including service authorizations, traffic rules, DNS configuration and resolving conflicts, and manage MEC App lifecycles mgmt 2448. The MEC platform manager 2406 may also receive virtualized resources, fault reports, and performance measurements from the VIM 2408 for further processing. The Mm5 reference point between the MEC platform manager 2406 and the MEC platform 2432 is used to perform platform configuration, configuration of the MEC Platform element mgmt 2444, MEC App rules and reqts 2446, MEC App lifecycles mgmt 2448, and management of application relocation.

The VIM 2408 may be an entity that allocates, manages and releases virtualized (compute, storage and networking) resources of the VI 2422, and prepares the VI 2422 to run a software image. To do so, the VIM 2408 may communicate with the VI 2422 over the Mm7 reference point between the VIM 2408 and the VI 2422. Preparing the VI 2422 may include configuring the VI 2422, and receiving/storing the software image. When supported, the VIM 2408 may provide rapid provisioning of applications, such as described in "Openstack++ for Cloudlet Deployments", available at http://reports-archive.adm.cs.cmu.edu/anon/2015/CMU-CS-15-123.pdf. The VIM 2408 may also collect and report performance and fault information about the virtualized resources, and perform application relocation when supported. For application relocation from/to external cloud environments, the VIM 2408 may interact with an external cloud manager to perform the application relocation, for example using the mechanism described in "Adaptive VM Handoff Across Cloudlets", and/or possibly through a proxy. Furthermore, the VIM 2408 may communicate with the MEC platform manager 2406 via the Mm6 reference point, which may be used to manage virtualized resources, for example, to realize the application lifecycle management. Moreover, the VIM 2408 may communicate with the MEC-O 2410 via the Mm4 reference point, which may be used to manage virtualized resources of the MEC server 2402, and to manage application images. Managing the virtualized resources may include tracking available resource capacity, etc.

The MEC system level management includes the MEC-O 2410, which has an overview of the complete MEC system 2400. The MEC-O 2410 may maintain an overall view of the MEC system 2400 based on deployed MEC hosts 2402, available resources, available MEC services 2436, and topology. The Mm3 reference point between the MEC-O 2410 and the MEC platform manager 2406 may be used for the management of the application lifecycle, application rules and requirements and keeping track of available MEC services 2436. The MEC-O 2410 may communicate with the UALCMP 2414 via the Mm9 reference point in order to manage MEC Apps 2426 requested by UE app 2418.

The MEC-O 2410 may also be responsible for on-boarding of application packages, including checking the integrity and authenticity of the packages, validating application rules and requirements and if necessary adjusting them to comply with operator policies, keeping a record of on-boarded packages, and preparing the VIM(s) 2408 to handle the applications. The MEC-O 2410 may select appropriate MEC host(s) 901 for application instantiation based on constraints, such as latency, available resources, and available services. The MEC-O 2410 may also trigger application instantiation and termination, as well as trigger application relocation as needed and when supported.

The Operations Support System (OSS) 2412 is the OSS of an operator that receives requests via the Customer Facing Service (CFS) portal 2416 over the Mx1 reference point and from UE apps 2418 for instantiation or termination of MEC Apps 2426. The OSS 2412 decides on the granting of these requests. The CFS portal 2416 (and the Mx1 interface) may be used by third-parties to request the MEC system 2400 to run apps 2418 in the MEC system 2400. Granted requests may be forwarded to the MEC-O 2410 for further processing. When supported, the OSS 2412 also receives requests from UE apps 2418 for relocating applications between external clouds and the MEC system 2400. The Mm2 reference point between the OSS 2412 and the MEC platform manager 2406 is used for the MEC platform manager 2406 configuration, fault and performance management. The Mm1 reference point between the MEC-O 2410 and the OSS 2412 is used for triggering the instantiation and the termination of MEC Apps 2426 in the MEC system 2400.

The UE app(s) 2418 (also referred to as "device applications" or the like) is one or more apps running in a device 2420 that has the capability to interact with the MEC system 2400 via the UALCMP 2414. The UE app(s) 2418 may be, include, or interact with one or more client applications, which in the context of MEC, is application software running on the device 2418 that utilizes functionality provided by one or more specific MEC Apps 2426. The UALCMP 2414 may authorize requests from UE apps 2418 in the UE 2420 and interacts with the OSS 2412 and the MEC-O 2410 for further processing of these requests. The term "lifecycle management," in the context of MEC, refers to a set of functions required to manage the instantiation, maintenance and termination of a MEC App 2426 instance. The UALCMP 2414 may interact with the OSS 2412 via the Mm8 reference point, and is used to handle UE 2418 requests for running applications in the MEC system 2400. A user app may be an MEC App 2426 that is instantiated in the MEC system 2400 in response to a request of a user via an application running in the UE 2420 (e.g., UE App 2418). The UALCMP 2414 allows UE apps 2418 to request on-boarding, instantiation, termination of user applications and when supported, relocation of user applications in and out of the MEC system 2400. It also allows informing the user apps about the state of the user apps. The UALCMP 2414 is only accessible from within the mobile network, and may only be available when supported by the MEC system 2400. A UE app 2418 may use the Mx2 reference point between the UALCMP 2414 and the UE app 2418 to request the MEC system 2400 to run an application in the MEC system 2400, or to move an application in or out of the MEC system 2400. The Mx2 reference point may only be accessible within the mobile network and may only be available when supported by the MEC system 2400.

In order to run an MEC App 2426 in the MEC system 2400, the MEC-O 2410 receives requests triggered by the OSS 2412, a third-party, or a UE app 2418. In response to receipt of such requests, the MEC-O 2410 selects a MEC server/host 2402 to host the MEC App 2426 for computational offloading, etc. These requests may include information about the application to be run, and possibly other information, such as the location where the application needs to be active, other application rules and requirements, as well as the location of the application image if it is not yet on-boarded in the MEC system 2400.

The MEC-O 2410 may select one or more MEC servers 2402 for computational intensive tasks. The selected one or more MEC servers XE136 may offload computational tasks of a UE app 2418 based on various operational parameters, such as network capabilities and conditions, computational capabilities and conditions, application requirements, and/or other like operational parameters. The application requirements may be rules and requirements associated to/with one or more MEC Apps 2426, such as deployment model of the application (e.g., whether it is one instance per user, one instance per host, one instance on each host, etc.); required virtualized resources (e.g., compute, storage, network resources, including specific hardware support); latency requirements (e.g., maximum latency, how strict the latency constraints are, latency fairness between users); requirements on location; multi-access Edge services that are required and/or useful for the MEC Apps 2426 to be able to run; multi-access Edge services that the MEC Apps 2426 can take advantage of, if available; connectivity or mobility support/requirements (e.g., application state relocation, application instance relocation); required multi-access Edge features, such as VM relocation support or UE identity; required network connectivity (e.g., connectivity to applications within the MEC system 2400, connectivity to local networks, or to the Internet); information on the operator's MEC system 2400 deployment or mobile network deployment (e.g., topology, cost); requirements on access to user traffic; requirements on persistent storage; traffic rules 2440; DNS rules 2442; etc.

The MEC-O 2410 considers the requirements and information listed above and information on the resources currently available in the MEC system 2400 to select one or several MEC servers 2402 to host MEC Apps 2426 and/or for computational offloading. After one or more MEC servers XE136 are selected, the MEC-O 2410 requests the selected MEC host(s) 2402 to instantiate the application(s) or application tasks. The actual algorithm used to select the MEC servers 2402 depends on the implementation, configuration, and/or operator deployment. The selection algorithm (s) may be based on the task offloading criteria/parameters, for example, by taking into account network, computational, and energy consumption requirements for performing application tasks, as well as network functionalities, processing, and offloading coding/encodings, or differentiating traffic between various RATs. Under certain circumstances (e.g., UE mobility events resulting in increased latency, load balancing decisions, etc.), and if supported, the MEC-O 2410 may decide to select one or more new MEC hosts 2402 to act as a primary/source node, and initiates the transfer of an application instance or application-related state information from the one or more source MEC hosts 2402 to the one or more target MEC hosts 2402.

In a first implementation, a UPF 2948 of the 5GS is mapped into the MEC architecture 2400 as the MEC data plane 2424. In this implementation, the UPF 2948 handles the UP path of PDU sessions. Additionally, the UPF 2948 provides the interface to a data network and supports the functionality of a PDU session anchor.

In a second implementation, an application function (AF) of the 5GS is mapped into the MEC architecture 2400 as the MEC platform 2432. In these implementations, the AF is configurable or operable to perform application influence on traffic routing, access network capability exposure, and interact with the policy framework for policy control. The second implementation may be combined with the first implementation, or may be a standalone implementation. In the first and/or second implementations, since user traffic is routed to the local DN, MEC apps 2426, 2427, and/or 2428 can be mapped in or to the DN of the 5GS.

In a third implementation, the RAN of 5GS can be a virtual RAN based on a VNF, and the UPF 2948 is configurable or operable to function as the MEC data plane 2424 within an NF virtualization infrastructure (NFVI) (e.g., VI 2422). In these implementations, the AF can be configured as MEC platform VNF with MEC APIs, MEC app enablement functionality, and API principles functionality. Additionally, the local DN an include MEC apps 2426, 2427, and/or 2428 instantiated as VNFs. This implementation can be configured to provide functionalities in accordance with [MEC003] and/or ETSI GR MEC 017 V1.1.1 (2018 February) ("[MEC017]"). The third implementation may be combined with the first implementation and/or the second implementation, or may be a standalone implementation.

Additionally or alternatively, the access level Edge (e.g., the various NANs and/or (R)ANs discussed herein) can use one or more APIs to communicate with local/regional level Edge networks. The local/regional level Edge networks can include network nodes using corresponding applications to communicate with a national level Edge network. The national level Edge can include various NANs that use applications for accessing one or more remote clouds within the global level Edge. The NANs are also configurable or operable for vertical segment management and SLA compliance. Additionally or alternatively, MEC deployment can be based on the definition of "Edge" to provide degrees of freedom to MNOs, especially when deploying MEC in an NFV environment (e.g., MEC entities can be instantiated as Virtualized NFs (VNFs), thus with high flexibility in terms of deployment for the operator).

Additionally or alternatively, MEC system 2400 can be flexibly deployed depending on the use case/vertical segment/information to be processed. Some components of the MEC system 2400 can be co-located with other elements of the system. As an example, in certain use cases (e.g., enterprise), a MEC app 2426 may need to consume a MEC service locally, and it may be efficient to deploy a MEC host locally equipped with the needed set of APIs. In another example, deploying a MEC server 2402 in a data center (which can be away from the access network) may not need to host some APIs like the RNI API (which can be used for gathering radio network information from the radio base station). On the other hand, RNI information can be elaborated and made available in the cloud RAN (CRAN) environments at the aggregation point, thus enabling the execution of suitable radio-aware traffic management algorithms. Additionally or alternatively, a bandwidth management API may be present both at the access level Edge and also in more remote Edge locations, in order to set up transport networks (e.g., for CDN-based services).

Figure 25:
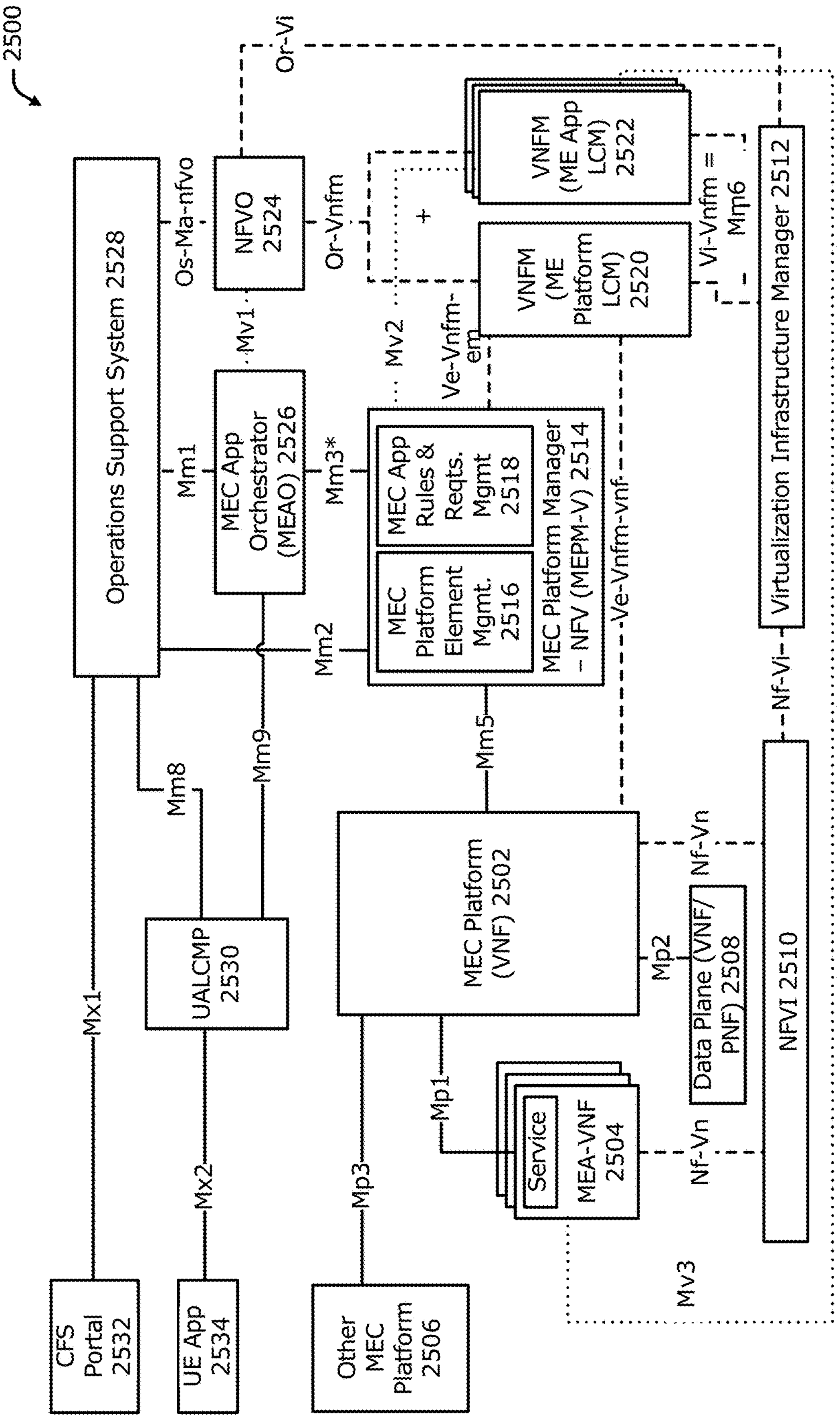
FIG. 25 illustrates a MEC reference architecture variant for deployment in a Network Function Virtualization (NFV) environment.

FIG. 25 illustrates a MEC reference architecture 2500 in a NFV environment. The MEC architecture 2500 includes a MEC platform 2502, a MEC platform manager-NFV (MEPM-V) 2514, a data plane 2508, a NFV infrastructure (NFVI) 2510, VNF managers (VNFMs) 2520 and 2522, NFV orchestrator (NFVO) 2524, a MEC app orchestrator (MEAO) 2526, an OSS 2528, a user app LCM proxy 2530, a UE app 2534, and a CFS portal 2532. The MEC platform manager 2514 can include a MEC platform element management 2516 and MEC app rules and requirements management 2518. The MEC platform 2502 can be coupled to another MEC platform 2506 via an MP3 interface.

In this embodiments, the MEC platform 2502 is deployed as a VNF. The MEC applications 2504 can appear like VNFs towards the ETSI NFV Management and Orchestration (MANO) components. This allows re-use of ETSI NFV MANO functionality. The full set of MANO functionality may be unused and certain additional functionality may be needed. Such a specific MEC app is denoted by the name "MEC app VNF" or "MEA-VNF". The virtualization infrastructure is deployed as an NFVI 2510 and its virtualized resources are managed by the virtualized infrastructure manager (VIM) 2512. For that purpose, one or more of the procedures defined by ETSI NFV Infrastructure specifications can be used (see e.g., ETSI GS NFV-INF 003 V2.4.1 (2018 February), ETSI GS NFV-INF 004 V2.4.1 (2018 February), ETSI GS NFV-INF 005 V3.2.1 (2019 April), and ETSI GS NFV-IFA 009 V1.1.1 (2016 July) (collectively "[ETSINFV]")). The MEA-VNF 2504 are managed like individual VNFs, allowing that a MEC-in-NFV deployment can delegate certain orchestration and LCM tasks to the NFVO 2524 and VNFMs 2520 and 2522, as defined by ETSI NFV MANO.

When a MEC platform is implemented as a VNF (e.g., MEC platform VNF 2502), the MEPM-V 2514 may be configured to function as an Element Manager (EM). The MEAO 2526 uses the NFVO 2524 for resource orchestration, and for orchestration of the set of MEA-VNFs 2504 as one or more NFV Network Services (NSs). The MEPM-V 2514 delegates the LCM part to one or more VNFMs 2520 and 2522. A specific or generic VNFM 2520, 2522 is/are used to perform LCM. The MEPM-V 2514 and the VNFM (ME platform LCM) 2520 can be deployed as a single package as per the ensemble concept in 3GPP TR 32.842 v13.1.0 (2015 Dec. 21) ("[TR32842]"), or that the VNFM is a Generic VNFM as per [ETSINFV] and the MEC Platform VNF 2502 and the MEPM-V 2514 are provided by a single vendor.

The Mp1 reference point between a MEC app 2504 and the MEC platform 2514 can be optional for the MEC app 2504, unless it is an application that provides and/or consumes a MEC service. The Mm3* reference point between MEAO 2526 and the MEPM-V 2514 is based on the Mm3 reference point (see e.g., [MEC003]). Changes may be configured to this reference point to cater for the split between MEPM-V 2514 and VNFM (ME applications LCM) 2522. The following new reference points (Mv1, Mv2, and Mv3) are introduced between elements of the ETSI MEC architecture and the ETSI NFV architecture to support the management of ME app VNFs 2504.

The following reference points are related to existing NFV reference points, but only a subset of the functionality may be used for ETSI MEC, and extensions may be necessary. Mv1 is a reference point connecting the MEAO 2526 and the NFVO 2524, and is related to the Os-Ma-nfvo reference point as defined in ETSI NFV). Mv2 is a reference point connecting the VNFM 2522 that performs the LCM of the MEC app VNFs 2504 with the MEPM-V 2514 to allow LCM related notifications to be exchanged between these entities. Mv2 is related to the Ve-Vnfm-em reference point as defined in ETSI NFV, but may possibly include additions, and might not use all functionality offered by the Ve-Vnfm-em. Mv3 is a reference point connecting the VNFM 2522 with the ME app VNF 2504 instance to allow the exchange of messages (e.g., related to MEC app LCM or initial deployment-specific configuration). Mv3 is related to the Ve-Vnfm-vnf reference point, as defined in ETSI NFV, but may include additions, and might not use all functionality offered by Ve-Vnfm-vnf.

The following reference points are used as they are defined by ETSI NFV: Nf-Vn reference point connects each ME app VNF 2504 with the NFVI 2510. The Nf-Vi reference point connects the NFVI 2510 and the VIM 2512. The Os-Ma-nfvo reference point connects the OSS 2528 and the NFVO 2524 and is primarily used to manage NSs (e.g., a number of VNFs connected and orchestrated to deliver a service). The Or-Vnfm reference point connects the NFVO 2524 and the VNFM (MEC Platform LCM) 2520 and is primarily used for the NFVO 2524 to invoke VNF LCM operations. Vi-Vnfm reference point connects the VIM 2512 and the VNFM (MEC Platform LCM) 2520 and is primarily used by the VNFM 2520 to invoke resource management operations to manage cloud resources that are needed by the VNF (it is assumed in an NFV-based MEC deployment that this reference point corresponds 1:1 to Mm6). The Or-Vi reference point connects the NFVO 2524 and the VIM 2512 and is primarily used by the NFVO 2524 to manage cloud resources capacity. The Ve-Vnfm-em reference point connects the VNFM (MEC Platform LCM) 2520 with the MEPM-V 2514. The Ve-Vnfm-vnf reference point connects the VNFM (MEC Platform LCM) 2520 with the MEC Platform VNF 2502.

Figure 26:
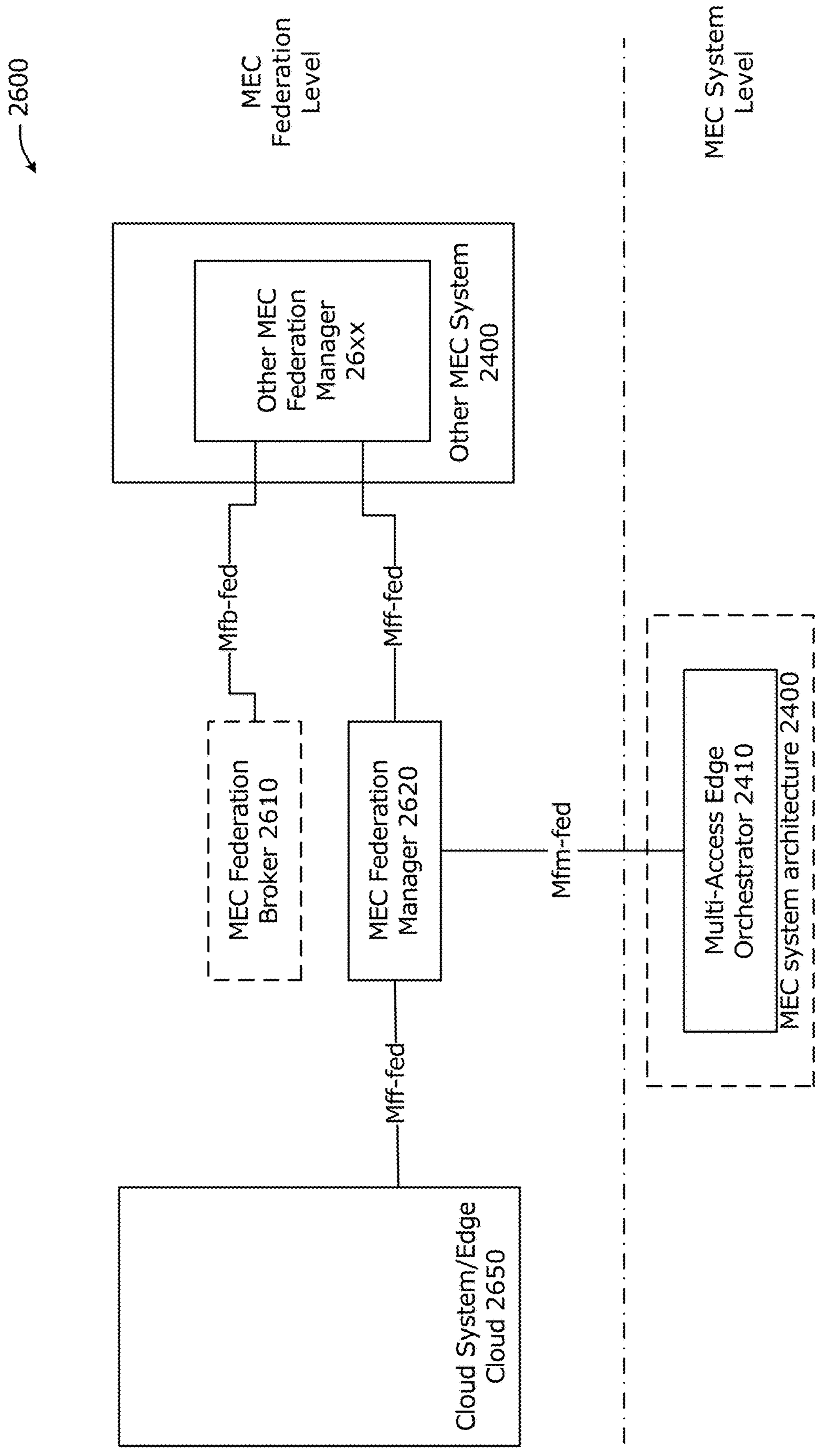
FIG. 26 illustrates a MEC reference architecture variant for MEC federation.

FIG. 26 depicts a variant of the multi-access edge system reference architecture for the deployment in a MEC federation. In addition to the definitions for the MEC reference architecture 2400 of FIG. 24 (see also clause 6.1 of [MEC003]), an additional MEC Federation Management Level is added to the MEC reference architecture 2400 including two entities: a MEC Federation Broker (MEFB) 2610 and a MEC Federation Manager (MEFM) 2620. The MEFM 2620 is included in a MEC system 2400 in order to establish a federation with another system such as another MEC system 2400 or a Cloud System/Edge Cloud 2650 (which may correspond to the edge system 1235, cloud 1244, edge cloud 1310, and/or the like). The MEFM 2620 is responsible for publishing details of the capabilities the MEC system 2400 provides, whilst providing the MEC system 2400 access point to the capabilities and resources of other systems. When the MEFB 2610 is present, the MEFB 2610 is placed between MEFMs 2620. The MEFB 2610 serves to act as a single point of access for each MEFM 2620, thereby reducing the complexity of MEC federation establishment involving many MEC systems 2400. Different MEC systems' 2400 MEFM entities 2620 are connected via the Mff-fed reference point if there is no MEFB 2610, but if there is an MEFB 2610 then each MEFM 2620 can connect to that instead via the Mfb-fed reference point. In case of connection between a MEC system with an external cloud system 2650, the same Mif-fed reference point definitions may be reused. The Mfm-fed reference point interconnects the MEC system's MEO 2410 to its MEFM 2620.

Figure 27:
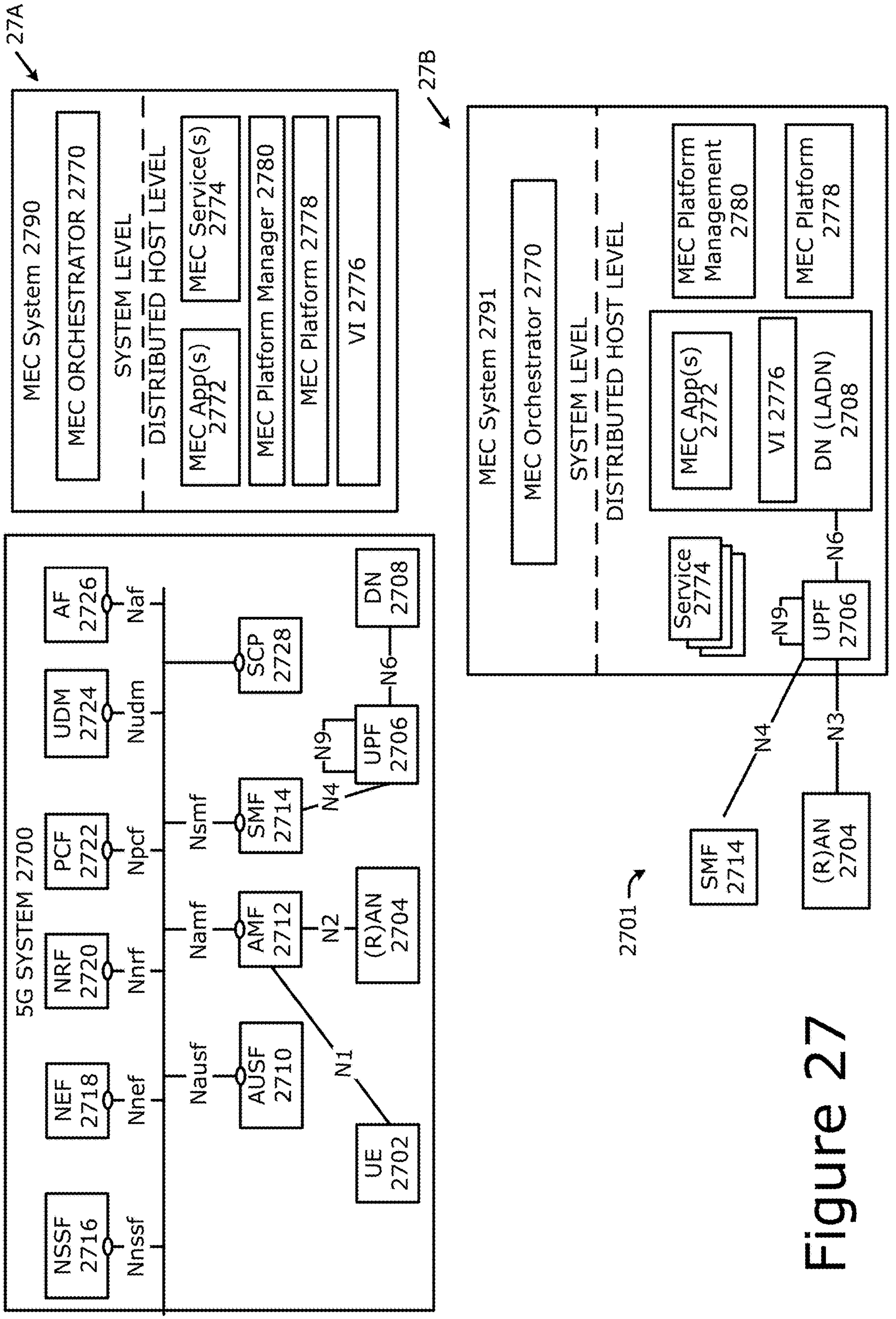
FIG. 27 illustrates a 5G service-based architecture and a MEC architecture deployable in an example edge computing system, and an integrated MEC deployment in a 5G network usable with an example edge computing system.

FIG. 27 illustrates a 5G service-based architecture and a MEC architecture deployable in an example edge computing system, and an integrated MEC deployment in a 5G network usable with an example edge computing system.

FIG. 27 illustrates a non-integrated MEC deployment 27A including a 5G service-based architecture 2700 and a MEC architecture 2790, and an integrated MEC deployment 27B including a MEC system 2791 in a 5G network 2701, where some of the functional entities of the MEC system 2791 interact with the NFs of the 5G network. Referring to deployment 27A, the 5G system (5GS) architecture 2700 is illustrated in a service-based representation and includes elements that are the same or similar to the various elements of FIG. 29. For example, the 5GS 2700 includes the following entities that also appear in the system architecture 2900 of FIG. 29: NSSF 2716, PCF 2722, UDM 2724, AF 2726, AUSF 2710, AMF 2712, SMF 2714, UE 2702, RAN 2704, UPF 2706, and DN 2708. In addition to these NFs, the 5GS architecture 2800 also includes a network exposure function (NEF) 2718 and a network repository function (NRF) 2720. The 5GS architectures can be service-based and interaction between NFs can be represented by corresponding point-to-point reference points Ni or as SBIs (as illustrated in FIG. 27).

The 5GS 2700 in FIG. 27 is a service-based representation, which is used to represent NFs within the CP that enable other authorized NFs to access their services. The 5GS 2700 includes the following service-based interfaces (SBIs): Namf (an SBI exhibited by the AMF 2712), Nsmf (an SBI exhibited by the SMF 2714), Nnef (an SBI exhibited by the NEF 2718), Npcf (an SBI exhibited by the PCF 2722), Nudm (an SBI exhibited by the UDM 2724), Naf (an SBI exhibited by the AF 2726), Nnrf (an SBI exhibited by the NRF 2720), Nnssf (an SBI exhibited by the NSSF 2716), Nausf (an SBI exhibited by the AUSF 2710). Other SBIs not shown in FIG. 27 can also be used (e.g., Nudr, N5g-eir, and Nudsf).

The NEF 2718 provides means for securely exposing the services and capabilities provided by 3GPP NFs for third party, internal exposure/re-exposure, AFs 2764, edge computing or fog computing systems, etc. The NEF 2718 may authenticate, authorize, and/or throttle the AFs 2764. The NEF 2718 may also translate information exchanged with the AF(s) 2764 and information exchanged with internal NFs. The NEF 2718 may also receive information from other NFs based on exposed capabilities of other NFs. This information may be stored at the NEF 2718 as structured data, or at a data storage NF using standardized interfaces. The stored information can then be re-exposed by the NEF 2718 to other NFs and AFs, and/or used for other purposes such as analytics. In this example, the NEF 2718 provides an interface to a MEC host in a MEC system 2790, 2791, which can be used to process wireless connections with the RAN 2704.

The NRF 2720 supports service discovery functions, receives NF discovery requests from NF instances or the SCP 2728, and provides the information of the discovered (or to be discovered) NF instances to the NF instances or the SCP 2728. The NRF 2720 maintains NF profiles of available NF instances and their supported services (e.g., NF instance ID, NF type, PLMN ID, FQDN or IP address of NF, NF capacity information, NF priority information, etc.). The SCP 2728 (or individual instances of the SCP 2728) supports indirect communication (see e.g., [TS23501] section 7.1.1) between two or more NFs; delegated discovery (see e.g., [TS23501] section 7.1.1); message forwarding and routing to destination NF/NF service(s), communication security (e.g., authorization of the NF Service Consumer to access the NF Service Producer API) (see e.g., 3GPP TS 33.501), load balancing, monitoring, overload control, etc.; and discovery and selection functionality for UDM(s), AUSF(s), UDR(s), PCF(s) with access to subscription data stored in the UDR based on UE's SUPI, SUCI or GPSI (see e.g., [TS23501] section 6.3). Load balancing, monitoring, overload control functionality provided by the SCP 2728 may be implementation specific. The SCP 2728 may be deployed in a distributed manner. More than one SCP 2728 can be present in the communication path between various NF Services. The SCP 2728, although not an NF instance, can also be deployed distributed, redundant, and scalable.

The MEC system 2790 can include a MEC orchestrator 2770 (operating at a system level) as well as the following MEC entities operating at a distributed host level: one or more apps 2772, one or more services 2774, virtualization infrastructure 2776, a MEC platform 2778, and a MEC platform manager 2780. Components of the MEC system 2790 are discussed in greater detail infra.

The integrated MEC deployment 27B includes the same MEC and 5GC NFs as in the non-integrated deployment 27A discussed previously. In this implementation, the integrated MEC deployment 27B is located at least partially within the 5G network 2701. The 5G network 2701 is the same or similar to the 5GS 2700 (and includes the same or similar NFs), however, not all of the NFs in 5G network 2701 are shown for the sake of clarity. The integrated MEC deployment 27B can be configured using one or more of the following techniques: (1) Local Routing and Traffic Steering; (2) The ability of an AF 2726 to influence UPF 2706 (*re*)selection and traffic routing directly via the PCF 2722 or indirectly via the NEF 2718, depending on the operator's policies; (3) The Session and Service Continuity (SSC) modes for UE 2702 and application mobility scenarios; (4) Support of Local Area Data Network (LADN) 2708 by the 5G network 2701 by providing support to connect to the LADN 2708 in a certain area where the apps 2772 are deployed. The access to a LADN 2708 may be available in a specific LADN service area, defined as a set of Tracking Areas in the serving PLMN of the UE. The LADN 2708 can be configured as a service provided by the serving PLMN of the UE. For local routing and traffic steering, the 5G network 2701 can be configured to select traffic to be routed to the apps 2772 in the LADN 2708, which can be part of the MEC system 2791. A PDU session may have multiple N6 interfaces towards the data network 2708. The UPFs 2706 that terminate these interfaces can be configured to support PDU Session Anchor functionality. Traffic steering by the UPF 2706 is supported by UL Classifiers that operate on a set of traffic filters matching the steered traffic, or alternatively, by IPv6 multi-homing, where multiple IPv6 prefixes have been associated with the PDU session in question.

The NFs within the 5G network 2701 and the services they produce are registered in the NRF 2720, while in the MEC system 2791 the services produced by the MEC applications 2772 are registered in the service registry of the MEC platform 2778. Service registration can be part of the application enablement functionality. To use the service, if authorized, an NF can directly interact with the NF that produces the service. The list of available MEC services can be discovered from the NRF 2720. Some of the services may be accessible via the NEF 2718, which is also available to untrusted entities that are external to the domain, to access the service. Put another way, the NEF 2718 can function as a centralized point for service exposure and also has a key role in authorizing all access requests originating from outside of the system. Procedures related to authentication can be served by the AUSF 2710.

The 5G network 2701 can use network slicing which allows the allocation of the required features and resources from the available NFs to different services or to tenants that are using the services. The Network Slice Selection Function (NSSF) 2716 can be configured to assist in the selection of suitable network slice instances for users, and in the allocation of the necessary AMF 2712. A MEC app 2772 (e.g., an application hosted in the distributed cloud of the MEC system 2790) can belong to one or more network slices that have been configured in the 5G network 2701.

The PCF 2722 is also the function whose services an AF 2726, such as a MEC platform 2778, requests in order to impact the traffic steering rules. The PCF 2722 can be accessed either directly, or via the NEF 2718, depending on whether the AF 2726 is considered trusted or not, and in the case of traffic steering, whether the corresponding PDU session is known at the time of the request. The UDM 2724 is responsible for services related to users and subscriptions. For example, the UDM 2724 can be configured to generate 3GPP authentication and key agreement (AKA) authentication credentials, handle user identification related information, manage access authorization (e.g., roaming restrictions), register the user serving NFs (serving AMF 2712, SMF 2714), support service continuity by keeping record of SMF/DNN assignments, support interception procedures in outbound roaming by acting as a contact point, and perform subscription management procedures.

The UPF 2706 can be configured to assist in an integrated MEC deployment in the 5G network 2701. UPFs 2706 can be considered as a distributed and configurable data plane from the MEC system 2791 perspective. The control of that data plane, such as in a traffic rules configuration, may follow the NEF-PCF-SMF communication route. Consequently, the local UPF 2706 may be part of the MEC implementation as illustrated in deployment 27B.

The MEC orchestrator 2770 in deployment 27B is a MEC system level functional entity that, acting as an AF 2726, can interact with the NEF 2718, or in some scenarios directly with the target 5G NFs. At the distributed host level (or "MEC host level"), the MEC platform 2778 can be configured to interact with the 5G NFs, again in the role of an AF 2726. The MEC host (see e.g., MEC host 2402 in FIG. 24) and/or other host level functional entities, may be deployed in a data network (or LADN) 2708 in the 5GS 2700. While the NEF 2718 as a 5GC NF is a system level entity deployed centrally together with similar NFs, an instance of NEF 2718 can also be deployed in the edge to allow low latency, high throughput service access from a MEC host.

In deployment 27B, the MEC system 2791 is deployed on the N6 reference point of the UPF 2706, which may be in a data network 2708 external to the 5GS 2701. This functionality can be enabled by flexibility in locating the UPF 2706. The distributed MEC host can accommodate, apart from MEC apps 2772, a message broker as a MEC platform service 2774, and another MEC platform service 2774 to steer traffic to local accelerators. The choice to run a service as a MEC app or as a platform service can be implementation-specific and can factor in the level of sharing and authentication needed to access the service. A MEC service 2774 such as a message broker could be initially deployed as a MEC app 2772 and then become available as a MEC platform service 2774. Additionally or alternatively, a MEC service 2774 may be used to implement aspects of the embodiments discussed herein.

MEC hosts of the MEC system 2791 are deployed in the edge or in a central data network. The UPF 2706 can be configured to manage to steer the UP traffic towards the targeted MEC apps 2772 in the DN 2708. The locations of the DN(s) 2708 and the UPF(s) 2706 are a choice of the network operator and the network operator may choose to place the physical computing resources based on technical and business parameters such as available site facilities, supported applications and their requirements, measured or estimated user load, etc. The MEC management system, orchestrating the operation of MEC hosts and applications, may decide dynamically where to deploy the MEC apps 2772. In terms of physical deployment of MEC hosts, the following options may be used in different aspects: (1) the MEC host and the local UPF 2706 are co-located with the base station of a base station edge layer; (2) the MEC host co-located with a transmission node which may include a local UPF 2706; (3) the MEC host and the local UPF 2706 co-located with a network aggregation point; and (4) the MEC host is co-located with the 5G core NFs (e.g., in the same data center).

Figure 28:
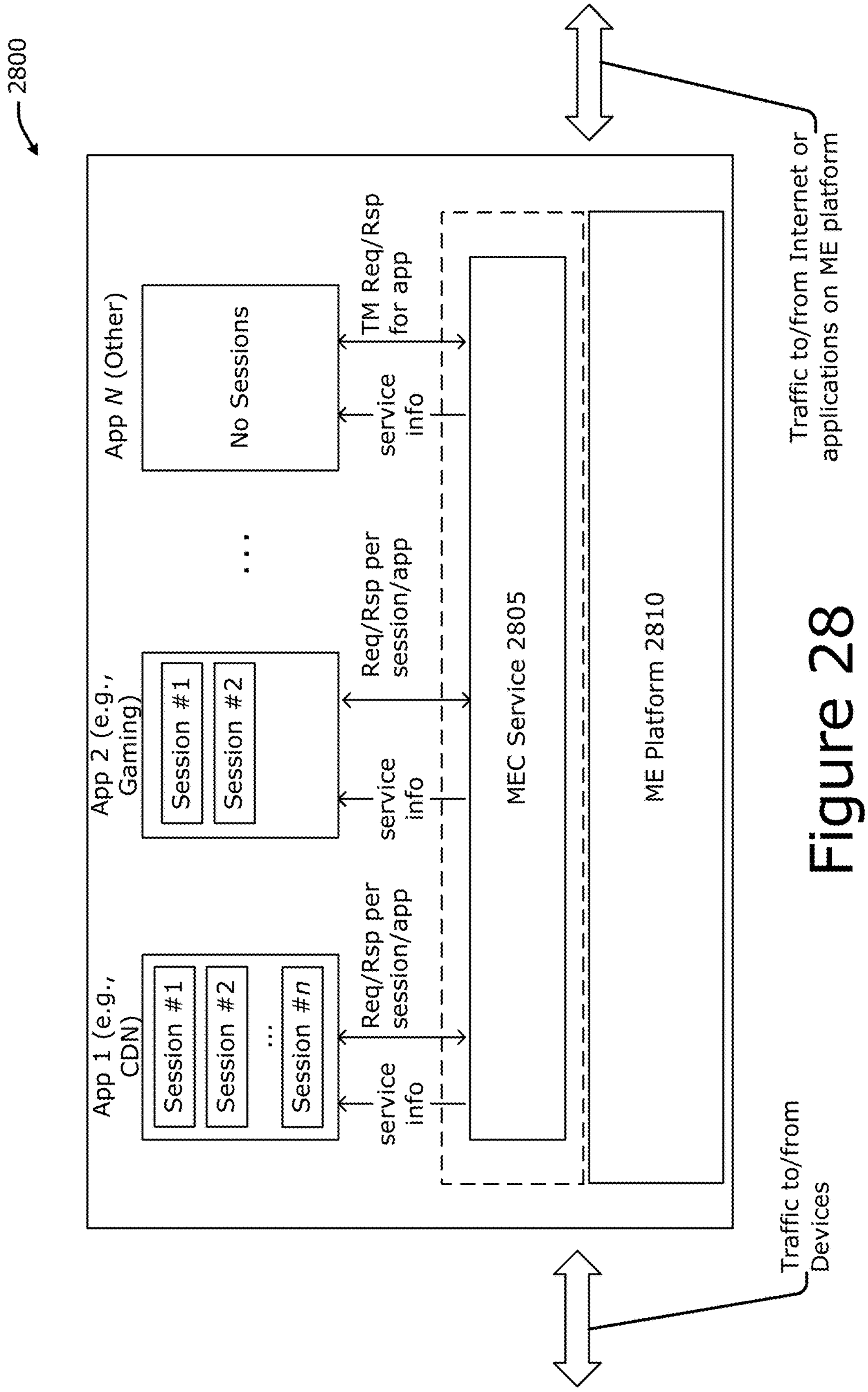
FIG. 28 illustrates an example MEC service architecture.

FIG. 28 illustrates an example MEC service architecture 2800. MEC service architecture 2800 includes the MEC service 2805, ME platform 2810 (corresponding to MEC platform 2432), and applications (Apps) 1 to N (where N is a number). As an example, the App 1 may be a CDN app/service hosting 1 to n sessions (where n is a number that is the same or different than N), App 2 may be a gaming app/service which is shown as hosting two sessions, and App N may be some other app/service which is shown as a single instance (e.g., not hosting any sessions). Each App may be a distributed application that partitions tasks and/or workloads between resource providers (e.g., servers such as ME platform 2810) and consumers (e.g., UEs 101, user apps instantiated by individual UEs 101, other servers/services, network functions, application functions, etc.). Each session represents an interactive information exchange between two or more elements, such as a client-side app and its corresponding server-side app, a user app instantiated by a UE 101 and a MEC app instantiated by the ME platform 2810, and/or the like. A session may begin when App execution is started or initiated and ends when the App exits or terminates execution. Additionally or alternatively, a session may begin when a connection is established and may end when the connection is terminated. Each App session may correspond to a currently running App instance. Additionally or alternatively, each session may correspond to a Protocol Data Unit (PDU) session or multi-access (MA) PDU session. A PDU session is an association between a UE 1211, 1221 and a DN that provides a PDU connectivity service, which is a service that provides for the exchange of PDUs between a UE 1211, 1221 and a Data Network. An MA PDU session is a PDU Session that provides a PDU connectivity service, which can use one access network at a time, or simultaneously a 3GPP access network 110A and a non-3GPP access network 110B. Furthermore, each session may be associated with a session identifier (ID) which is data the uniquely identifies a session, and each App (or App instance) may be associated with an App ID (or App instance ID) which is data the uniquely identifies an App (or App instance).

The MEC service 2805 provides one or more MEC services 2436 to MEC service consumers (e.g., Apps 1 to N). The MEC service 2805 may optionally run as part of the platform (e.g., ME platform 2810) or as an application (e.g., ME app). Different Apps 1 to N, whether managing a single instance or several sessions (e.g., CDN), may request specific service info per their requirements for the whole application instance or different requirements per session. The MEC service 2805 may aggregate all the requests and act in a manner that will help optimize the BW usage and improve Quality of Experience (QoE) for applications.

The MEC service 2805 provides a MEC service API that supports both queries and subscriptions (e.g., pub/sub mechanism) that are used over a Representational State Transfer ("REST" or "RESTful") API or over alternative transports such as a message bus. For RESTful architectural style, the MEC APIs contain the HTTP protocol bindings for traffic management functionality.

Each Hypertext Transfer Protocol (HTTP) message is either a request or a response. A server listens on a connection for a request, parses each message received, interprets the message semantics in relation to the identified request target, and responds to that request with one or more response messages. A client constructs request messages to communicate specific intentions, examines received responses to see if the intentions were carried out, and determines how to interpret the results. The target of an HTTP request is called a "resource." Additionally or alternatively, a "resource" is an object with a type, associated data, a set of methods that operate on it, and relationships to other resources if applicable. Each resource is identified by at least one Uniform Resource Identifier (URI), and a resource URI identifies at most one resource. Resources are acted upon by the RESTful API using HTTP methods (e.g., POST, GET, PUT, DELETE, etc.). With every HTTP method, one resource URI is passed in the request to address one particular resource. Operations on resources affect the state of the corresponding managed entities.

Considering that a resource could be anything, and that the uniform interface provided by HTTP is similar to a window through which one can observe and act upon such a thing only through the communication of messages to some independent actor on the other side, an abstraction is needed to represent ("take the place of") the current or desired state of that thing in our communications. That abstraction is called a representation. For the purposes of HTTP, a "representation" is information that is intended to reflect a past, current, or desired state of a given resource, in a format that can be readily communicated via the protocol. A representation comprises a set of representation metadata and a potentially unbounded stream of representation data. Additionally or alternatively, a resource representation is a serialization of a resource state in a particular content format.

An origin server might be provided with, or be capable of generating, multiple representations that are each intended to reflect the current state of a target resource. In such cases, some algorithm is used by the origin server to select one of those representations as most applicable to a given request, usually based on content negotiation. This "selected representation" is used to provide the data and metadata for evaluating conditional requests constructing the payload for response messages (e.g., 200 OK, 304 Not Modified responses to GET, and the like). A resource representation is included in the payload body of an HTTP request or response message. Whether a representation is required or not allowed in a request depends on the HTTP method used (see e.g., Fielding et al., "Hypertext Transfer Protocol (HTTP/1.1): Semantics and Content", IETF RFC 7231 (June 2014)).

The MEC API resource Universal Resource Indicators (URIs) are discussed in various ETSI MEC standards, such as those mentioned herein. The MTS API supports additional application-related error information to be provided in the HTTP response when an error occurs (see e.g., clause 6.15 of [MEC009]). The syntax of each resource URI follows [MEC009], as well as Berners-Lee et al., "Uniform Resource Identifier (URI): Generic Syntax", IETF Network Working Group, RFC 3986 (January 2005) and/or Nottingham, "URI Design and Ownership", IETF RFC 8820 (June 2020). In the RESTful MEC service APIs, including the VIS API, the resource URI structure for each API has the following structure: {apiRoot}/{apiName}/{apiVersion}/{apiSpecificSuffixes}

Here, "apiRoot" includes the scheme ("https"), host and optional port, and an optional prefix string. The "apiName" defines the name of the API (e.g., MTS API, RNI API, etc.). The "apiVersion" represents the version of the API, and the "apiSpecificSuffixes" define the tree of resource URIs in a particular API. The combination of "apiRoot", "apiName" and "apiVersion" is called the root URI. The "apiRoot" is under control of the deployment, whereas the remaining parts of the URI are under control of the API specification. In the above root, "apiRoot" and "apiName" are discovered using the service registry (see e.g., service registry 2438 in FIG. 24). It includes the scheme ("http" or "https"), host and optional port, and an optional prefix string. For the a given MEC API, the "apiName" may be set to "mec" and "apiVersion" may be set to a suitable version number (e.g., "v1" for version 1). The MEC APIs support HTTP over TLS (also known as HTTPS). All resource URIs in the MEC API procedures are defined relative to the above root URI.

The JSON content format may also be supported. The JSON format is signaled by the content type "application/json". The MTS API may use the OAuth 2.0 client credentials grant type with bearer tokens (see e.g., [MEC009]). The token endpoint can be discovered as part of the service availability query procedure defined in [MEC009]. The client credentials may be provisioned into the MEC app using known provisioning mechanisms.

2. COMPUTING SYSTEM AND HARDWARE COMPONENTS, CONFIGURATIONS, AND ARRANGEMENTS

FIG. 29 illustrates an example network architecture 2900 according to various embodiments. The network 2900 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 2900 includes a UE 2902, which is any mobile or non-mobile computing device designed to communicate with a RAN 2904 via an over-the-air connection. The UE 2902 is communicatively coupled with the RAN 2904 by a Uu interface, which may be applicable to both LTE and NR systems. Examples of the UE 2902 include, but are not limited to, a smartphone, tablet computer, wearable computer, desktop computer, laptop computer, in-vehicle infotainment system, in-car entertainment system, instrument cluster, head-up display (HUD) device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, machine-to-machine (M2M), device-to-device (D2D), machine-type communication (MTC) device, Internet of Things (IoT) device, and/or the like. The network 2900 may include a plurality of UEs 2902 coupled directly with one another via a D2D, ProSe, PC5, and/or sidelink (SL) interface. These UEs 2902 may be M2M/D2D/MTC/IoT devices and/or vehicular systems that communicate using physical sidelink channels such as, but not limited to, PSBCH, PSDCH, PSSCH, PSCCH, PSFCH, etc. The UE 2902 may perform blind decoding attempts of SL channels/links according to the various embodiments herein.

In some embodiments, the UE 2902 may additionally communicate with an AP 2906 via an over-the-air (OTA) connection. The AP 2906 manages a WLAN connection, which may serve to offload some/all network traffic from the RAN 2904. The connection between the UE 2902 and the AP 2906 may be consistent with any IEEE 802.11 protocol. Additionally, the UE 2902, RAN 2904, and AP 2906 may utilize cellular-WLAN aggregation/integration (e.g., LWA/LWIP). Cellular-WLAN aggregation may involve the UE 2902 being configured by the RAN 2904 to utilize both cellular radio resources and WLAN resources.

The RAN 2904 includes one or more access network nodes (ANs) 2908. The ANs 2908 terminate air-interface(s) for the UE 2902 by providing access stratum protocols including RRC, PDCP, RLC, MAC, and PHY/L1 protocols. In this manner, the AN 2908 enables data/voice connectivity between CN 2920 and the UE 2902. The ANs 2908 may be a macrocell base station or a low power base station for providing femtocells, picocells or other like cells having smaller coverage areas, smaller user capacity, or higher bandwidth compared to macrocells; or some combination thereof. In these implementations, an AN 2908 be referred to as a BS, gNB, RAN node, eNB, ng-eNB, NodeB, RSU, TRxP, etc.

One example implementation is a "CU/DU split" architecture where the ANs 2908 are embodied as a gNB-Central Unit (CU) that is communicatively coupled with one or more gNB-Distributed Units (DUs), where each DU may be communicatively coupled with one or more Radio Units (RUs) (also referred to as RRHs, RRUs, or the like) (see e.g., 3GPP TS 38.401 v16.1.0 (2020 March)). In some implementations, the one or more RUs may be individual RSUs. In some implementations, the CU/DU split may include an ng-eNB-CU and one or more ng-eNB-DUs instead of, or in addition to, the gNB-CU and gNB-DUs, respectively. The ANs 2908 employed as the CU may be implemented in a discrete device or as one or more software entities running on server computers as part of, for example, a virtual network including a virtual Base Band Unit (BBU) or BBU pool, cloud RAN (CRAN), Radio Equipment Controller (REC), Radio Cloud Center (RCC), centralized RAN (C-RAN), virtualized RAN (vRAN), and/or the like (although these terms may refer to different implementation concepts). Any other type of architectures, arrangements, and/or configurations can be used.

The plurality of ANs may be coupled with one another via an X2 interface (if the RAN 2904 is an LTE RAN or Evolved Universal Terrestrial Radio Access Network (E-UTRAN) 2910) or an Xn interface (if the RAN 2904 is a NG-RAN 2914). The X2/Xn interfaces, which may be separated into control/user plane interfaces in some embodiments, may allow the ANs to communicate information related to handovers, data/context transfers, mobility, load management, interference coordination, etc.

The ANs of the RAN 2904 may each manage one or more cells, cell groups, component carriers, etc. to provide the UE 2902 with an air interface for network access. The UE 2902 may be simultaneously connected with a plurality of cells provided by the same or different ANs 2908 of the RAN 2904. For example, the UE 2902 and RAN 2904 may use carrier aggregation to allow the UE 2902 to connect with a plurality of component carriers, each corresponding to a Pcell or Scell. In dual connectivity scenarios, a first AN 2908 may be a master node that provides an MCG and a second AN 2908 may be secondary node that provides an SCG. The first/second ANs 2908 may be any combination of eNB, gNB, ng-eNB, etc.

The RAN 2904 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 2902 or AN 2908 may be or act as a roadside unit (RSU), which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 2904 may be an E-UTRAN 2910 with one or more eNBs 2912. The an E-UTRAN 2910 provides an LTE air interface (Uu) with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 2904 may be an next generation (NG)-RAN 2914 with one or more gNB 2916 and/or on or more ng-eNB 2918. The gNB 2916 connects with 5G-enabled UEs 2902 using a 5G NR interface. The gNB 2916 connects with a 5GC 2940 through an NG interface, which includes an N2 interface or an N3 interface. The ng-eNB 2918 also connects with the 5GC 2940 through an NG interface, but may connect with a UE 2902 via the Uu interface. The gNB 2916 and the ng-eNB 2918 may connect with each other over an Xn interface.

In some embodiments, the NG interface may be split into two parts, an NG user plane (NG-U) interface, which carries traffic data between the nodes of the NG-RAN 2914 and a UPF 2948 (e.g., N3 interface), and an NG control plane (NG-C) interface, which is a signaling interface between the nodes of the NG-RAN 2914 and an AMF 2944 (e.g., N2 interface).

The NG-RAN 2914 may provide a 5G-NR air interface (which may also be referred to as a Uu interface) with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

The 5G-NR air interface may utilize BWPs for various purposes. For example, BWP can be used for dynamic adaptation of the SCS. For example, the UE 2902 can be configured with multiple BWPs where each BWP configuration has a different SCS. When a BWP change is indicated to the UE 2902, the SCS of the transmission is changed as well. Another use case example of BWP is related to power saving. In particular, multiple BWPs can be configured for the UE 2902 with different amount of frequency resources (e.g., PRBs) to support data transmission under different traffic loading scenarios. A BWP containing a smaller number of PRBs can be used for data transmission with small traffic load while allowing power saving at the UE 2902 and in some cases at the gNB 2916. A BWP containing a larger number of PRBs can be used for scenarios with higher traffic load.

The RAN 2904 is communicatively coupled to CN 2920 that includes network elements and/or network functions (NFs) to provide various functions to support data and telecommunications services to customers/subscribers (e.g., UE 2902). The components of the CN 2920 may be implemented in one physical node or separate physical nodes. In some embodiments, NFV may be utilized to virtualize any or all of the functions provided by the network elements of the CN 2920 onto physical compute/storage resources in servers, switches, etc. A logical instantiation of the CN 2920 may be referred to as a network slice, and a logical instantiation of a portion of the CN 2920 may be referred to as a network sub-slice.

The CN 2920 may be an LTE CN 2922 (also referred to as an Evolved Packet Core (EPC) 2922). The EPC 2922 may include MME 2924, SGW 2926, SGSN 2928, HSS 2930, PGW 2932, and PCRF 2934 coupled with one another over interfaces (or "reference points") as shown. The NFs in the EPC 2922 are briefly introduced as follows.

The MME 2924 implements mobility management functions to track a current location of the UE 2902 to facilitate paging, bearer activation/deactivation, handovers, gateway selection, authentication, etc.

The SGW 2926 terminates an S1 interface toward the RAN 2910 and routes data packets between the RAN 2910 and the EPC 2922. The SGW 2926 may be a local mobility anchor point for inter-RAN node handovers and also may provide an anchor for inter-3GPP mobility. Other responsibilities may include lawful intercept, charging, and some policy enforcement.

The SGSN 2928 tracks a location of the UE 2902 and performs security functions and access control. The SGSN 2928 also performs inter-EPC node signaling for mobility between different RAT networks; PDN and S-GW selection as specified by MME 2924; MME 2924 selection for handovers; etc. The S3 reference point between the MME 2924 and the SGSN 2928 enable user and bearer information exchange for inter-3GPP access network mobility in idle/active states.

The HSS 2930 includes a database for network users, including subscription-related information to support the network entities' handling of communication sessions. The HSS 2930 can provide support for routing/roaming, authentication, authorization, naming/addressing resolution, location dependencies, etc. An S6a reference point between the HSS 2930 and the MME 2924 may enable transfer of subscription and authentication data for authenticating/authorizing user access to the EPC 2920.

The PGW 2932 may terminate an SGi interface toward a data network (DN) 2936 that may include an application (app)/content server 2938. The PGW 2932 routes data packets between the EPC 2922 and the data network 2936. The PGW 2932 is communicatively coupled with the SGW 2926 by an S5 reference point to facilitate user plane tunneling and tunnel management. The PGW 2932 may further include a node for policy enforcement and charging data collection (e.g., PCEF). Additionally, the SGi reference point may communicatively couple the PGW 2932 with the same or different data network 2936. The PGW 2932 may be communicatively coupled with a PCRF 2934 via a Gx reference point.

The PCRF 2934 is the policy and charging control element of the EPC 2922. The PCRF 2934 is communicatively coupled to the app/content server 2938 to determine appropriate QoS and charging parameters for service flows. The PCRF 2932 also provisions associated rules into a PCEF (via Gx reference point) with appropriate TFT and QCI.

The CN 2920 may be a 5GC 2940 including an AUSF 2942, AMF 2944, SMF 2946, UPF 2948, NSSF 2950, NEF 2952, NRF 2954, PCF 2956, UDM 2958, and AF 2960 coupled with one another over various interfaces as shown. The NFs in the 5GC 2940 are briefly introduced as follows.

The AUSF 2942 stores data for authentication of UE 2902 and handle authentication-related functionality. The AUSF 2942 may facilitate a common authentication framework for various access types.

The AMF 2944 allows other functions of the 5GC 2940 to communicate with the UE 2902 and the RAN 2904 and to subscribe to notifications about mobility events with respect to the UE 2902. The AMF 2944 is also responsible for registration management (e.g., for registering UE 2902), connection management, reachability management, mobility management, lawful interception of AMF-related events, and access authentication and authorization. The AMF 2944 provides transport for SM messages between the UE 2902 and the SMF 2946, and acts as a transparent proxy for routing SM messages. AMF 2944 also provides transport for SMS messages between UE 2902 and an SMSF. AMF 2944 interacts with the AUSF 2942 and the UE 2902 to perform various security anchor and context management functions. Furthermore, AMF 2944 is a termination point of a RAN-CP interface, which includes the N2 reference point between the RAN 2904 and the AMF 2944. The AMF 2944 is also a termination point of NAS (N1) signaling, and performs NAS ciphering and integrity protection.

AMF 2944 also supports NAS signaling with the UE 2902 over an N3IWF interface. The N3IWF provides access to untrusted entities. N3IWF may be a termination point for the N2 interface between the (R)AN 2904 and the AMF 2944 for the control plane, and may be a termination point for the N3 reference point between the (R)AN 2914 and the 2948 for the user plane. As such, the AMF 2944 handles N2 signaling from the SMF 2946 and the AMF 2944 for PDU sessions and QoS, encapsulate/de-encapsulate packets for IPSec and N3 tunneling, marks N3 user-plane packets in the uplink, and enforces QoS corresponding to N3 packet marking taking into account QoS requirements associated with such marking received over N2. N3IWF may also relay UL and DL control-plane NAS signaling between the UE 2902 and AMF 2944 via an N1 reference point between the UE 2902 and the AMF 2944, and relay uplink and downlink user-plane packets between the UE 2902 and UPF 2948. The N3IWF also provides mechanisms for IPsec tunnel establishment with the UE 2902. The AMF 2944 may exhibit an Namf service-based interface, and may be a termination point for an N14 reference point between two AMFs 2944 and an N17 reference point between the AMF 2944 and a 5G-EIR (not shown by FIG. 29).

The SMF 2946 is responsible for SM (e.g., session establishment, tunnel management between UPF 2948 and AN 2908); UE IP address allocation and management (including optional authorization); selection and control of UP function; configuring traffic steering at UPF 2948 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 2944 over N2 to AN 2908; and determining SSC mode of a session. SM refers to management of a PDU session, and a PDU session or "session" refers to a PDU connectivity service that provides or enables the exchange of PDUs between the UE 2902 and the DN 2936.

The UPF 2948 acts as an anchor point for intra-RAT and inter-RAT mobility, an external PDU session point of interconnect to data network 2936, and a branching point to support multi-homed PDU session. The UPF 2948 also performs packet routing and forwarding, packet inspection, enforces user plane part of policy rules, lawfully intercept packets (UP collection), performs traffic usage reporting, perform QoS handling for a user plane (e.g., packet filtering, gating, UL/DL rate enforcement), performs uplink traffic verification (e.g., SDF-to-QoS flow mapping), transport level packet marking in the uplink and downlink, and performs downlink packet buffering and downlink data notification triggering. UPF 2948 may include an uplink classifier to support routing traffic flows to a data network.

The NSSF 2950 selects a set of network slice instances serving the UE 2902. The NSSF 2950 also determines allowed NSSAI and the mapping to the subscribed S-NSSAIs, if needed. The NSSF 2950 also determines an AMF set to be used to serve the UE 2902, or a list of candidate AMFs 2944 based on a suitable configuration and possibly by querying the NRF 2954. The selection of a set of network slice instances for the UE 2902 may be triggered by the AMF 2944 with which the UE 2902 is registered by interacting with the NSSF 2950; this may lead to a change of AMF 2944. The NSSF 2950 interacts with the AMF 2944 via an N22 reference point; and may communicate with another NSSF in a visited network via an N31 reference point (not shown).

The NEF 2952 securely exposes services and capabilities provided by 3GPP NFs for third party, internal exposure/re-exposure, AFs 2960, edge computing or fog computing systems (e.g., edge compute node, etc. In such embodiments, the NEF 2952 may authenticate, authorize, or throttle the AFs. NEF 2952 may also translate information exchanged with the AF 2960 and information exchanged with internal network functions. For example, the NEF 2952 may translate between an AF-Service-Identifier and an internal 5GC information. NEF 2952 may also receive information from other NFs based on exposed capabilities of other NFs. This information may be stored at the NEF 2952 as structured data, or at a data storage NF using standardized interfaces. The stored information can then be re-exposed by the NEF 2952 to other NFs and AFs, or used for other purposes such as analytics.

The NRF 2954 supports service discovery functions, receives NF discovery requests from NF instances, and provides information of the discovered NF instances to the requesting NF instances. NRF 2954 also maintains information of available NF instances and their supported services. The NRF 2954 also supports service discovery functions, wherein the NRF 2954 receives NF Discovery Request from NF instance or an SCP (not shown), and provides information of the discovered NF instances to the NF instance or SCP.

The PCF 2956 provides policy rules to control plane functions to enforce them, and may also support unified policy framework to govern network behavior. The PCF 2956 may also implement a front end to access subscription information relevant for policy decisions in a UDR of the UDM 2958. In addition to communicating with functions over reference points as shown, the PCF 2956 exhibit an Npcf service-based interface.

The UDM 2958 handles subscription-related information to support the network entities' handling of communication sessions, and stores subscription data of UE 2902. For example, subscription data may be communicated via an N8 reference point between the UDM 2958 and the AMF 2944. The UDM 2958 may include two parts, an application front end and a UDR. The UDR may store subscription data and policy data for the UDM 2958 and the PCF 2956, and/or structured data for exposure and application data (including PFDs for application detection, application request information for multiple UEs 2902) for the NEF 2952. The Nudr service-based interface may be exhibited by the UDR 221 to allow the UDM 2958, PCF 2956, and NEF 2952 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 2958 may exhibit the Nudm service-based interface.

AF 2960 provides application influence on traffic routing, provide access to NEF 2952, and interact with the policy framework for policy control. The AF 2960 may influence UPF 2948 (*re*)selection and traffic routing. Based on operator deployment, when AF 2960 is considered to be a trusted entity, the network operator may permit AF 2960 to interact directly with relevant NFs. Additionally, the AF 2960 may be used for edge computing implementations, The 5GC 2940 may enable edge computing by selecting operator/3rd party services to be geographically close to a point that the UE 2902 is attached to the network. This may reduce latency and load on the network. In edge computing implementations, the 5GC 2940 may select a UPF 2948 close to the UE 2902 and execute traffic steering from the UPF 2948 to DN 2936 via the N6 interface. This may be based on the UE subscription data, UE location, and information provided by the AF 2960, which allows the AF 2960 to influence UPF (re)selection and traffic routing.

The data network (DN) 2936 may represent various network operator services, Internet access, or third party services that may be provided by one or more servers including, for example, application (app)/content server 2938. The DN 2936 may be an operator external public, a private PDN, or an intra-operator packet data network, for example, for provision of IMS services. In this embodiment, the app server 2938 can be coupled to an IMS via an S-CSCF or the I-CSCF. In some implementations, the DN 2936 may represent one or more local area DNs (LADNs), which are DNs 2936 (or DN names (DNNs)) that is/are accessible by a UE 2902 in one or more specific areas. Outside of these specific areas, the UE 2902 is not able to access the LADN/DN 2936.

Additionally or alternatively, the DN 2936 may be an Edge DN 2936, which is a (local) Data Network that supports the architecture for enabling edge applications. In these embodiments, the app server 2938 may represent the physical hardware systems/devices providing app server functionality and/or the application software resident in the cloud or at an edge compute node that performs server function(s). In some embodiments, the app/content server 2938 provides an edge hosting environment that provides support required for Edge Application Server's execution.

In some embodiments, the 5GS can use one or more edge compute nodes to provide an interface and offload processing of wireless communication traffic. In these embodiments, the edge compute nodes may be included in, or co-located with one or more RAN2910, 2914. For example, the edge compute nodes can provide a connection between the RAN 2914 and UPF 2948 in the 5GC 2940. The edge compute nodes can use one or more NFV instances instantiated on virtualization infrastructure within the edge compute nodes to process wireless connections to and from the RAN 2914 and UPF 2948.

The interfaces of the 5GC 2940 include reference points and service-based interfaces. The reference points include: N1 (between the UE 2902 and the AMF 2944), N2 (between RAN 2914 and AMF 2944), N3 (between RAN 2914 and UPF 2948), N4 (between the SMF 2946 and UPF 2948), N5 (between PCF 2956 and AF 2960), N6 (between UPF 2948 and DN 2936), N7 (between SMF 2946 and PCF 2956), N8 (between UDM 2958 and AMF 2944), N9 (between two UPFs 2948), N10 (between the UDM 2958 and the SMF 2946), N11 (between the AMF 2944 and the SMF 2946), N12 (between AUSF 2942 and AMF 2944), N13 (between AUSF 2942 and UDM 2958), N14 (between two AMFs 2944; not shown), N15 (between PCF 2956 and AMF 2944 in case of a non-roaming scenario, or between the PCF 2956 in a visited network and AMF 2944 in case of a roaming scenario), N16 (between two SMFs 2946; not shown), and N22 (between AMF 2944 and NSSF 2950). Other reference point representations not shown in FIG. 29 can also be used. The service-based representation of FIG. 29 represents NFs within the control plane that enable other authorized NFs to access their services. The service-based interfaces (SBIs) include: Namf (SBI exhibited by AMF 2944), Nsmf (SBI exhibited by SMF 2946), Nnef (SBI exhibited by NEF 2952), Npcf (SBI exhibited by PCF 2956), Nudm (SBI exhibited by the UDM 2958), Naf (SBI exhibited by AF 2960), Nnrf (SBI exhibited by NRF 2954), Nnssf (SBI exhibited by NSSF 2950), Nausf (SBI exhibited by AUSF 2942). Other service-based interfaces (e.g., Nudr, N5g-eir, and Nudsf) not shown in FIG. 29 can also be used. In some embodiments, the NEF 2952 can provide an interface to edge compute nodes 2936*x*, which can be used to process wireless connections with the RAN 2914.

In some implementations, the system 2900 may include an SMSF, which is responsible for SMS subscription checking and verification, and relaying SM messages to/from the UE 2902 to/from other entities, such as an SMS-GMSC/IWMSC/SMS-router. The SMS may also interact with AMF 2942 and UDM 2958 for a notification procedure that the UE 2902 is available for SMS transfer (e.g., set a UE not reachable flag, and notifying UDM 2958 when UE 2902 is available for SMS).

The 5GS may also include an SCP (or individual instances of the SCP) that supports indirect communication (see e.g., 3GPP TS 23.501 section 7.1.1); delegated discovery (see e.g., 3GPP TS 23.501 section 7.1.1); message forwarding and routing to destination NF/NF service(s), communication security (e.g., authorization of the NF Service Consumer to access the NF Service Producer API) (see e.g., 3GPP TS 33.501), load balancing, monitoring, overload control, etc.; and discovery and selection functionality for UDM(s), AUSF(s), UDR(s), PCF(s) with access to subscription data stored in the UDR based on UE's SUPI, SUCI or GPSI (see e.g., [TS23501] section 6.3). Load balancing, monitoring, overload control functionality provided by the SCP may be implementation specific. The SCP may be deployed in a distributed manner. More than one SCP can be present in the communication path between various NF Services. The SCP, although not an NF instance, can also be deployed distributed, redundant, and scalable.

Figure 30:
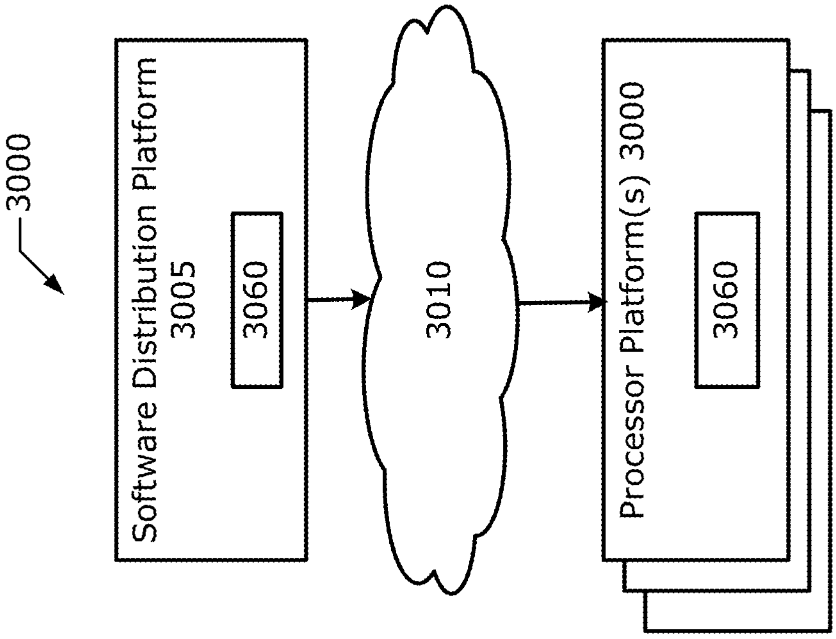
FIG. 30 illustrates an example software distribution platform.
Figure 32:
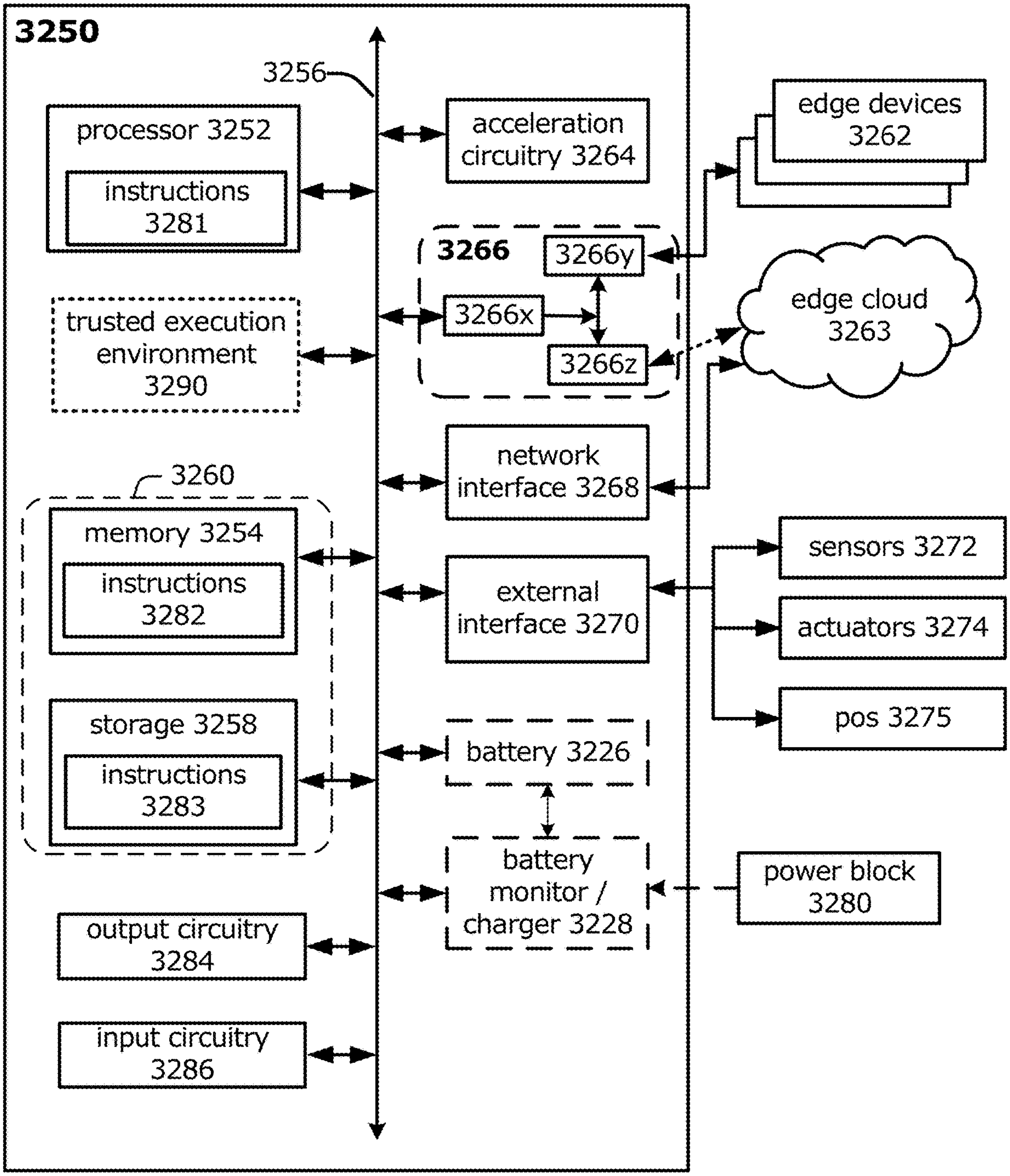

FIG. 30 illustrates a software distribution platform 3005 to distribute software 3060, such as the example computer readable instructions 3260 of FIG. 32, to one or more devices, such as example processor platform(s) 3000 and/or example connected edge devices 3262 (see e.g., FIG. 32) and/or any of the other computing systems/devices discussed herein. The example software distribution platform 3005 may be implemented by any computer server, data facility, cloud service, etc., capable of storing and transmitting software to other computing devices (e.g., third parties, the example connected edge devices 3262 of FIG. 32). Example connected edge devices may be customers, clients, managing devices (e.g., servers), third parties (e.g., customers of an entity owning and/or operating the software distribution platform 3005). Example connected edge devices may operate in commercial and/or home automation environments. In some examples, a third party is a developer, a seller, and/or a licensor of software such as the example computer readable instructions 3260 of FIG. 32. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In FIG. 30, the software distribution platform 3005 includes one or more servers and one or more storage devices. The storage devices store the computer readable instructions 3060, which may correspond to the example computer readable instructions 3260 of FIG. 32, as described above. The one or more servers of the example software distribution platform 3005 are in communication with a network 3010, which may correspond to any one or more of the Internet and/or any of the example networks as described herein. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 3060 from the software distribution platform 3005. For example, the software 3060, which may correspond to the example computer readable instructions 3260 of FIG. 32, may be downloaded to the example processor platform(s) 3000, which is/are to execute the computer readable instructions 3060 to implement Radio apps.

In some examples, one or more servers of the software distribution platform 3005 are communicatively connected to one or more security domains and/or security devices through which requests and transmissions of the example computer readable instructions 3060 must pass. In some examples, one or more servers of the software distribution platform 3005 periodically offer, transmit, and/or force updates to the software (e.g., the example computer readable instructions 3260 of FIG. 32) to ensure improvements, patches, updates, etc. are distributed and applied to the software at the end user devices.

In FIG. 30, the computer readable instructions 3060 are stored on storage devices of the software distribution platform 3005 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions D182 stored in the software distribution platform 3005 are in a first format when transmitted to the example processor platform(s) 3000. In some examples, the first format is an executable binary in which particular types of the processor platform(s) 3000 can execute. However, in some examples, the first format is uncompiled code that requires one or more preparation tasks to transform the first format to a second format to enable execution on the example processor platform(s) 3000. For instance, the receiving processor platform(s) 3000 may need to compile the computer readable instructions 3060 in the first format to generate executable code in a second format that is capable of being executed on the processor platform(s) 3000. In still other examples, the first format is interpreted code that, upon reaching the processor platform(s) 3000, is interpreted by an interpreter to facilitate execution of instructions.

Figure 31:
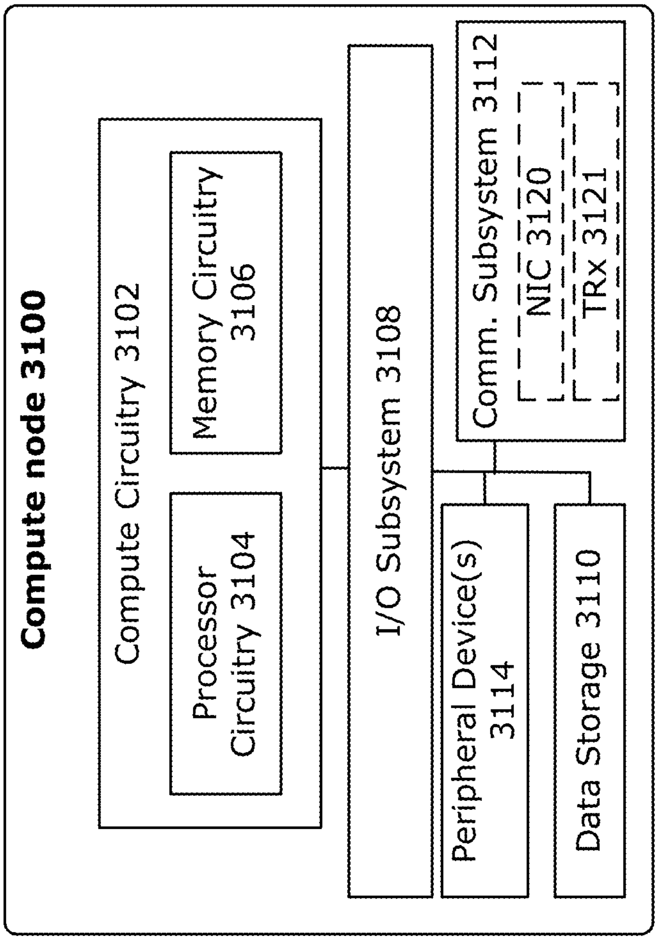
FIGS. 31 and 32 depict example components of various compute nodes in edge computing system(s).

FIGS. 31 and 32 depict further examples of edge computing systems and environments that may fulfill any of the compute nodes or devices discussed herein. Respective edge compute nodes may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

In FIG. 31, an edge compute node 3100 includes a compute engine (also referred to herein as "compute circuitry") 3102, an input/output (I/O) subsystem 3108, data storage 3110, a communication circuitry subsystem 3112, and, optionally, one or more peripheral devices 3114. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component. Additionally or alternatively, the edge compute node 3100 (or portions thereof) may be contained in a housing, a chassis, a case, or a shell such as those discussed previously with respect to the appliance computing device of the edge cloud 1310 of FIG. 13.

The compute node 3100 may be embodied as any type of engine, device, or collection of devices capable of performing various compute functions. The compute node 3100 may correspond to the UEs 1211, 1221*a*, NANs 1231-1233, edge compute node(s) 1236, CN 1242 (or compute node(s) therein), and/or cloud 1244 (or compute node(s) therein) of FIG. 12; edge cloud 1310 (or systems/devices therein), central office 1320 (or systems/devices therein), NAN 1340, processing hub 1350, and/or end point devices 1360 of FIG. 13; use case devices 1405, network equipment (nodes) 1415, equipment 1425 of FIG. 14; client endpoints 1510, on-premise network system 1532, access point 1534, aggregation points 1542, 1544, edge aggregation nodes 1540, and/or data center 1560 (or systems/devices therein) of FIG. 15; devices 1610, edge nodes 1622, 1624 and/or cloud/data center 1640 of FIG. 16; container managers 1711, 1721, container orchestrator 1731, and/or compute nodes 1715, 1723 of FIG. 17; client compute nodes 1810, edge gateway devices 1820, edge resource nodes 1840, NAN 1842, core data center 1850 (or systems/devices therein) of FIG. 18; UE 2101, EES 2155, and/or ECS 2160 of FIG. 21; UE 2420, MEC host 2402 (or systems/devices therein), MEC platform 2432, OSS 2412 (or systems/devices therein) of FIG. 24; MEC platform 2810 of FIG. 28; software distribution platform 3005 and/or processor platform(s) 3000 of FIG. 30; and/or any other component, device, and/or system discussed herein.

In some examples, the compute node 3100 may be embodied as a single device such as an integrated circuit, an embedded system, an FPGA, a System-on-Chip (SoC), or other integrated system or device. The compute node 3100 includes or is embodied as a processor 3104 and a memory 3106. The processor 3104 may be embodied as any type of processor capable of performing the functions described herein (e.g., executing an application). For example, the processor 3104 may be embodied as a multi-core processor (s), a microcontroller, or other processor or processing/controlling circuit.

In some examples, the processor 3104 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 3104 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, storage disks, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 3104 may work in coordination with each other to execute many types of operations and instructions within and on behalf of the compute node 3100.

The memory 3106 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the main memory 3106 may be integrated into the processor 3104. The main memory 3106 may store various software and data used during operation such as one or more applications, data operated on by the application(s), libraries, and drivers.

The compute circuitry 3102 is communicatively coupled to other components of the compute node 3100 via the I/O subsystem 3108, which may be embodied as circuitry and/or components to facilitate input/output operations with the compute circuitry 3102 (e.g., with the processor 3104 and/or the main memory 3106) and other components of the compute circuitry 3102. For example, the I/O subsystem 3108 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 3108 may form a portion of an SoC and be incorporated, along with one or more of the processor 3104, the main memory 3106, and other components of the compute circuitry 3102, into the compute circuitry 3102.

The one or more illustrative data storage devices/disks 3110 may be embodied as one or more of any type(s) of physical device(s) configured for short-term or long-term storage of data such as, for example, memory devices, memory, circuitry, memory cards, flash memory, hard disk drives, solid-state drives (SSDs), and/or other data storage devices/disks. Individual data storage devices/disks 3110 may include a system partition that stores data and firmware code for the data storage device/disk 3110. Individual data storage devices/disks 3110 may also include one or more operating system partitions that store data files and executables for operating systems depending on, for example, the type of compute node 3100.

The communication circuitry 3112 may be embodied as any communication circuit, device, or collection thereof, capable of enabling communications over a network between the compute circuitry 3102 and another compute device (e.g., an edge gateway node or the like). The communication circuitry 3112 may be configured to use any one or more communication technology (e.g., wired or wireless communications) and associated protocols (e.g., a cellular networking protocol such a 3GPP 4G or 5G standard, a wireless local area network protocol such as IEEE 802.11/WiFi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The communication circuitry 3112 includes a network interface controller (NIC) 3120, which may also be referred to as a host fabric interface (HFI). The NIC 3120 may be embodied as one or more add-in-boards, daughter cards, network interface cards, controller chips, chipsets, or other devices that may be used by the compute node 3100 to connect with another compute device. In some examples, the NIC 3120 may be embodied as part of a system-on-a-chip (SoC) that includes one or more processors, or included on a multichip package that also contains one or more processors. In some examples, the NIC 3120 may include a local processor (not shown) and/or a local memory (not shown) that are both local to the NIC 3120. In such examples, the local processor of the NIC 3120 may be capable of performing one or more of the functions of the compute circuitry 3102 described herein. Additionally, or alternatively, in such examples, the local memory of the NIC 3120 may be integrated into one or more components of the client compute node at the board level, socket level, chip level, and/or other levels. Additionally or alternatively, the communication circuitry 3112 may include one or more transceivers (TRx) 3121, each of which include various hardware devices/components such as baseband processor(s), switches, filters, amplifiers, antenna elements, and the like to facilitate communications over an air interface.

Additionally, in some examples, a respective compute node 3100 may include one or more peripheral devices 3114. Such peripheral devices 3114 may include any type of peripheral device found in a compute device or server such as audio input devices, a display, other input/output devices, interface devices, and/or other peripheral devices, depending on the particular type of the compute node 3100. In further examples, the compute node 3100 may be embodied by a respective edge compute node in an edge computing system (e.g., client compute node, edge gateway node, edge aggregation node, V-ITS-Ss discussed previous, etc.) or like forms of appliances, computers, subsystems, circuitry, or other components.

FIG. 32 illustrates an example of components that may be present in an edge computing node 3250 for implementing the techniques (e.g., operations, processes, methods, and methodologies) described herein. The edge computing node 3250 may correspond to the UEs 1211, 1221*a*, NANs 1231-1233, edge compute node(s) 1236, CN 1242 (or compute node(s) therein), and/or cloud 1244 (or compute node(s) therein) of FIG. 12; edge cloud 1310 (or systems/devices therein), central office 1320 (or systems/devices therein), NAN 1340, processing hub 1350, and/or end point devices 1360 of FIG. 13; use case devices 1405, network equipment (nodes) 1415, equipment 1425 of FIG. 14; client endpoints 1510, on-premise network system 1532, access point 1534, aggregation points 1542, 1544, edge aggregation nodes 1540, and/or data center 1560 (or systems/devices therein) of FIG. 15; devices 1610, edge nodes 1622, 1624 and/or cloud/data center 1640 of FIG. 16; container managers 1711, 1721, container orchestrator 1731, and/or compute nodes 1715, 1723 of FIG. 17; client compute nodes 1810, edge gateway devices 1820, edge resource nodes 1840, NAN 1842, core data center 1850 (or systems/devices therein) of FIG. 18; UE 2101, EES 2155, and/or ECS 2160 of FIG. 21; UE 2420, MEC host 2402 (or systems/devices therein), MEC platform 2432, OSS 2412 (or systems/devices therein) of FIG. 24; MEC platform 2810 of FIG. 28; software distribution platform 3005 and/or processor platform(s) 3000 of FIG. 30; compute node 3100 of FIG. 31; and/or any other component, device, and/or system discussed herein.

The edge computing node 3250 provides a closer view of the respective components of node 3100 when implemented as or as part of a computing device (e.g., as a mobile device, a base station, server, gateway, appliance, edge compute node, etc.). The edge computing node 3250 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the edge computing node 3250, or as components otherwise incorporated within a chassis of a larger system.

The edge computing node 3250 includes processing circuitry in the form of one or more processors 3252. The processor circuitry 3252 includes circuitry such as, but not limited to one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 3252 may include one or more hardware accelerators (e.g., same or similar to acceleration circuitry 3264), which may be microprocessors, programmable processing devices (e.g., FPGA, ASIC, etc.), or the like. The one or more accelerators may include, for example, computer vision and/or deep learning accelerators. In some implementations, the processor circuitry 3252 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 3252 may be, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, an xPU/DPU/IPU/NPU, special purpose processing unit, specialized processing unit, or any other known processing elements, or any suitable combination thereof. The processors (or cores) 3252 may be coupled with or may include memory/storage and may be configured to execute instructions stored in the memory/storage to enable various applications or operating systems to run on the platform 3250. The processors (or cores) 3252 is configured to operate application software to provide a specific service to a user of the platform 3250. Additionally or alternatively, the processor(s) 3252 may be a special-purpose processor(s)/controller(s) configured (or configurable) to operate according to the elements, features, and implementations discussed herein.

As examples, the processor(s) 3252 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 3252 may be a part of a system on a chip (SoC), System-in-Package (SiP), a multi-chip package (MCP), and/or the like, in which the processor(s) 3252 and other components are formed into a single integrated circuit, or a single package, such as the Edison™ or Galileo™ SoC boards from Intel® Corporation. Other examples of the processor(s) 3252 are mentioned elsewhere in the present disclosure.

The processor(s) 3252 may communicate with system memory 3254 over an interconnect (IX) 3256. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 3258 may also couple to the processor 3252 via the IX 3256. In an example, the storage 3258 may be implemented via a solid-state disk drive (SSDD) and/or high-speed electrically erasable memory (commonly referred to as "flash memory"). Other devices that may be used for the storage 3258 include flash memory cards, such as SD cards, microSD cards, eXtreme Digital (XD) picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 3254 and/or storage circuitry 3258 may also incorporate three-dimensional (3D) cross-point (XPOINT) memories from Intel® and Micron®.

In low power implementations, the storage 3258 may be on-die memory or registers associated with the processor 3252. However, in some examples, the storage 3258 may be implemented using a micro hard disk drive (HDD). Further, any number of new technologies may be used for the storage 3258 in addition to, or instead of, the technologies described, such resistance change memories, phase change memories, holographic memories, or chemical memories, among others.

The components of edge computing device 3250 may communicate over an interconnect (IX) 3256. The IX 3256 may include any number of technologies, including ISA, extended ISA, I2C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, PROFIBUS, and/or any number of other IX technologies. The IX 3256 may be a proprietary bus, for example, used in a SoC based system.

The IX 3256 couples the processor 3252 to communication circuitry 3266 for communications with other devices, such as a remote server (not shown) and/or the connected edge devices 3262. The communication circuitry 3266 is a hardware element, or collection of hardware elements, used to communicate over one or more networks (e.g., cloud 3263) and/or with other devices (e.g., edge devices 3262). The collection of hardware elements include hardware devices such as baseband circuitry **326*x***, switches, filters, amplifiers, antenna elements, and the like to facilitate OTA communications).

The transceiver 3266 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 3262. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The communication circuitry 3266 (or multiple transceivers 3266) may communicate using multiple standards or radios for communications at a different range. For example, the communication circuitry 3266 may include short-range RAT circuitry **326*y* to communicate with relatively close devices (e.g., within about 10 meters) based on BLE, or another low power radio, to save power. More distant connected edge devices 3262 (e.g., within about 50 meters) may be reached over ZigBee® circuitry 326*y* and/or other intermediate power radios 326*y*. Both communications techniques may take place over a single radio 326*y* at different power levels or may take place over separate transceivers 326*y*, for example, a local transceiver 326*y* using BLE and a separate mesh transceiver 326*y*** using ZigBee®.

A wireless network transceiver **326*z* may be included to communicate with devices or services in the edge cloud 3263 via local or wide area network protocols. The wireless network transceiver 326*z* may be an LPWA transceiver that follows the IEEE 802.15.4, or IEEE 802.15.4g standards, among others. The edge computing node 3250** may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver **326*z*, as described herein. For example, the transceiver 326*z* may include a cellular transceiver that uses spread spectrum (SPA/SAS) communications for implementing high-speed communications. Further, any number of other protocols may be used, such as Wi-Fi® networks for medium speed communications and provision of network communications. The transceiver 326*z*** may include radios that are compatible with any number of 3GPP specifications, such as LTE and 5G/NR communication systems, discussed in further detail at the end of the present disclosure.

A network interface controller (NIC) 3268 may be included to provide a wired communication to nodes of the edge cloud 3263 or to other devices, such as the connected edge devices 3262 (e.g., operating in a mesh). The wired communication may provide an Ethernet connection or may be based on other types of networks, such as Controller Area Network (CAN), Local Interconnect Network (LIN), DeviceNet, ControlNet, Data Highway+, or PROFINET, among many others. An additional NIC 3268 may be included to enable connecting to a second network, for example, a first NIC 3268 providing communications to the cloud over Ethernet, and a second NIC 3268 providing communications to other devices over another type of network.

Given the variety of types of applicable communications from the device to another component or network, applicable communications circuitry used by the device may include or be embodied by any one or more of components 3264, 3266, 3268, or 3270. Accordingly, in various examples, applicable means for communicating (e.g., receiving, transmitting, etc.) may be embodied by such communications circuitry.

The edge computing node 3250 may include or be coupled to acceleration circuitry 3264, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include AI processing (including machine learning, training, inferencing, and classification operations), visual data processing, network data processing, object detection, rule analysis, or the like. In FPGA-based implementations, the acceleration circuitry 3264 may comprise logic blocks or logic fabric and other interconnected resources that may be programmed (configured) to perform various functions, such as the procedures, methods, functions, etc. discussed herein. In such implementations, the acceleration circuitry 3264 may also include memory cells (e.g., EPROM, EEPROM, flash memory, static memory (e.g., SRAM, anti-fuses, etc.) used to store logic blocks, logic fabric, data, etc. in LUTs and the like.

The IX 3256 also couples the processor 3252 to a sensor hub or external interface 3270 that is used to connect additional devices or subsystems. The additional/external devices may include sensors 3272, actuators 3274, and positioning circuitry 3275.

The sensor circuitry 3272 includes devices, modules, or subsystems whose purpose is to detect events or changes in its environment and send the information (sensor data) about the detected events to some other a device, module, subsystem, etc. Examples of such sensors 3272 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

The actuators 3274, allow platform 3250 to change its state, position, and/or orientation, or move or control a mechanism or system. The actuators 3274 comprise electrical and/or mechanical devices for moving or controlling a mechanism or system, and converts energy (e.g., electric current or moving air and/or liquid) into some kind of motion. The actuators 3274 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 3274 may include one or more electromechanical devices such as pneumatic actuators, hydraulic actuators, electromechanical switches including electromechanical relays (EMRs), motors (e.g., DC motors, stepper motors, servomechanisms, etc.), power switches, valve actuators, wheels, thrusters, propellers, claws, clamps, hooks, audible sound generators, visual warning devices, and/or other like electromechanical components. The platform 3250 may be configured to operate one or more actuators 3274 based on one or more captured events and/or instructions or control signals received from a service provider and/or various client systems The positioning circuitry 3275 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 3275 comprises various hardware elements (e.g., including hardware devices such as switches, filters, amplifiers, antenna elements, and the like to facilitate OTA communications) to communicate with components of a positioning network, such as navigation satellite constellation nodes. Additionally or alternatively, the positioning circuitry 3275 may include a Micro-Technology for Positioning, Navigation, and Timing (Micro-PNT) IC that uses a master timing clock to perform position tracking/estimation without GNSS assistance. The positioning circuitry 3275 may also be part of, or interact with, the communication circuitry 3266 to communicate with the nodes and components of the positioning network. The positioning circuitry 3275 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 3275 is, or includes an INS, which is a system or device that uses sensor circuitry 3272 (e.g., motion sensors such as accelerometers, rotation sensors such as gyroscopes, and altimimeters, magnetic sensors, and/or the like to continuously calculate (e.g., using dead by dead reckoning, triangulation, or the like) a position, orientation, and/or velocity (including direction and speed of movement) of the platform 3250 without the need for external references.

In some optional examples, various input/output (I/O) devices may be present within or connected to, the edge computing node 3250, which are referred to as input circuitry 3286 and output circuitry 3284 in FIG. 32. The input circuitry 3286 and output circuitry 3284 include one or more user interfaces designed to enable user interaction with the platform 3250 and/or peripheral component interfaces designed to enable peripheral component interaction with the platform 3250. Input circuitry 3286 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 3284 may be included to show information or otherwise convey information, such as sensor readings, actuator position(s), or other like information. Data and/or graphics may be displayed on one or more user interface components of the output circuitry 3284. Output circuitry 3284 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 3250. The output circuitry 3284 may also include speakers or other audio emitting devices, printer(s), and/or the like. Additionally or alternatively, the sensor circuitry 3272 may be used as the input circuitry 3284 (e.g., an image capture device, motion capture device, or the like) and one or more actuators 3274 may be used as the output device circuitry 3284 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 3276 may power the edge computing node 3250, although, in examples in which the edge computing node 3250 is mounted in a fixed location, it may have a power supply coupled to an electrical grid, or the battery may be used as a backup or for temporary capabilities. The battery 3276 may be a lithium ion battery, or a metal-air battery (e.g., a zinc-air battery, an aluminum-air battery, a lithium-air battery, etc.), one or more capacitors, and the like.

A battery monitor/charger 3278 may be included in the edge computing node 3250 to track the state of charge (SoCh) of the battery 3276, if included. The battery monitor/charger 3278 may be used to monitor other parameters of the battery 3276 to provide failure predictions, such as the state of health (SoH) and the state of function (SoF) of the battery 3276. The battery monitor/charger 3278 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 3278 may communicate the information on the battery 3276 to the processor 3252 over the IX 3256. The battery monitor/charger 3278 may also include an analog-to-digital (ADC) converter that enables the processor 3252 to directly monitor the voltage of the battery 3276 or the current flow from the battery 3276. The battery parameters may be used to determine actions that the edge computing node 3250 may perform, such as transmission frequency, mesh network operation, sensing frequency, and the like. In some implementations, the battery 3276 and/or battery monitor/charger 3278 can be divided into different power domains depending on use case/implementation, where different batteries 3276 are used for different power domains and each power domain may power different components/devices of the edge computing node 3250.

A power block 3280, or other power supply coupled to a grid, may be coupled with the battery monitor/charger 3278 to charge the battery 3276. In some examples, the power block 3280 may be replaced with a wireless power receiver to obtain the power wirelessly, for example, through a loop antenna in the edge computing node 3250. A wireless battery charging circuit, such as an LTC4020 chip from Linear Technologies of Milpitas, California, among others, may be included in the battery monitor/charger 3278. The specific charging circuits may be selected based on the size of the battery 3276, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 3258 may include instructions 3282 in the form of software, firmware, or hardware commands to implement the techniques described herein. Although such instructions 3282 are shown as code blocks included in the memory 3254 and the storage 3258, it may be understood that any of the code blocks may be replaced with hardwired circuits, for example, built into an application specific integrated circuit (ASIC).

In an example, the instructions 3282 provided via the memory 3254, the storage 3258, or the processor 3252 may be embodied as a non-transitory, machine-readable medium 3260 including code to direct the processor 3252 to perform electronic operations in the edge computing node 3250. The processor 3252 may access the non-transitory, machine-readable medium 3260 over the IX 3256. For instance, the non-transitory, machine-readable medium 3260 may be embodied by devices described for the storage 3258 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The non-transitory, machine-readable medium 3260 may include instructions to direct the processor 3252 to perform a specific sequence or flow of actions, for example, as described with respect to the flowchart(s) and block diagram(s) of operations and functionality depicted above. the terms "machine-readable medium" and "computer-readable medium" are interchangeable. the term "non-transitory computer-readable medium" is expressly defined to include any type of computer readable storage device and/or storage disk and to exclude propagating signals and to exclude transmission media.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

The illustrations of FIGS. 31 and 32 are intended to depict a high-level view of components of a varying device, subsystem, or arrangement of an edge computing node. However, it will be understood that some of the components shown may be omitted, additional components may be present, and a different arrangement of the components shown may occur in other implementations. Further, these arrangements are usable in a variety of use cases and environments, including those discussed below (e.g., a mobile UE in industrial compute for smart city or smart factory, among many other examples).

The respective compute platforms of FIGS. 31 and 32 may support multiple edge instances (e.g., edge clusters) by use of tenant containers running on a single compute platform. Likewise, multiple edge nodes may exist as subnodes running on tenants within the same compute platform. Accordingly, based on available resource partitioning, a single system or compute platform may be partitioned or divided into supporting multiple tenants and edge node instances, each of which may support multiple services and functions—even while being potentially operated or controlled in multiple compute platform instances by multiple owners. These various types of partitions may support complex multi-tenancy and many combinations of multi-stakeholders through the use of an LSM or other implementation of an isolation/security policy. References to the use of an LSM and security features which enhance or implement such security features are thus noted in the following sections. Likewise, services and functions operating on these various types of multi-entity partitions may be load-balanced, migrated, and orchestrated to accomplish necessary service objectives and operations.

FIGS. 31 and 32 depict examples of edge computing systems and environments that may fulfill any of the compute nodes or devices discussed herein. Respective edge compute nodes may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

3. EXAMPLE IMPLEMENTATIONS

Figure 33:
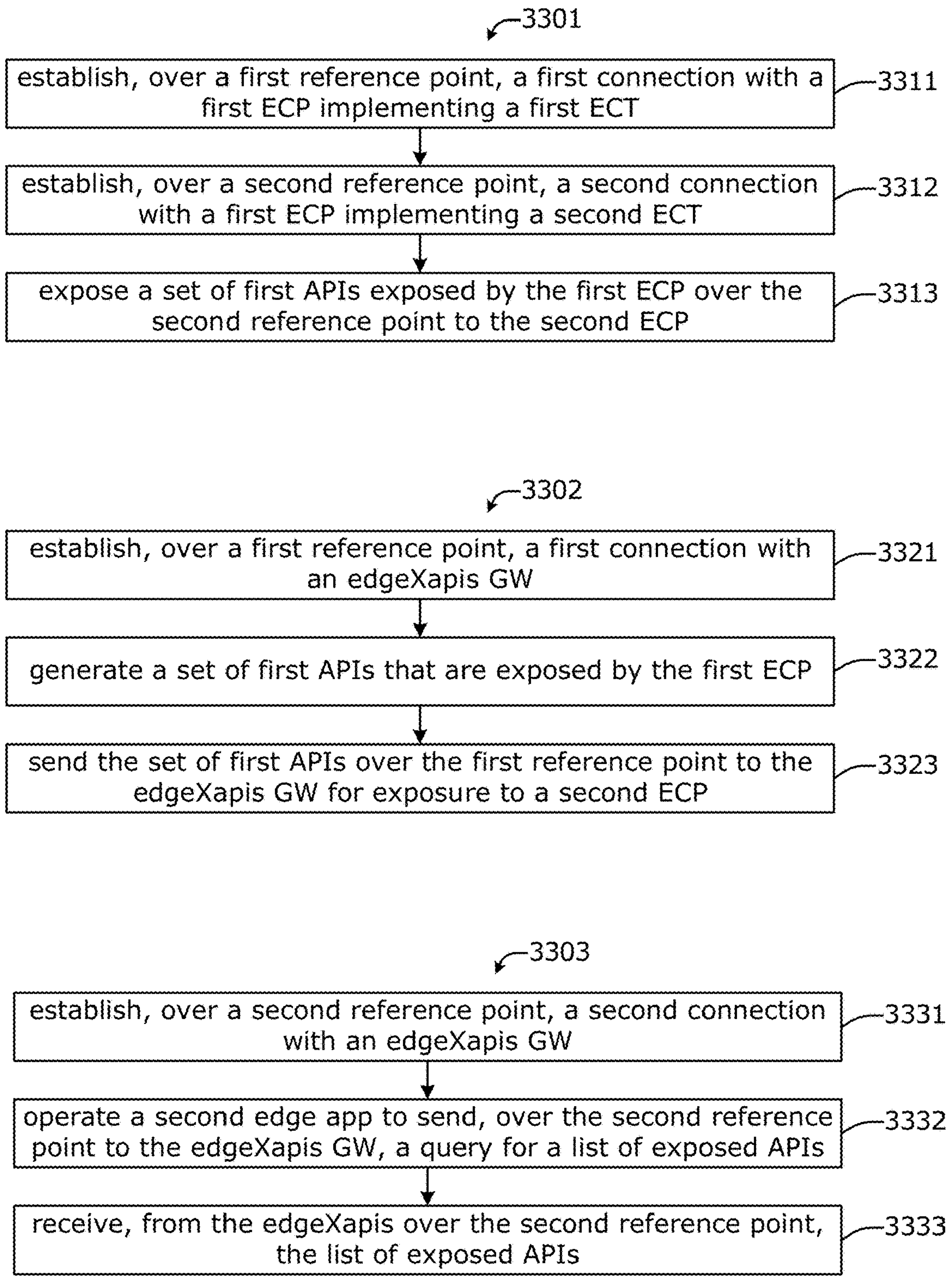
FIG. 33 depicts various processes for practicing the various embodiments discussed herein.

FIG. 33 shows processes 3301, 3302, and 3303 that may be used to practice the various embodiments discussed herein. Process 3301 is a process for operating an edgeXapis GW 710, which includes operation 3311 where the edgeXapis GW 710 establishes, over a first reference point, a first connection with a first edge computing platform (ECP) implementing a first edge computing technology (ECT). The edgeXapis GW 710 may use the established first connection to communicate with the first ECP. At operation 3312, the edgeXapis GW 710 establishes, over a second reference point, a second connection with a second ECP implementing a second ECT different than the first ECT. At operation 3313, the edgeXapis GW 710 exposes, to the second ECP over the second reference point, a set of first APIs exposed by the first ECP. The edgeXapis GW 710 uses the established second connection to communicate the set of first APIs to the second ECP.

Process 3302 is a process for operating a first ECP implementing a first ECT, which includes operation 3321 where the first ECP establishes, over a first reference point, a first connection with an edgeXapis GW 710. At operation 3322, the first ECP generates a set of first APIs that are exposed by the first ECP. At operation 3323, the first ECP sends, over the first reference point, the set of first APIs exposed by the first ECP for exposure of the set of first APIs to a second ECT different than the first ECT by the edgeXapis GW. The first ECP may use the established first connection to communicate the set of first APIs to the edgeXapis GW 710, and the edgeXapis GW 710 may use an established second connection with a second ECP to communicate and expose the set of first APIs to the second ECP.

Process 3303 is a process for operating a second ECP implementing a second ECT, which includes operation 3331 where the second ECP establishes, over a second reference point, a second connection with an edgeXapis GW 710. The edgeXapis GW 710 also establishes a first connection with a first ECP implementing a first ECT different than the second ECT. At operation 3332, the second ECP operates a second edge app to send, over the second reference point to the edgeXapis GW 710, a query for a list of exposed APIs. At operation 3333, the second ECP receives, over the second reference point from the edgeXapis GW710, the list of exposed APIs. The list of exposed APIs include a set of first APIs exposed by the first ECP and a set of second APIs exposed by the second ECP. The second ECP may use the established second connection to obtain the list of exposed APIs from the edgeXapis GW 710, and the edgeXapis GW 710 may use an established first connection with the first ECP to obtain the set of first APIs from the first ECP.

In one example of processes 3301, 3302, and 3303, the first ECP is a MEC platform 2422 in a MEC framework 2400. Additionally or alternatively, the second ECP is an EES 2155 in a 3GPP Edge Computing framework 2100, the second edge app is an EAS 2150, and the MEC platform 2422 implements a MEC app 2426 employed as an application server. Additionally or alternatively, the MEC platform 2422 and the EES 2155 are configured to communicate with one another over an Mp1 interface and/or an EDGE-3 reference point.

In another example of processes 3301, 3302, and 3303, the first ECP is an EES 2155 in a 3GPP Edge Computing framework 2100 and the second ECP is a MEC platform 2422 in a MEC framework 2400. Additionally or alternatively, the EES 2155 is configured to operated an EAS 2150 and the second edge app is a MEC app 2426 employed as an application server.

Additionally or alternatively to the aforementioned examples of processes 3301, 3302, and 3303, the edgeXapis GW 710 is included in, or connected with a CAPIF 400, and the edgeXapis GW 710 is configured to communicate with the first ECP and/or the second ECP via a CAPIF-2e reference point, a CAPIF-3e reference point, and/or a CAPIF-7e reference point. Additionally or alternatively, the edgeXapis GW 710 is included in a CCF 405. Alternatively, the edgeXapis GW 710 outside the CCF 405 and communicatively coupled with the CCF 405. Additionally or alternatively, the first ECP is configured to act as a CAPIF AEF 401. Additionally or alternatively, the first reference point is a CAPIF-1e reference point or a CAPIF-3e reference point. Additionally or alternatively, the second reference point is a CAPIF-1 reference point or a CAPIF-3 reference point.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 includes a method of operating an edge application programming interface service (edgeXapis) gateway (GW), the method comprising: establishing, over a first reference point, a first connection with a first edge computing platform (ECP) implementing a first edge computing technology (ECT); establishing, over a second reference point, a second connection with a second ECP implementing a second ECT different than the first ECT; and exposing, to the second ECP over the second reference point, a set of first application programming interfaces (APIs) exposed by the first ECP.

Example 2 includes the method of example 1 and/or some other example(s) herein, wherein establishing the first connection with the first ECP comprises: receiving, from the first ECP over the first reference point, the set of first APIs exposed by the first ECP.

Example 3 includes the method of examples 1-2 and/or some other example(s) herein, wherein establishing the first connection with the first ECP comprises: authenticate and verify the first ECP using an authentication and attestation mechanism.

Example 4 includes the method of example 3 and/or some other example(s) herein, further comprising: authenticate and verify requests received from the first ECP using the authentication and attestation mechanism.

Example 5 includes the method of examples 3-4 and/or some other example(s) herein, wherein the authentication and attestation mechanism is one or both of OAuth2 and Transport Layer Security (TLS).

Example 6 includes the method of examples 1-5 and/or some other example(s) herein, wherein establishing the second connection with the second ECP comprises: receiving, over the second reference point from a second edge application (app) implemented by the second ECP, a query for a list of exposed APIs; generating the list of exposed APIs, the list of exposed APIs including the set of first APIs exposed by the first ECP and a set of second APIs exposed by the second ECP; and sending, over the second reference point to the second edge app, the list of exposed APIs.

Example 7 includes the method of example 6 and/or some other example(s) herein, further comprising: updating a list of edge apps having access to the list of exposed APIs to include the second edge app; and sending the list of edge apps to the first ECP over the first reference point.

Example 8 includes the method of examples 6-7 and/or some other example(s) herein, wherein the second edge app is capable of obtaining first transport information from the first ECP, wherein the first transport information indicates transport protocols supported by the first ECP.

Example 9 includes the method of examples 2-7 and/or some other example(s) herein, wherein establishing the first connection with the first ECP further comprises: receiving first transport information from the first ECP over the first reference point when the first ECP exposes the set of first APIs to the edgeXapis GW, wherein the first transport information indicates transport protocols supported by the first ECP.

Example 10 includes the method of example 9 and/or some other example(s) herein, further comprising: exposing, to the second ECP over the second reference point, the first transport information when exposing the set of first APIs to the second ECP.

Example 11 includes the method of examples 8-10 and/or some other example(s) herein, wherein the second edge app is capable of invoking any advertised API in the list of exposed APIs.

Example 12 includes the method of example 11 and/or some other example(s) herein, wherein the second edge app is capable of communicating with a first edge app implemented by the first ECP over a third reference point using a transport protocol defined by the invoked API.

Example 13 includes a method of operating a first edge computing platform (ECP) implementing a first edge computing technology (ECT), the method comprising: establishing, over a first reference point, a first connection with an edge application programming interface service (edgeXapis) gateway (GW); generating a set of first application programming interfaces (APIs) exposed by the first ECP; and sending, by the first ECP over the first reference point, the set of first APIs exposed by the first ECP for exposure of the set of first APIs to a second ECT different than the first ECT by the edgeXapis GW.

Example 14 includes the method of example 13 and/or some other example(s) herein, wherein the edgeXapis GW is to establish a second connection with the second ECP over a second reference point, and expose the set of first APIs to the second ECP over the second reference point.

Example 15 includes the method of examples 13-14 and/or some other example(s) herein, wherein the edgeXapis GW is to authenticate and verify the first ECP using an authentication and attestation mechanism.

Example 16 includes the method of example 15 and/or some other example(s) herein, wherein the edgeXapis GW is to authenticate and verify requests received from the first ECP using the authentication and attestation mechanism.

Example 17 includes the method of examples 15-16 and/or some other example(s) herein, wherein the authentication and attestation mechanism is one or both of OAuth2 and Transport Layer Security (TLS).

Example 18 includes the method of examples 14-17 and/or some other example(s) herein, wherein the edgeXapis GW is to receive a query for a list of exposed APIs over the second reference point from a second edge application (app) implemented by the second ECP, generate the list of exposed APIs, the list of exposed APIs including the set of first APIs exposed by the first ECP and a set of second APIs exposed by the second ECP, and send the list of exposed APIs over the second reference point to the second edge app.

Example 19 includes the method of example 18 and/or some other example(s) herein, wherein the edgeXapis GW is further to update a list of edge apps having access to the list of exposed APIs to include the second edge app, and send the list of edge apps to the first ECP over the first reference point.

Example 20 includes the method of examples 18-19 and/or some other example(s) herein, further comprising: implementing a first edge app to act as an application server.

Example 21 includes the method of examples 18-20 and/or some other example(s) herein, further comprising: generating first transport information including information about transport protocols supported by the first ECP; and sending the first transport information over the second reference point to the second edge app.

Example 22 includes the method of examples 13-20 and/or some other example(s) herein, wherein establishing the first connection with the edgeXapis GW further comprises: generating first transport information including information about transport protocols supported by the first ECP; and sending the first transport information over the first reference point when exposing the set of first APIs to the edgeXapis GW.

Example 23 includes the method of example 22 and/or some other example(s) herein, wherein the edgeXapis GW is to expose the first transport information to the second ECP over the second reference point when the edgeXapis GW exposes the set of first APIs to the second ECP.

Example 24 includes the method of examples 18-23 and/or some other example(s) herein, wherein the second edge app is capable of invoking any advertised API in the list of exposed APIs.

Example 25 includes the method of example 24 and/or some other example(s) herein, wherein the second edge app is capable of communicating with a first edge app implemented by the first ECP over a third reference point using a transport protocol defined by the invoked API.

Example 26 includes a method of operating a second edge computing platform (ECP) implementing a second edge computing technology (ECT), the method comprising: establishing, over a second reference point, a second connection with an edge application programming interface service (edgeXapis) gateway (GW), wherein the edgeXapis GW is to establish a first connection with a first ECP implementing a first ECT different than the second ECT; operating a second edge application (app) to send a query for a list of exposed application programming interfaces (APIs) over the second reference point to the edgeXapis GW; and receiving, over the second reference point from the edgeXapis GW, the list of exposed APIs, the list of exposed APIs including a set of first APIs exposed by the first ECP and a set of second APIs exposed by the second ECP.

Example 27 includes the method of example 26 and/or some other example(s) herein, wherein the edgeXapis GW is to receive the set of first APIs exposed by the first ECP from the first ECP over the first reference point.

Example 28 includes the method of examples 26-27 and/or some other example(s) herein, wherein the edgeXapis GW is further to authenticate and verify the first ECP using an authentication and attestation mechanism.

Example 29 includes the method of example 28 and/or some other example(s) herein, wherein the edgeXapis GW is further to authenticate and verify requests received from the first ECP using the authentication and attestation mechanism.

Example 30 includes the method of examples 28-29 and/or some other example(s) herein, wherein the authentication and attestation mechanism is one or both of OAuth2 and Transport Layer Security (TLS).

Example 31 includes the method of examples 26-30 and/or some other example(s) herein, wherein the edgeXapis GW is further to update a list of edge apps having access to the list of exposed APIs to include the second edge app, and send the list of edge apps to the first ECP over the first reference point.

Example 32 includes the method of examples 26-31 and/or some other example(s) herein, further comprising: operating the second edge app to obtain first transport information from the first ECP, wherein the first transport information indicates transport protocols supported by the first ECP.

Example 33 includes the method of examples 26-31 and/or some other example(s) herein, wherein the edgeXapis GW is further to receive first transport information from the first ECP over the first reference point when the first ECP exposes the set of first APIs to the edgeXapis GW, wherein the first transport information indicates transport protocols supported by the first ECP.

Example 34 includes the method of example 33 and/or some other example(s) herein, further comprising: obtaining the first transport information from the edgeXapis GW over the second reference point when the set of first APIs is exposed to the second ECP.

Example 34 includes the method of examples 33-34 and/or some other example(s) herein, further comprising: operating the second edge app to invoke an advertised API in the list of exposed APIs.

Example 35 includes the method of example 34 and/or some other example(s) herein, further comprising: operating the second edge app to communicate with a first edge app implemented by the first ECP over a third reference point using a transport protocol defined by the invoked API.

Example 36 includes the method of examples 12, 25, and 35 and/or some other example(s) herein, wherein the first ECP is a Multi-access Edge Computing (MEC) platform in a MEC framework, and the third reference point is an Mp1 interface.

Example 37 includes the method of example 36 and/or some other example(s) herein, wherein the second ECP is an Edge Enabler Server (EES) in a Third Generation Partnership Project (3GPP) Edge Computing framework, the second edge app is an Edge Application Server (EAS), and the first edge app is a MEC app employed as an application server.

Example 38 includes the method of examples 12, 25, and 35 and/or some other example(s) herein, wherein the first ECP is an EES in a 3GPP Edge Computing framework, and the third reference point is an EDGE-3 reference point.

Example 39 includes the method of example 38 and/or some other example(s) herein, wherein the second ECP is a MEC platform in a MEC framework, the first edge app is an EAS, and the second edge app is a MEC app employed as an application server.

Example 40 includes the method of examples 12, 25, and 35 and/or some other example(s) herein, wherein the edgeXapis GW is included in, or connected with a common API framework (CAPIF), and the third reference point is a CAPIF-2e reference point, a CAPIF-3e reference point, or a CAPIF-7e reference point.

Example 41 includes the method of examples 1-40 and/or some other example(s) herein, wherein the edgeXapis GW is included in, or connected with a CAPIF, and the first ECP acts as a CAPIF API Exposure Function (AEF).

Example 42 includes the method of example 41 and/or some other example(s) herein, wherein the edgeXapis GW is part of CAPIF Core Function (CCF) of the CAPIF.

Example 43 includes the method of example 41 and/or some other example(s) herein, wherein the edgeXapis GW is outside of a CCF of the CAPIF.

Example 44 includes the method of examples 42-43 and/or some other example(s) herein, wherein a first ECP configuration of the first ECP includes a root uniform resource locator (URL) of the CCF.

Example 45 includes the method of examples 41-44 and/or some other example(s) herein, wherein the first reference point is a CAPIF-1e reference point or a CAPIF-3e reference point.

Example 46 includes the method of examples 41-45 and/or some other example(s) herein, wherein the second reference point is a CAPIF-1 reference point or a CAPIF-3 reference point.

Example 47 includes a method for implementing functionalities and APIs compliant to two or more systems implementing respective edge computing and/or wireless communication standards.

Example 48 includes the method of example 47 and/or some other example(s) herein, further comprising: a definition of a edgeXapis GW, as a function enabling interoperable and secure communication via attestation, and supporting the connection between the two or more systems.

Example 49 includes the method of examples 47-48 and/or some other example(s) herein, further comprising: exposing a full list of APIs from the two or more systems to Edge Apps by means of signaling (supported by the edgeXapis GW function) CAPIF Core Function and the MEC platform.

Example 50 includes the method of examples 47-49 and/or some other example(s) herein, further comprising: providing interoperable edge service consumption from the two or more systems, including APIs exposed from both systems.

Example 51 includes the method of examples 47-50 and/or some other example(s) herein, further comprising: making available to EASs alternative transport protocols for the MEC APIs service consumption.

Example 52 includes one or more computer readable media comprising instructions, wherein execution of the instructions by processor circuitry is to cause the processor circuitry to perform the method of any one of examples 1-51. Example 53 includes a computer program comprising the instructions of example 52. Example 54 includes an Application Programming Interface defining functions, methods, variables, data structures, and/or protocols for the computer program of example 53. Example 55 includes an apparatus comprising circuitry loaded with the instructions of example 52. Example 56 includes an apparatus comprising circuitry operable to run the instructions of example 52. Example 57 includes an integrated circuit comprising one or more of the processor circuitry of example 52 and the one or more computer readable media of example 52. Example 58 includes a computing system comprising the one or more computer readable media and the processor circuitry of example 52. Example 58 includes an apparatus comprising means for executing the instructions of example 52. Example 60 includes a signal generated as a result of executing the instructions of example 52. Example 61 includes a data unit generated as a result of executing the instructions of example 52. Example 62 includes the data unit of example 56, wherein the data unit is a datagram, network packet, data frame, data segment, a PDU, a service data unit, "SDU", a message, or a database object. Example 63 includes a signal encoded with the data unit of example 61 or 62. Example 64 includes an electromagnetic signal carrying the instructions of example 52. Example 65 includes an apparatus comprising means for performing the method of any one of examples 1-51.

An example implementation is an edge computing system, including respective edge processing devices and nodes to invoke or perform the operations of examples XYZ, or other subject matter described herein. Another example implementation is a client endpoint node, operable to invoke or perform the operations of examples XYZ, or other subject matter described herein. Another example implementation is an aggregation node, network hub node, gateway node, or core data processing node, within or coupled to an edge computing system, operable to invoke or perform the operations of examples XYZ, or other subject matter described herein. Another example implementation is an access point, base station, road-side unit, street-side unit, or on-premise unit, within or coupled to an edge computing system, operable to invoke or perform the operations of examples XYZ, or other subject matter described herein. Another example implementation is an edge provisioning node, service orchestration node, application orchestration node, or multi-tenant management node, within or coupled to an edge computing system, operable to invoke or perform the operations of examples XYZ, or other subject matter described herein.

Another example implementation is an edge node operating an edge provisioning service, application or service orchestration service, virtual machine deployment, container deployment, function deployment, and compute management, within or coupled to an edge computing system, operable to invoke or perform the operations of examples XYZ, or other subject matter described herein. Another example implementation is an edge computing system operable as an edge mesh, as an edge mesh with side car loading, or with mesh-to-mesh communications, operable to invoke or perform the operations of examples XYZ, or other subject matter described herein. Another example implementation is an edge computing system including aspects of network functions, acceleration functions, acceleration hardware, storage hardware, or computation hardware resources, operable to invoke or perform the use cases discussed herein, with use of examples XYZ, or other subject matter described herein. Another example implementation is an edge computing system adapted for supporting client mobility, vehicle-to-vehicle (V2V), vehicle-to-everything (V2X), or vehicle-to-infrastructure (V2I) scenarios, and optionally operating according to ETSI MEC specifications, operable to invoke or perform the use cases discussed herein, with use of examples XYZ, or other subject matter described herein. Another example implementation is an edge computing system adapted for mobile wireless communications, including configurations according to an 3GPP 4G/LTE or 5G network capabilities, operable to invoke or perform the use cases discussed herein, with use of examples XYZ, or other subject matter described herein. Another example implementation is an edge computing system adapted for operating according to 0-RAN specifications, operable to invoke or perform the use cases discussed herein, with use of examples XYZ, or other subject matter described herein.

Example Z01 includes an apparatus comprising means to perform one or more elements of a method described in or related to any of examples XYZ, or any other method or process described herein. Example Z02 includes one or more non-transitory computer-readable media comprising instructions, wherein execution of the instructions by an electronic device is operable to cause the electronic device to perform one or more elements of a method described in or related to any of examples XYZ, and/or any other method or process described herein. Example Z03 includes a computer program comprising instructions, wherein execution of the program by a processing element is operable to cause the processing element to carry out the method, techniques, or process as described in or related to any of examples XYZ, and/or portions thereof. Example Z04 includes an apparatus comprising logic, modules, or circuitry to perform one or more elements of a method described in or related to any of examples XYZ, and/or any other method or process described herein. Example Z05 includes an apparatus configured to perform one or more elements of a method described in or related to any of examples XYZ, and/or any other method or process described herein.

Example Z06 includes a method, technique, or process as described in or related to any of examples XYZ, and/or portions or parts thereof. Example Z07 includes an apparatus comprising: processor circuitry and computer-readable media comprising instructions, wherein the one or more processors are configurable to perform the method, techniques, or process as described in or related to any of examples XYZ, and/or portions thereof. Example Z08 includes a signal as described in or related to any of examples XYZ, and/or portions or parts thereof. Example Z09 includes a datagram, packet, frame, segment, protocol data unit (PDU), or message as described in or related to any of examples XYZ, or portions or parts thereof, and/or otherwise described in the present disclosure. Example Z10 includes a signal encoded with a datagram, packet, frame, segment, PDU, or message as described in or related to any of examples XYZ, or portions or parts thereof, or otherwise described in the present disclosure.

Example Z11 includes a signal encoded with data as described in or related to any of examples XYZ, or portions or parts thereof, or otherwise described in the present disclosure. Example Z12 includes an electromagnetic signal carrying computer-readable instructions, wherein execution of the computer-readable instructions by one or more processors is operable or configurable to cause the one or more processors to perform a method, technique, or process as described in or related to any of examples XYZ, or portions thereof. Example Z13 includes an API or specification defining functions, methods, variables, data structures, protocols, etc., defining or involving use of any of examples XYZ or portions thereof, or otherwise related to any of examples XYZ or portions thereof. Example Z14, includes a Multi-access Edge Computing (MEC) host executing a service as part of one or more MEC applications instantiated on a virtualization infrastructure, the service being related to any of examples XYZ or portions thereof, and wherein the MEC host is configured to operate according to a standard from one or more ETSI MEC standards families. Example Z15 includes a signal in a wireless network as shown and described herein. Example Z16 includes a method of communicating in a wireless network as shown and described herein. Example Z17 includes a system for providing wireless communication as shown and described herein. Example Z18 includes a device for providing wireless communication as shown and described herein.

4. TERMINOLOGY

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," each of which may refer to one or more of the same or different embodiments. Furthermore, the terms "comprising," "including," "having," and the like, as used with respect to the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" at least in some embodiments refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an ASIC, a FPGA, programmable logic controller (PLC), SoC, SiP, multi-chip package (MCP), DSP, etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis)

may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

The term "processor circuitry" at least in some embodiments refers to, is part of, or includes circuitry capable of sequentially and automatically carrying out a sequence of arithmetic or logical operations, or recording, storing, and/or transferring digital data. The term "processor circuitry" at least in some embodiments refers to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" at least in some embodiments refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" at least in some embodiments refers to, is part of, or includes circuitry that enables the exchange of information between two or more components or devices. The term "interface circuitry" at least in some embodiments refers to one or more hardware interfaces, for example, buses, I/O interfaces, peripheral component interfaces, network interface cards, and/or the like.

The term "element" at least in some embodiments refers to a unit that is indivisible at a given level of abstraction and has a clearly defined boundary, wherein an element may be any type of entity including, for example, one or more devices, systems, controllers, network elements, modules, etc., or combinations thereof. The term "device" at least in some embodiments refers to a physical entity embedded inside, or attached to, another physical entity in its vicinity, with capabilities to convey digital information from or to that physical entity. The term "entity" at least in some embodiments refers to a distinct component of an architecture or device, or information transferred as a payload. The term "controller" at least in some embodiments refers to an element or entity that has the capability to affect a physical entity, such as by changing its state or causing the physical entity to move.

The term "Edge computing" encompasses many implementations of distributed computing that move processing activities and resources (e.g., compute, storage, acceleration resources) towards the "Edge" of the network, in an effort to reduce latency and increase throughput for endpoint users (client devices, user equipment, etc.). Such Edge computing implementations typically involve the offering of such activities and resources in cloud-like services, functions, applications, and subsystems, from one or multiple locations accessible via wireless networks. Thus, the references to an "Edge" of a network, cluster, domain, system or computing arrangement used herein are groups or groupings of functional distributed compute elements and, therefore, generally unrelated to "Edges" (links or connections) as used in graph theory. Specific arrangements of Edge computing applications and services accessible via mobile wireless networks (e.g., cellular and WiFi data networks) may be referred to as "mobile Edge computing" or "multi-access edge computing", which may be referenced by the acronym "MEC". The usage of "MEC" herein may also refer to a standardized implementation promulgated by the European Telecommunications Standards Institute (ETSI), referred to as "ETSI MEC". Terminology that is used by the ETSI MEC specification is generally incorporated herein by reference, unless a conflicting definition or usage is provided herein.

The term "compute node" or "compute device" at least in some embodiments refers to an identifiable entity implementing an aspect of Edge computing operations, whether part of a larger system, distributed collection of systems, or a standalone apparatus. In some examples, a compute node may be referred to as a "Edge node", "Edge device", "Edge system", whether in operation as a client, server, or intermediate entity. Specific implementations of a compute node may be incorporated into a server, base station, gateway, road side unit, on premise unit, UE or end consuming device, or the like.

The term "computer system" at least in some embodiments refers to any type interconnected electronic devices, computer devices, or components thereof. Additionally, the terms "computer system" and/or "system" at least in some embodiments refer to various components of a computer that are communicatively coupled with one another. Furthermore, the term "computer system" and/or "system" at least in some embodiments refer to multiple computer devices and/or multiple computing systems that are communicatively coupled with one another and configured to share computing and/or networking resources.

The term "architecture" at least in some embodiments refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, at least in some embodiments refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" at least in some embodiments refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. The term "station" or "STA" at least in some embodiments refers to a logical entity that is a singly addressable instance of a medium access control (MAC) and physical layer (PHY) interface to the wireless medium (WM). The term "wireless medium" or WM" at least in some embodiments refers to the medium used to implement the transfer of protocol data units (PDUs) between peer physical layer (PHY) entities of a wireless local area network (LAN).

The term "network element" at least in some embodiments refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "access point" or "AP" at least in some embodiments refers to an entity that contains one station (STA) and provides access to the distribution services, via the wireless medium (WM) for associated STAs. An AP comprises a STA and a distribution system access function (DSAF).

The term "base station" at least in some embodiments refers to a network element in a radio access network (RAN), such as a fourth-generation (4G) or fifth-generation (5G) mobile communications network which is responsible for the transmission and reception of radio signals in one or more cells to or from a user equipment (UE). A base station can have an integrated antenna or may be connected to an antenna array by feeder cables. A base station uses specialized digital signal processing and network function hardware. In some examples, the base station may be split into multiple functional blocks operating in software for flexibility, cost, and performance. In some examples, a base station can include an evolved node-B (eNB) or a next generation node-B (gNB). In some examples, the base station may operate or include compute hardware to operate as a compute node. However, in many of the scenarios discussed herein, a RAN node may be substituted with an access point (e.g., wireless network access point) or other network access hardware.

The term "E-UTEAN NodeB", "eNodeB", or "eNB" at least in some embodiments refers to a RAN node providing E-UTRA user plane (PDCP/RLC/MAC/PHY) and control plane (RRC) protocol terminations towards a UE, and connected via an S1 interface to the Evolved Packet Core (EPC). Two or more eNBs are interconnected with each other (and/or with one or more en-gNBs) by means of an X2 interface.

The term "next generation eNB" or "ng-eNB" at least in some embodiments refers to a RAN node providing E-UTRA user plane and control plane protocol terminations towards a UE, and connected via the NG interface to the 5GC. Two or more ng-eNBs are interconnected with each other (and/or with one or more gNBs) by means of an Xn interface.

The term "Next Generation NodeB", "gNodeB", or "gNB" at least in some embodiments refers to a RAN node providing NR user plane and control plane protocol terminations towards a UE, and connected via the NG interface to the 5GC. Two or more gNBs are interconnected with each other (and/or with one or more ng-eNBs) by means of an Xn interface.

The term "E-UTRA-NR gNB" or "en-gNB" at least in some embodiments refers to a RAN node providing NR user plane and control plane protocol terminations towards a UE, and acting as a Secondary Node in E-UTRA-NR Dual Connectivity (EN-DC) scenarios (see e.g., 3GPP TS 37.340 v16.6.0 (2021 Jul. 9)). Two or more en-gNBs are interconnected with each other (and/or with one or more eNBs) by means of an X2 interface.

The term "Next Generation RAN node" or "NG-RAN node" at least in some embodiments refers to either a gNB or an ng-eNB.

The term "Central Unit" or "CU" at least in some embodiments refers to a logical node hosting radio resource control (RRC), Service Data Adaptation Protocol (SDAP), and/or Packet Data Convergence Protocol (PDCP) protocols/layers of an NG-RAN node, or RRC and PDCP protocols of the en-gNB that controls the operation of one or more DUs; a CU terminates an F1 interface connected with a DU and may be connected with multiple DUs.

The term "Distributed Unit" or "DU" at least in some embodiments refers to a logical node hosting radio link control (RLC), medium access control (MAC), and physical (PHY) layers of the NG-RAN node or en-gNB, and its operation is partly controlled by a CU; one DU supports one or multiple cells, and one cell is supported by only one DU; and a DU terminates the F1 interface connected with a CU.

The term "Residential Gateway" or "RG" at least in some embodiments refers to a device providing, for example, voice, data, broadcast video, video on demand, to other devices in customer premises. The term "Wireline 5G Access Network" or "W-5GAN" at least in some embodiments refers to a wireline AN that connects to a 5GC via N2 and N3 reference points. The W-5GAN can be either a W-5GBAN or W-5GCAN. The term "Wireline 5G Cable Access Network" or "W-5GCAN" at least in some embodiments refers to an Access Network defined in/by CableLabs. The term "Wireline BBF Access Network" or "W-5GBAN" at least in some embodiments refers to an Access Network defined in/by the Broadband Forum (BBF). The term "Wireline Access Gateway Function" or "W-AGF" at least in some embodiments refers to a Network function in W-5GAN that provides connectivity to a 3GPP 5G Core network (5GC) to 5G-RG and/or FN-RG. The term "5G-RG" at least in some embodiments refers to an RG capable of connecting to a 5GC playing the role of a user equipment with regard to the 5GC; it supports secure element and exchanges N1 signaling with 5GC. The 5G-RG can be either a 5G-BRG or 5G-CRG The term "central office" (or CO) indicates an aggregation point for telecommunications infrastructure within an accessible or defined geographical area, often where telecommunication service providers have traditionally located switching equipment for one or multiple types of access networks. The CO can be physically designed to house telecommunications infrastructure equipment or compute, data storage, and network resources. The CO need not, however, be a designated location by a telecommunications service provider. The CO may host any number of compute devices for Edge applications and services, or even local implementations of cloud-like services.

The term "cloud computing" or "cloud" at least in some embodiments refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" at least in some embodiments refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable. Additionally or alternatively, the term "Resource" at least in some embodiments refers to an object or component of the API on which the operations are acted upon.

The term "workload" at least in some embodiments refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

The term "cloud service provider" (or CSP) indicates an organization which operates typically large-scale "cloud" resources comprised of centralized, regional, and Edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to Edge computing.

The term "data center" at least in some embodiments refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and Edge data center (e.g., smallest).

The term "access Edge layer" indicates the sub-layer of infrastructure Edge closest to the end user or device. For example, such layer may be fulfilled by an Edge data center deployed at a cellular network site. The access Edge layer functions as the front line of the infrastructure Edge and may connect to an aggregation Edge layer higher in the hierarchy.

The term "aggregation Edge layer" indicates the layer of infrastructure Edge one hop away from the access Edge layer. This layer can exist as either a medium-scale data center in a single location or may be formed from multiple interconnected micro data centers to form a hierarchical topology with the access Edge to allow for greater collaboration, workload failover, and scalability than access Edge alone.

The term "network function virtualization" (or NFV) indicates the migration of NFs from embedded services inside proprietary hardware appliances to software-based virtualized NFs (or VNFs) running on standardized CPUs (e.g., within standard x86® and ARM® servers, such as those including Intel® Xeon™ or AMD® Epyc™ or Opteron™ processors) using industry standard virtualization and cloud computing technologies. Additionally or alternatively, NFV processing and data storage will occur at the Edge data centers that are connected directly to the local cellular site, within the infrastructure Edge.

The term "virtualized NF" (or VNF) indicates a software-based NF operating on multi-function, multi-purpose compute resources (e.g., x86, ARM processing architecture) which are used by NFV in place of dedicated physical equipment. Additionally or alternatively, several VNFs will operate on an Edge data center at the infrastructure Edge.

The term "edge compute node" at least in some embodiments refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" generally refer to a distributed architecture, organization, or collection of multiple nodes and devices, and which is organized to accomplish or offer some aspect of services or resources in an edge computing setting.

The term "cluster" at least in some embodiments refers to a set or grouping of entities as part of an Edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

The term "radio technology" at least in some embodiments refers to technology for wireless transmission and/or reception of electromagnetic radiation for information transfer. The term "radio access technology" or "RAT" at least in some embodiments refers to the technology used for the underlying physical connection to a radio based communication network. The "RAT type" identifies the transmission technology used in an access network, for example, new radio (NR), narrowband IoT (NB-IOT), Untrusted Non-3GPP, Trusted Non-3GPP, Trusted IEEE 802.11, Non-3GPP access, Wireline, Wireline-Cable, Wireline Broadband Forum (wireline-BBF), etc.

The term "V2X" at least in some embodiments refers to vehicle to vehicle (V2V), vehicle to infrastructure (V2I), infrastructure to vehicle (I2V), vehicle to network (V2N), and/or network to vehicle (N2V) communications and associated radio access technologies.

The term "communication protocol" (either wired or wireless) at least in some embodiments refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Digital Enhanced Cordless Telecommunications (DECT), DECT Ultra Low Energy (DECT ULE), DECT-2020, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11ay, etc.), V2X communication including C-V2X, WAVE, 802.11bd, Dedicated Short Range Communications (DSRC), Intelligent-Transport-Systems (ITS) including the European ITS-G5, ITS-G5B, ITS-G5C, etc. Ultra High Frequency (UHF) communication, Very High Frequency (VHF) communication. In addition to the standards listed above, any number of satellite uplink technologies may be used for purposes of the present disclosure including, for example, radios compliant with standards issued by the International Telecommunication Union (ITU), or the ETSI, among others. The examples provided herein are thus understood as being applicable to various other communication technologies, both existing and not yet formulated.

The term "channel" at least in some embodiments refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" at least in some embodiments refers to a connection between two devices through a RAT for the purpose of transmitting and receiving information.

The term "localized network" as used herein may refer to a local network that covers a limited number of connected vehicles in a certain area or region. The term "distributed computing" as used herein may refer to computation resources that are geographically distributed within the vicinity of one or more localized networks' terminations. The term "local data integration platform" as used herein may refer to a platform, device, system, network, or element(s) that integrate local data by utilizing a combination of localized network(s) and distributed computation.

The term "Quality of Service" or "QoS' at least in some embodiments refers to a description or measurement of the overall performance of a service (e.g., telephony and/or cellular service, network service, wireless communication/connectivity service, cloud computing service, etc.). In some cases, the QoS may be described or measured from the perspective of the users of that service, and as such, QoS may be the collective effect of service performance that determine the degree of satisfaction of a user of that service. In other cases, QoS at least in some embodiments refers to traffic prioritization and resource reservation control mechanisms rather than the achieved perception of service quality. In these cases, QoS is the ability to provide different priorities to different applications, users, or flows, or to guarantee a certain level of performance to a flow. In either case, QoS is characterized by the combined aspects of performance factors applicable to one or more services such as, for example, service operability performance, service accessibility performance; service retain ability performance; service reliability performance, service integrity performance, and other factors specific to each service. Several related aspects of the service may be considered when quantifying the QoS, including packet loss rates, bit rates, throughput, transmission delay, availability, reliability, jitter, signal strength and/or quality measurements, and/or other measurements such as those discussed herein.

The terms "beamforming" and "beam steering" at least in some embodiments refer to a spatial filtering mechanism used at a transmitter (Tx) to improve the received signal power, signal-to-noise ratio (SNR), or some other signaling metric at an intended receiver (Rx). The term "beamformer" at least in some embodiments refers to a STA that transmits a physical layer PDU (PPDU) using a beamforming steering matrix. The term "beamforming steering matrix" at least in some embodiments refers to a matrix determined using knowledge of the channel between a Tx and an intended Rx that maps from space-time streams to transmit antennas with the goal of improving the signal power, SNR, and/or some other signaling metrics at the intended Rx.

The term "basic service set" or "BSS" at least in some embodiments refers to a set of STAs that have successfully synchronized using the JOIN service primitives and one STA that has used the START primitive. Alternatively, a set of STAs that have used the START primitive specifying matching mesh profiles where the match of the mesh profiles has been verified via the scanning procedure. Membership in a BSS does not imply that wireless communication with all other members of the BSS is possible.

The term "coordination function" at least in some embodiments refers to a logical function that determines when a STA is permitted to transmit PDUs via a WM. The term "distributed coordination function" or "DCF" at least in some embodiments refers to a class of coordination function(s) where the same coordination function logic is active in every STA in a basic service set (BSS) whenever the network is in operation. The term "distribution service" at least in some embodiments refers to a service that, by using association information, delivers medium access control (MAC) service tuples within a distribution system (DS). The term "distribution system" or DS" at least in some embodiments refers to a system used to interconnect a set of basic service sets (BSSs) and integrated local area networks (LANs) to create an extended service set (ESS).

The term "clear channel assessment (CCA) function" at least in some embodiments refers to a logical function in the physical layer (PHY) that determines the current state of use of a WM.

The terms "instantiate," "instantiation," and the like at least in some embodiments refers to the creation of an instance. An "instance" also at least in some embodiments refers to a concrete occurrence of an object, which may occur, for example, during execution of program code. The term "information element" at least in some embodiments refers to a structural element containing one or more fields. The term "field" at least in some embodiments refers to individual contents of an information element, or a data element that contains content. The term "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like. The term "data element" or "DE" at least in some embodiments refers to a data type that contains one single data. The term "data frame" or "DF" at least in some embodiments refers to a data type that contains more than one data element in a predefined order.

The term "datagram" at least in some embodiments at least in some embodiments refers to a basic transfer unit associated with a packet-switched network; a datagram may be structured to have header and payload sections. The term "datagram" at least in some embodiments may be referred to as a "data unit" or the like.

The term "subframe" at least in some embodiments at least in some embodiments refers to a time interval during which a signal is signaled. In some implementations, a subframe is equal to 1 millisecond (ms). The term "time slot" at least in some embodiments at least in some embodiments refers to an integer multiple of consecutive subframes. The term "superframe" at least in some embodiments at least in some embodiments refers to a time interval comprising two time slots.

The term "interoperability" at least in some embodiments refers to the ability of STAs utilizing one communication system or RAT to communicate with other STAs utilizing another communication system or RAT. The term "Coexistence" at least in some embodiments refers to sharing or allocating radiofrequency resources among STAs using either communication system or RAT.

The term "reliability" at least in some embodiments refers to the ability of a computer-related component (e.g., software, hardware, or network element/entity) to consistently perform a desired function and/or operate according to a specification. Reliability in the context of network communications (e.g., "network reliability") may refer to the ability of a network to carry out communication. Network reliability may also be (or be a measure of) the probability of delivering a specified amount of data from a source to a destination (or sink).

The term "user" in the context of reconfigurable radio equipment/systems, at least in some embodiments refers to an abstract representation of any entity issuing command requests (e.g., using the services) to the multiradio computer. Three types of users are distinguished based on the type of services used: administrator for multiradio management plane, mobility policy manager for control plane, and networking stack for user plane.

The term "use case" at least in some embodiments refers to a description of a system from a user's perspective. Use cases sometimes treat a system as a black box, and the interactions with the system, including system responses, are perceived as from outside the system. Use cases typically avoid technical jargon, preferring instead the language of the end user or domain expert.

The term "quality" at least in some embodiments refers to a property, character, attribute, or feature of something as being affirmative or negative, and/or a degree of excellence of something. Additionally or alternatively, the term "quality" at least in some embodiments, in the context of data processing systems, refers to a state of qualitative and/or quantitative aspects of data, processes, and/or some other aspects of data processing systems.

The term "application" may refer to a computer program designed to carry out a specific task other than one relating to the operation of the computer itself. Additionally or alternatively, term "application" may refer to a complete and deployable package, environment to achieve a certain function in an operational environment. The term "AI/ML application" or the like may be an application that contains some AI/ML models and application-level descriptions.

The term "machine learning" or "ML at least in some embodiments refers to the use of computer systems to optimize a performance criterion using example (training) data and/or past experience. ML involves using algorithms to perform specific task(s) without using explicit instructions to perform the specific task(s), but instead relying on learnt patterns and/or inferences. ML uses statistics to build mathematical model(s) (also referred to as "ML models" or simply "models") in order to make predictions or decisions based on sample data (e.g., training data). The model is defined to have a set of parameters, and learning is the execution of a computer program to optimize the parameters of the model using the training data or past experience. The trained model may be a predictive model that makes predictions based on an input dataset, a descriptive model that gains knowledge from an input dataset, or both predictive and descriptive. Once the model is learned (trained), it can be used to make inferences (e.g., predictions). ML algorithms perform a training process on a training dataset to estimate an underlying ML model. An ML algorithm is a computer program that learns from experience with respect to some task(s) and some performance measure(s)/metric(s), and an ML model is an object or data structure created after an ML algorithm is trained with training data. In other words, the term "ML model" or "model" may describe the output of an ML algorithm that is trained with training data. After training, an ML model may be used to make predictions on new datasets. Additionally, separately trained AI/ML models can be chained together in a AI/ML pipeline during inference or prediction generation. Although the term "ML algorithm at least in some embodiments refers to different concepts than the term "ML model," these terms may be used interchangeably for the purposes of the present disclosure. ML techniques generally fall into the following main types of learning problem categories: supervised learning, unsupervised learning, and reinforcement learning.

The term "supervised learning at least in some embodiments refers to an ML technique that aims to learn a function or generate an ML model that produces an output given a labeled data set. Supervised learning algorithms build models from a set of data that contains both the inputs and the desired outputs. For example, supervised learning involves learning a function or model that maps an input to an output based on example input-output pairs or some other form of labeled training data including a set of training examples. Each input-output pair includes an input object (e.g., a vector) and a desired output object or value (referred to as a "supervisory signal"). Supervised learning can be grouped into classification algorithms, regression algorithms, and instance-based algorithms.

The term "classification" in the context of ML may refer to an ML technique for determining the classes to which various data points belong. Here, the term "class" or "classes" may refer to categories, and are sometimes called "targets" or "labels." Classification is used when the outputs are restricted to a limited set of quantifiable properties. Classification algorithms may describe an individual (data) instance whose category is to be predicted using a feature vector. As an example, when the instance includes a collection (corpus) of text, each feature in a feature vector may be the frequency that specific words appear in the corpus of text. In ML classification, labels are assigned to instances, and models are trained to correctly predict the pre-assigned labels of from the training examples. ML algorithms for classification may be referred to as a "classifier." Examples of classifiers include linear classifiers, k-nearest neighbor (kNN), decision trees, random forests, support vector machines (SVMs), Bayesian classifiers, convolutional neural networks (CNNs), among many others (note that some of these algorithms can be used for other ML tasks as well).

The terms "regression algorithm" and/or "regression analysis" in the context of ML may refer to a set of statistical processes for estimating the relationships between a dependent variable (often referred to as the "outcome variable") and one or more independent variables (often referred to as "predictors", "covariates", or "features"). Examples of regression algorithms/models include logistic regression, linear regression, gradient descent (GD), stochastic GD (SGD), and the like.

The terms "instance-based learning" or "memory-based learning" in the context of ML may refer to a family of learning algorithms that, instead of performing explicit generalization, compares new problem instances with instances seen in training, which have been stored in memory. Examples of instance-based algorithms include k-nearest neighbor, and the like), decision tree Algorithms (e.g., Classification And Regression Tree (CART), Iterative Dichotomiser 3 (ID3), C4.5, chi-square automatic interaction detection (CHAID), etc.), Fuzzy Decision Tree (FDT), and the like), Support Vector Machines (SVM), Bayesian Algorithms (e.g., Bayesian network (BN), a dynamic BN (DBN), Naive Bayes, and the like), and ensemble algorithms (e.g., Extreme Gradient Boosting, voting ensemble, bootstrap aggregating ("bagging"), Random Forest and the like.

The term "feature" in the context of ML refers to an individual measureable property, quantifiable property, or characteristic of a phenomenon being observed. Features are usually represented using numbers/numerals (e.g., integers), strings, variables, ordinals, real-values, categories, and/or the like. A set of features may be referred to as a "feature vector." A "vector" may refer to a tuple of one or more values called scalars, and a "feature vector" may be a vector that includes a tuple of one or more features.

The term "unsupervised learning at least in some embodiments refers to an ML technique that aims to learn a function to describe a hidden structure from unlabeled data. Unsupervised learning algorithms build models from a set of data that contains only inputs and no desired output labels. Unsupervised learning algorithms are used to find structure in the data, like grouping or clustering of data points. Examples of unsupervised learning are K-means clustering, principal component analysis (PCA), and topic modeling, among many others. The term "semi-supervised learning at least in some embodiments refers to ML algorithms that develop ML models from incomplete training data, where a portion of the sample input does not include labels.

The term "reinforcement learning" or "RL" at least in some embodiments refers to a goal-oriented learning technique based on interaction with an environment. In RL, an agent aims to optimize a long-term objective by interacting with the environment based on a trial and error process. Examples of RL algorithms include Markov decision process, Markov chain, Q-learning, multi-armed bandit learning, and deep RL. The term "multi-armed bandit problem", "K-armed bandit problem", "N-armed bandit problem", or "contextual bandit" at least in some embodiments refers to a problem in which a fixed limited set of resources must be allocated between competing (alternative) choices in a way that maximizes their expected gain, when each choice's properties are only partially known at the time of allocation, and may become better understood as time passes or by allocating resources to the choice. The term "contextual multi-armed bandit problem" or "contextual bandit" at least in some embodiments refers to a version of multi-armed bandit where, in each iteration, an agent has to choose between arms; before making the choice, the agent sees a d-dimensional feature vector (context vector) associated with a current iteration, the learner uses these context vectors along with the rewards of the arms played in the past to make the choice of the arm to play in the current iteration, and over time the learner's aim is to collect enough information about how the context vectors and rewards relate to each other, so that it can predict the next best arm to play by looking at the feature vectors.

The term "reward function", in the context of RL, at least in some embodiments refers to a function that outputs a reward value based on one or more reward variables; the reward value provides feedback for an RL policy so that an RL agent can learn a desirable behavior. The term "reward shaping", in the context of RL, at least in some embodiments refers to a adjusting or altering a reward function to output a positive reward for desirable behavior and a negative reward for undesirable behavior.

The terms "artificial neural network", "neural network", or "NN" refer to an ML technique comprising a collection of connected artificial neurons or nodes that (loosely) model neurons in a biological brain that can transmit signals to other arterial neurons or nodes, where connections (or edges) between the artificial neurons or nodes are (loosely) modeled on synapses of a biological brain. The artificial neurons and edges typically have a weight that adjusts as learning proceeds. The weight increases or decreases the strength of the signal at a connection. Neurons may have a threshold such that a signal is sent only if the aggregate signal crosses that threshold. The artificial neurons can be aggregated or grouped into one or more layers where different layers may perform different transformations on their inputs. Signals travel from the first layer (the input layer), to the last layer (the output layer), possibly after traversing the layers multiple times. NNs are usually used for supervised learning, but can be used for unsupervised learning as well. Examples of NNs include deep NN (DNN), feed forward NN (FFN), a deep FNN (DFF), convolutional NN (CNN), deep CNN (DCN), deconvolutional NN (DNN), a deep belief NN, a perception NN, recurrent NN (RNN) (e.g., including Long Short Term Memory (LS™) algorithm, gated recurrent unit (GRU), etc.), deep stacking network (DSN).

The term "session" at least in some embodiments refers to a temporary and interactive information interchange between two or more communicating devices, two or more application instances, between a computer and user, or between any two or more entities or elements.

The term "Data Network" or "DN" at least in some embodiments refers to a network hosting data-centric services such as, for example, operator services, the internet, third-party services, or enterprise networks. Additionally or alternatively, a DN at least in some embodiments refers to service networks that belong to an operator or third party, which are offered as a service to a client or user equipment (UE). DNs are sometimes referred to as "Packet Data Networks" or "PDNs". The term "Local Area Data Network" or "LADN" at least in some embodiments refers to a DN that is accessible by the UE only in specific locations, that provides connectivity to a specific DNN, and whose availability is provided to the UE.

The term "PDU Connectivity Service" at least in some embodiments refers to a service that provides exchange of protocol data units (PDUs) between a UE and a DN. The term "PDU Session" at least in some embodiments refers to an association between a UE and a DN that provides a PDU connectivity service. A PDU Session type can be IPv4, IPv6, IPv4v6, Ethernet, Unstructured, or any other network/connection type, such as those discussed herein. The term "MA PDU Session" at least in some embodiments refers to a PDU Session that provides a PDU connectivity service, which can use one access network at a time or multiple access networks simultaneously.

The term "traffic shaping" at least in some embodiments refers to a bandwidth management technique that manages data transmission to comply with a desired traffic profile or class of service. Traffic shaping ensures sufficient network bandwidth for time-sensitive, critical applications using policy rules, data classification, queuing, QoS, and other techniques. The term "throttling" at least in some embodiments refers to the regulation of flows into or out of a network, or into or out of a specific device or element.

The term "network address" at least in some embodiments refers to an identifier for a node or host in a computer network, and may be a unique identifier across a network and/or may be unique to a locally administered portion of the network. Examples of network addresses include a Closed Access Group Identifier (CAG-ID), Bluetooth hardware device address (BD ADDR), a cellular network address (e.g., Access Point Name (APN), AMF identifier (ID), AF-Service-Identifier, Edge Application Server (EAS) ID, Data Network Access Identifier (DNAI), Data Network Name (DNN), EPS Bearer Identity (EBI), Equipment Identity Register (EIR) and/or 5G-EIR, Extended Unique Identifier (EUI), Group ID for Network Selection (GIN), Generic Public Subscription Identifier (GPSI), Globally Unique AMF Identifier (GUAMI), Globally Unique Temporary Identifier (GUTI) and/or 5G-GUTI, International Mobile Equipment Identity (IMEI), IMEI Type Allocation Code (IMEA/TAC), International Mobile Subscriber Identity (IMSI), Local Area Data Network (LADN) DNN, Mobile Subscriber Identification Number (MSIN), Mobile Subscriber/Station ISDN Number (MSISDN), Network identifier (NID), Network Slice Instance (NSI) ID, Permanent Equipment Identifier (PEI), Public Land Mobile Network (PLMN) ID, QoS Flow ID (QFI) and/or 5G QoS Identifier (5QI), RAN ID, Routing Indicator, SMS Function (SMSF) ID, Stand-alone Non-Public Network (SNPN) ID, Subscription Concealed Identifier (SUCI), Subscription Permanent Identifier (SUPI), Temporary Mobile Subscriber Identity (TMSI) and variants thereof, UE Access Category and Identity, and/or other cellular network related identifiers), an email address, Enterprise Application Server ID, an endpoint address, an Electronic Product Code (EPC) as defined by the EPCglobal Tag Data Standard, a Fully Qualified Domain Name (FQDN), an internet protocol (IP) address in an IP network (e.g., IP version 4 (Ipv4), IP version 6 (IPv6), etc.), an internet packet exchange (IPX) address, Local Area Network (LAN) ID, a media access control (MAC) address, personal area network (PAN) ID, a port number (e.g., Transmission Control Protocol (TCP) port number, User Datagram Protocol (UDP) port number), QUIC connection ID, RFID tag, service set identifier (SSID) and variants thereof, telephone numbers in a public switched telephone network (PTSN), universally unique identifier (UUID) (e.g., as specified in ISO/IEC 11578:1996), a Universal Resource Locator (URL) and/or Universal Resource Identifier (URI), Virtual LAN (VLAN) ID, an X.21 address, an X.25 address, Zigbee® ID, Zigbee® Device Network ID, and/or any other suitable network address and components thereof. The term "application identifier", "application ID", or "app ID" at least in some embodiments refers to an identifier that can be mapped to a specific application or application instance; in the context of 3GPP 5G/NR systems, an “application identifier” may refer to an identifier that can be mapped to a specific application traffic detection rule. An “endpoint address” may refer to an address used to determine the host/authority part of a target URI, where the target URI is used to access an NF service (e.g., to invoke service operations) of an NF service producer or for notifications to an NF service consumer. The term “CAG-ID” at least in some embodiments refers to an identifier of a Closed Access Group (CAG), and the term “closed access group” or “CAG” at least in some embodiments refers to a group of list of users permitted to connect and/or access a specific network, a specific access network, and/or attach to a specific cell or network access node. Closed access groups (CAGs) are sometimes referred to as Access Control Lists (ACLs), Closed Subscriber Groups (CSGs), Closed User Groups (CUGs), and the like. The term “port” as used herein (e.g., in the context of computer networks) at least in some embodiments refers to a communication endpoint, a virtual data connection between two or more entities, and/or a virtual point where network connections start and end; additionally or alternatively, a “port” is associated with a specific process or service.

The term “subnetwork” or “subnet” at least in some embodiments refers to a logical subdivision of a network, such as an IP network. The practice of dividing a network into two or more networks is called “subnetting.” The term “netmask” or “subnet mask” at least in some embodiments refers to a bitmask applied by bitwise AND operations to a network address (e.g., an IP address in an IP network) to yield a routing prefix, and/or is a 32-bit “mask” used to divide an IP address into subnets and specify the network’s available hosts.

The term “cryptographic hash function”, “hash function”, or “hash”) at least in some embodiments refers to a mathematical algorithm that maps data of arbitrary size (sometimes referred to as a “message”) to a bit array of a fixed size (sometimes referred to as a “hash value”, “hash”, or “message digest”). A cryptographic hash function is usually a one-way function, which is a function that is practically infeasible to invert. The term “integrity” at least in some embodiments refers to a mechanism that assures that data has not been altered in an unapproved way. Examples of cryptographic mechanisms that can be used for integrity protection include digital signatures, message authentication codes (MAC), and secure hashes.

The term “flow” at least in some embodiments refers to a sequence of data and/or data units (e.g., datagrams, packets, or the like) from a source entity/element to a destination entity/element. Additionally or alternatively, the terms “flow” or “traffic flow” at least in some embodiments refer to an artificial and/or logical equivalent to a call, connection, or link. Additionally or alternatively, the terms “flow” or “traffic flow” at least in some embodiments refer to a sequence of packets sent from a particular source to a particular unicast, anycast, or multicast destination that the source desires to label as a flow; from an upper-layer viewpoint, a flow may include of all packets in a specific transport connection or a media stream, however, a flow is not necessarily 1:1 mapped to a transport connection. Additionally or alternatively, the terms “flow” or “traffic flow” at least in some embodiments refer to a set of data and/or data units (e.g., datagrams, packets, or the like) passing an observation point in a network during a certain time interval. Additionally or alternatively, the term “flow” at least in some embodiments refers to a user plane data link that is attached to an association. Examples are circuit switched phone call, voice over IP call, reception of an SMS, sending of a contact card, PDP context for internet access, demultiplexing a TV channel from a channel multiplex, calculation of position coordinates from geopositioning satellite signals, etc. For purposes of the present disclosure, the terms “traffic flow”, “data flow”, “dataflow”, “packet flow”, “network flow”, and/or “flow” may be used interchangeably even though these terms may refer to different concepts.

The term “stream” at least in some embodiments refers to a sequence of data elements made available over time. At least in some embodiments, functions that operate on a stream, which may produce another stream, are referred to as “filters,” and can be connected in pipelines, analogously to function composition. Filters may operate on one item of a stream at a time, or may base an item of output on multiple items of input, such as a moving average.

The term “distributed computations” at least in some embodiments refers to a model in which components located on networked computers communicate and coordinate their actions by passing messages interacting with each other in order to achieve a common goal.

The term “microservice” at least in some embodiments refers to one or more processes that communicate over a network to fulfil a goal using technology-agnostic protocols (e.g., HTTP or the like). Additionally or alternatively, the term “microservice” at least in some embodiments refers to services that are relatively small in size, messaging-enabled, bounded by contexts, autonomously developed, independently deployable, decentralized, and/or built and released with automated processes. Additionally or alternatively, the term “microservice” at least in some embodiments refers to a self-contained piece of functionality with clear interfaces, and may implement a layered architecture through its own internal components. The term “microservice architecture” at least in some embodiments refers to a variant of the service-oriented architecture (SOA) structural style wherein applications are arranged as a collection of loosely-coupled services (e.g., fine-grained services) and may use lightweight protocols.

The term “time to live” (or “TTL”) or “hop limit” at least in some embodiments refers to a mechanism which limits the lifespan or lifetime of data in a computer or network. TTL may be implemented as a counter or timestamp attached to or embedded in the data. Once the prescribed event count or timespan has elapsed, data is discarded or revalidated.

The term “queue” at least in some embodiments refers to a collection of entities (e.g., data, objects, events, etc.) are stored and held to be processed later. that are maintained in a sequence and can be modified by the addition of entities at one end of the sequence and the removal of entities from the other end of the sequence; the end of the sequence at which elements are added may be referred to as the “back”, “tail”, or “rear” of the queue, and the end at which elements are removed may be referred to as the “head” or “front” of the queue. Additionally, a queue may perform the function of a buffer, and the terms “queue” and “buffer” may be used interchangeably throughout the present disclosure. The term “enqueue” at least in some embodiments refers to one or more operations of adding an element to the rear of a queue. The term “dequeue” at least in some embodiments refers to one or more operations of removing an element from the front of a queue.

The term “queuing delay” at least in some embodiments refers to an amount of time a job waits in a queue until that job can be executed. Additionally or alternatively, the term “queuing delay” at least in some embodiments refers to an amount of time a packet waits in a queue until it can be processed and/or transmitted. The term "packet delay" at least in some embodiments refers to the time it takes to transfer any packet from one point to another. Additionally or alternatively, the term "packet delay" or "per packet delay" at least in some embodiments refers to the difference between a packet reception time and packet transmission time. Additionally or alternatively, the "packet delay" or "per packet delay" can be measured by subtracting the packet sending time from the packet receiving time where the transmitter and receiver are at least somewhat synchronized. The term "processing delay" at least in some embodiments refers to an amount of time taken to process a packet in a network node. The term "transmission delay" at least in some embodiments refers to an amount of time needed (or necessary) to push a packet (or all bits of a packet) into a transmission medium. The term "propagation delay" at least in some embodiments refers to amount of time it takes a signal's header to travel from a sender to a receiver. The term "network delay" at least in some embodiments refers to the delay of an a data unit within a network (e.g., an IP packet within an IP network).

The term "delay bound" at least in some embodiments refers to a predetermined or configured amount of acceptable delay. The term "per-packet delay bound" at least in some embodiments refers to a predetermined or configured amount of acceptable packet delay where packets that are not processed and/or transmitted within the delay bound are considered to be delivery failures and are discarded or dropped.

The term "Packet Drop Rate" at least in some embodiments refers to a share of packets that were not sent to the target due to high traffic load or traffic management and should be seen as a part of the packet loss rate. The term "Packet Loss Rate" at least in some embodiments refers to a share of packets that could not be received by the target, including packets dropped, packets lost in transmission and packets received in wrong format. The term "latency" at least in some embodiments refers to the amount of time it takes to transfer a first/initial data unit in a data burst from one point to another.

The term "performance indicator" at least in some embodiments refers to performance data aggregated over a group of network functions (NFs), which is derived from performance measurements collected at the NFs that belong to the group, according to the aggregation method identified in a Performance Indicator definition.

The term "physical rate" or "PHY rate" at least in some embodiments refers to a speed at which one or more bits are actually sent over a transmission medium. Additionally or alternatively, the term "physical rate" or "PHY rate" at least in some embodiments refers to a speed at which data can move across a wireless link between a transmitter and a receiver.

The term "throughput" or "network throughput" at least in some embodiments refers to a rate of production or the rate at which something is processed. Additionally or alternatively, the term "throughput" or "network throughput" at least in some embodiments refers to a rate of successful message (date) delivery over a communication channel. The term "goodput" at least in some embodiments refers to a number of useful information bits delivered by the network to a certain destination per unit of time.

The term "establish" or "establishment" at least in some embodiments refers to (partial or in full) acts, tasks, operations, etc., related to bringing or the readying the bringing of something into existence either actively or passively (e.g., exposing a device identity or entity identity). Additionally or alternatively, the term "establish" or "establishment" at least in some embodiments refers to (partial or in full) acts, tasks, operations, etc., related to initiating, starting, or warming communication or initiating, starting, or warming a relationship between two entities or elements (e.g., establish a session, establish a session, etc.). Additionally or alternatively, the term "establish" or "establishment" at least in some embodiments refers to initiating something to a state of working readiness. The term "established" at least in some embodiments refers to a state of being operational or ready for use (e.g., full establishment). Furthermore, any definition for the term "establish" or "establishment" defined in any specification or standard can be used for purposes of the present disclosure and such definitions are not disavowed by any of the aforementioned definitions.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, etc.). Furthermore, various standards (e.g., 3GPP, ETSI, etc.) may define various message formats, PDUs, containers, frames, etc., as comprising a sequence of optional or mandatory data elements (DEs), data frames (DFs), information elements (IEs), and/or the like. However, it should be understood that the requirements of any particular standard should not limit the embodiments discussed herein, and as such, any combination of containers, frames, DFs, DEs, IEs, values, actions, and/or features are possible in various embodiments, including any combination of containers, DFs, DEs, values, actions, and/or features that are strictly required to be followed in order to conform to such standards or any combination of containers, frames, DFs, DEs, IEs, values, actions, and/or features strongly recommended and/or used with or in the presence/absence of optional elements.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. At least one non-transitory computer readable medium comprising instructions to cause at least one processor circuit to at least:
 - access, over a first reference point, information to advertise a first plurality of application programming interfaces (APIs) exposed by a first edge computing platform (ECP), the first ECP to implement a first edge computing technology (ECT) including multi-access edge computing (MEC), the first plurality of APIs including a transport discovery API and a MEC service API;
 - prepare a common API framework (CAPIF) publish service API including (i) a protocol data type to identify a protocol used by the MEC service API and (ii) a transport data type to identify a first transport protocol used to expose the MEC service API, the transport data type different from the protocol data type;
 - based on the CAPIF publish service API, expose, to a second ECP over a second reference point, at least the MEC service API and the transport discovery API, the second ECP to implement a second ECT including the CAPIF, the transport discovery API to provide access to a plurality of different transport protocols available to expose a plurality of service APIs, the plurality of different transport protocols including the first transport protocol associated with the MEC service API, the first transport protocol not supported by the second ECT;
 - obtain a query for a list of exposed APIs from an application implemented by the second ECP;
 - generate the list of exposed APIs, the list of exposed APIs including the first plurality of APIs exposed by the first ECP and a second plurality of APIs exposed by the second ECP; and
 - cause the list of exposed APIs to be sent to the application.

2. The at least one non-transitory computer readable medium of claim 1, wherein the instructions are to cause one or more of the at least one processor circuit to:
 - authenticate and verify the first ECP based on an authentication and attestation mechanism; and
 - authenticate and verify a request from the first ECP based on the authentication and attestation mechanism.

3. The at least one non-transitory computer readable medium of claim 2, wherein the authentication and attestation mechanism is based on at least one of an Open Authorization (OAuth) protocol or a Transport Layer Security (TLS) protocol.

4. The at least one non-transitory computer readable medium of claim 1, wherein the instructions are to cause one or more of the at least one processor circuit to:
 - update a list of applications having access to the list of exposed APIs to include the application; and
 - cause the updated list of applications to be sent to the first ECP.

5. The at least one non-transitory computer readable medium of claim 1, wherein the first ECP is a MEC platform in a MEC framework.

6. The at least one non-transitory computer readable medium of claim 5, wherein the second ECP is an Edge Enabler Server (EES) in a Third Generation Partnership Project (3GPP) Edge Computing framework, and the application is associated with an Edge Application Server (EAS).

7. The at least one non-transitory computer readable medium of claim 1, wherein the first ECP is an EES in a 3GPP Edge Computing framework.

8. The at least one non-transitory computer readable medium of claim 7, wherein the second ECP is a MEC platform in a MEC framework, and the application is associated with an application server.

9. The at least one non-transitory computer readable medium of claim 1, wherein one or more of the at least one processor circuit is included in or connected with a gateway associated with the CAPIF.

10. The at least one non-transitory computer readable medium of claim 9, wherein the first ECP is to act as a CAPIF API Exposure Function (AEF), the first reference point is a first CAPIF reference point, and the second reference point is a second CAPIF reference point.

11. The at least one non-transitory computer readable medium of claim 10, wherein the gateway is part of a CAPIF Core Function (CCF) of the CAPIF.

12. An apparatus comprising:
 - interface circuitry to communicate over a first reference point and a second reference point;
 - instructions; and
 - at least one processor circuit to be programmed by the instructions to:
   - access, over the first reference point, information to advertise a first plurality of application programming interfaces (APIs) exposed by a first edge computing platform (ECP), the first ECP to implement a first edge computing technology (ECT) including multi-access edge computing (MEC), the first plurality of APIs including a transport discovery API and a MEC service API;
   - prepare a common API framework (CAPIF) publish service API including (i) a protocol data type to identify a protocol used by the MEC service API and (ii) a transport data type to identify a first transport protocol used to expose the MEC service API, the transport data type different from the protocol data type;
   - based on the CAPIF publish service API, expose at least the MEC service API and the transport discovery API to a second ECP over the second reference point, the second ECP to implement a second ECT including the CAPIF, the transport discovery API to provide access to a plurality of different transport protocols available to expose a plurality of service APIs, the plurality of different transport protocols including the first transport protocol associated with the service API, the first transport protocol not supported by the second ECT;
   - obtain a query for a list of exposed APIs from an application implemented by the second ECP;
   - generate the list of exposed APIs, the list of exposed APIs including the first plurality of APIs exposed by the first ECP and a second plurality of APIs exposed by the second ECP; and
   - cause the list of exposed APIs to be sent to the application.

13. A method comprising:
 - accessing, over a first reference point, information to advertise a first plurality of application programming interfaces (APIs) exposed by a first edge computing platform (ECP), the first ECP implementing a first edge computing technology (ECT) including multi-access edge computing (MEC), the first plurality of APIs including a transport discovery API and a MEC service API;

preparing a common API framework (CAPIF) publish service API including (i) a protocol data type to identify a protocol used by the MEC service API and (ii) a transport data type to identify a first transport protocol used to expose the MEC service API, the transport data type different from the protocol data type;

exposing, based on the CAPIF publish service API, at least the MEC service API and the transport discovery API to a second ECP over a second reference point, the second ECP implementing a second ECT including the CAPIF, the transport discovery API providing access to a plurality of different transport protocols available to expose a plurality of service APIs, the plurality of different transport protocols including the first transport protocol associated with the service API, the first transport protocol not supported by the second ECT;

obtaining a query for a list of exposed APIs from an application implemented by the second ECP;

generating the list of exposed APIs, the list of exposed APIs including the first plurality of APIs exposed by the first ECP and a second plurality of APIs exposed by the second ECP; and sending the list of exposed APIs to the application.

14. The at least one non-transitory computer readable medium of claim 10, wherein the gateway is outside of a CCF of the CAPIF.

15. The apparatus of claim 12, wherein one or more of the at least one processor circuit is to:

update a list of applications having access to the list of exposed APIs to include the application; and cause the updated list of applications to be sent to the first ECP.

16. The method of claim 13, including sending a list of applications having access to the list of exposed APIs to the first ECP.

* * * * *